(12) United States Patent
Alazba et al.

(10) Patent No.: US 12,591,499 B2
(45) Date of Patent: Mar. 31, 2026

(54) SYSTEM AND METHOD FOR CODE SMELL DETECTION USING TRANSFORMER-BASED CODE REPRESENTATIONS WITH SELF-SUPERVISION BY PREDICTING RESERVED WORDS

(71) Applicant: KING FAHD UNIVERSITY OF PETROLEUM AND MINERALS, Dhahran (SA)

(72) Inventors: Amal Abdulrahman Alazba, Dhahran (SA); Hamoud Ibrahim Aljamaan, Dhahran (SA); Mohammad Rabah Alshayeb, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 262 days.

(21) Appl. No.: 18/427,939

(22) Filed: Jan. 31, 2024

(65) Prior Publication Data

US 2025/0245121 A1 Jul. 31, 2025

(51) Int. Cl.
G06F 11/36 (2025.01)
G06F 8/41 (2018.01)
(Continued)

(52) U.S. Cl.
CPC ............ G06F 11/3608 (2013.01); G06F 8/72 (2013.01)

(58) Field of Classification Search
CPC .... G06F 8/72; G06F 11/3608; G06F 11/3698; G06F 11/3644; G06F 11/3692;
(Continued)

(56) References Cited

U.S. PATENT DOCUMENTS

| | | | |
|---|---|---|---|
| 11,809,302 B2 * | 11/2023 | Clement | .................. G06N 3/08 |
| 12,242,372 B2 * | 3/2025 | Garg | .................. G06F 11/3692 |
| 2022/0374631 A1 | 11/2022 | Gao et al. | |

FOREIGN PATENT DOCUMENTS

| | | |
|---|---|---|
| CN | 114612211 A | 6/2022 |
| CN | 115809464 A | 3/2023 |

OTHER PUBLICATIONS

Khleedl et al., Detection of code smells using machine learning techniques combined with data-balancing methods, 17 pages (Year: 2023).*

(Continued)

*Primary Examiner* — Thuy Dao
(74) *Attorney, Agent, or Firm* — Oblon, McClelland, Maier & Neustadt, L.L.P.

(57) ABSTRACT

A device, method, and non-transitory computer readable medium that for analyzing computer source code to detect code smells is disclosed. The method includes inputting, via processing circuitry, the source code and creating, via the processing circuitry, pseudo labels by a proxy task based on a vector of tokens for the source code. In addition, the method includes training, via the processing circuitry, a transformer model on the pseudo labels, as a pre-trained model that outputs a prediction of a value of tokens in the vector of tokens, and applying, via the processing circuitry, the pre-trained model to a plurality of fine-tuning models for respective downstream tasks, where each fine-tuning model is created by training the pre-trained model. The method also includes outputting, via the processing circuitry, from each fine-tuning model, an indication of whether a code smell has been detected in the source code.

20 Claims, 88 Drawing Sheets

Datasets construction

(51) Int. Cl.
  *G06F 8/70*        (2018.01)
  *G06F 8/72*        (2018.01)
  *G06F 9/44*        (2018.01)
  *G06F 11/3604*     (2025.01)
  *G06N 20/00*       (2019.01)

(58) Field of Classification Search
  CPC ..... G06F 8/71; G06F 8/41; G06F 8/75; G06F
                                11/3616; G06N 20/00
  See application file for complete search history.

(56) References Cited

OTHER PUBLICATIONS

Kovacevic ; Automatic detection of Long Method and God Class code smells through neural source code embeddings ; Expert Systems with Applications, 204 ; May 19, 2022 ; 18 Pages.
Devlin et al. ; BERT: Pre-training of Deep Bidirectional Transformers for Language Understanding ; May 24, 2019 ; 16 Pages.
Feng et al. ; CodeBERT: A Pre-Trained Model for Programming and Natural Languages ; Sep. 18, 2020 ; 12 Pages.
Hua et al. ; FCCA: Hybrid Code Representation for Functional Clone Detection Using Attention Networks ; IEEE Transaction on Reliability, vol. 70, No. 1 ; Mar. 2021 ; 15 Pages.
Bui et al. ; InferCode: Self-Supervised Learning of Code Representations by Predicting Subtrees ; 2021 IEEE/ACM 43$^{rd}$ International Conference on Software Engineering (ICSE) ; 12 Pages.

* cited by examiner

Datasets construction

Data Class Baseline (AUC)

Feature Envy Feature-based (F1-score)

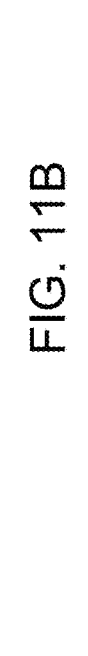

Training dataset accumulo
activemq
airavata
beam
calcite
cocoon
commons-math3
cxf
directory-studio
drill
fop
giraph
hadoop
hbase
hive
jasml
jena
kafka
manifoldcf
nifi
ofbiz
olingo-odata
openjpa
ranger
storm
syncope
tajo
tez
tinkerpop
tomcat
uima-ruta
zeppelin Evaluation dataset accumulo
activemq
airavata
beam
calcite
cocoon
commons-math3
cxf
directory-studio
drill
fop
giraph
hadoop
hbase
hive
jasml
jena
kafka
manifoldcf
nifi
ofbiz
olingo-odata
openjpa
ranger
storm
syncope
tajo
tez
tinkerpop
tomcat
uima-ruta
zeppelin

FIG. 11B

Data Class Feature-based (Recall)

Data Class Baseline (Precision)

Training dataset

Evaluation dataset
Baseline

SYSTEM AND METHOD FOR CODE SMELL DETECTION USING TRANSFORMER-BASED CODE REPRESENTATIONS WITH SELF-SUPERVISION BY PREDICTING RESERVED WORDS

STATEMENT REGARDING PRIOR DISCLOSURE BY THE INVENTORS

Aspects of this technology are described in an article Alazba, A., Aljamaan, H. & Alshayeb, M., "Deep learning approaches for bad smell detection: a systematic literature review," Empir Software Eng 28, 77 (2023). doi.org/10.1007/s10664-023-10312-z, and is incorporated herein by reference in its entirety.

STATEMENT OF ACKNOWLEDGEMENT

The authors acknowledge the support of King Fahd University of Petroleum and Minerals in the development of this work.

BACKGROUND

Technical Field

The present disclosure relates to a system and method of analyzing and processing computing programs. More particularly, the present disclosure relates to system and method for code smell detection using transformer-based code representations with self-supervision by predicting reserved words.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Organizations have thrived through the use of software systems to automate various tasks, such as handling transactions and managing payroll. These organizations have contributed to defining new advanced ways to create business-to-consumer relationships through social networks and cloud computing. This has led to improving organizational efficiency and effectiveness. Over a period of time, software systems have become increasingly large, complicated, and hard to deal with. With the spread of information technologies, there is an increasing demand for software systems that meet non-functional requirements such as maintainability, reliability, and efficiency in addition to cost. As a result, not only is software creation becoming more complicated, but the maintenance processes to correct and improve software have become problematic due to stringent schedules and deadlines. Studies have shown that the cost of maintaining software systems is almost one-hundred times higher than the costs of production (See: Banker, R. D., Datar, S. M., Kemerer, C. F., & Zweig, D. (1993). Software complexity and maintenance costs. Communications of the ACM, 36(11), 81-94. doi.org/10.1145/163359.163375).

The first step towards identifying software quality issues related to maintainability is detecting code smells, where appropriate refactoring techniques can be applied. In computer programming, a code smell is any characteristic in the source code of a program that possibly indicates poorly written code. Code smelling is a process of identifying poorly written code.

Various methods to detect code smells have been developed based on conventional techniques. Most conventional techniques detect code smells by using a series of thresholds dependent on structural parameters (i.e., software metrics) to classify core symptoms that describe specific code smells. Another approach combines multiple structural parameters and formulates a rule that varies depending on the form of code smells (See: Moha, N., Gueheneuc, Y.-G., Duchien, L., & Le Meur, A.-F. (2010). DECOR: A Method for the Specification and Detection of Code and Design Smells. IEEE Trans. Softw. Eng., 36(1), 20-36. doi.org/10.1109/TSE.2009.50). One major limitation of these methodologies is that their performance depends heavily on the threshold values and/or the combination rules for which there is no agreement on standards (See, Lacerda, G., Petrillo, F., Pimenta, M., & Guéhéneuc, Y. G. (2020). Code smells and refactoring: A tertiary systematic review of challenges and observations. Journal of Systems and Software, 167, 110610. doi.org/10.1016/j.jss.2020.110610). To mitigate these limitations, methodologies such as machine learning (ML) and deep learning (DL) have sparked the interest of researchers in recent years (See: Al-Shaaby, A., Aljamaan, H., & Alshayeb, M. (2020). Bad Smell Detection Using Machine Learning Techniques: A Systematic Literature Review. Arabian Journal for Science and Engineering. doi.org/10.1007/s13369-019-04311-w).

Although these techniques have shown to be promising, one major limitation is that they need a vast amount of manually annotated datasets. However, there is a lack of publicly available datasets that can be leveraged in such methodologies. Manual annotation is a tedious, time-consuming, and error-prone activity. For instance, in one study (See: Chen, Z., Chen, L., Ma, W., Zhou, X., Zhou, Y., & Xu, B. (2018), Understanding metric-based detectable smells in Python software: A comparative study. Information and Software Technology, 194, 14-29. doi.org/10.1016/j.infsof.2017.09.011), 600 code smell instances were manually annotated by five people, taking nearly 100 hours per person. To mitigate the error in the manual annotation, researchers usually attempt to use strategies like the majority vote, which requires that each data point be annotated by at least three individuals. Also, in terms of economics, the labeling is costly, for example image labeling costs may be around $6.4 per image, according to Scale, a data labeling firm. Considering this scenario, a dataset of images with tens of thousands of instances may cost around one million dollars.

Using ML techniques with the labeled dataset is known as supervised learning. The challenge with supervised learning is not solely that it needs a labeled dataset, but that it also suffers from generalization issues (See: Liu, X., Zhang, F., Hou, Z., Wang, Z., Mian, L., Zhang, J., & Tang, J. (2021). Self-supervised Learning: Generative or Contrastive. ArXiv: 2006.08218 [Cs, Stat]. arxiv.org/abs/2006.08218X) where the model is trained on only a subset of the data (the labeled ones), thus it has great difficulty in detecting unseen instances.

One of the major limitations of conventional DL-based approaches is the requirement for a large amount of manual annotation of data. As noted above, the collection of a vast amount of labeled data is both expensive and infeasible. In the context of code smells, there is a lack of large-scale datasets which makes it challenging to train DL models. This leads to a vicious cycle of collecting and annotating data, then training DL models.

Self-supervised learning can be leveraged to alleviate the need for data annotation and simplify training of DL models. Self-supervised learning is a framework designed to tackle a supervised learning problem as an unsupervised one. The motivation behind self-supervised learning is to learn useful representations of the data from unlabeled data for a supervised task (e.g., classification, regression). The main goal of self-supervised learning is to eliminate the need for manual annotation of the data and to improve the generalization of the trained model. The framework has been leveraged within the context of NLP and image processing. It has been shown that self-supervised learning can improve the performance of classical tasks such as Question-Answering (See: Devlin, J., Chang, M.-W., Lee, K., & Toutanova, K. (2019). BERT: Pre-training of Deep Bidirectional Transformers for Language Understanding. ArXiv:1810.04805 [Cs]. arxiv.org/abs/1810.04805), NLP inferencing (See: Jaiswal, A., Babu, A. R., Zadeh, M. Z., Banerjee, D., & Makedon, F. (2021). A Survey on Contrastive Self-Supervised Learning. Technologies, 9(1), Article 1. doi.org/10.3390/technologies9010002), and object detection (See: Gidaris, S., Singh, P., & Komodakis, N. (2018). Unsupervised Representation Learning by Predicting Image Rotations (arXiv:1803.07728). doi.org/10.48550/arXiv.1803.07728).

Accordingly, it is one object of the present disclosure to provide systems and methods to mitigate limitations of supervised learning by providing a detection approach that utilizes unlabeled data.

SUMMARY

In an exemplary embodiment, a method of analyzing computer source code to detect code smells is disclosed. The method of analyzing computer source code to detect code smells, includes inputting, via processing circuitry, the source code, creating, via the processing circuitry, pseudo labels by a proxy task based on a vector of tokens for the source code, training, via the processing circuitry, a transformer model on the pseudo labels, as a pre-trained model that outputs a prediction of a value of tokens in the vector of tokens, applying, via the processing circuitry, the pre-trained model to a plurality of fine-tuning models for respective downstream tasks, where each fine-tuning model is created by training the pre-trained model, outputting, via the processing circuitry, from each fine-tuning model, an indication of whether a code smell has been detected in the source code.

In another exemplary embodiment, a system for source code smell detection is disclosed. The system includes a processing circuitry. The processing circuitry is configured to input the source code, create pseudo labels by a proxy task based on a vector of tokens for the source code, train a transformer model on the pseudo labels, as a pre-trained model that outputs a prediction of a value of tokens in the vector of tokens, apply the pre-trained model to a plurality of fine-tuning models for respective downstream tasks, wherein each fine-tuning model is created by training the pre-trained model, and output from each fine-tuning model, an indication of whether code smell has been detected in the source code.

In another exemplary embodiment, a non-transitory computer readable medium having instructions stored therein that, when executed by one or more processor, cause the one or more processors to perform a method of In another exemplary embodiment, a non-transitory computer-readable storage medium including computer executable instructions, wherein the instructions, when executed by processing circuitry, cause the processing circuitry to perform a method of analyzing computer source code to detect code smells is disclosed. The method includes inputting, via the processing circuitry, the source code, creating, via the processing circuitry, pseudo labels by a proxy task based on a vector of tokens for the source code, training, via the processing circuitry, a transformer model on the pseudo labels, as a pre-trained model that outputs a prediction of a value of tokens in the vector of tokens, applying, via the processing circuitry, the pre-trained model to a plurality of fine-tuning models for respective downstream tasks, wherein each fine-tuning model is created by training the pre-trained model, outputting, via the processing circuitry, from each fine-tuning model, an indication of whether a code smell has been detected in the source code.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
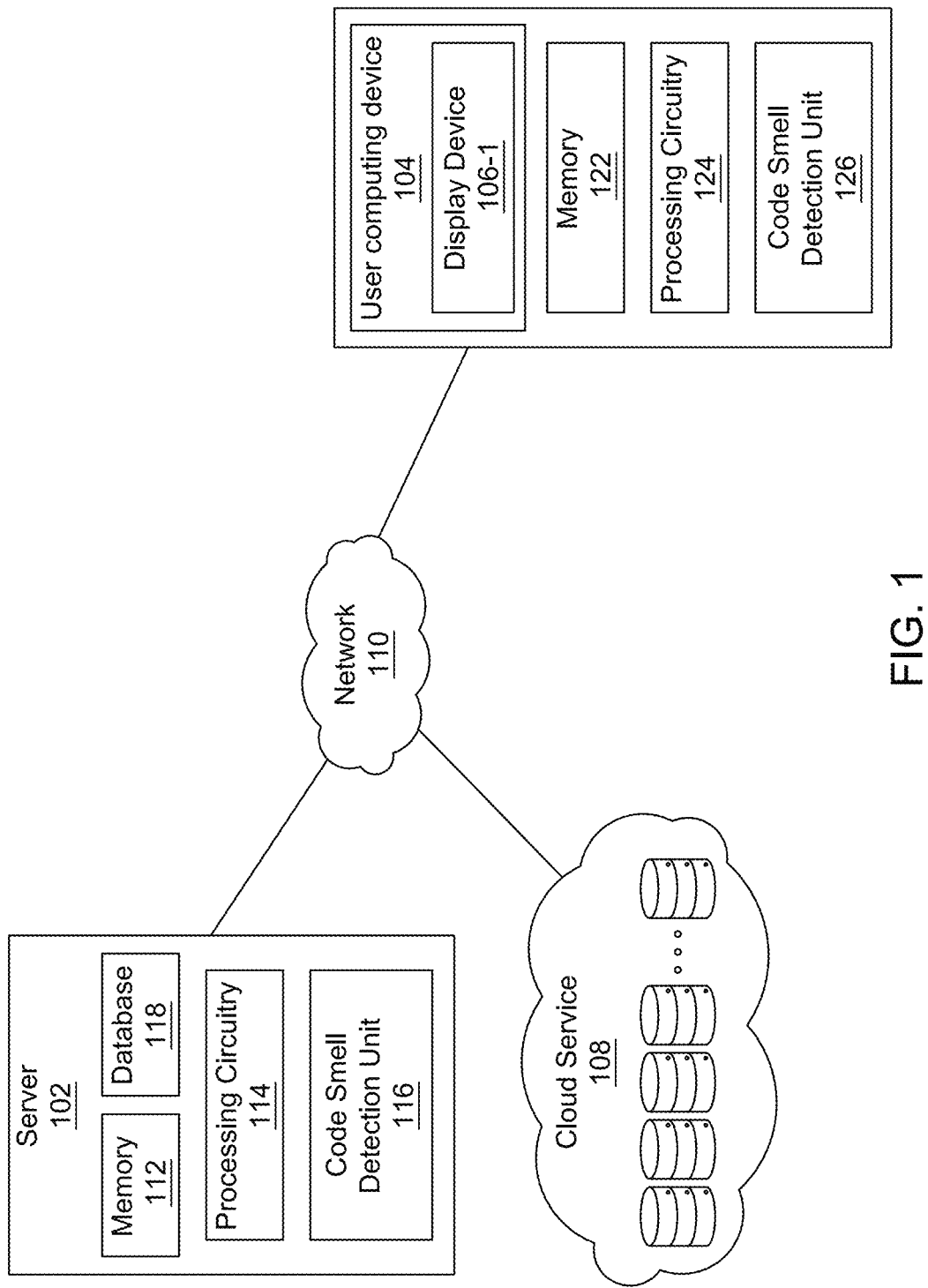
FIG. 1 is a diagram of a machine learning system in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Code smell detection is a process of identifying sections of code that are poorly designed and implemented. As discussed above, supervised learning-based approaches for code smelling need substantial amounts of manually labeled data for implementing, which is not only costly but hard to scale. Unsupervised learning, or learning without necessitating manual annotation work, is vital for effectively harvesting the substantial data that is available. Aspects of this disclosure are directed to methods and systems for analyzing computer source code to detect code smells (also referred to as a Code Representation with Transformers (CoRT)). The disclosure includes a self-supervised learning method to learn intermediate representations, without a need for labels, and fine-tune these representations on downstream tasks. The CoRT system is configured to learn semantics and structural features of the source code by training transformers to recognize masked reserved words that are applied to the code given as input. The CoRT is evaluated on four downstream tasks, i.e., the detection of Data Class, God Class, Feature Envy, and Long Method code smells. The results of the evaluation are compared with two paradigms: supervised learning and feature-based approach. Furthermore, a cross-project experiment is conducted to evaluate generalizability of the disclosed CoRT on unseen labeled data.

FIG. 1 is a system for analyzing computer source code to detect code smells in accordance with an exemplary aspect of the disclosure. In an exemplary embodiment, a server 102 or an artificial intelligence (AI) workstation may be configured for the detection of code smell. With the aforementioned configuration, one or more client computing devices

104 (although shown as a single client computing device 104, there may be more than one client computing device 104) to be used to perform code smell detection for several source code classes at a time. In the embodiment, the server 102 may be connected to a cloud service 108. The cloud service 108 may be accessible via a network 110 (for example, internet, intranet, etc.). The cloud service 108 may provide a database system and may store source code for the system. The client computing devices 104 may be a computer, a laptop, a tablet, a mobile device or any such computing device having processor and memory.

The system 100, among other things, includes a server 102, a client computing device 104, a cloud service 108 and a network 110. The network 110 enables communication between the system components for information exchange. According to an implementation, the server 102 may be deployed and/or executed on any type and form of computing device, for example, a computer, network device, or appliance capable of communicating on any type and form of network (such as the network) and perform the operations described herein. In some embodiments, the server 102 may be implemented across multiple servers, thereby, tasks performed by the server 102 may be performed by the multiple servers. In some embodiments, the client computing device 104 may be any device used by a user. In an implementation, the client computing device 104 may be any computing device, such as, but not limited to, a mobile device, a smart phone, a tablet, a personal digital assistant, a laptop, or any other type and/or form of computing device that is capable of processing data and performing communication. In embodiments, the client computing device 104 includes a memory 122 and a processing circuitry 124 coupled to the memory 122, and a code smell detection unit 126. In some examples, the server 102 may be a cloud computing server. In some examples, the server 102 may be implemented in a cloud.

According to an embodiment, the network 110 may be a private network or a public network. The network 110 may be connected via wired and/or wireless links. Wired links may include Digital Subscriber Line (DSL), coaxial cable lines, or optical fiber lines. Wireless links may include Bluetooth®, Wi-Fi®, Worldwide Interoperability for Microwave Access (WiMAX®), an infrared channel, a satellite band, etc. The wireless links may also include any cellular network standards to communicate among mobile devices. Examples of cellular network standards may include Global System for Mobile (GSM), General Packet Radio Services (GPRS), Universal Mobile Telecommunications Service (UMTS), and Code-Division Multiple Access (CDMA). The network 110 may also encompass a local-area network (LAN), e.g., Intranet, a wide area network (WAN), or the Internet. In some exemplary implementations, the network 110 may be a type of broadcast network, a telecommunications network, a data communication network, or a computer network.

The server 102 may include a memory 112, a processing circuitry 114 and a code smell detection unit 116. In an implementation, the processing circuitry 114 may be any logic circuitry that responds to and processes instructions fetched from the memory 112. In many embodiments, the processing circuitry 114 may be a microprocessor unit, a Graphical Processing Unit (GPU), a microcontroller unit or any integrated circuit configured to process data. The memory 110 may include one or more memory chips capable of storing data and allowing any storage location to be directly accessed by the processing circuitry 114. The memory 110 may be Dynamic Random-Access Memory (DRAM) or any variants, including static Random-Access Memory (SRAM). In some embodiments, the memory 110 may be non-volatile.

In an implementation, the code smell detection unit 116, 126 in server 102 may be coupled to the processing circuitry 114 and the memory 110. In some examples, the code smell detection unit 116, 126 may be a part of memory 112. In some examples, the code smell detection unit 116, 126 may be implemented within the processing circuitry 114. In some embodiments, the code smell detection unit 116, 126 amongst other units, may include routines, programs, objects, components, data structures, etc., which may perform particular tasks or implement particular abstract data types. The the code smell detection unit 116, 126 may also be implemented as, signal processor(s), state machine(s), logic circuitries, and/or any other device or component that manipulates signals based on operational instructions. In some embodiments, the code smell detection unit 116, 126 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or the processing unit may be dedicated to performing the required functions. In some embodiments, the code smell detection unit 116, 126 may be machine-readable instructions that, when executed by a processor/processing unit, perform any of desired and defined functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in the memory 110.

In an implementation, the server 102 may include a database 118. The database 118 may store the codes and/or the smelled codes. In an example, the codes and codes that are processed by the code smell detection unit 116, 126 stored in database 118 may be periodically or dynamically updated as required. In an implementation, the database 118 may include any type or form of storage, such as a database or a file system or coupled to the memory 110.

According to an implementation, the client computing device 104 may include a processor 122 and a memory 124. In an implementation, the processor 122 may be any logic circuitry that responds to and processes instructions fetched from the memory 124. In many embodiments, the processor 122 may be provided by a microprocessor unit, e.g., such as those manufactured by Intel Corporation of Mountain View, California; the ARM processor or those manufactured by Advanced Micro Devices of Sunnyvale, California. The memory 124 may include one or more memory chips capable of storing data and allowing any storage location to be directly accessed by the processor 122. The memory 124 may be Dynamic Random-Access Memory (DRAM) or any variants.

In an implementation, the client computing device 104 may include a code smell detection unit 126. In an implementation, the code smell detection unit 116, 126 may be coupled to the processor 122 and the memory 124. In some embodiments, the code smell detection unit 116, 126, amongst other units, may include routines, programs, objects, components, data structures, etc., which may perform particular tasks or implement particular abstract data types. The code smell detection unit 116, 126 may also be implemented as, signal processor(s), state machine(s), logic circuitries, and/or any other device or component that manipulates signals based on operational instructions.

In some embodiments, the code smell detection unit 116, 126 may be implemented in hardware, instructions executed by a processing unit, or by a combination thereof. The processing unit may comprise a computer, a processor, a state machine, a logic array or any other suitable devices capable of processing instructions. The processing unit may be a general-purpose processor that executes instructions to cause the general-purpose processor to perform the required tasks or the processing unit may be dedicated to performing the required functions. In some embodiments, the code smell detection unit 116, 126 may be machine-readable instructions that, when executed by a processor/processing unit, perform any of desired functionalities. The machine-readable instructions may be stored on an electronic memory device, hard disk, optical disk or other machine-readable storage medium or non-transitory medium. In an implementation, the machine-readable instructions may also be downloaded to the storage medium via a network connection. In an example, machine-readable instructions may be stored in the memory 112, 122. The code smell detection unit 116 and the code smell detection unit 126 may be implementations at the server 102 and the user computing device 104, respectively, and can be implemented in a form of server-client architecture or in an independent form.

An aspect is a code smell detection service provided by code smell detection unit 116 having one or more servers 102 and one or more client computing devices 104. The code smell detection service can determine whether the source code has one or more sections of code subject to code smell and take appropriate action, such as refactor the source code or insert a label that indicates that the source code has been detected as being code smell.

Another aspect is the code smell detection application that any user of a display device will be made aware that a source code is a code smell, or may be provided with a list of classes, downloaded, or stored, that the application has determined to be code smell. The code smell detection software application may be configured to run in the background as a daemon, or be configured to be invoked by a command and/or function associated with a graphical widget. In addition, sections of source code that have been determined to be code smell may be stored in a database 118 containing source code. The database 118 may be maintained in a server computer or in a cloud service 108.

In some embodiments, the code smell detection service may include a code smell detection system of the present disclosure. The code smell detection system may perform an operation of refactoring the source code, or other action based on a setup of the service. The service may be set up to label classes as being code smell, store classes in a separate distribution channel, or other action under the discretion of the code smell detection service.

In some embodiments, the code smell detection system of the present disclosure may take the form of a product, such as a code smell detector device or software application. The code smell detector device or software application may be connected to a source code uploading service 110 and may capture source code distributed by the source code uploading service in order to determine if the source code is a code smell. The code smell detector device or software application may be incorporated into a network system as middleware that is connected between a source code uploading service 110 and an end user display device 106. Source code that is detected as having code smell may be subjected to a follow-up action, such as inserting a label into the source code as an indication that it has been detected as being code smell. Another action may be to redirect those source code detected as having code smell into a database 118 storing source code detected with code smell, for example, to be further analyzed, or separately distributed in a source code channel. A further action may be to block source code having code smell from being uploaded by the source code upload service.

In some embodiments, a code smell detector may be a mobile application that can be installed in a mobile display device 130. The code smell detector mobile application may provide information to the user of the mobile display device that a source code has a code smell, by for example, displaying an indication message, or outputting an audio sound or voice message, in order to make the user aware that a source code has been detected as having code smell.

Figure 2A:
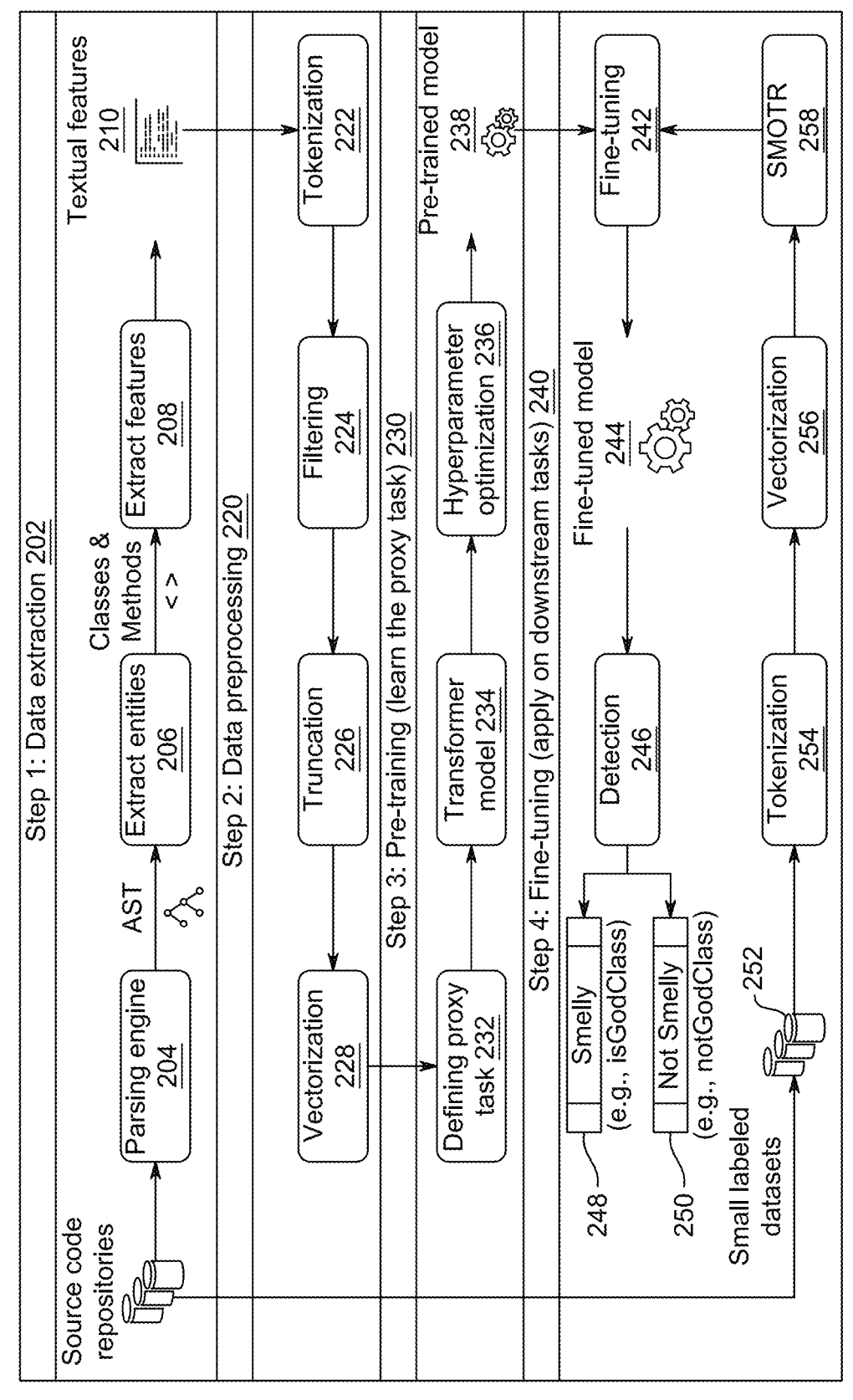
FIG. 2A illustrates a process flow for transformer model architecture training, in accordance with an exemplary aspect of the disclosure.

FIG. 2A is process flow 200, illustrating the generation of fine-tuned models and the application of the fine-tuned models for code smell detection, according to one or more embodiments. Step 1 includes data extraction 202. The data extraction 202 includes substeps, which includes accessing the source code repositories and extracting source code for processing. In substep of 202, a parsing engine 204 of the the code smell detection unit 116, 126 processes the source code to extract entities 206 that includes classes and methods. In an example, ANTLR4 (ANother Tool for Language Recognition) may be used for parsing the source code into Abstract Syntax Tree (AST), from which the entities are extracted. Further, textual the features 210 of the classes are extracted in extraction step 208. The extracted textual features 210 are processed in Step 2 which is data preprocessing 220. The data preprocessing 220 includes tokenization 222, filtering 224, truncation 226 and vectorization 228.

Step 3 includes pre-training 230, that is learning the proxy task. The pre-training includes defining proxy task 232, training the transformer module 234, hyperparameter optimization 236 and generating a pre-trained model 238. The pre-trained model 238 is processed in fine-tuning process 240 in Step 4 which involves fine-tuning 242 to generate a fine-tuned model 244. Also, the source code is processed into small data sets 252, tokenizing 254, vectorizing 256 and SMOTR 258 which is fed to the fine-tuning 242 process for fine-tuning 242. The fine-tuned model is applied on downstream tasks where the model performs smell detection 246 and classifies the code as smelly code 248 and non smelly code 250.

The process flow is elaborated herein. In operation, the code smell detection unit 116, 126 is configured to input, via the processing circuitry 114, the source code. The source code may be a program or module prepared by a coder. In one or more embodiments, the coder may be a human or a machine. In some embodiments, the source code may be generated by a collaboration of human and machine. The code smell detection unit 116, 126 is configured to parse, via the processing circuitry, the source code to extract classes and extract textual features of the classes. In one example, the code smell detection unit 116, 126 may use ANTLR4 for parsing the source code into AST. The ANTLR is a parser generator for reading, processing, executing, or translating structured text. The code smell detection unit 116, 126 is configured to process the AST by traversing through the AST to extract raw classes (and methods) and extract textual features of the classes. In some implementations, class name, class body, methods names, and methods body are extracted. Although, the disclosure describes extracting the classes and textual features of the classes, the code smell detection unit 116, 126 can extract features that can be used as input, such as software metrics, control flow graphs, or binary code. Processing the classes and textual features of the classes over other features has an advantage of reducing transformation overhead and producing good results.

The code smell detection unit 116, 126 is configured to apply, via the processing circuitry 114, a set of preprocessing techniques including the tokenization 222, the filtering 224, the truncation 226, and the vectorization 228, to convert the textual features into a proper format. The tokenization 222 is a process of splitting a sentence into words. In the present context, the textual features are split into lexeme (i.e., tokens). The filtering 224 includes removing any textual features having less than 50 tokens. The truncation 226 is a process for truncating a textual feature into two or more instances. In an example, the code smell detection unit 116, 126 may define a maximum length of an instance to be 256 tokens. In instances, there may be textual features having hundreds or thousands of tokens. In such instances, instead of retaining the initial 256 tokens and discarding the rest of tokens, the code smell detection unit 116, 126 uses the truncation to truncate a single entity into multiple instances of length 256. Text vectorization involves creating a vocabulary of size 30,000, where each distinct token is represented with an integer. Further, the text vectorization 228 converts all instances from text to numerical values. Data balancing includes balancing labeled datasets. In an example, a Synthetic Minority Oversampling Technique (SMOTE) technique may be used to balance labeled datasets.

The code smell detection unit 116, 126 is configured to detect code smells using unlabeled data. The code smell detection unit 116, 126 may learn code representation from transformers using unlabeled data, also referred to as Code Representation with Transformers (CoRT). The code smell detection unit 116, 126 trains CoRT to predict a set of masked words applied to a part of the source code that is given to it as input.

In some examples, the code smell detection unit 116, 126 may define a proxy task that would facilitate learning intermediate data representations. In an example, the proxy task may be a task that is used for pre-training. The training steps may include pseudo label creation and pseudo-label training. The pseudo code in Table 1 summarizes the process of creating pseudo labels.

TABLE 1

Inputs: Training data D = { $x_i$|i = 1 ... m, $x_i \in R^n$}
    Reserved words list R = {$r_i$|i = 1 ... L}
    Mask token id = $MASK_{ID}$
1: Step 1: Get reserved words positions
2: P = {} // empty list
3: for i ← 1 to M do
4:    for t ← 1 to N do
5:       $P_i$ = {index($x_{it}$) if $x_{it} \in R$}
6:       $P = P \cup P_i$
7:    end for
8: end for
9: Step 2: Mask reserved words randomly
10: for i ← 1 to M do 11:    $Mask_{P_i} = \begin{cases} \text{True if } random(1, len(P_i)) < 0.25 \\ \text{False if } random(1, len(P_i)) \geq 0.25 \end{cases}$ 12:    for t ← 1 to $x_i$ tokens do 13:    $x'_{it} = \begin{cases} x_{it} & \text{if } index(x_{it}) \notin P_i \\ MASK_{ID} & \text{if } index(x_{it}) \in P_i \text{ and } Mask_{P_{it}} = True \end{cases}$ TABLE 1-continued

```
14:    end for
15: end for
16: Step 3: Mask random tokens
17: for i ← 1 to M do
```

$$18: \quad \text{Mask}_{Rand_i} = \begin{cases} \text{True if } random(1, len(x_i)) < 0.10 \\ \text{False if } random(1, len(x_i)) \geq 0.10 \end{cases}$$

```
19:    for i ← 1 to N do
```

$$20: \quad x'_{it} = \begin{cases} x_{it} & \text{if } \text{Mask}_{Rand_{it}} = \text{False} \\ \text{MASK}_{ID} & \text{if } \text{Mask}_{Rand_{it}} = \text{True} \end{cases}$$

```
21:      end for
22: end for
23: Step 4: Construct a new data set using with pseudo-labels
24: D* = {x_i*, y_i|i = 1 ... m, x_i* = x_i' and y_i = x_i
Output: Training data D*
```

The code smell detection unit 116, 126 may be configured to use results from the preprocessing techniques of the formatted textual features that consists of m instances where a single instance i is associated with x value which is a feature vector of length n tokens, where each instance i represents a whole class or part of a class, a list R of reserved words of a target programming language, and a unique token $\text{MASK}_{ID}$. To elaborate, for example, in steps, the code smell detection unit 116, 126 is configured to take an input of:

1) unlabeled dataset D that includes of m instances where a single instance i is associated with x value which is a feature vector of length n tokens. Each instance i represents a whole class/method or part of a class/method;

2) a list R of reserved words of the target programming language; and 3) a unique token $\text{MASK}_{ID}$. It returns a new dataset D* that has m instances where a single instance i is associated with a tuple (x*, y), where x is a new feature vector of length n tokens and y is the pseudo label of length n tokens.

In an example implementation, the code smell detection unit 116, 126 may operate in steps that include:

1. getting reserved words positions: considering that there are R reserved words, a new position list P is listed to track the index of the reserved words; for each instance $i \in m$ find the index of token $t \in n$ and add it to P if and only if t is a reserved word;

2. masking reserved words randomly: for each instance $i \in m$ a random True/False array $\text{Mask}_{p_i}$ may be created using position list P created in step 1 and with probability of 25% is True, then for each token $t \in n$, t is replaced with the MASKID when if it is a reserved word and selected by $\text{Mask}_{p_i}$, otherwise the original token t is kept;

3. masking random tokens: for each instance $i \in m$, a random True/False array $\text{Mask}_{Rand_i}$ may be created with probability of 10% is True, then for each token $t \in n$, t may be replaced with the $\text{MASK}_{ID}$ when it is selected by $\text{Mask}_{Rand_i}$, otherwise the original token t is kept; and 4. constructing a new data set with the pseudo-labels: the outputs of step 1 and 2 are considered as a new feature vector x'; for each instance i in D, a new instance i'(x*, y) is created such that (1) x*=x' where x' is the new feature vector created in previous steps, and (2) pseudo-labels y=x where x is the original feature vector.

The reserved words are masked instead of random tokens as the reserved words are a part of syntactic structure of programming language grammar. The pre-training phase provides a model with a good representation of the features. By masking reserved words, the model is configured to learn to localize/recognize reserved words based on the context and then learn the structural and semantics features of a programming language being considered resulting in having a good representation. Furthermore, although program variables such as identifier name, method name, class name, etc., play a role in the syntax of a programming language, program variables tend to have various naming conventions; thus, masking random tokens may make the task ambiguous. In contrast, there is usually no ambiguity in predicting the masked reserved words. Also, the proxy task can easily capture the structural and semantics features without many code transformations, such as converting to binary code, AST, CFG, or using additional tools for extracting software metrics.

The code smell detection unit 116, 126 is configured to train, via the processing circuitry 114, 116, a transformer model on the pseudo labels, to produce a pre-trained model that outputs a prediction of a value of tokens in the vector of tokens. In an example, the transformer model may be a multilayer transformer model. Transformer models has several advantages compared to Convolutional Neural Network (CNN) and Long Short-Term Memory (LSTM). The transformer models are efficient like CNN as the computations can be performed in parallel, and similar to LSTM, which can process sequential data like text and source code. The code smell detection unit 116, 126 is configured to perform hyperparameter optimization to select the number of layers (denoted as L), the embedding dimension (E), the number of units of hidden layers (H), and the number of self-attention heads (A). In an example, library such as Optuna library may be utilized to perform hyperparameter optimization, and a parameter-sampling algorithm such as a tree-structured Parzen estimator (TPE) may be used. Other algorithms such as grid search, random search, etc., not disclosed herein are contemplated here for hyperparameter optimization. However, the grid search and random search are computationally expensive, and the random search is a well-known algorithm that has been known to produce results almost identical to grid search but much faster. TPE is extremely computationally efficient compared to random search.

TABLE 2

| Hyperparameter optimization search space | |
|---|---|
| Hyperparameter | Values |
| Model architecture | |
| Number of layers (L) | 3, 6, 12 |
| Embedding dimension (E) | 128, 256, 512 |
| Number of units of hidden layers (H) | 128, 256, 512, 1024, 2048 |
| Number of self-attention heads (A) | 8, 16 |
| Model training | |
| Batch size (B) | 32, 64, 128, 256 |
| Learning rate (LR) | 0.0001, 0.001, 0.01 |
| Dropout rate (DR) | 0.1, 0.2, 0.3 |

Figure 2B:
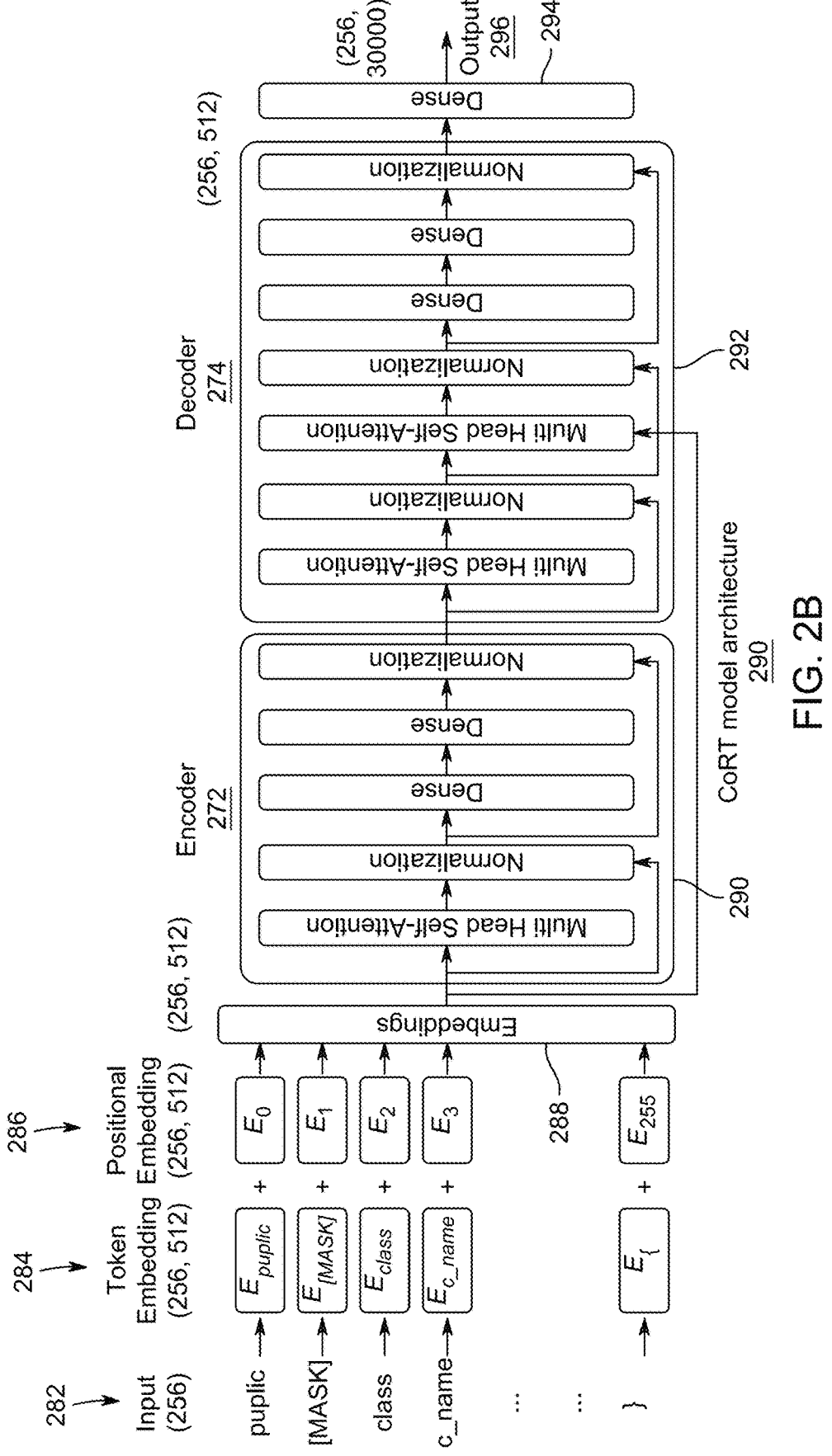
FIG. 2B illustrates a CoRT model architecture for transformer model architecture training, in accordance with an exemplary aspect of the disclosure.

FIG. 2B illustrates the transformer model architecture after hyperparameter optimization. In an example, a base model may have 12 L, 256 E, 512 H, 12 A. In some examples, a small model may be defined that has 12 L, 256 E, 512 H, 12 A, and a large model may be defined with 12 L, 256 E, 512 H, 12 A. For other models, the best hyperparameters for the model architecture were as follows: CNN model with 12 L, 256 E, 512 H. LSTM model with 12 L, 256 E, 512 H, and ANN model with 12 L, 256 E, 512 H. These results of these models are explained in the later part of description. The transformer model architecture includes an encoder 272, and a decoder 274. In an aspect, the multi-head self-attention layers receives multiple versions of the queries, keys, and values, each to produce self-attention outputs simultaneously that are then used to produce final results using the following equation:

$$\text{MultiHead}(Q,K,V)=\text{concat}(\text{head}_1,\text{head}_2, \dots ,\text{head}_h) \\ W^o$$

where Q, K, and V are queries, keys, and values, respectively, $W^o$ is the weight matrix, and i=1 . . . h is the number of heads where each head is a self-attention representation:

$$\text{head}_i=\text{Attention}(QW_i^Q, KW_i^K, VW_i^W)$$

where $QW_i^Q$, $KW_i^K$, $VW_i^W$ are weight matrices that create multiple subspace representations of the query, key, and value matrices, calculated as follows:

$$\text{Attention}\ (Q,\ K,\ V) = \text{softmax}\left(\frac{QK^T}{\sqrt{d_k}}\right) V$$

where $d_k$ is a scaling factor to mitigate the vanishing gradients problem that equals to the number of embedding dimensions divided by the number of heads. In this work, the number of heads is denoted as A, and $d_k$ is set to 256 because E=512 and A=8. The first multi-head self-attention layer on the decoder 274 is substantially similar to the multi-head self-attention layer implemented in the encoder 272. However, the second multi-head self-attention layer on the decoder 274 receives keys and values from the encoder's output while queries from the preceding the embedding layer 288.

Second main layer (also referred to as Feed-forward network) is a fully connected feed-forward neural network comprised of two dense layers with, for example, Rectified Linear Unit (ReLU) activation:

$$FFN(x) = ReLU(W_1 x + b_1)W_2 + b_2$$

Each layer is followed by a normalization layer, layernorm(.), which normalizes the sum by re-centering and re-scaling the layer input, x, and the output of the layer itself, i.e., layer(x):

layernorm(x+layer(x))

The computed sum is normalized using the following equation:

$$\hat{x}_i^{(k)} = \frac{x_i^{(k)} - \mu^{(k)}}{\sqrt{(\sigma^{(k)})^2 + \epsilon}}$$

where k=1 . . . d (i.e., embedding dimension), i=1 . . . m (instances in training dataset), $\mu$ is the mean, $\sigma$ is the standard deviation, and epsilon $\epsilon$ is an arbitrarily small constant set to 1e-6 in this work.

The layers are connected via residual connections. The main advantages of these connections are 1) to remind the contextual representations of the original input tokens as deep neural networks might "forget" some features, and 2)

to mitigate the vanishing gradient problem by summing up the values of the input to the output result of the layer in the following way:

$$\text{layer}(x) + x = [W_2\alpha(W_1 x + b_1) + b_2] + x$$

where x is the input, layer(x) is the output generated by the previous layer, $W_2$ and $b_2$ are the weight and bias for the current layer, $W_1$ and $b_1$ are the weight and bias for the previous layer, and $\alpha$ is the activation function.

The input 282 is a sequence of code that is either a class, method, or subsequence of class/method. The representation of each token in a sequence is the summation of the token embedding 284 and positional embedding 286. In an example, word embedding may be used provided by TensorFlow (TensorFlow|Google Open Source Projects, n.d.) with a vocabulary size of 30,000 tokens and a set of special tokens ([unk] to represent out of vocabulary tokens, and [mask] to represent masked tokens). In the token embeddings 284, each token (represented as a positive integer) is mapped to a dense vector of a fixed size (i.e., embedding dimension). The positional embedding 286 is a unique representation of the position of each token within a sequence. The two mathematical functions, sine and cosine, may be used to construct positional embedding vectors, which have the same dimension as the token embeddings, using the following equations:

$$PE_{(p,2i)} = \sin\left(\frac{p}{n^{2i/d}}\right)$$

$$PE_{(p,2i+1)} = \cos\left(\frac{p}{n^{2i/d}}\right)$$

where p is the position of the token, i is the column index $0 \le i < d/2$, d is the embedding dimension, and n is a user-defined scalar, set to 10,000 as recommended in the original paper (See, Vaswani, A., Shazeer, N., Parmar, N., Uszkoreit, J., Jones, L., Gomez, A. N., Kaiser, L., & Polosukhin, I. (2017). *Attention Is All You Need* (arXiv:1706.03762). arXiv, doi.org/10.48550/arXiv.1706.03762). The sine function is used to encode the even position (2i), while cosine encodes odd positions (2i+1).

The output of the model 296 is a prediction of the masked tokens value that is a probability matrix of size (sequence length×vocabulary size) calculated using the softmax function:

$$\text{softmax}(x_i) = \frac{e^{x_i}}{\sum_{j=1}^{k} e^{x_j}}$$

The code smell detection unit 116, 126 inputs, via the processing circuitry, the formatted textual features for training the transformer model. In an example, the model may be trained with a batch size of 64 instances, and each instance may have a maximum length of 256 for 5 epochs (55,000 steps). In an example, Adam may be used as an optimization algorithm with a learning rate of 0.001. Other optimization algorithms not described herein may be used as well. Further, in an example, Xavier uniform initializer may be used to initialize weights. A dropout rate of 0.1 may be used on all layers, while other dropout rate may also be used. The network may be trained to reduce loss either in terms of error or cost. In an example, a categorical cross entropy function may be used with sample weights defined as follows:

$$L(\theta) = -\frac{1}{n}\sum_{i=1}^{n}\sum_{j=1}^{m}w_{ij}\left(y_{ij}\log(\hat{y}_{ij})\right)$$

where n is the number of masked tokens across instances, m is the total number of classes, w is the sample weight, y is the true pseudo label, and $\hat{y}$ is the predicted pseudo label. In an example, the classes are all tokens in the vocabulary (i.e., 30000 classes). The weight may be created as follows: give a sequence of code with length 256, a token is provided with a weight of 1 if it is a mask token and 0 otherwise.

The code smell detection unit 116, 126 is configured to apply, via the processing circuitry 114, the pre-trained model to multiple fine-tuning models for respective downstream tasks. Each fine-tuning model is created by training the pre-trained model. For fine tuning, the pre-trained parameters are utilized to initialize the fine-tuning model. Further, the parameters are tuned using labeled datasets. Each downstream task is fine-tuned using its own labeled datasets, and thereof will have its own fine-tuned model. Although each downstream task is fine-tuned individually, they are all initialized with the same parameters, which has two main advantages: 1) fine-tuning will not require a large amount of data (i.e., it can be fine-tuned on small, labeled datasets), 2) speed up the training as the fine-tuning process is usually very fast compared to the pre-training that has been trained once and then used multiple times on various downstream tasks.

For down stream tasks, in an example, two class-level code smells may be selected: God Class and Data Class, and two method-level code smells: Feature Envy and Long Method, as downstream tasks. The selection of two class-level code and two method-level code smells may be based on aspects that these code smells are of high importance (i.e., have main impacts on software quality) and are more prevalence in software programs (See: Olbrich, S. M., Cruzes, D. S., & Sjøberg, D. I. K. (2010). Are all code smells harmful? A study of God Classes and Brain Classes in the evolution of three open source systems. 2010 *IEEE International Conference on Software Maintenance*, 1-10. doi.org/10.1109/ICSM.2010.5609564).

For a fine-tuning model architecture, in an example, ANN may be implemented, which is a simple feed-forward neural network with two layers. For input/output representations, for example, the input is either a class for class-level code smells or a method for method-level code smells. The output may be 0 or 1, indicating whether a class/method is smelly or not calculated using the sigmoid function:

$$sigmoid(x_i) = \frac{1}{1 - e^{-x_i}}$$

In an example, to fine tune the model, a batch size of 16 instances may be selected, with each instance having a maximum length of 256 for 5 epochs (55,000 steps). In an example, Adam may be chosen as an optimization algorithm with a learning rate of 0.001. Also, in an example, Xavier uniform initializer may be used to initialize the weights. Finally, a dropout rate of 0.1 may be used on all layers. In the fine-tuning model, a binary cross entropy function may be used as follows:

$$L(\theta) = -\frac{1}{n}\sum_{i=1}^{n}y_i\log(\hat{y}_i) + (1 - y_i)\log(1 - \hat{y}_i)$$

where n is the number of instances, y is the true label, and $\hat{y}$ is the predicted label.

The code smell detection unit 116, 126 is configured to output, via the processing circuitry, from each fine-tuning model, an indication of whether a code smell has been detected in the source code.

Experiments and Evaluation

This section presents the details of the experiments conducted to evaluate the method and system of the disclosure on various code smell detection tasks. Experiments and evaluations were performed to evaluate CoRT on detecting God Class, Data Class, Feature Envy, and Long Method code smells. Performance of architecture of CoRT (Transformer) was compared with known models such as CNN, LSTM, ANN, etc. In addition, the architecture of CoRT was evaluated to determine influence of model size on detection performance and computational time. Also, the architecture of CoRT was evaluated to determine influence of training hyperparameters on the detection performance and the computational time. Furthermore, the architecture of CoRT was evaluated to determine the performance in detecting two class-level code smells, God Class and Data Class, in terms of accuracy, precision, recall, f1-score, and AUC. The detection performance is compared to state-of-the-art DL-based approaches. Similarly architecture of CoRT was evaluated to determine the performance in detecting two method-level code smells, Feature Envy and Long Method. The detection performance is compared to state-of-the-art DL-based approaches.

Model complexity is a significant factor to take into account when choosing a model, in addition to model performance (See: Lim, T.-S., Loh, W.-Y., & Shih, Y.-S. (2000). A Comparison of Prediction Accuracy, Complexity, and Training Time of Thirty-Three Old and New Classification Algorithms. Machine Learning, 40(3), 203-228. doi.org/10.1023/A:1007608224229; Myung, I. J. (2000). The Importance of Complexity in Model Selection. Journal of Mathematical Psychology, 44(1), 190-204, doi.org/10.1006/jmps.1999.1283, each incorporated herein as a reference in its entirety), because additional resource consumption (e.g., storage and computational time cost) may be necessary for complex models. DL models are considered complex models; hence, the time complexity is an important metric to consider when evaluating DL models. One of the main advantages of self-supervised learning is the capability to train one complex DL model (which takes a very long time to train) that can be used multiple times on other downstream tasks using a simple fine-tuning model (which is fast to train). Therefore, this RQ would reveal quantitatively the difference between the pre-training and fine-tuning time of the disclosed approach. Many previous studies have generated features using unsupervised learning and then utilized these features as input to a supervised classifier. The performance of the architecture is compared with a feature-based approach. The architecture of CoRT was evaluated on unseen projects. In particular, the trained models that have been trained on 100 Java projects were chosen and the performance was tested on new Java projects that have not been used in either pre-training or fine-tuning. For evaluation, the data construction described below was performed.

17 18

Figure 3:
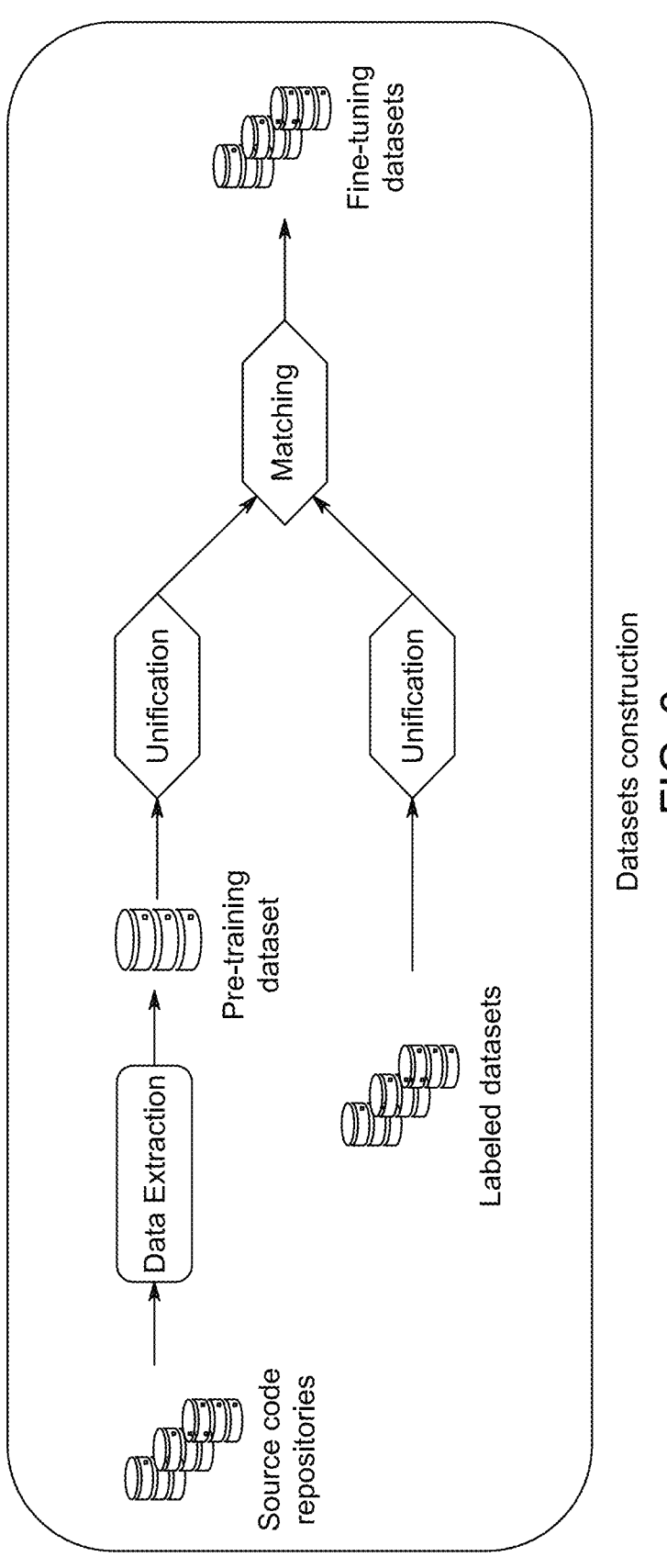
FIG. 3 illustrates a database construction for creating datasets, in accordance with an exemplary aspect of the disclosure.

The overall procedure for creating the datasets is shown in FIG. 3. To construct pre-training and fine-tuning datasets, the following steps were used:

1. Collection of unlabeled datasets: source code from 103 open-source Java projects were collected. The data was collected as described above that included tokenization, filtering, truncation, text vectorization, and data balancing. Table 3 shows the selected projects, number of methods (NOM), number of classes (NOC), line of codes (LOC), and the time took to parse the project and extract its methods and classes. The pre-training was constructed using a total of 16M LOC.

Collection of labeled datasets: labeled datasets that were publicly available from previous studies were used; the selection of the datasets was based on 1) the availability of one of the four code smells that are considered in this study, 2) the datasets must have full file path along with the class/method name to be able to match the labels with the extracted code. The dataset was collected from the following studies:

Tarek Alkhaeir; Bartosz Walter (See: Alkhaeir, T., & Walter, B. (2021). The Effect of Code Smells on the Relationship Between Design Patterns and Defects. IEEE Access, 9, 3360-3373. doi.org/10.1109/AC-CESS.2020.3047870, incorporated herein as a reference in its entirety) utilized Eclipse plugin inCode for static code analysis that detects code smells; among the code smells, the ones related to disclosure are Data Class and Feature Envy.

José Pereira dos Reis et al. (Reis, J. P. dos, Abreu, F. B. e., & Carneiro, G. de F. (2022). Crowdsmelling: A preliminary study on using collective knowledge in code smells detection. Empirical Software Engineering, 27(3), 69. doi.org/10.1007/s10664-021-10110-5, incorporated herein as a reference in its entirety) manually annotated three code smells (Long Method, God Class, and Feature Envy) by a hundred teams.

Bruno Sotto-Mayor et al. (See: Sotto-Mayor, B., Elmishali, A., Kalech, M., & Abreu, R. (2022). Exploring Design smells for smell-based defect prediction. Engineering Applications of Artificial Intelligence, 115, 105240. doi.org/ 10.1016/j.engappai.2022.105240, incorporated herein as a reference in its entirety) utilized the Organic plugin to detect the existence of code smells in the source code; they detected various types of smells, including Data Class, Large Class, Long Method, and Feature Envy. It is worth mentioning that the original paper detected the smells at the file level. To utilize their data, files with only one class can be used to easily map the label of the file with the class. Also, for method-level smells, they provided the ratio of the existence of each method-level code smell within the file, thereof we labeled the data as follows:

1. For files with a ratio of 100%, all methods that belong to this file were labeled as smelly.

2. For files with a ratio of 0%, all methods that belong to this file were labeled as non-smelly.

3. All files with ratios between 0%-100% were excluded.

Constructing new labeled datasets: Fine-tuning datasets were constructed using data collected in aforementioned two steps. First, a clean version was selected for each labeled dataset selected in the previous step by 1) unification, 2) removing duplicates, and 3) handling missing data:

1. Unification: the below said aspects were unified that includes: 1) project names by removing "apatch" word, converting to lower case and using "–" to split words projects consisting of multiple words, 2) project versions by removing project names or (e.g., camel1.2.4 to 1.2.4), 3) file path by using dot in the file path instead of slash/backslash and removing the file extension (i.e., .java), 4) class name by converting it to lower case and extracting the class name in case it is written within a file path and, 5) method name by converting it to lower case and extracting the method name in case the full method header is provided, 6) labels by converting variations of true, false to 1, 0.

2. Removing duplicate: in case of a class or method with different labels, both were kept. However, in case having two instances with exactly the same values, including the label, only one version was kept.

3. Missing data: all instances with empty values were removed to match the labeled data with the source code, as all information, including project name, version, file path, class/method name, and labels were required.

The final output was a cleaned version of the labeled datasets, where each instance had the following attributes: project name, project version, file path, class name, method name (for method level smells), smelly (1 for smelly, 0 for non-smelly) and source (which previous studies used to extract the label).

Match labels with source code: it produces a mapping for each class/method, for each code smell, whether the code is smelly or not. Regex was used to map unlabeled data with its labels. The final output is a set of labeled instances, where each instance has the following attributes: project name, project version, file path, class name, method name (for method level smells), smelly (1 for smelly, 0 for non-smelly), source (which previous studies used to extract the label), and code (which contains the class body for class-level smells and method body for method-level smells).

The constructed fine-tuning datasets are presented in Table 4. A total of 97 projects were used. The total number of smelly and non-smelly instances per project for each code smell is shown in the Table 5. Some datasets that have less than six positive instances were not used as SMOTE is based on the K-nearest neighbor algorithm, which generates synthetic instances based on k nearest instances. Therefore, datasets with very few labeled instances were eliminated.

TABLE 3

| | | | | | | Time |
|---|---|---|---|---|---|---|
| # | Project | Version | NOC | NOM | LOC | (Mins) |
| 1 | Accumulo | 1.7.3 | 3254 | 33810 | 419546 | 135.22 |
| 2 | Activemq-parent | 5.8.0 | 3534 | 28867 | 295784 | 105.85 |
| 3 | Airavata | 0.16 | 2221 | 33192 | 391359 | 149.03 |
| 4 | Apache-ant | 1.7.0 | 1267 | 11282 | 117076 | 37.53 |
| 5 | Apache-archiva | 1.4.M3 | 760 | 6955 | 92045 | 23.57 |
| 6 | Apache-artemis | 2.6.3 | 4255 | 39407 | 484235 | 169.38 |
| 7 | Apache-atlas | 0.8.2 | 923 | 8429 | 108950 | 41.92 |

Pre-training dataset description

TABLE 3-continued

Pre-training dataset description

| # | Project | Version | NOC | NOM | LOC | Time (Mins) |
|---|---------|---------|-----|-----|-----|-------------|
| 8 | Apache-calcite | 1.21.0 | 2762 | 23918 | 321172 | 81.6 |
| 9 | Apache-camel | 1.6.0 | 2009 | 10507 | 99145 | 22.4 |
| 10 | Apache-cassandra | 0.7.4 | 636 | 6876 | 88612 | 23.45 |
| 11 | Apache-continuum | 1.4.0 | 607 | 6326 | 79262 | 18.62 |
| 12 | Apache-crunch | 0.9.0 | 568 | 3384 | 35261 | 15.9 |
| 13 | Apache-curator | 4.3.0 | 646 | 3667 | 57609 | 21.67 |
| 14 | Apache-cxf | 2.7.0 | 5251 | 35479 | 468928 | 105.78 |
| 15 | Apache-directory-server | 2.0.0.M24 | 1891 | 12017 | 224976 | 42.9 |
| 16 | Apache-directory-studio | 2.0.0.v20180908-M14 | 1850 | 12709 | 210981 | 64.82 |
| 17 | Apache-drill | 1.11.0 | 2942 | 31495 | 334522 | 65.37 |
| 18 | Apache-hive | 0.13.1 | 4697 | 50614 | 629986 | 156.55 |
| 19 | Apache-hyracks | 0.3.1 | 2277 | 12557 | 154261 | 45.03 |
| 20 | Apache-ivy | 2.0.0 | 488 | 5082 | 53540 | 24.87 |
| 21 | Apache-karaf | 4.2.7 | 1575 | 9075 | 122109 | 47.9 |
| 22 | Apache-kylin | 2.3.2 | 1477 | 12248 | 142468 | 49.5 |
| 23 | Apache-manifoldcf | 1.1 | 1040 | 7080 | 153040 | 47.28 |
| 24 | Apache-maven | 3.5.0.alpha | 974 | 6529 | 79861 | 19.73 |
| 25 | Apache-metron | 0.5.0.rc2 | 1128 | 8296 | 103283 | 43.87 |
| 26 | Apache-nutch | 1.15 | 619 | 3433 | 57761 | 27.13 |
| 27 | Apache-ofbiz | 13.07.01 | 1539 | 13543 | 243216 | 128.77 |
| 28 | Apache-openjpa | 2.3.0 | 4722 | 45007 | 424623 | 95.68 |
| 29 | Apache-openmeetings | 4.0.2 | 604 | 4596 | 55224 | 30.53 |
| 30 | Apache-opennlp | 1.7.2 | 831 | 3580 | 59778 | 19.55 |
| 31 | Apache-parquet | 1.8.1 | 761 | 5237 | 58563 | 18.78 |
| 32 | Apache-plc4x | 0.6.0 | 1023 | 5219 | 61029 | 29 |
| 33 | Apache-pulsar | 2.4.1 | 2118 | 20641 | 287382 | 115.02 |
| 34 | Apache-qpid-jms | 0.5.0 | 548 | 6164 | 64618 | 16.95 |
| 35 | Apache-ranger | 1.0.0 | 1003 | 10287 | 159818 | 54.2 |
| 36 | Apache-reef | 0.15.1 | 2346 | 6475 | 81187 | 23.02 |
| 37 | Apache-samza | 1.2.0 | 1305 | 6720 | 89538 | 38.28 |
| 38 | Apache-storm | 1.2.3 | 1940 | 19380 | 214258 | 58.43 |
| 39 | Apache-tez | 0.9.1 | 1328 | 10948 | 179571 | 62.25 |
| 40 | Apache-tomcat | 7.0.57 | 2225 | 21073 | 252668 | 75.77 |
| 41 | Apache-wicket | 6.23.0 | 3349 | 16419 | 210824 | 43.62 |
| 42 | Avro | 1.9.1 | 943 | 7032 | 77722 | 25.33 |
| 43 | Beam | 2.9.0 | 4330 | 32952 | 422866 | 152.53 |
| 44 | Bookkeeper | 4.6.0 | 793 | 5829 | 85650 | 35.9 |
| 45 | Carbondata | 2.0.0 | 1152 | 9822 | 134500 | 52.03 |
| 46 | Cayenne | 4.1.B2 | 3860 | 23673 | 265988 | 62.18 |
| 47 | Clerezza | 201508.1 | 55 | 328 | 5612 | 4.22 |
| 48 | Cocoon | 2.1.6 | 2771 | 17057 | 285918 | 63.35 |
| 49 | Commons-beanutils | 1.9.3 | 284 | 2702 | 33421 | 9.27 |
| 50 | Commons-cli | 1.3.1 | 48 | 499 | 6446 | 2.73 |
| 51 | Commons-codec | 1.11 | 122 | 1414 | 19900 | 7.85 |
| 52 | Commons-collections4 | 4.3 | 626 | 6330 | 62869 | 14.85 |
| 53 | Commons-compress | 1.19 | 373 | 3551 | 46063 | 12.93 |
| 54 | Commons-csv | 1.7 | 31 | 550 | 6931 | 2.73 |
| 55 | Commons-dbcp2 | 2.5.0 | 140 | 3467 | 30346 | 6.08 |
| 56 | Commons-email | 1.3.3 | 47 | 422 | 6478 | 2.5 |
| 57 | Commons-io | 2.5 | 238 | 2331 | 29546 | 7.58 |
| 58 | Commons-lang3 | 3.3.2 | 361 | 5189 | 64300 | 16.03 |
| 59 | Commons-math3 | 3.3 | 1646 | 12531 | 187519 | 62.37 |
| 60 | Commons-net | 3.3 | 254 | 1823 | 25787 | 7.42 |
| 61 | Commons-validator | 1.5.1 | 140 | 1128 | 15239 | 4.35 |
| 62 | Commons-vfs | 2.5.0 | 501 | 3276 | 33554 | 10.73 |
| 63 | Deltaspike-project | 0.6 | 1288 | 4268 | 55122 | 12.85 |
| 64 | Flink | 1.3.2.rc3 | 5685 | 36290 | 530683 | 130.73 |
| 65 | Fop | 2.3 | 2341 | 17710 | 212088 | 56.07 |
| 66 | Giraph | 1.1.0 | 1001 | 6238 | 68757 | 17.37 |
| 67 | Hadoop | 2.2.0 | 5636 | 49887 | 651434 | 147.08 |
| 68 | Hbase | 2.1.10 | 4508 | 51266 | 694464 | 248.77 |
| 69 | Helix | 0.7.1 | 778 | 4792 | 78858 | 28.7 |
| 70 | Isis | 1.16.1.20180316-1549 | 3972 | 17522 | 177636 | 31.23 |
| 71 | Jackrabbit | 2.0.0 | 2571 | 20877 | 247728 | 71.68 |
| 72 | Jackrabbit | 0.8 | 1196 | 8914 | 113679 | 30.35 |
| 73 | Jasml | 0.1 | 46 | 216 | 5818 | 4.6 |
| 74 | Jedit | 4.2 | 603 | 4848 | 90531 | 29.38 |
| 75 | Jena | 3.14.0 | 6630 | 58330 | 553442 | 102.9 |
| 76 | Jfreechart | 1.0.13 | 982 | 10570 | 143110 | 28.88 |
| 77 | Jgrapht | 0.8.1 | 269 | 1235 | 17232 | 3.1 |
| 78 | Johnzon | 1.1.12 | 461 | 2876 | 31367 | 13.25 |

TABLE 3-continued

Pre-training dataset description

| # | Project | Version | NOC | NOM | LOC | Time (Mins) |
|---|---------|---------|-----|-----|-----|-------------|
| 79 | Kafka | 2.4.0 | 2616 | 22721 | 298808 | 95.4 |
| 80 | Kerby | 1.1.1 | 926 | 5482 | 52749 | 10.2 |
| 81 | Knox | 1.3.0 | 1306 | 7883 | 105564 | 25.32 |
| 82 | Logging-log4j1 | 1.2.0 | 417 | 3077 | 35262 | 10.38 |
| 83 | Lucene | 2.4.0 | 1046 | 7932 | 125946 | 35.92 |
| 84 | Nifi | 1.9.2 | 5105 | 37262 | 557625 | 187.23 |
| 85 | Olingo-odata | 4.3.0 | 1751 | 12449 | 156166 | 43.63 |
| 86 | Openwebbeans | 1.1.7 | 1145 | 4311 | 57545 | 14.18 |
| 87 | Phoenix | 4.7.0-HBase-0 | 1498 | 16362 | 228318 | 67.87 |
| 88 | Poi | 3.0.rc4 | 1410 | 11325 | 140394 | 31.4 |
| 89 | Roller-weblogger | 5.2.4 | 621 | 5008 | 53630 | 18.68 |
| 90 | Shiro | 1.4.1 | 721 | 3719 | 34656 | 7.92 |
| 91 | Struts | 2.1.6 | 1069 | 6566 | 62961 | 18.02 |
| 92 | Surefire | 2.18.1 | 942 | 4136 | 44290 | 9.55 |
| 93 | Syncope | 2.0.4 | 1934 | 10354 | 144861 | 71.37 |
| 94 | Tajo | 0.11.2 | 1935 | 16407 | 215049 | 95.98 |
| 95 | Tapestry | 5.1.0.0 | 1860 | 8938 | 93320 | 51.37 |
| 96 | Tika | 1.14 | 882 | 5476 | 84592 | 96.75 |
| 97 | Tinkerpop | 3.4.3 | 1920 | 13278 | 147074 | 265.83 |
| 98 | Uima-ruta | 2.8.0 | 1226 | 6333 | 98991 | 129.78 |
| 99 | Velocity | 1.6 | 385 | 2615 | 37007 | 10.8 |
| 100 | Xalan | 2.7.0 | 1004 | 9341 | 165720 | 35.3 |
| 101 | Xerces2-j-trunk | 2.0.0 | 883 | 9799 | 142696 | 42.23 |
| 102 | Xmlsec | 2.1.4 | 751 | 5117 | 79095 | 24.62 |
| 103 | Zeppelin | 0.7.3 | 620 | 6397 | 77699 | 25.6 |
| Total | | | 165K NOC | 1.3M NOM | 16M LOC | 78 h |

TABLE 4

Fine-tuning datasets description

| Project | Data class | | | God class | | | Feature envy | | | Long method | | |
|---------|------------|----------|-------|-----------|----------|-------|--------------|----------|-------|-------------|----------|-------|
| | Smelly | Non-smelly | Total | Smelly | Non-smelly | Total | Smelly | Non-smelly | Total | Smelly | Non-smelly | Total |
| Accumulo | 31 | 2219 | 2250 | 6 | 2244 | 2250 | 265 | 1204 | 1469 | 264 | 1094 | 1358 |
| Activemq | 84 | 2286 | 2370 | 168 | 2202 | 2370 | 33 | 1141 | 1174 | 23 | 1339 | 1362 |
| Airavata | 144 | 1214 | 1358 | 0 | 1358 | 1358 | 440 | 1072 | 1512 | 319 | 974 | 1293 |
| Archiva | 34 | 429 | 463 | 73 | 390 | 463 | 4 | 159 | 163 | 1 | 181 | 182 |
| Atlas-sources | 18 | 469 | 487 | 52 | 435 | 487 | 5 | 175 | 180 | 6 | 174 | 180 |
| Avro | 3 | 468 | 471 | 13 | 458 | 471 | 7 | 195 | 202 | 7 | 195 | 202 |
| Beam | 17 | 2096 | 2113 | 92 | 2021 | 2113 | 37 | 1265 | 1302 | 3 | 1568 | 1571 |
| Bookkeeper | 5 | 398 | 403 | 23 | 380 | 403 | 4 | 149 | 153 | 4 | 144 | 148 |
| Calcite | 45 | 1541 | 1586 | 29 | 1557 | 1586 | 26 | 699 | 725 | 12 | 772 | 784 |
| Camel | 23 | 894 | 917 | 121 | 798 | 919 | 10 | 444 | 454 | 2 | 496 | 498 |
| Carbondata | 43 | 572 | 615 | 81 | 534 | 615 | 9 | 222 | 231 | 5 | 252 | 257 |
| Cassandra | 6 | 383 | 389 | 3 | 386 | 389 | 8 | 227 | 235 | 2 | 212 | 214 |
| Cayenne | 110 | 2040 | 2150 | 178 | 1972 | 2150 | 10 | 753 | 763 | 8 | 845 | 853 |
| Clerezza | 0 | 25 | 25 | 2 | 23 | 25 | 1 | 12 | 13 | 1 | 5 | 6 |
| Cocoon | 89 | 1167 | 1256 | 90 | 1166 | 1256 | 12 | 702 | 714 | 12 | 619 | 631 |
| Commons-beanutils | 10 | 137 | 147 | 12 | 135 | 147 | 0 | 50 | 50 | 1 | 45 | 46 |
| Commons-cli | 0 | 33 | 33 | 4 | 29 | 33 | 0 | 8 | 8 | 0 | 8 | 8 |
| Commons-codec | 0 | 69 | 69 | 5 | 64 | 69 | 0 | 21 | 21 | 0 | 19 | 19 |
| Commons-collections4 | 0 | 216 | 216 | 19 | 197 | 216 | 0 | 148 | 148 | 0 | 157 | 157 |
| Commons-compress | 7 | 176 | 183 | 25 | 158 | 183 | 3 | 55 | 58 | 0 | 65 | 65 |
| Commons-csv | 0 | 17 | 17 | 4 | 13 | 17 | 0 | 4 | 4 | 0 | 2 | 2 |
| Commons-dbcp2 | 7 | 85 | 92 | 14 | 78 | 92 | 0 | 37 | 37 | 0 | 35 | 35 |
| Commons-email | 1 | 19 | 20 | 5 | 15 | 20 | 2 | 5 | 7 | 0 | 8 | 8 |
| Commons-io | 0 | 111 | 111 | 8 | 103 | 111 | 2 | 51 | 53 | 0 | 53 | 53 |
| Commons-lang3 | 2 | 185 | 187 | 21 | 166 | 187 | 1 | 45 | 46 | 0 | 38 | 38 |
| Commons-math3 | 15 | 973 | 988 | 82 | 906 | 988 | 21 | 263 | 284 | 11 | 303 | 314 |

TABLE 4-continued

Fine-tuning datasets description

| | Data class | | | God class | | | Feature envy | | | Long method | | |
|---|---|---|---|---|---|---|---|---|---|---|---|---|
| Project | Smelly | Non-smelly | Total | Smelly | Non-smelly | Total | Smelly | Non-smelly | Total | Smelly | Non-smelly | Total |
| Commons-net | 4 | 146 | 150 | 15 | 135 | 150 | 7 | 43 | 50 | 5 | 52 | 57 |
| Commons-validator | 1 | 85 | 86 | 17 | 69 | 86 | 1 | 25 | 26 | 0 | 29 | 29 |
| Commons-vfs | 7 | 230 | 237 | 23 | 214 | 237 | 4 | 90 | 94 | 2 | 105 | 107 |
| Continuum | 53 | 311 | 364 | 38 | 326 | 364 | 3 | 119 | 122 | 1 | 134 | 135 |
| Crunch | 3 | 257 | 260 | 21 | 239 | 260 | 3 | 141 | 144 | 1 | 176 | 177 |
| Curator | 2 | 210 | 212 | 39 | 173 | 212 | 0 | 82 | 82 | 0 | 87 | 87 |
| Cxf | 178 | 2191 | 2369 | 184 | 2185 | 2369 | 38 | 923 | 961 | 40 | 955 | 995 |
| Directory-server | 34 | 889 | 923 | 100 | 823 | 923 | 5 | 401 | 406 | 3 | 367 | 370 |
| Directory-studio | 49 | 936 | 985 | 138 | 847 | 985 | 15 | 242 | 257 | 7 | 268 | 275 |
| Drill | 53 | 1397 | 1450 | 5 | 1445 | 1450 | 25 | 862 | 887 | 14 | 831 | 845 |
| Flink | 5 | 166 | 171 | 12 | 159 | 171 | 1 | 109 | 110 | 1 | 118 | 119 |
| Fop | 85 | 1265 | 1350 | 49 | 1301 | 1350 | 19 | 547 | 566 | 13 | 599 | 612 |
| Giraph | 14 | 742 | 756 | 49 | 707 | 756 | 24 | 429 | 453 | 4 | 486 | 490 |
| Hadoop | 91 | 2949 | 3040 | 56 | 2984 | 3040 | 40 | 1100 | 1140 | 22 | 1207 | 1229 |
| Hbase | 75 | 2656 | 2731 | 9 | 2722 | 2731 | 99 | 1238 | 1337 | 102 | 1288 | 1390 |
| Helix | 26 | 399 | 425 | 37 | 388 | 425 | 8 | 166 | 174 | 8 | 166 | 174 |
| Hive | 163 | 2764 | 2927 | 4 | 2923 | 2927 | 217 | 1610 | 1827 | 236 | 1481 | 1717 |
| Isis | 23 | 1170 | 1193 | 137 | 1056 | 1193 | 11 | 598 | 609 | 4 | 643 | 647 |
| Jackrabbit | 73 | 1114 | 1187 | 124 | 1063 | 1187 | 11 | 613 | 624 | 6 | 663 | 669 |
| Jackrabbit | 23 | 613 | 636 | 54 | 582 | 636 | 5 | 237 | 242 | 2 | 270 | 272 |
| Jasml | — | — | — | 8 | 5 | 13 | 22 | 16 | 38 | 36 | 39 | 75 |
| Jena | 42 | 3299 | 3341 | 148 | 3193 | 3341 | 45 | 1399 | 1444 | 21 | 1536 | 1557 |
| Johnzon | 10 | 160 | 170 | 12 | 158 | 170 | 0 | 85 | 85 | 1 | 77 | 78 |
| Kafka | 3 | 1434 | 1437 | 79 | 1358 | 1437 | 19 | 405 | 424 | 9 | 479 | 488 |
| Karaf | 34 | 703 | 737 | 53 | 684 | 737 | 10 | 333 | 343 | 9 | 302 | 311 |
| Kerby | 56 | 414 | 470 | 63 | 407 | 470 | 6 | 191 | 197 | 4 | 209 | 213 |
| Knox | 13 | 613 | 626 | 43 | 583 | 626 | 6 | 230 | 236 | 5 | 233 | 238 |
| Kylin | 34 | 761 | 795 | 34 | 761 | 795 | 11 | 316 | 327 | 3 | 332 | 335 |
| Lucene | 7 | 614 | 621 | 43 | 579 | 622 | 9 | 230 | 239 | 5 | 233 | 238 |
| Manifoldcf | 52 | 934 | 986 | 8 | 978 | 986 | 19 | 528 | 547 | 27 | 503 | 530 |
| Maven | 36 | 367 | 403 | 34 | 369 | 403 | 2 | 135 | 137 | 3 | 142 | 145 |
| Metron | 1 | 50 | 51 | 8 | 43 | 51 | 1 | 26 | 27 | 0 | 27 | 27 |
| Nifi | 164 | 2695 | 2859 | 212 | 2647 | 2859 | 36 | 821 | 857 | 15 | 909 | 924 |
| Nutch | 5 | 307 | 312 | 28 | 284 | 312 | 10 | 103 | 113 | 11 | 75 | 86 |
| Ofbiz | 67 | 937 | 1004 | 84 | 920 | 1004 | 48 | 331 | 379 | 40 | 305 | 345 |
| Olingo-odata | 75 | 624 | 699 | 107 | 592 | 699 | 33 | 251 | 284 | 18 | 304 | 322 |
| Openjpa | 359 | 1929 | 2288 | 57 | 2231 | 2288 | 13 | 1221 | 1234 | 8 | 1263 | 1271 |
| Openmeetings | 28 | 382 | 410 | 37 | 373 | 410 | 4 | 129 | 133 | 1 | 143 | 144 |
| Opennlp | 4 | 405 | 409 | 30 | 379 | 409 | 3 | 135 | 138 | 4 | 137 | 141 |
| Openwebbeans | 18 | 366 | 384 | 40 | 344 | 384 | 0 | 106 | 106 | 2 | 109 | 111 |
| Parquet | 6 | 361 | 367 | 28 | 339 | 367 | 0 | 169 | 169 | 0 | 177 | 177 |
| Phoenix | 0 | 142 | 142 | 18 | 124 | 142 | 1 | 42 | 43 | 1 | 36 | 37 |
| Plc4x | 3 | 85 | 88 | 4 | 84 | 88 | 0 | 30 | 30 | 0 | 33 | 33 |
| Pulsar | 54 | 1140 | 1194 | 19 | 1174 | 1193 | 10 | 437 | 447 | 13 | 405 | 418 |
| Qpid-jms | 22 | 236 | 258 | 32 | 226 | 258 | 0 | 133 | 133 | 3 | 134 | 137 |
| Ranger | 77 | 573 | 650 | 56 | 594 | 650 | 12 | 257 | 269 | 6 | 247 | 253 |
| Reef | 11 | 610 | 621 | 66 | 555 | 621 | 1 | 123 | 124 | 1 | 140 | 141 |
| Roller-weblogger | 58 | 302 | 360 | 42 | 318 | 360 | 4 | 126 | 130 | 3 | 137 | 140 |
| Samza | 15 | 578 | 593 | 56 | 537 | 593 | 2 | 252 | 254 | 2 | 280 | 282 |
| Shiro | 13 | 259 | 272 | 50 | 222 | 272 | 2 | 171 | 173 | 3 | 172 | 175 |
| Storm | 20 | 712 | 732 | 2 | 730 | 732 | 74 | 690 | 764 | 77 | 621 | 698 |
| Struts | 75 | 428 | 503 | 69 | 434 | 503 | 5 | 258 | 263 | 1 | 301 | 302 |
| Syncope | 72 | 947 | 1019 | 107 | 912 | 1019 | 19 | 429 | 448 | 10 | 448 | 458 |
| Tajo | 25 | 1077 | 1102 | 83 | 1019 | 1102 | 21 | 400 | 421 | 13 | 424 | 437 |
| Tez | 29 | 655 | 684 | 23 | 661 | 684 | 15 | 293 | 308 | 8 | 300 | 308 |
| Tika | 13 | 512 | 525 | 48 | 477 | 525 | 7 | 184 | 191 | 4 | 183 | 187 |
| Tinkerpop | 3 | 397 | 400 | 25 | 375 | 400 | 30 | 221 | 251 | 4 | 270 | 274 |
| Tomcat | 87 | 1014 | 1101 | 77 | 1023 | 1100 | 32 | 496 | 528 | 23 | 521 | 544 |
| Uima-ruta | 28 | 680 | 708 | 68 | 640 | 708 | 24 | 296 | 320 | 8 | 274 | 282 |
| Wicket | 37 | 1280 | 1317 | 114 | 1203 | 1317 | 9 | 474 | 483 | 4 | 583 | 587 |
| Zeppelin | 5 | 401 | 406 | 2 | 404 | 406 | 15 | 197 | 212 | 15 | 183 | 198 |
| Grand Total | 3317 | 68095 | 71412 | 4438 | 67075 | 71513 | 2016 | 31350 | 33366 | 1581 | 32765 | 34346 |

Evaluation metrics: To evaluate the detection performance of the models, metrics frequently used in DL-based code smell detection was calculated. The evaluation metrics that were utilized to measure the detection performance of each model are:

Accuracy: accuracy is a percentage of instances that are correctly detected, and is calculated as follows:

$$Accuracy = \frac{TP + TN}{TP + FP + TN + FN} \times 100$$

Precision: precision (also referred to as positive predictive value) is the percentage of retrieved instances that are relevant instances:

$$Precision = \frac{TP}{(FP - TP)}$$

Recall: recall (also referred to as sensitivity) is the percentage of retrieved relevant instances, defined as follows:

$$Recall = \frac{TP}{(FN + TP)}$$

F1-score is the harmonic mean of both precision and recall, calculated as:

$$F - measure = 2 \times \frac{precision \times recall}{precision + recall} \times 100$$

Matthews Correlation Coefficient (MCC): MCC computes a correlation coefficient (i.e., measure the strength of a correlation) between the true class and the predicted class. MCC can range from 1 to −1 where a value of 1 denotes the best classifier, −1 denotes complete inconsistency, and 0 denotes random prediction. MCC is defined as:

$$MC = \frac{TP \times TN - FP \times FN}{\sqrt{(TP + FP)(TP + FN)(TN + FP)(TN + FN)}}$$

Area Under Curve (AUC): AUC is a measure of how much of a region is below a Receiver Operator Characteristic (ROC) curve. The AUC can range from 0 to 1, with a value of 0 denoting the worst classifier and a value of 1 denoting the best classifier. A classifier with an AUC value of 0.5 resembles a classifier that makes guesses at random. Here TP is the number of smelly instances that were correctly detected, TN describes the number of non-smelly instances that were predicted as non-smelly, FN is the number of non-smelly instances incorrectly predicted as smelly, and FP is the number of non-smelly instances that were incorrectly detected as smelly.

Validation Method

For validation, the train-test-split technique was used to validate the models, where data is randomly split into two sets: one used for training and another for testing. A ratio of 80/20, where 80% of the data was used for training, and 20% was utilized for testing. This method was used to evaluate the pre-training models. For fine-tuning models, a ratio of 70/30, where 70% of the data was used for training, and 30% was utilized for testing. The selection of the ratio was based on: 1) the two ratios are the top two validation methods according to a recent review (See: Alazba, A., Aljamaan, H., & Alshayeb, M. (in press). Deep Learning Approaches for Bad Smell Detection: A Systematic Literature Review. Empirical Software Engineering Journal, incorporated herein as a reference in its entirety), and 2) the number of instances in the datasets, so for pre-training, 20% for validation was considered enough, however, in fine-tuning, the datasets are considered relatively small, thereof 30% of the data was selected for validation.

Results and Discussion

Figure 4:
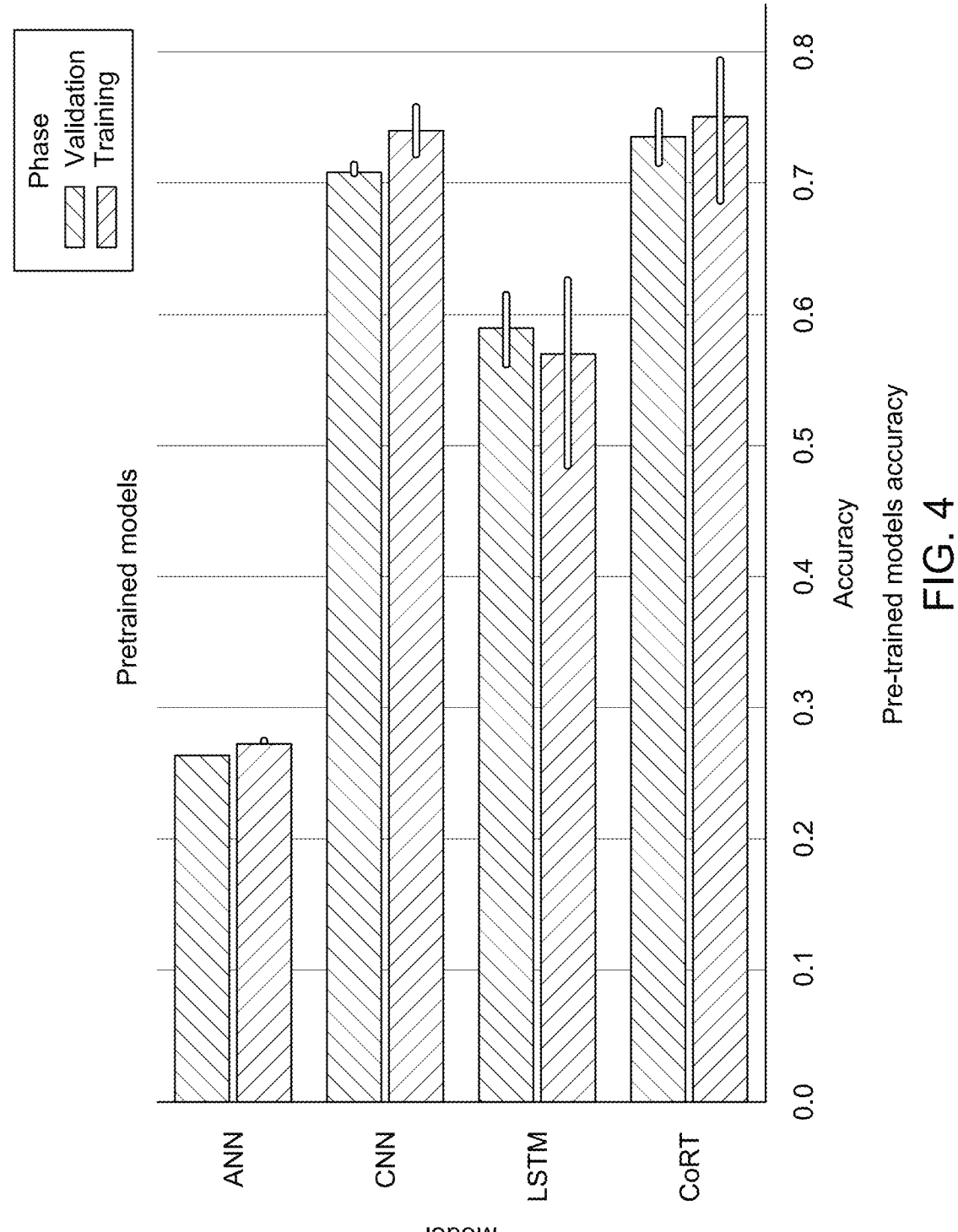
FIG. 4 illustrates a comparison of pre-trained models accuracy, in accordance with an exemplary aspect of the disclosure.
Figure 5:
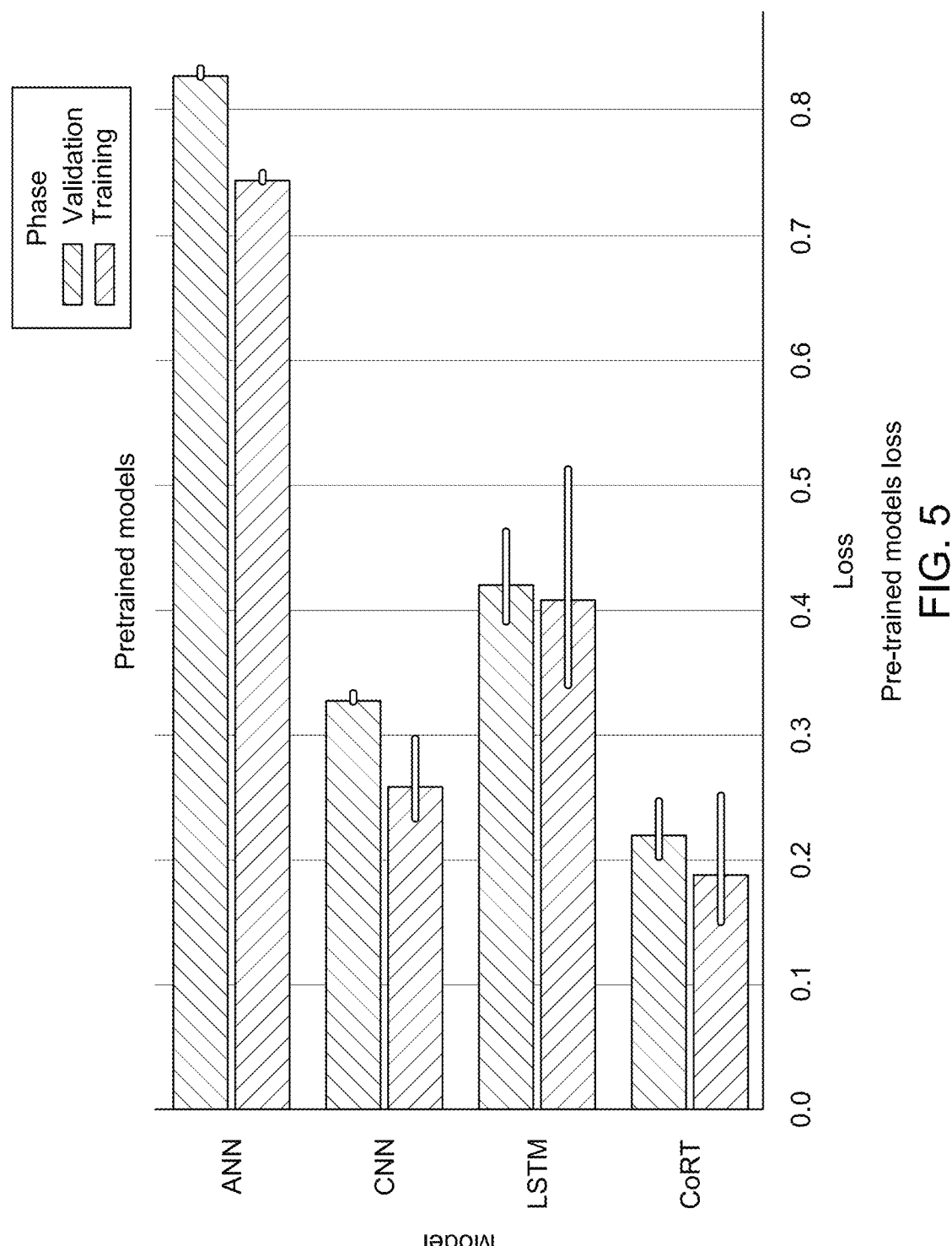
FIG. 5 illustrates a comparison of pre-trained model losses, in accordance with an exemplary aspect of the disclosure.

The performance of CoRT compared to three architectures CNN, LSTM, and ANN. These models were trained on the proxy task described above and used the following hyperparameters: 128 E, 32 B, 0.001 LR, 0.1 DR, 128 H, 3 L, 8 A. Starting by analyzing the accuracy and loss for the pre-trained models, shown in FIG. 4 and FIG. 5. As seen in FIG. 4 and FIG. 5, the results obtained by CoRT surpasses the results of other techniques. As seen, the CoRT has an accuracy of 0.75 and loss of 0.2, followed by the CNN with an accuracy of 0.71 and loss of 0.33, on the validation set. The worst results were obtained by ANN with an accuracy of 0.27 and a loss of 0.83. The second worst algorithm was LSTM, with an accuracy of 0.62 and a loss of 0.38.

The results of hyperparameter optimization are presented in this section. For each pre-trained model (i.e., CoRT, CNN, LSTM, ANN), hyperparameter optimization was performed using Optuna. FIGS. 6A-6D shows the effect of training hyperparameters on the model loss. FIGS. 7A-7D shows effect of model size on the model loss. It can be observed that the ANN model was lease affected by hyperparameters optimization, while CoRT was sensitive to hyperparameters optimization. Also, CNN and LSTM were less sensitive to hyperparameter optimization compared to CoRT.

Figures 6A, 6B:
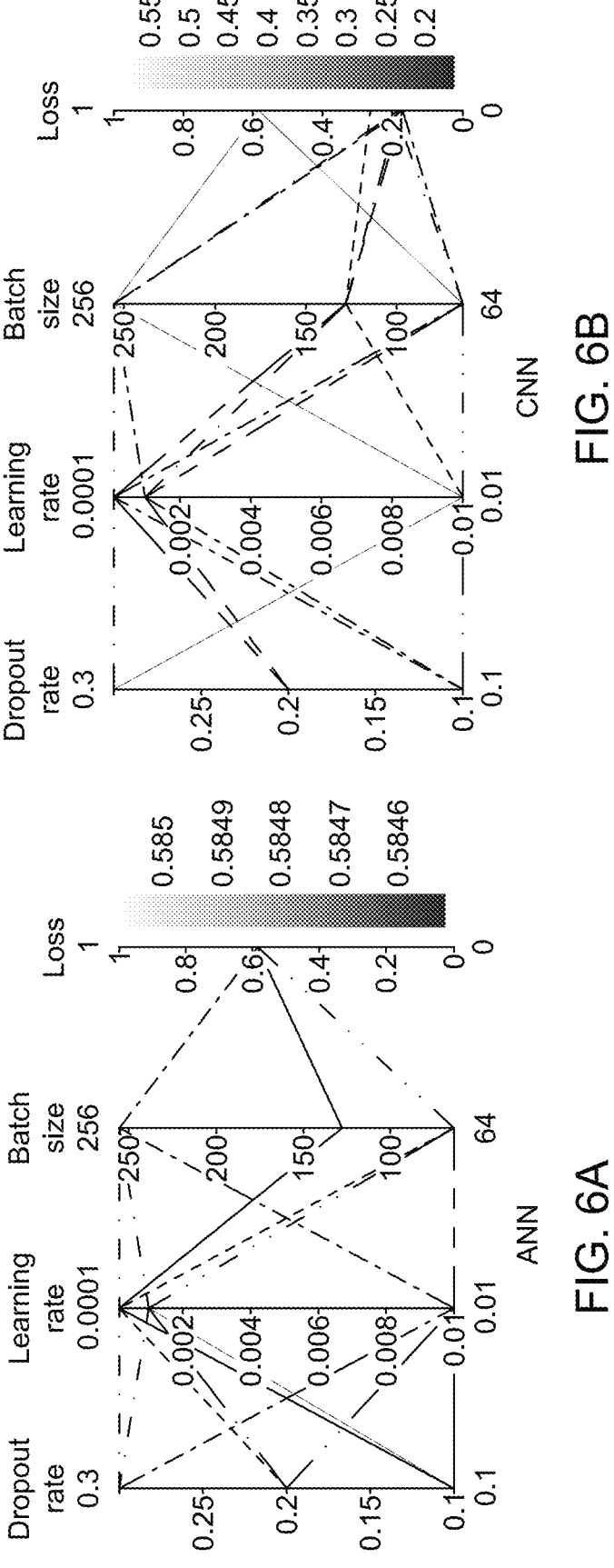
FIGS. 6A, 6B, 6C, 6D illustrate effects of training hyperparameters on model loss, in accordance with an exemplary aspect of the disclosure.
Figures 6C, 6D:
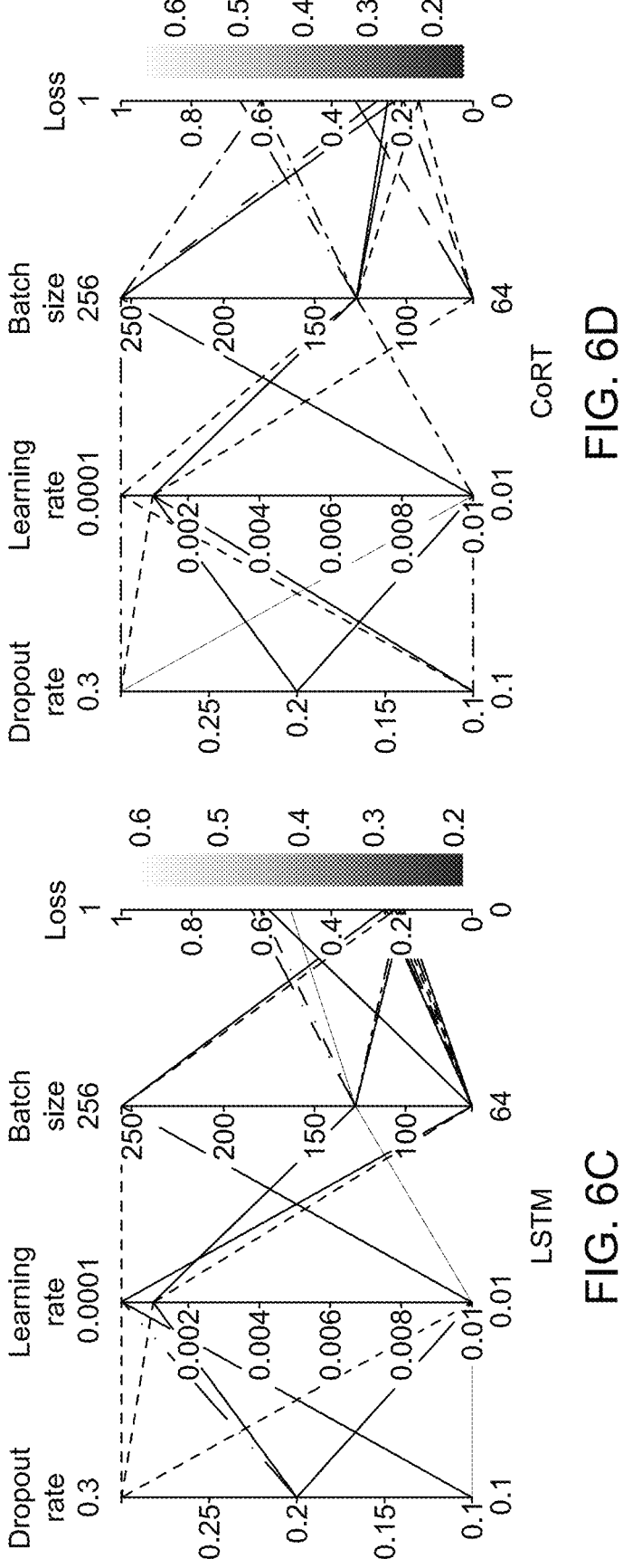
Figures 7A, 7B:
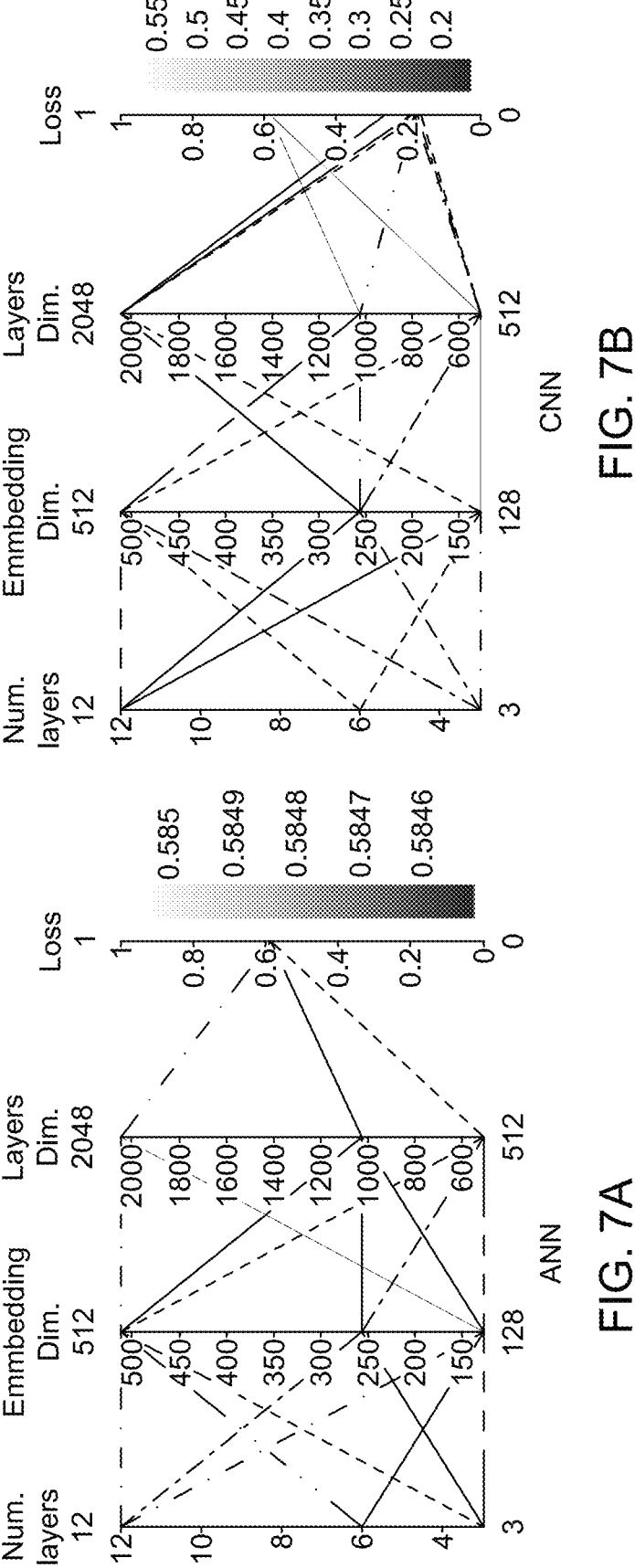
FIGS. 7A, 7B, 7C, 7D illustrate effects of model size on model loss, in accordance with an exemplary aspect of the disclosure.
Figures 7C, 7D:
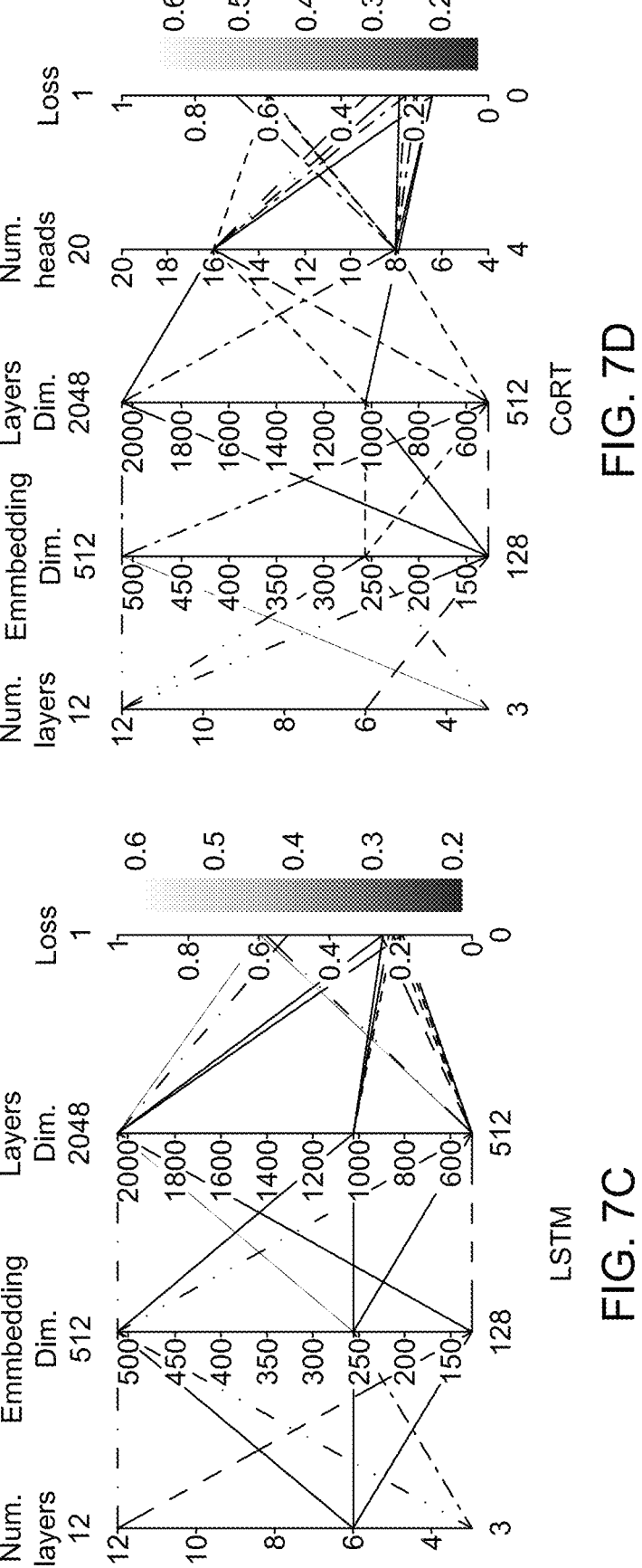

The training hyperparameters (i.e., learning rate, batch size, and dropout rate) were plotted against the model loss shown in FIG. 6A-FIG. 6D to show the effect of these hyperparameters on the model loss. It was observed that a small learning rate with a small batch size produced good results, as shown in FIG. 6B, FIG. 6C, and FIG. 6D.

FIG. 7A-FIG. 7D shows models' loss against the models' size (i.e., embedding dimension, number of layers, number of hidden units, and number of attention heads). From FIG. 7 it can be observed that deep models (L>3) perform well with smaller embedding and layer dimensions, while shallow models (L=3) need larger embedding and layer dimensions.

Table 5 presents the best hyperparameters for each model, along with loss before optimization. Although all models achieved better performance with a decrease in the model loss, CoRT shows a lowest loss value of 0.148. Similarly, CNN was the second-best model with a loss of 0.163, ANN achieved poor results with a loss of 0.584, and LSTM was the second-worst model with a 0.192 loss. The best hyperparameters of CoRT were as follows: 0.3 DR, 0.001 LR, 128 B, 6 L, 128 E, 2048 H, and 8 A, which were selected as the pre-trained model to perform fine-tuning on the labeled datasets.

TABLE 5

| Pre-trained model | Dropout rate | Learning rate | Batch size | Num. layers | Embedding Dim. | Layers Dim. | Num. heads | Loss | Loss (before) |
|---|---|---|---|---|---|---|---|---|---|
| | | | | | Pre-trained model's best hyperparameters | | | | |
| ANN | 0.2 | 0.0001 | 256 | 6 | 128 | 1024 | — | 0.584 | 0.834 |
| CNN | 0.1 | 0.001 | 256 | 6 | 512 | 512 | — | 0.163 | 0.329 |
| LSTM | 0.3 | 0.001 | 128 | 3 | 512 | 2048 | — | 0.192 | 0.382 |
| CORT | 0.3 | 0.001 | 128 | 6 | 128 | 2048 | 8 | 0.148 | 0.199 |

Detection performance after fine-tuning CoRT on four downstream tasks is described in further sections. For evaluation, the F1, the AUC, and the MCC as were chosen as main metrics. However, for ease of understanding, the ACC, the P, and the R would be presented in the tables. The detection performance of the two class-level code smells (i.e., Data Class and God Class) are presented in Table 6.

TABLE 6

Class-level code smells detection performance

| Dataset | Data Class | | | | | | God Class | | | | | |
|---|---|---|---|---|---|---|---|---|---|---|---|---|
| | ACC | P | R | F1 | AUC | MCC | ACC | P | R | F1 | AUC | MCC |
| accumulo | 99.4 | 99.7 | 99.1 | 99.4 | 99.74 | 98.8 | — | — | — | — | — | — |
| activemq | 98.4 | 99.7 | 97.08 | 98.37 | 99.5 | 96.83 | 96.97 | 99.52 | 94.4 | 96.89 | 98.95 | 94.07 |
| airavata | 97.67 | 96.77 | 98.63 | 97.69 | 99.88 | 95.36 | — | — | — | — | — | — |
| archiva | 95.35 | 100 | 90.7 | 95.12 | 96.74 | 91.09 | 89.32 | 90.35 | 88.03 | 89.17 | 94.5 | 78.66 |
| atlas-sources | 98.94 | 100 | 97.89 | 98.93 | 99.13 | 97.91 | 92.37 | 98.26 | 86.26 | 91.87 | 98.29 | 85.37 |
| avro | — | — | — | — | — | — | 98.55 | 100 | 97.1 | 98.53 | 99.14 | 97.14 |
| beam | 97.14 | 99.83 | 94.44 | 97.06 | 99.51 | 94.41 | 97.61 | 99.15 | 96.04 | 97.57 | 98.63 | 95.26 |
| bookkeeper | — | — | — | — | — | — | 96.05 | 97.3 | 94.74 | 96 | 97.24 | 92.14 |
| calcite | 97.62 | 99.55 | 95.67 | 97.57 | 99.11 | 95.31 | 99.04 | 100 | 98.07 | 99.03 | 99.61 | 98.09 |
| camel | 98.51 | 99.62 | 97.4 | 98.5 | 99.67 | 97.05 | 94.79 | 94.98 | 94.58 | 94.78 | 99.11 | 89.58 |
| carbondata | 95.64 | 96.45 | 94.77 | 95.6 | 98.49 | 91.29 | 92.55 | 95.97 | 88.82 | 92.26 | 97.42 | 85.33 |
| cayenne | 97.55 | 98.18 | 96.9 | 97.54 | 98.97 | 95.11 | 92.57 | 90.26 | 95.44 | 92.78 | 98.18 | 85.28 |
| cocoon | 97.43 | 97.43 | 97.43 | 97.43 | 99.22 | 94.86 | 96.43 | 98.51 | 94.29 | 96.35 | 98.85 | 92.94 |
| commons-beanutils | — | — | — | — | — | — | 95.12 | 100 | 90.24 | 94.87 | 96.1 | 90.68 |
| commons-collections4 | — | — | — | — | — | — | 95.76 | 100 | 91.53 | 95.58 | 97.33 | 91.86 |
| commons-compress | — | — | — | — | — | — | 92.55 | 97.62 | 87.23 | 92.13 | 97.69 | 85.59 |
| commons-dbcp2 | — | — | — | — | — | — | 89.58 | 88 | 91.67 | 89.8 | 98.44 | 79.24 |
| commons-lang3 | — | — | — | — | — | — | 94.12 | 95.92 | 92.16 | 94 | 98.37 | 88.3 |
| commons-math3 | 98.12 | 97.31 | 98.97 | 98.13 | 99.54 | 96.25 | 94.12 | 95.45 | 92.65 | 94.03 | 97.41 | 88.27 |
| commons-net | — | — | — | — | — | — | 91.25 | 92.31 | 90 | 91.14 | 95.78 | 82.53 |
| commons-validator | — | — | — | — | — | — | 90.48 | 86.96 | 95.24 | 90.91 | 93.76 | 81.32 |
| commons-vfs | — | — | — | — | — | — | 93.85 | 98.31 | 89.23 | 93.55 | 98.17 | 88.07 |
| continuum | 91.49 | 89.8 | 93.62 | 91.67 | 98.52 | 83.05 | 95.45 | 96.88 | 93.94 | 95.39 | 98.13 | 90.95 |
| crunch | — | — | — | — | — | — | 94.44 | 97.06 | 91.67 | 94.29 | 97.28 | 89.03 |
| curator | — | — | — | — | — | — | 87.5 | 95.35 | 78.85 | 86.32 | 92.1 | 76.15 |
| cxf | 96.2 | 96.63 | 95.74 | 96.18 | 98.55 | 92.41 | 95.5 | 97.61 | 93.29 | 95.4 | 98.53 | 91.1 |
| directory-server | 97.94 | 97.76 | 98.13 | 97.94 | 99.49 | 95.88 | 94.53 | 95.45 | 93.52 | 94.48 | 98.24 | 89.09 |
| directory-studio | 93.77 | 96.24 | 91.1 | 93.6 | 95.5 | 87.67 | 93.33 | 95.85 | 90.59 | 93.15 | 97.56 | 86.8 |
| drill | 97.74 | 99.02 | 96.43 | 97.71 | 99.4 | 95.51 | — | — | — | — | — | — |
| flink | — | — | — | — | — | — | 95.83 | 97.83 | 93.75 | 95.75 | 98.57 | 91.75 |
| fop | 92.63 | 89.9 | 96.05 | 92.87 | 97.9 | 85.46 | 96.8 | 98.67 | 94.88 | 96.74 | 99.25 | 93.68 |
| giraph | 90.36 | 100 | 80.72 | 89.33 | 89.62 | 82.26 | 94.81 | 100 | 89.62 | 94.53 | 98.73 | 90.11 |
| hadoop | 97.68 | 98.28 | 97.06 | 97.67 | 99.26 | 95.37 | 94.92 | 99.39 | 90.39 | 94.68 | 98.7 | 90.2 |
| hbase | 98.24 | 98.24 | 98.24 | 98.24 | 99.16 | 96.49 | — | — | — | — | — | — |
| helix | 94.58 | 98.2 | 90.83 | 94.37 | 99.06 | 89.42 | 96.15 | 100 | 92.31 | 96 | 98.38 | 92.58 |
| hive | 97.71 | 97.6 | 97.83 | 97.71 | 99.57 | 95.42 | — | — | — | — | — | — |
| isis | 97.58 | 96.13 | 99.15 | 97.62 | 98.85 | 95.2 | 94.79 | 95.81 | 93.69 | 94.74 | 99.16 | 89.61 |
| jackrabbit | 95.67 | 95.81 | 95.52 | 95.66 | 98.55 | 91.34 | 94.84 | 96.74 | 92.81 | 94.73 | 98.34 | 89.76 |
| jackrabbit-oak | 96.74 | 98.31 | 95.11 | 96.68 | 98.44 | 93.53 | 94.29 | 95.32 | 93.14 | 94.22 | 98.11 | 88.59 |

TABLE 6-continued

Class-level code smells detection performance

| | Data Class | | | | | | God Class | | | | | |
|---|---|---|---|---|---|---|---|---|---|---|---|---|
| Dataset | ACC | P | R | F1 | AUC | MCC | ACC | P | R | F1 | AUC | MCC |
| jena | 98.99 | 99.79 | 98.18 | 98.98 | 99.52 | 97.99 | 97.65 | 98.41 | 96.87 | 97.63 | 99.19 | 95.32 |
| johnzon | — | — | — | — | — | — | 94.79 | 97.78 | 91.67 | 94.63 | 98.18 | 89.76 |
| kafka | — | — | — | — | — | — | 96.45 | 98.97 | 93.87 | 96.35 | 98.7 | 93.02 |
| karaf | 90.8 | 99.43 | 82.08 | 89.93 | 91.82 | 82.88 | 95.63 | 98.45 | 92.72 | 95.5 | 97.96 | 91.42 |
| kerby | 96.37 | 93.89 | 99.19 | 96.47 | 99.11 | 92.89 | 93.03 | 95.65 | 90.16 | 92.82 | 98.55 | 86.21 |
| knox | 98.91 | 98.91 | 98.91 | 98.91 | 99.69 | 97.83 | 96 | 97.63 | 94.29 | 95.93 | 99.25 | 92.05 |
| kylin | 95.63 | 97.72 | 93.45 | 95.54 | 98.69 | 91.35 | 97.6 | 99.55 | 95.63 | 97.55 | 98.59 | 95.27 |
| lucene | — | — | — | — | — | — | 97.41 | 98.25 | 96.55 | 97.39 | 98.67 | 94.84 |
| manifoldcf | 94.82 | 100 | 89.64 | 94.54 | 94.68 | 90.13 | — | — | — | — | — | — |
| maven | 92.73 | 92.73 | 92.73 | 92.73 | 97.05 | 85.45 | 95.95 | 99.04 | 92.79 | 95.81 | 98.74 | 92.08 |
| nifi | 97.78 | 98.25 | 97.28 | 97.76 | 99.16 | 95.55 | 93.83 | 96.65 | 90.81 | 93.64 | 97.69 | 87.82 |
| nutch | — | — | — | — | — | — | 92.44 | 95.06 | 89.53 | 92.21 | 97.79 | 85.03 |
| ofbiz | 94.15 | 92.78 | 95.74 | 94.24 | 98.4 | 88.34 | 95.13 | 96.3 | 93.86 | 95.06 | 98.7 | 90.28 |
| olingo-odata | 95.72 | 97.77 | 93.58 | 95.63 | 98.11 | 91.53 | 88.2 | 86.17 | 91.01 | 88.52 | 96.35 | 76.53 |
| openipa | 96.03 | 96.19 | 95.85 | 96.02 | 98.39 | 92.06 | 98.28 | 98.94 | 97.61 | 98.27 | 99.32 | 96.58 |
| openmeetings | 91.3 | 86.26 | 98.26 | 91.87 | 97.98 | 83.42 | 93.75 | 97.12 | 90.18 | 93.52 | 97.61 | 87.72 |
| opennlp | — | — | — | — | — | — | 97.81 | 97.39 | 98.25 | 97.82 | 99.85 | 95.62 |
| openwebbeans | 97.3 | 98.17 | 96.4 | 97.28 | 97.53 | 94.61 | 94.71 | 96.97 | 92.31 | 94.58 | 98.59 | 89.53 |
| parquet | — | — | — | — | — | — | 96.12 | 98.97 | 93.2 | 96 | 97.94 | 92.39 |
| phoenix | — | — | — | — | — | — | 90.79 | 94.29 | 86.84 | 90.41 | 95.29 | 81.83 |
| pulsar | 96.06 | 98.17 | 93.88 | 95.98 | 98.13 | 92.22 | 98.44 | 98.3 | 98.58 | 98.44 | 99.8 | 96.88 |
| qpid-jms | 94.37 | 94.37 | 94.37 | 94.37 | 98.83 | 88.73 | 91.91 | 93.85 | 89.71 | 91.73 | 96.15 | 83.91 |
| ranger | 91.62 | 93.37 | 89.6 | 91.45 | 98.26 | 83.31 | 94.97 | 97.08 | 92.74 | 94.86 | 98.84 | 90.03 |
| reef | | | | | | | 94.91 | 97.47 | 92.22 | 94.77 | 98.88 | 89.95 |
| roller-weblogger | 87.36 | 83.33 | 93.41 | 88.08 | 95.79 | 75.28 | 94.27 | 96.7 | 91.67 | 94.12 | 98.24 | 88.66 |
| samza | 95.66 | 98.77 | 92.49 | 95.53 | 98.72 | 91.51 | 95.34 | 95.63 | 95.03 | 95.33 | 98.74 | 90.68 |
| shiro | 94.23 | 93.67 | 94.87 | 94.27 | 98.49 | 88.47 | 93.28 | 95.31 | 91.04 | 93.13 | 97.57 | 86.65 |
| storm | 98.6 | 99.52 | 97.66 | 98.58 | 99.37 | 97.21 | — | — | — | — | — | — |
| struts | 92.58 | 92.25 | 92.97 | 92.61 | 97.29 | 85.16 | 90.77 | 90.77 | 90.77 | 90.77 | 97.85 | 81.54 |
| syncope | 98.42 | 98.59 | 98.24 | 98.41 | 99.7 | 96.83 | 92.88 | 94.34 | 91.24 | 92.76 | 98.31 | 85.81 |
| tajo | 98.14 | 99.05 | 97.21 | 98.12 | 99.35 | 96.3 | 95.92 | 97.31 | 94.44 | 95.85 | 98.37 | 91.87 |
| tez | 95.43 | 99.45 | 91.37 | 95.24 | 99.14 | 91.16 | 97.99 | 99.48 | 96.48 | 97.96 | 99.41 | 96.02 |
| tika | 97.4 | 98.03 | 96.75 | 97.39 | 98.78 | 94.81 | 92.36 | 93.57 | 90.97 | 92.25 | 97.26 | 84.75 |
| tinkerpop | — | — | — | — | — | — | 95.98 | 98.13 | 93.75 | 95.89 | 99.23 | 92.06 |
| tomcat | 93.44 | 93.44 | 93.44 | 93.44 | 97.74 | 86.89 | 96.42 | 97.34 | 95.44 | 96.38 | 99.54 | 92.85 |
| uima-ruta | 98.05 | 98.52 | 97.56 | 98.04 | 99.5 | 96.1 | 94.56 | 97.25 | 91.71 | 94.4 | 97.86 | 89.26 |
| wicket | 98.05 | 99.2 | 96.88 | 98.03 | 99.38 | 96.13 | 95.03 | 96.31 | 93.65 | 94.96 | 98.21 | 90.09 |

The detection performance of CoRT on Data Class achieved a score of F1 between 88.08-99.4, the AUC achieved between 89.62-99.88, and the MCC achieved between 75.28-98.8, while on God Class the CoRT achieved a value of F1 ranges from 86.32-99.03, the AUC of 92.1-99.85, and the MCC of 76.15-98.09. It was observed that CoRT performed well on some datasets (i.e., among the top 10 datasets) in the two class-level smells, such as Jena and Knox while had the performance was not so good on other datasets (i.e., among the bottom 10 dataset) across both class-level smells, like Archiva and Struts. However, there was a contradiction of the performance in a few datasets, for instance, CoRT performed well on detecting Data Class in Atlas dataset but failed to maintain compatible performance in detecting God Class smell for the same dataset. On the contrary, the CoRT achieved good performance for detecting God Class in Fob and Tomcat but performed not so well for detecting Data Class for the same datasets. A possible underlying factor was the project size. It was noticed that both Jena and Knox are large projects with more than 100K LOC, while Archiva and Struts are both small projects with LOC less than 100K. Furthermore, it was observed from Table 7 that the detection performance is not sensitive to the number of positive (smelly) instances, whereas, in the Atlas dataset, the model performed well on detecting Data Class although it has only 18 smelly instances, while the CoRT did not perform well in detecting God Class which has almost triple smelly instances (i.e., 52).

Table 7 presents the detection performance of two method-level code smells: Feature Envy, and Long Method.

TABLE 7

Method-level code smells detection performance

| | Feature Envy | | | | | | Long Method | | | | | |
|---|---|---|---|---|---|---|---|---|---|---|---|---|
| Dataset | ACC | P | R | F1 | AUC | MCC | ACC | P | R | F1 | AUC | MCC |
| accumulo | 65.24 | 61.32 | 82.55 | 70.37 | 72.87 | 32.48 | 59.27 | 55.18 | 98.78 | 70.81 | 70.93 | 30.26 |
| activemq | 98.25 | 98.82 | 97.67 | 98.24 | 99.6 | 96.51 | 99.88 | 99.75 | 100 | 99.87 | 100 | 99.75 |
| airavata | 66.15 | 60.48 | 93.17 | 73.35 | 71.54 | 38.39 | 65.24 | 59.96 | 91.78 | 72.53 | 70.22 | 35.96 |
| beam | 94.34 | 97.2 | 91.32 | 94.17 | 98.28 | 88.85 | — | — | — | — | — | — |
| calcite | 97.14 | 98.53 | 95.71 | 97.1 | 99.44 | 94.32 | 98.92 | 99.13 | 98.71 | 98.92 | 99.73 | 97.85 |

TABLE 7-continued

Method-level code smells detection performance

| Dataset | Feature Envy | | | | | | Long Method | | | | | |
|---|---|---|---|---|---|---|---|---|---|---|---|---|
| | ACC | P | R | F1 | AUC | MCC | ACC | P | R | F1 | AUC | MCC |
| cocoon | 61.85 | 93.1 | 25.59 | 40.15 | 78.39 | 34.41 | 97.58 | 96.83 | 98.39 | 97.6 | 99.85 | 95.17 |
| commons-math3 | 96.25 | 94.05 | 98.75 | 96.34 | 98.23 | 92.62 | — | — | — | — | — | — |
| cxf | 98.56 | 98.21 | 98.92 | 98.56 | 99.53 | 97.12 | 96.34 | 98.9 | 93.73 | 96.25 | 98.41 | 92.81 |
| directory-studio | 99.32 | 100 | 98.63 | 99.31 | 99.97 | 98.64 | — | — | — | — | — | — |
| drill | 97.49 | 96.59 | 98.46 | 97.52 | 98.92 | 95 | 98.6 | 98.8 | 98.4 | 98.6 | 98.7 | 97.2 |
| fop | 97.56 | 97.56 | 97.56 | 97.56 | 99.77 | 95.12 | 95.28 | 99.39 | 91.11 | 95.07 | 98.72 | 90.87 |
| giraph | 87.98 | 97.12 | 78.29 | 86.69 | 93.89 | 77.44 | — | — | — | — | — | — |
| hadoop | 92.42 | 98.28 | 86.36 | 91.94 | 97.27 | 85.48 | 98.34 | 98.88 | 97.79 | 98.33 | 99.07 | 96.69 |
| hbase | 79.97 | 71.82 | 98.66 | 83.13 | 82.15 | 64.63 | 86.05 | 79.12 | 97.93 | 87.53 | 87.28 | 74.22 |
| hive | 82.64 | 76.78 | 93.6 | 84.36 | 87.35 | 66.91 | 82.47 | 76.51 | 93.71 | 84.24 | 87.72 | 66.65 |
| jasml | 57.14 | 55.56 | 71.43 | 62.5 | 67.35 | 14.91 | 37.5 | 33.33 | 25 | 28.57 | 25 | −25.82 |
| jena | 94.17 | 97.93 | 90.24 | 93.93 | 98.66 | 88.61 | 98.38 | 99.34 | 97.4 | 98.36 | 99.84 | 96.77 |
| kafka | 91.8 | 96.36 | 86.89 | 91.38 | 94.28 | 84.01 | — | — | — | — | — | — |
| manifoldcf | 92.45 | 100 | 84.91 | 91.84 | 99.81 | 85.89 | 97.68 | 100 | 95.36 | 97.62 | 98.68 | 95.47 |
| nifi | 97.77 | 97.58 | 97.98 | 97.78 | 99.6 | 95.55 | 99.27 | 99.27 | 99.27 | 99.27 | 99.85 | 98.53 |
| ofbiz | 93.5 | 93.07 | 94 | 93.53 | 97.71 | 87 | 96.74 | 98.86 | 94.57 | 96.67 | 98.64 | 93.57 |
| olingo-odata | 96.71 | 93.83 | 100 | 96.82 | 98.65 | 93.62 | 96.74 | 96.74 | 96.74 | 96.74 | 98.84 | 93.48 |
| openjpa | 90.05 | 99.66 | 80.38 | 88.99 | 96 | 81.65 | — | — | — | — | — | — |
| pulsar | — | — | — | — | — | — | 99.18 | 99.18 | 99.18 | 99.18 | 99.96 | 98.36 |
| ranger | 94.81 | 94.81 | 94.81 | 94.81 | 98.15 | 89.61 | — | — | — | — | — | — |
| storm | 72.36 | 65.05 | 96.63 | 77.76 | 73.35 | 51.15 | 77.54 | 70.2 | 95.72 | 81 | 78.83 | 59.13 |
| syncope | 94.96 | 98.33 | 91.47 | 94.78 | 99.35 | 90.14 | — | — | — | — | — | — |
| tajo | 95.87 | 98.26 | 93.39 | 95.76 | 99.13 | 91.85 | 95.31 | 96.77 | 93.75 | 95.24 | 97.96 | 90.67 |
| tez | 85.23 | 87.8 | 81.82 | 84.7 | 92.99 | 70.62 | — | — | — | — | — | — |
| tinkerpop | 94.03 | 90.41 | 98.51 | 94.29 | 99.03 | 88.41 | — | — | — | — | — | — |
| tomcat | 96.31 | 96 | 96.64 | 96.32 | 97.21 | 92.62 | 91.4 | 97.1 | 85.35 | 90.85 | 98.74 | 83.42 |
| uima-ruta | 97.75 | 97.75 | 97.75 | 97.75 | 99.66 | 95.51 | — | — | — | — | — | — |
| zeppelin | 68.64 | 61.46 | 100 | 76.13 | 68.64 | 47.87 | 67.27 | 63.01 | 83.64 | 71.87 | 77.54 | 36.56 |

The detection performance of Feature Envy obtained by CoRT achieved a score of F1 between 40.15-99.31 (Avg. 88.68), AUC between 67.35-99.97 (Avg. 92.4), and MCC between 14.91-98.64 (Avg. 78.34). For Long Method, the CoRT obtained a value of F1 between 28.57-99.87 (Avg. 88.87), AUC between 25-100 (Avg. 90.2), and MCC between −25.82-99.75 (Avg. 77.16). Similar to class-level smells, CoRT had a good detection performance across the two method-level smells on some datasets, such as Activemq and Nifi, while having not so good detection performance on other datasets, like Accumulo, Airavata, Jasml, Storm, and Zeppelin. It was observed that CoRT performed well on larger projects, where Activemq and Nifi have 300K, and 550K LOC, respectively, while it obtained not so good detection performance scores on smaller projects like Jasml, Storm, and Zeppelin with 6 k, 200 k, and 60 k LOC, respectively. An exception to that is Accumulo and Airavata datasets, where both have 400K LOC, but the CoRT model achieved not so good performance. On one dataset, Cocoon, the CoRT model had a high performance on one code smell (Long Method) while achieving not so good performance on the other smell (Feature Envy). Although the Cocoon dataset has the same number of smelly instances (12) for both method-level smells, the CoRT model performed well on one smell and failed to maintain similar performance on the other smell, which supports the claim that the detection performance of the CoRT model is not sensitive to the number of smelly instances, as observed in the class-level smells.

Compared to previous studies (For example, see: Barbez, A., Khomh, F., & Gueheneuc, Y.-G. (2019). Deep Learning Anti-Patterns from Code Metrics History. 2019 IEEE International Conference on Software Maintenance and Evolution (ICSME), 114-124. doi.org/10.1109/ICSME.2019.

00021, incorporated herein as a reference in its entirety) the disclosed DL-based approach for detecting God Class using CNN, and their conventional model has achieved 68% f-score for detecting God Class in Tomcat, 38% in Qpid, 23% in Struts and 21% in Wicket dataset, while the CoRT model achieved 96%, 98%, 90% and 94% f-scores in Tomcat, Qpid, Struts, and Wicket datasets, respectively. In another study by Hadj-Kacem and Bouassida (See: Deep Representation Learning for Code Smells Detection using Variational Auto-Encoder. 2019 International Joint Conference on Neural Networks (IJCNN), 1-8. doi.org/10.1109/IJCNN.2019.8851854, incorporated herein as a reference in its entirety), variational autoencoder was used to extract features from ASTs, their conventional model achieved high f-scores for detecting Blob in Lucene (80%) and Qpid (80%) datasets, yet the CoRT approach of the disclosure has higher scores with 97% f-score in Lucene and 98% in Qpid datasets. Compared to the previous approach, Hadj-Kacem and Bouassida (Hadj-Kacem & Bouassida, 2019b) approach achieved 84% and 85% f-score for detecting Feature Envy and Long Method, respectively, in Hive datasets, whereas the CoRT approach has achieved similar or better results (i.e., 84% f-score for detecting both smells).

The time complexity of pre-training and fine-tuning is presented in Table 8 and Table 9, respectively. For each pre-trained model, the average, minimum, and maximum training time were calculated across all models trained during the hyperparameters optimization. For fine-tuning, the average, minimum, and maximum tuning time across all labeled datasets were calculated per code smell. The tables clearly show that pre-training is time-consuming compared to fine-tuning process, which is one of the main advantages of self-supervised learning where a single complex model is trained and then efficiently used on multiple downstream tasks. Among the pre-trained models, CoRT and ANN have the least average training time with 6 hours per training, while LSTM had the longest training time with an average of 16 hours. CNN comes after LSTM with an average of 10 hours. Although CoRT and ANN have the shortest training time, CoRT has the best performance in terms of training accuracy and loss, while ANN has the worst performance. For fine-tuning, the average tuning time across code smells was between 1.3-2.02 minutes.

TABLE 8

| Pre-training time | | | |
|---|---|---|---|
| Model | Avg (min.) | Min (min.) | Max (min.) |
| ANN | 350.33 | 214 | 550 |
| CNN | 583.95 | 231 | 1714 |
| LSTM | 954.65 | 349 | 2980 |
| CoRT | 355.71 | 251 | 664 |

TABLE 9

| Fine-tuning time | | | |
|---|---|---|---|
| Code smell | Avg (min.) | Min (min.) | Max (min.) |
| Data Class | 2.02 | 0.55 | 5.73 |
| God Class | 1.45 | 0.23 | 5.52 |
| Feature Envy | 1.30 | 0.22 | 2.87 |
| Long Method | 1.45 | 0.23 | 2.77 |

In the experiments, the disclosed CoRT was compared with supervised learning and feature-based approaches. For the supervised learning, a baseline model was trained where an ANN model was implemented with the same hyperparameters used for fine-tuning, i.e., Adam was used as an optimization algorithm with a learning rate of 0.001. Xavier uniform initializer was utilized to initialize the weights and a dropout rate of 0.1. The labeled datasets were used to detect the four code smells. Also, the CoRT was compared with the feature-based where the extracted features were used from CoRT as input to the ANN model without any fine-tuning, then labeled datasets were used to make predictions. ANN was selected as a baseline because it was used for fine-tuning CoRT on the downstream tasks.

Figure 8:
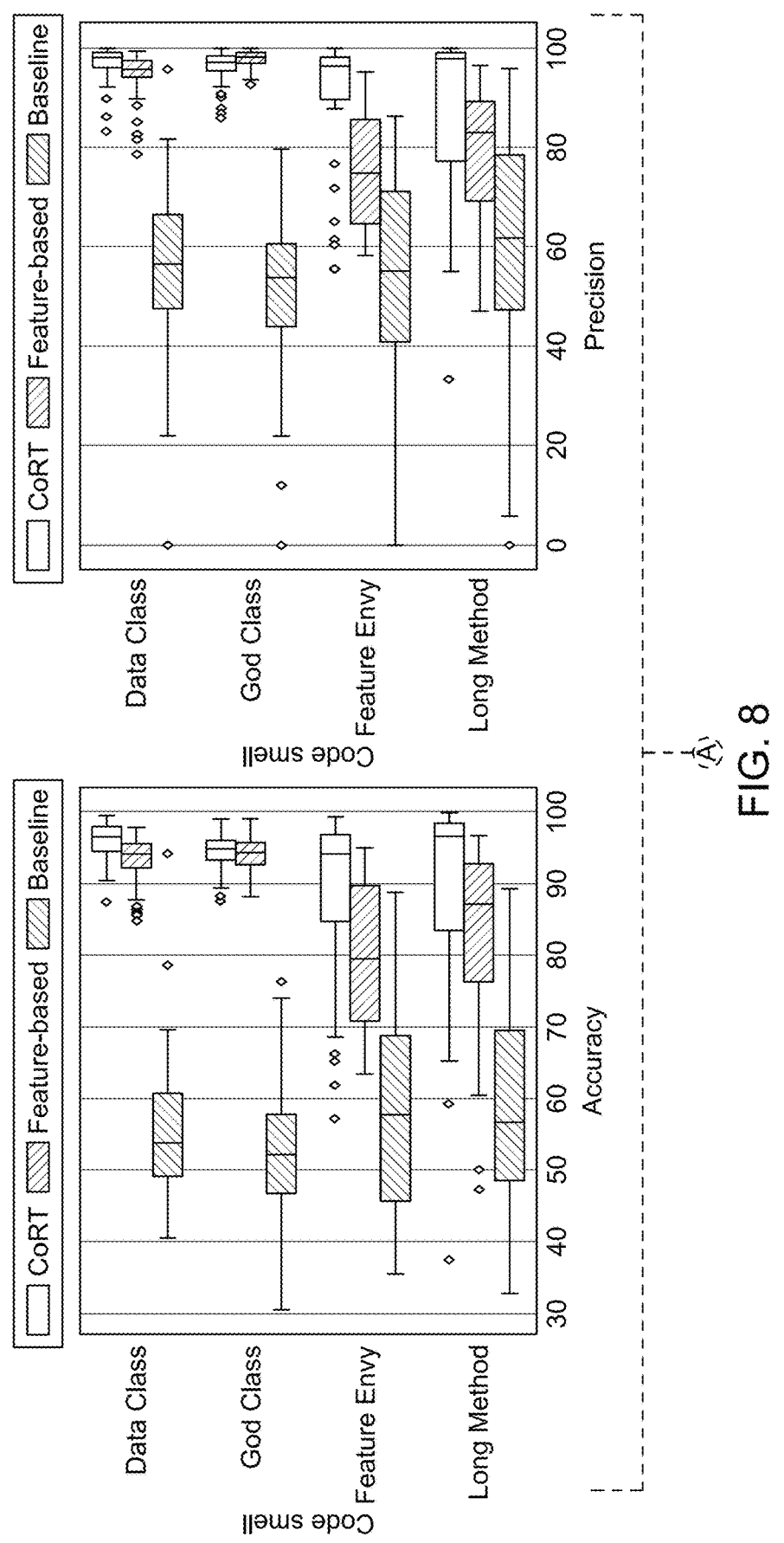
FIG. 8 illustrates detection performance boxplots of CoRT compared to baseline and feature-base, in accordance with an exemplary aspect of the disclosure.
Figure 8:
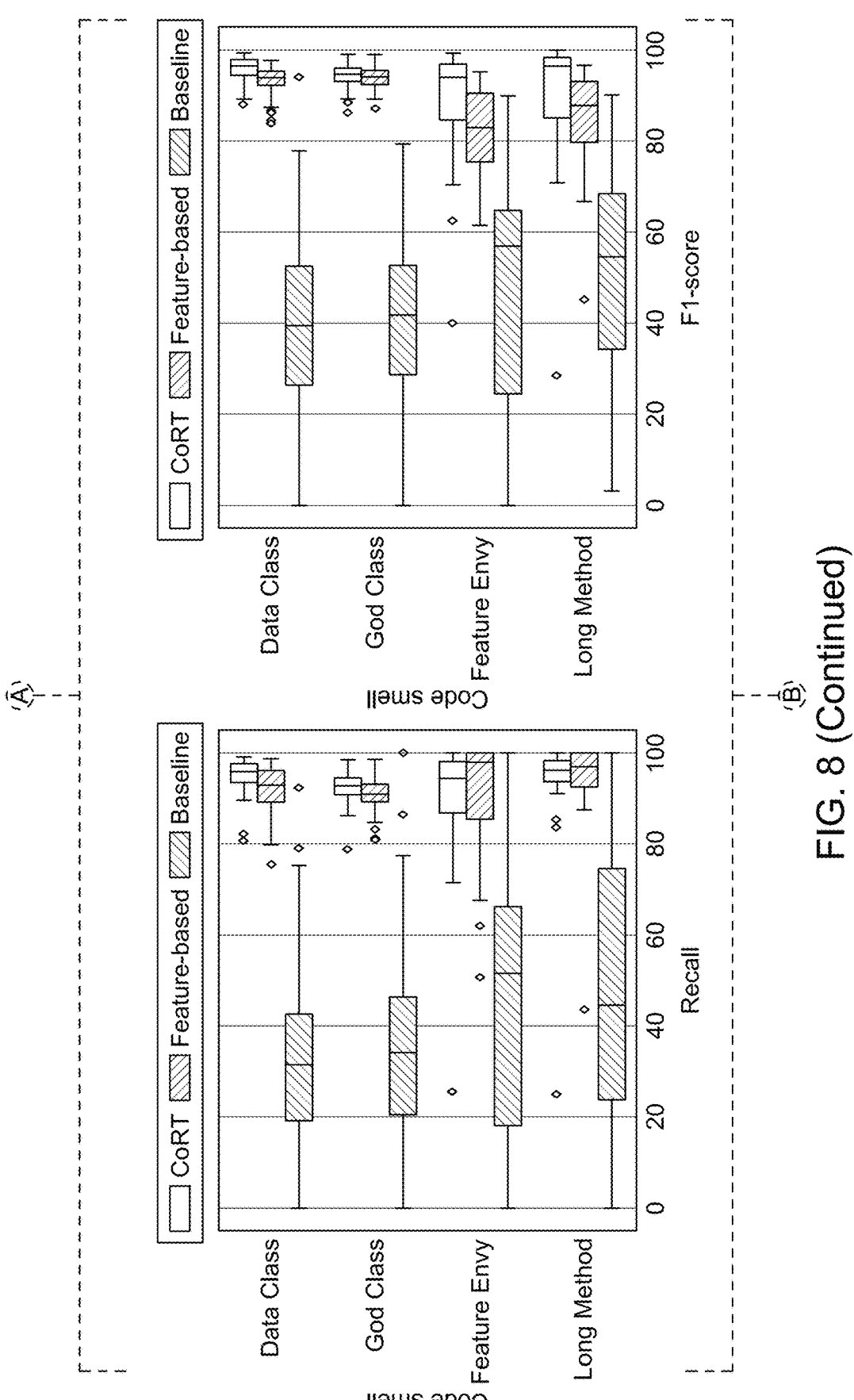
Figure 8:
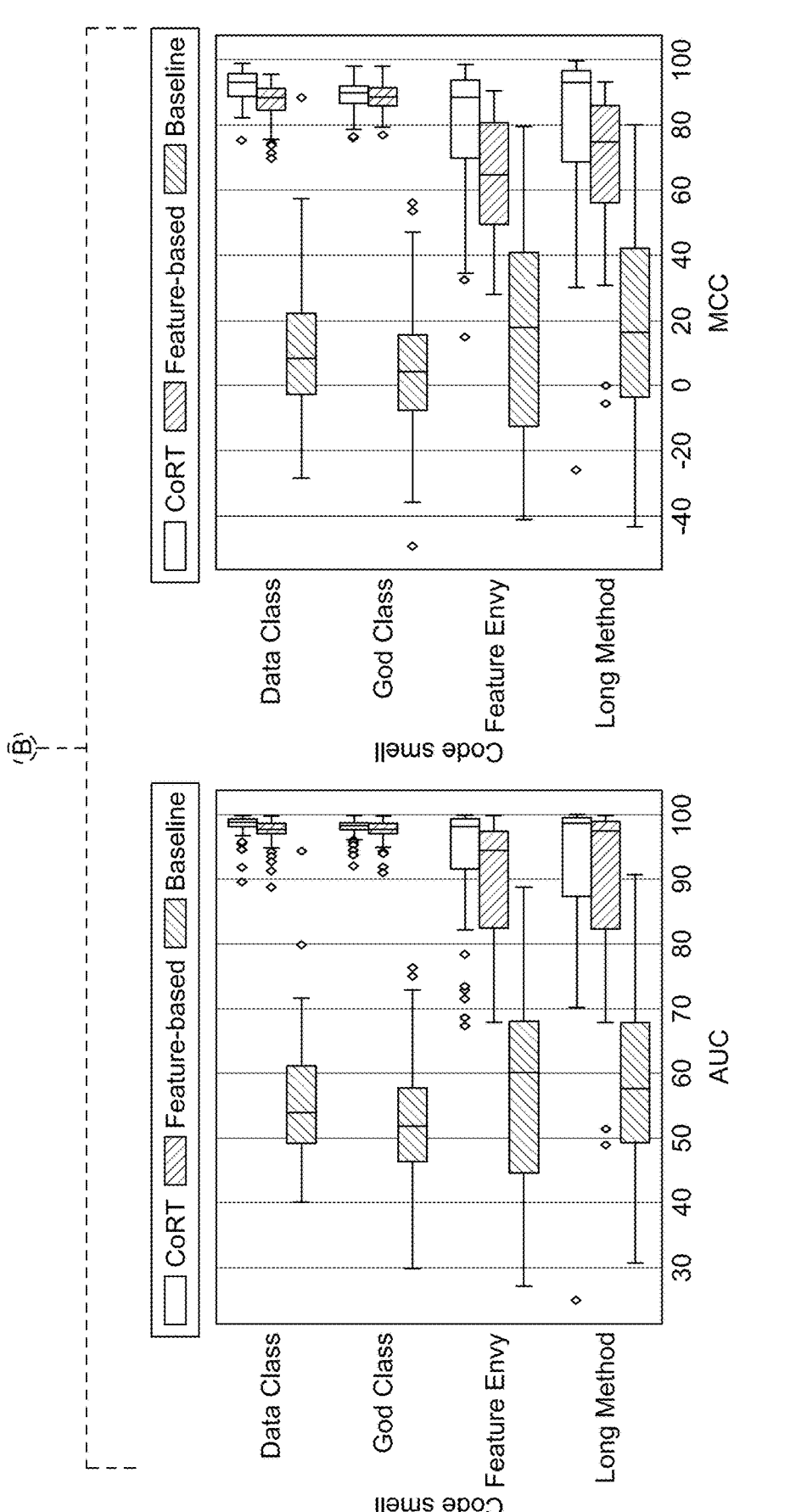
Figure 9A:
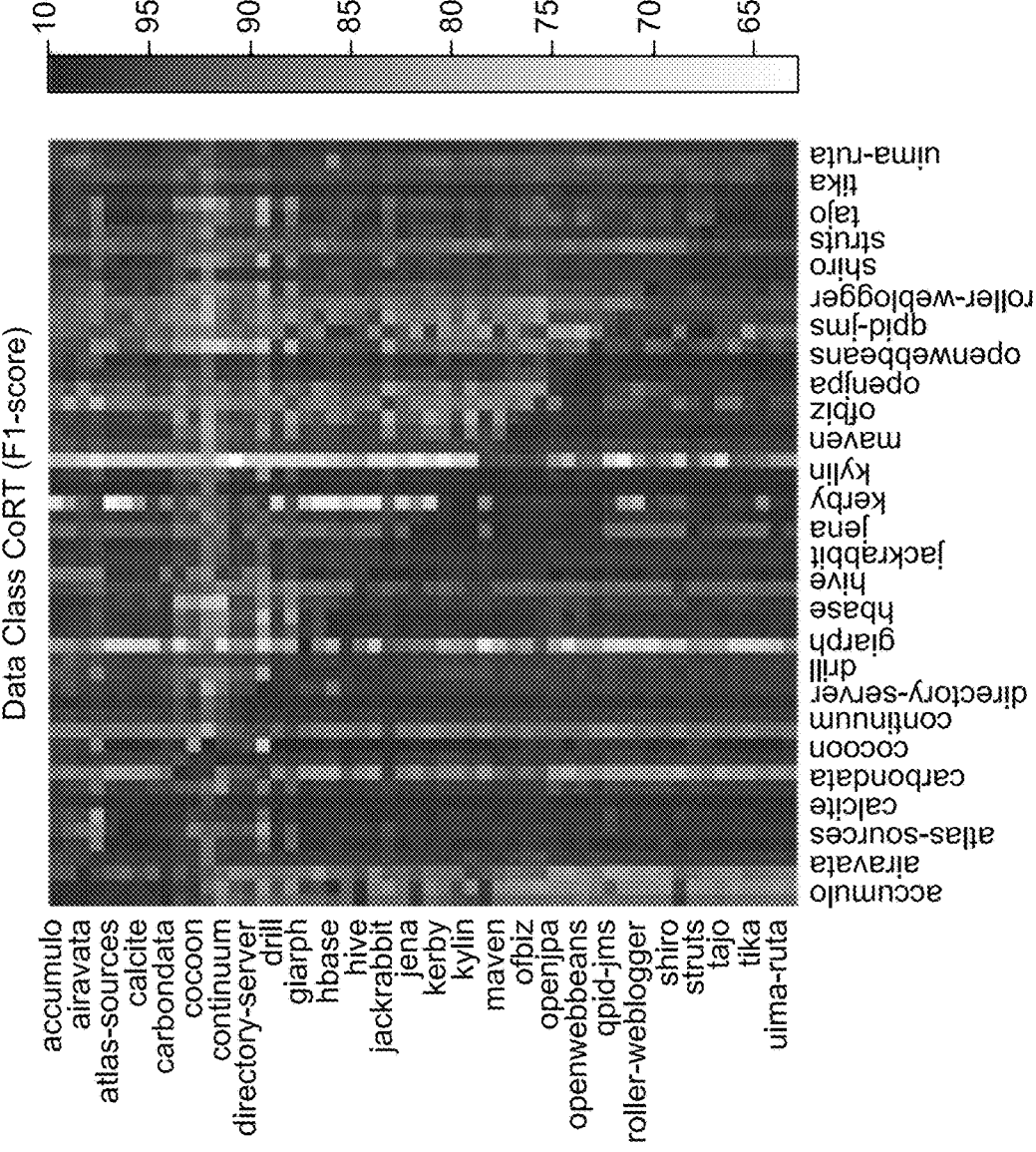
FIGS. 9A, 9B, 9C illustrate a cross-project heatmap for data class, in accordance with an exemplary aspect of the disclosure.
Figure 9A:
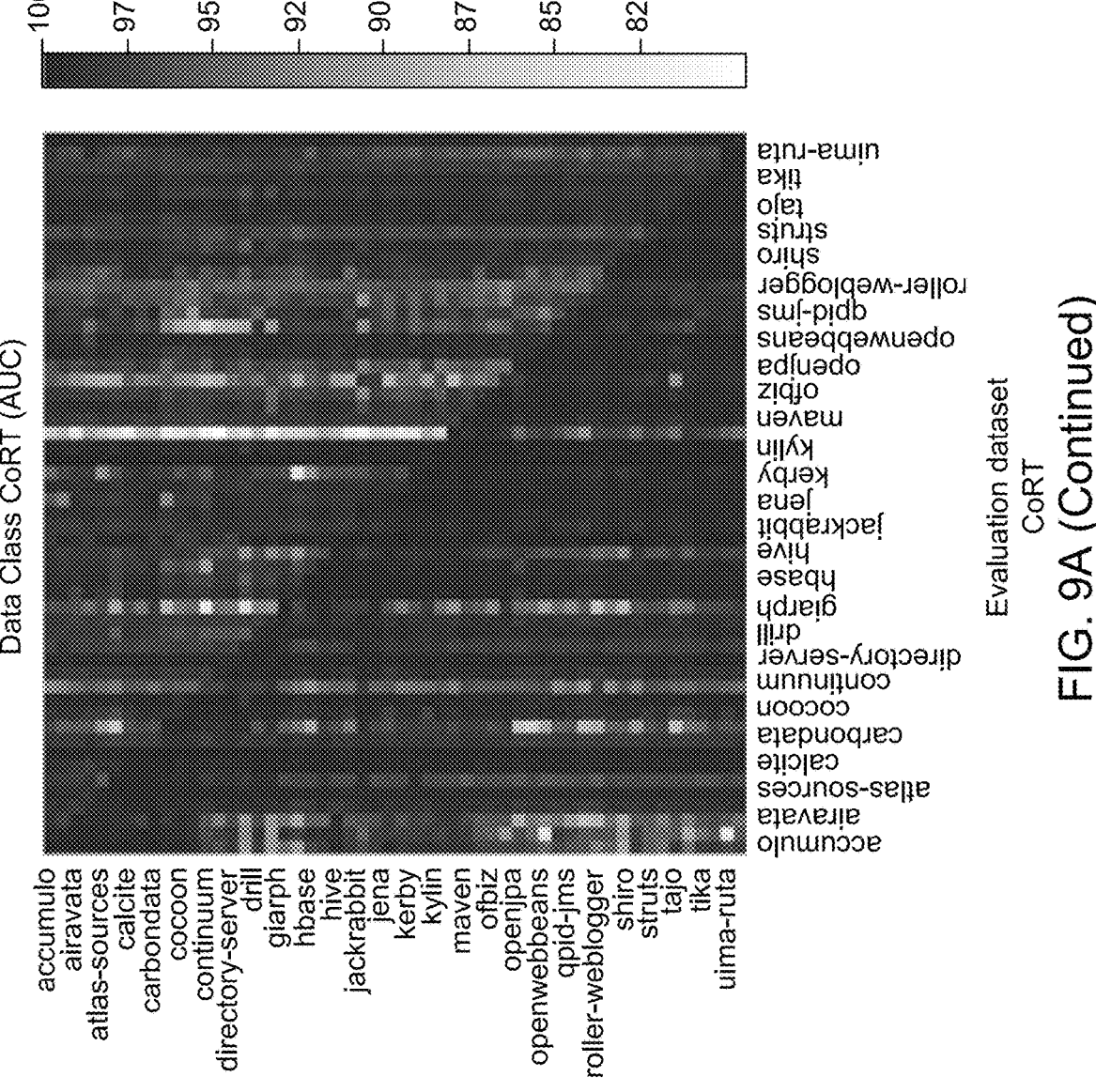
Figure 9A:
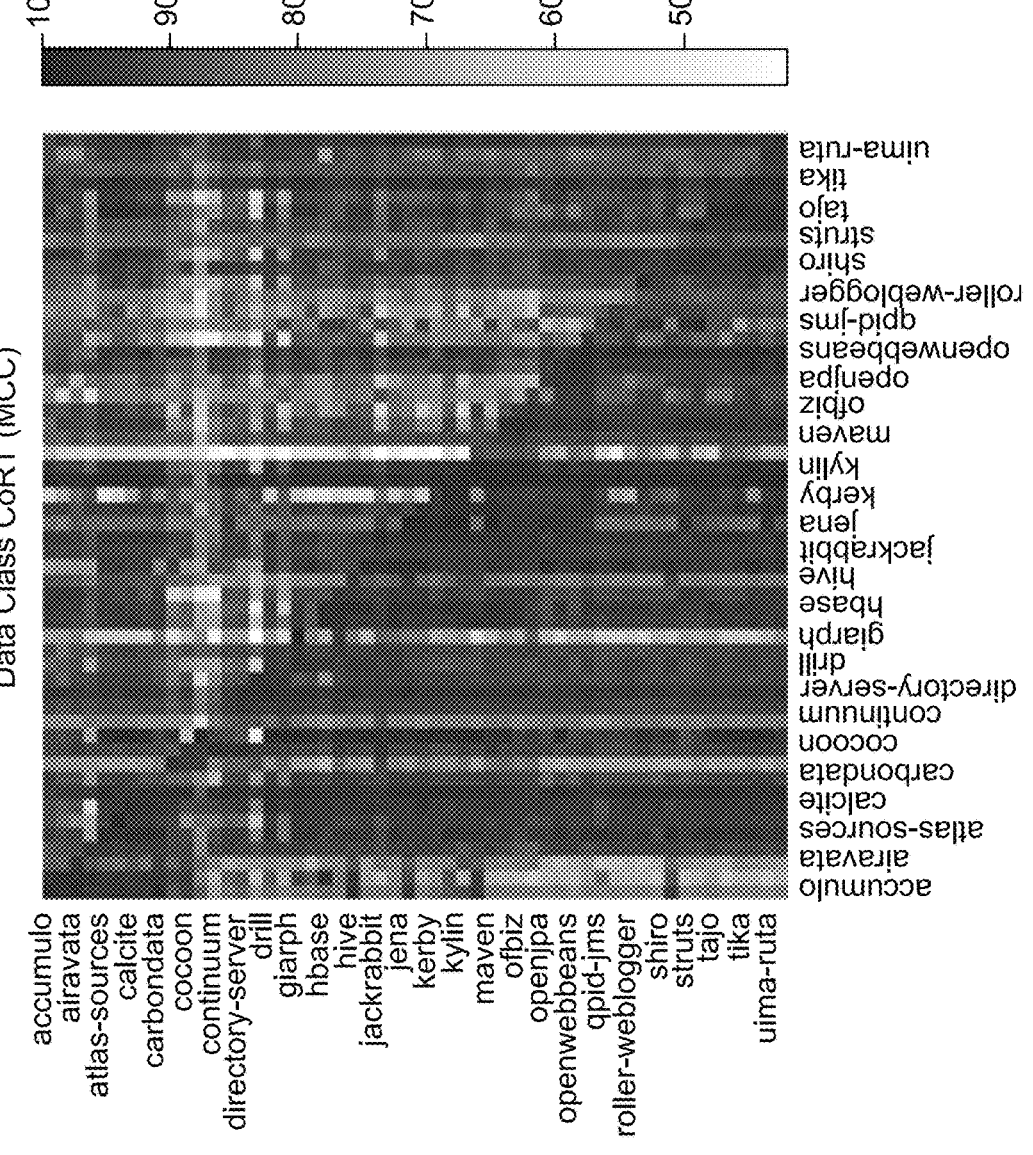
Figure 9B:
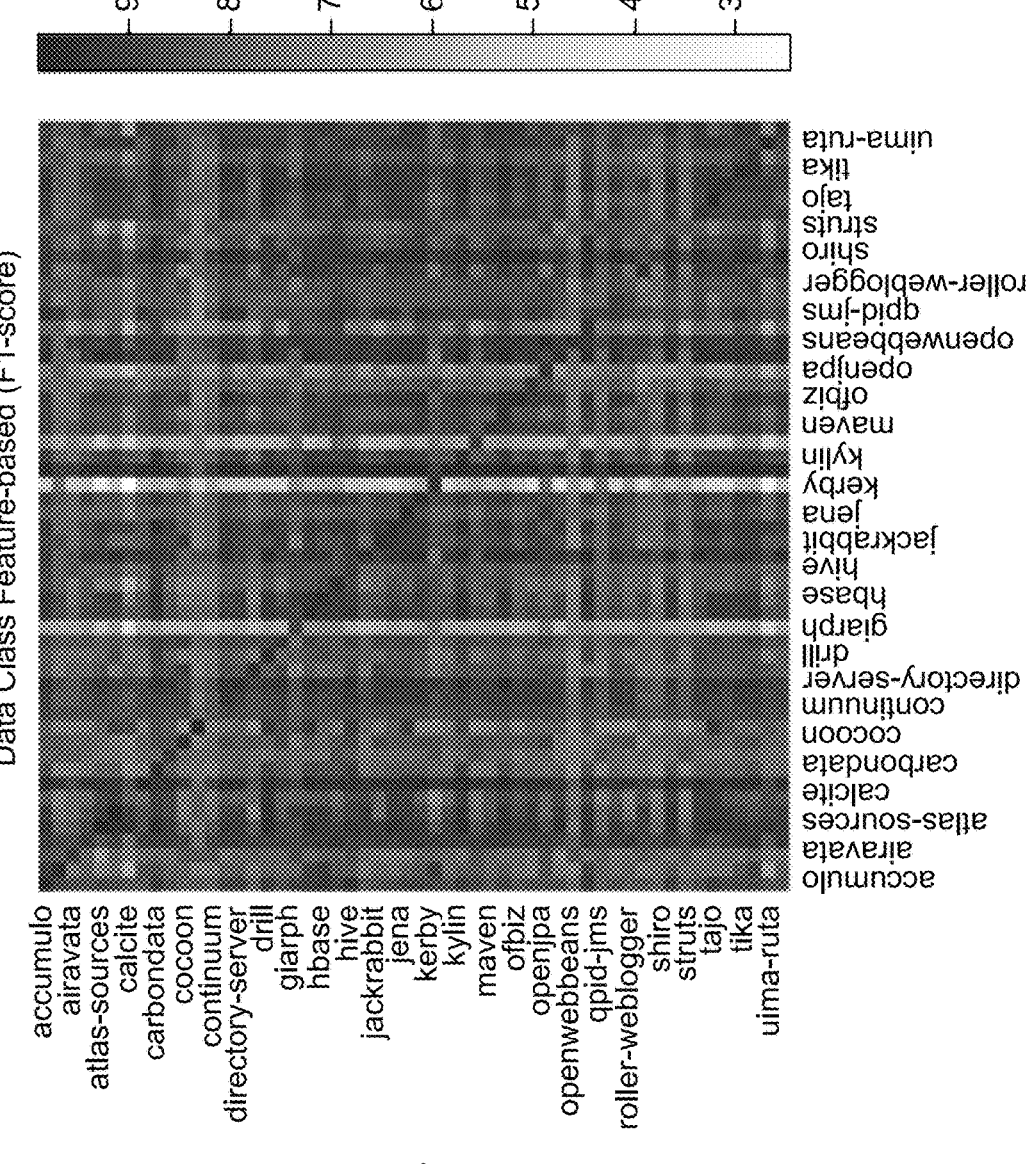
Figure 9B:
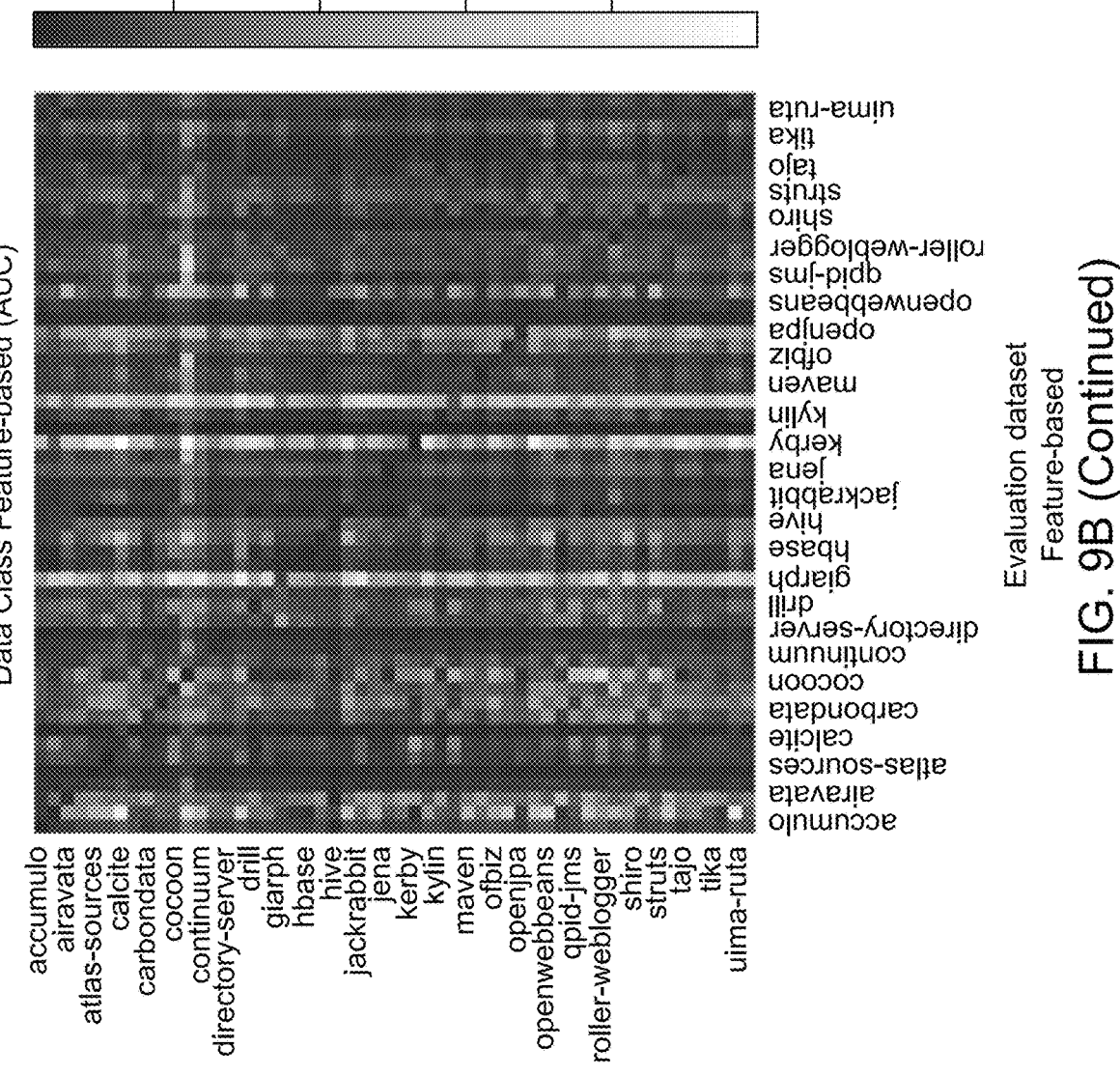
Figure 9B:
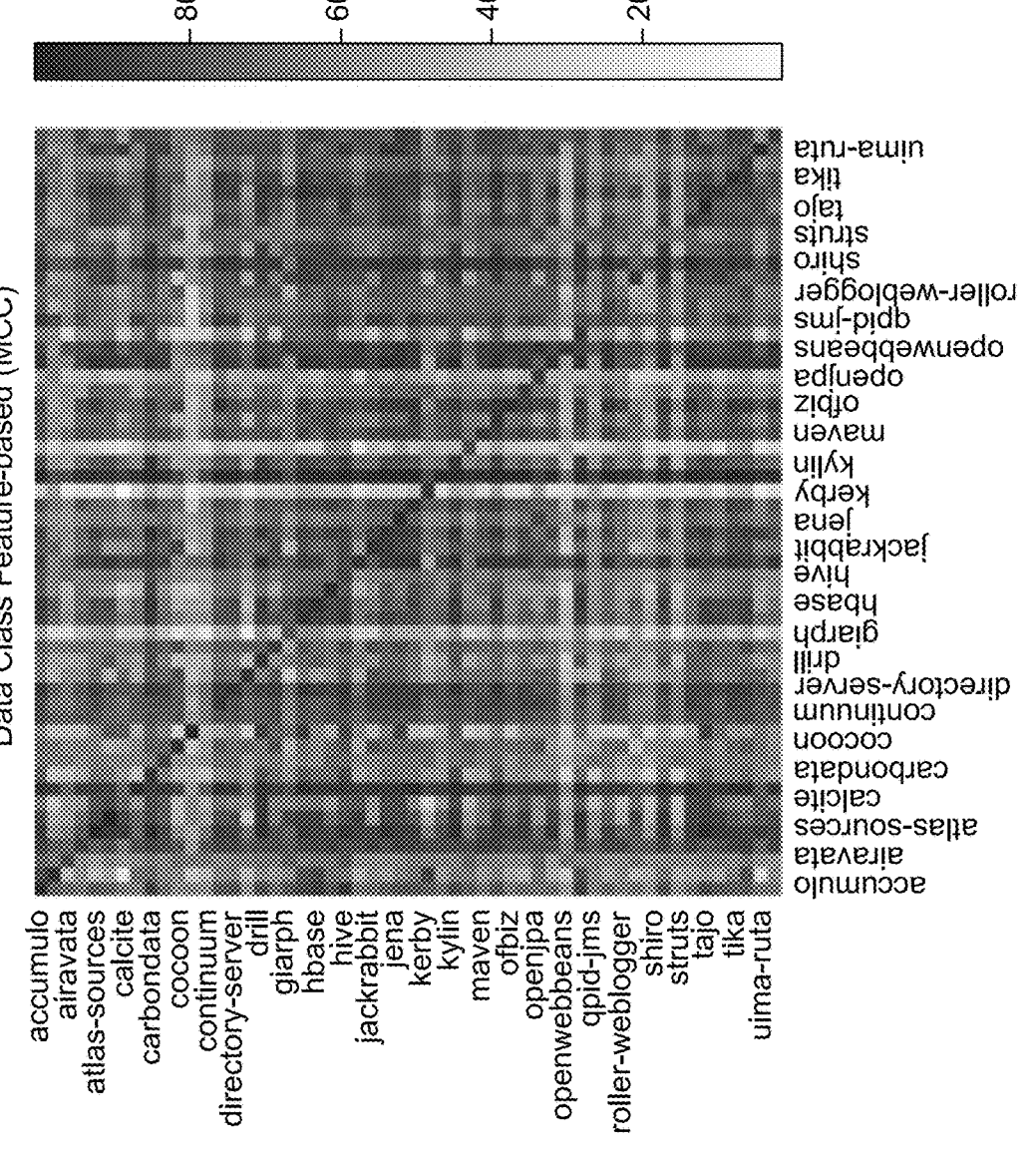
Figure 9C:
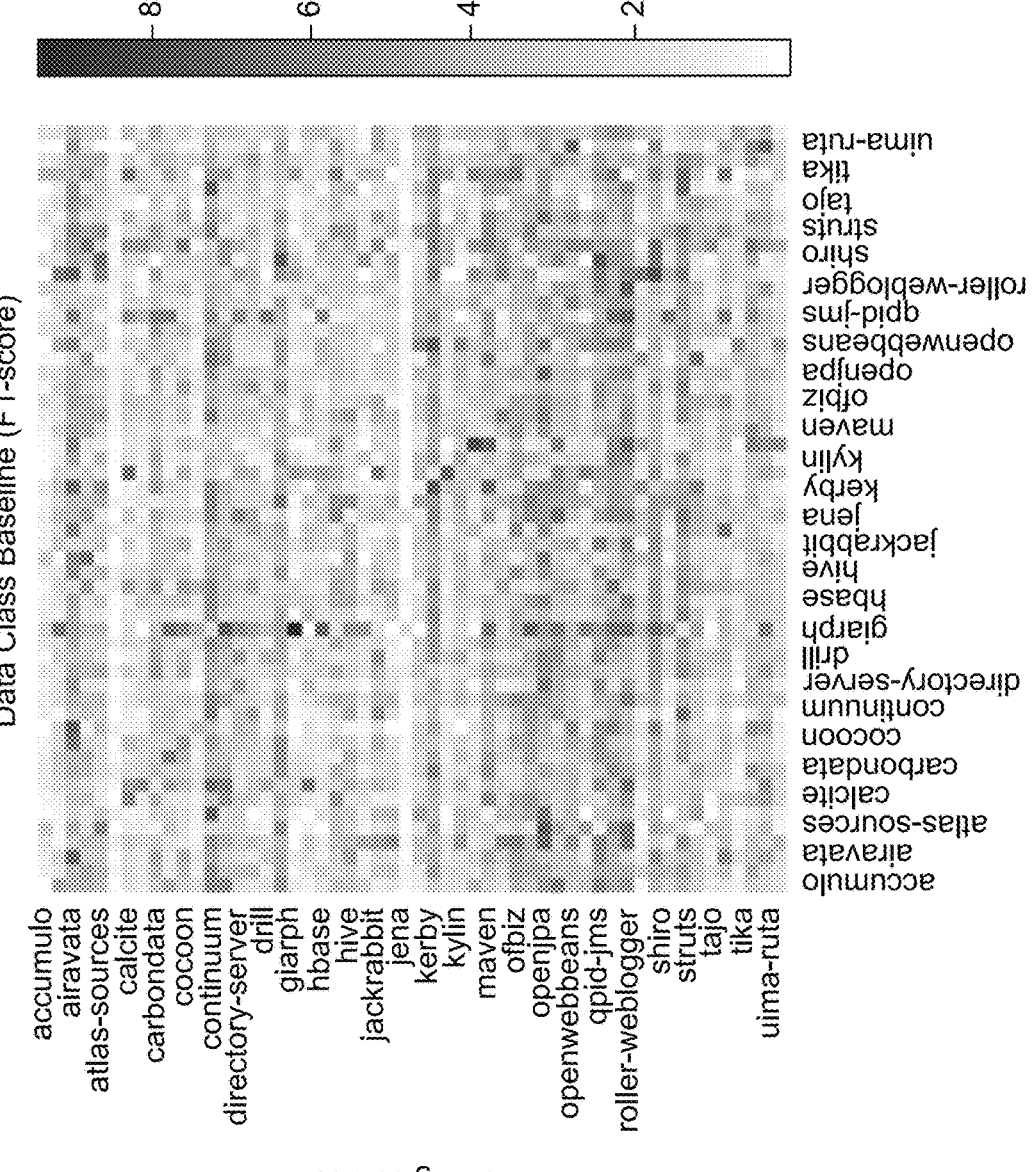
Figure 9C:
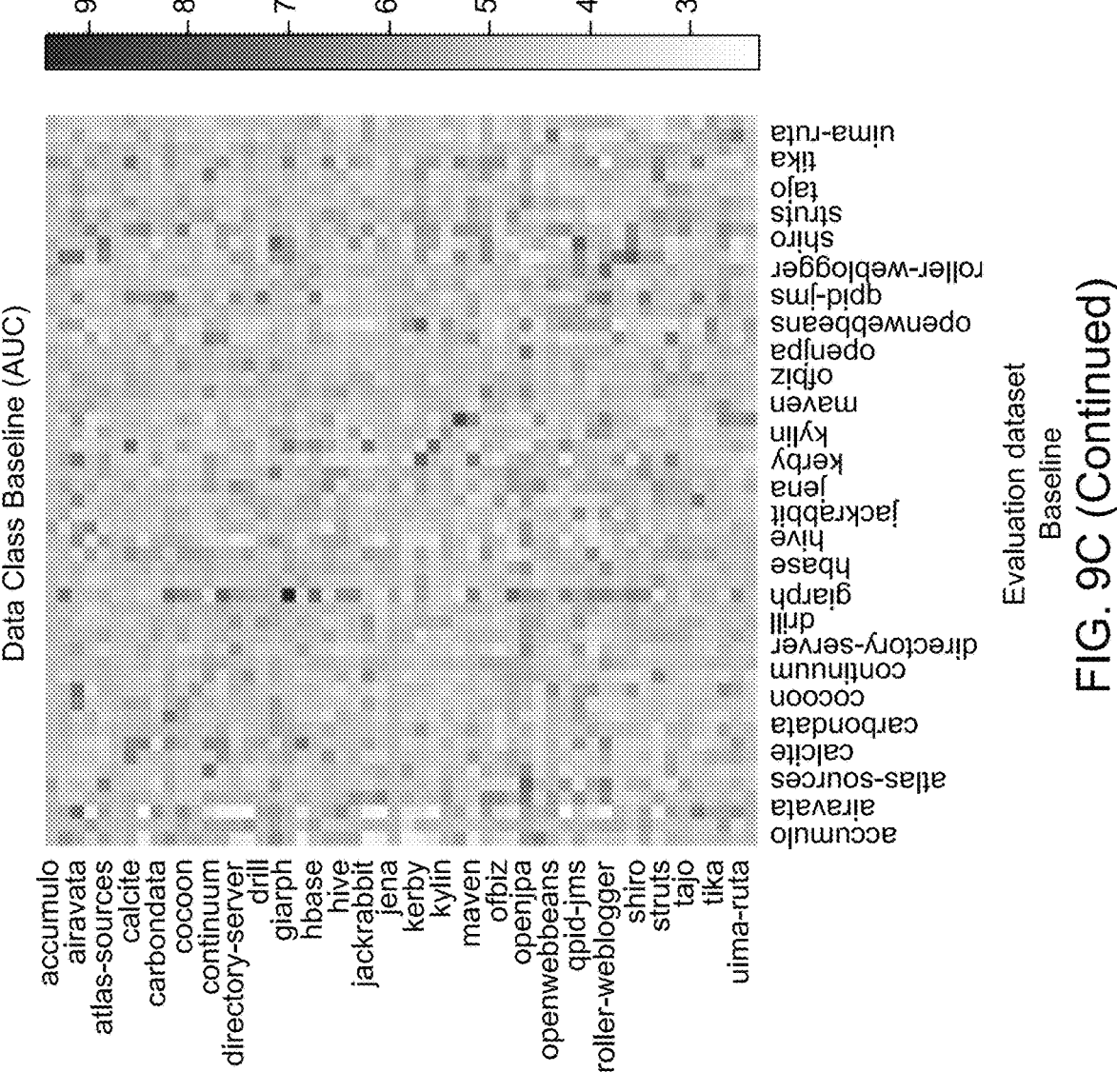
Figure 9C:
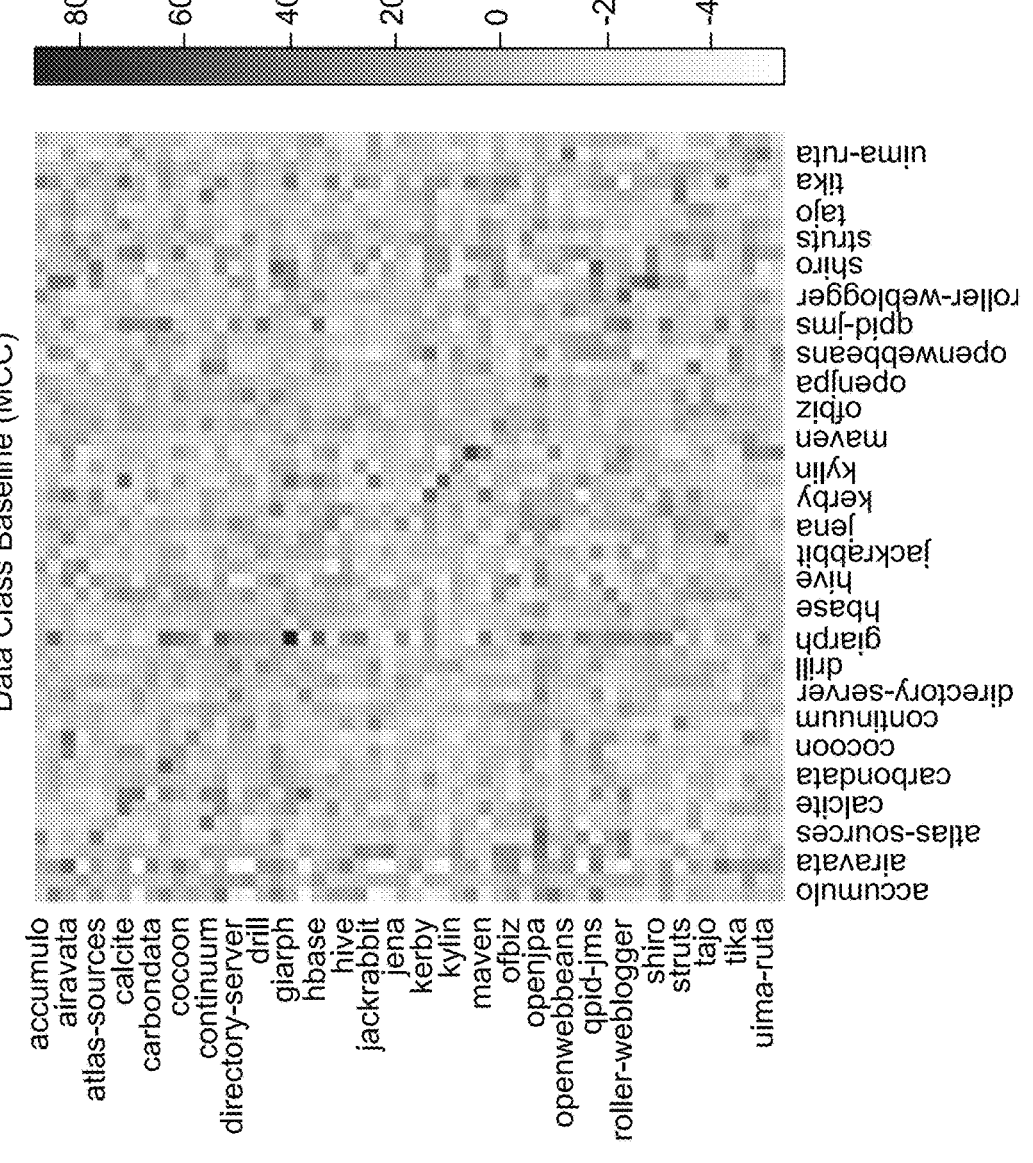
Figure 10A:
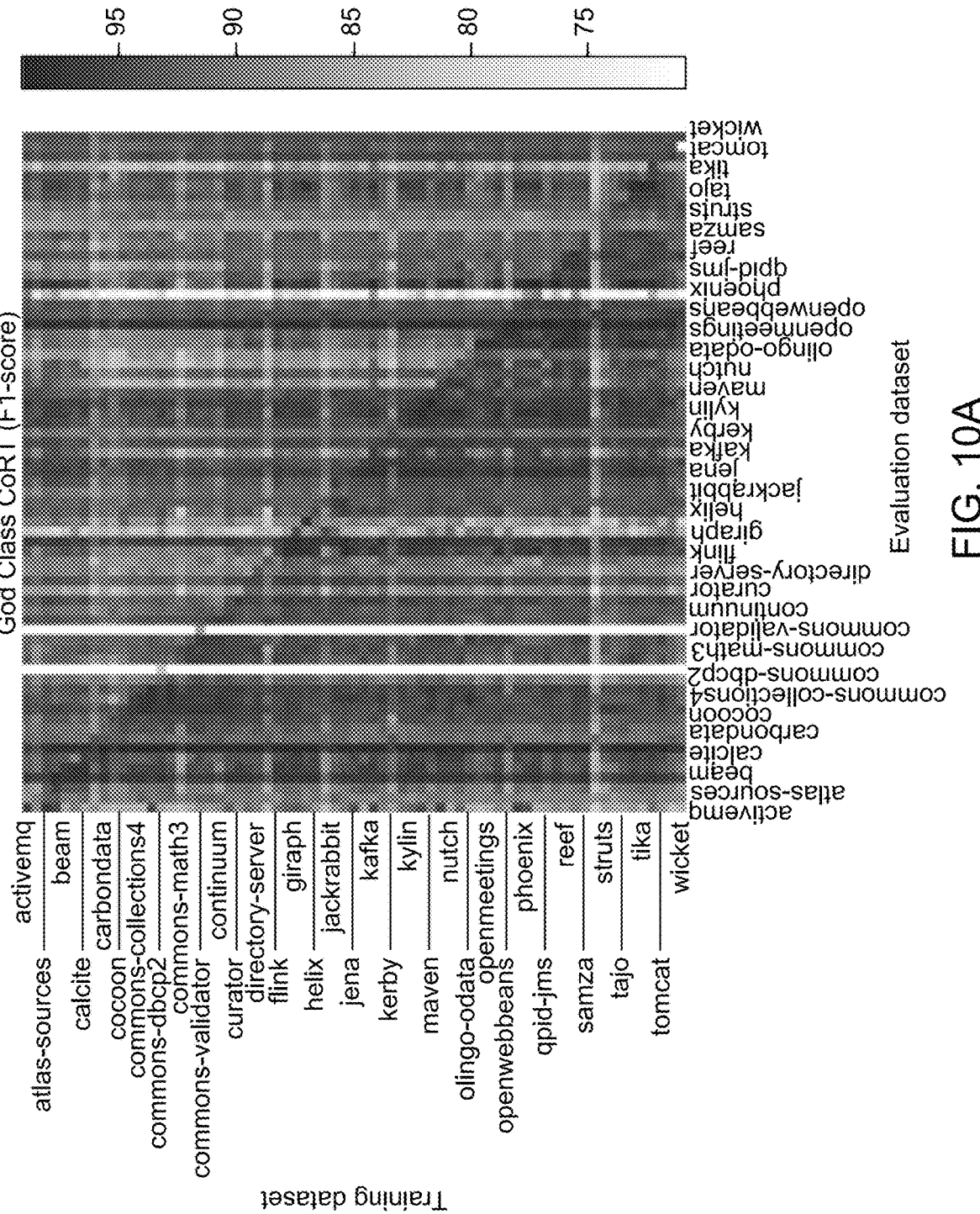
FIGS. 10A, 10B, 10C illustrate a cross-project heatmap for God class, in accordance with an exemplary aspect of the disclosure.
Figure 10A:
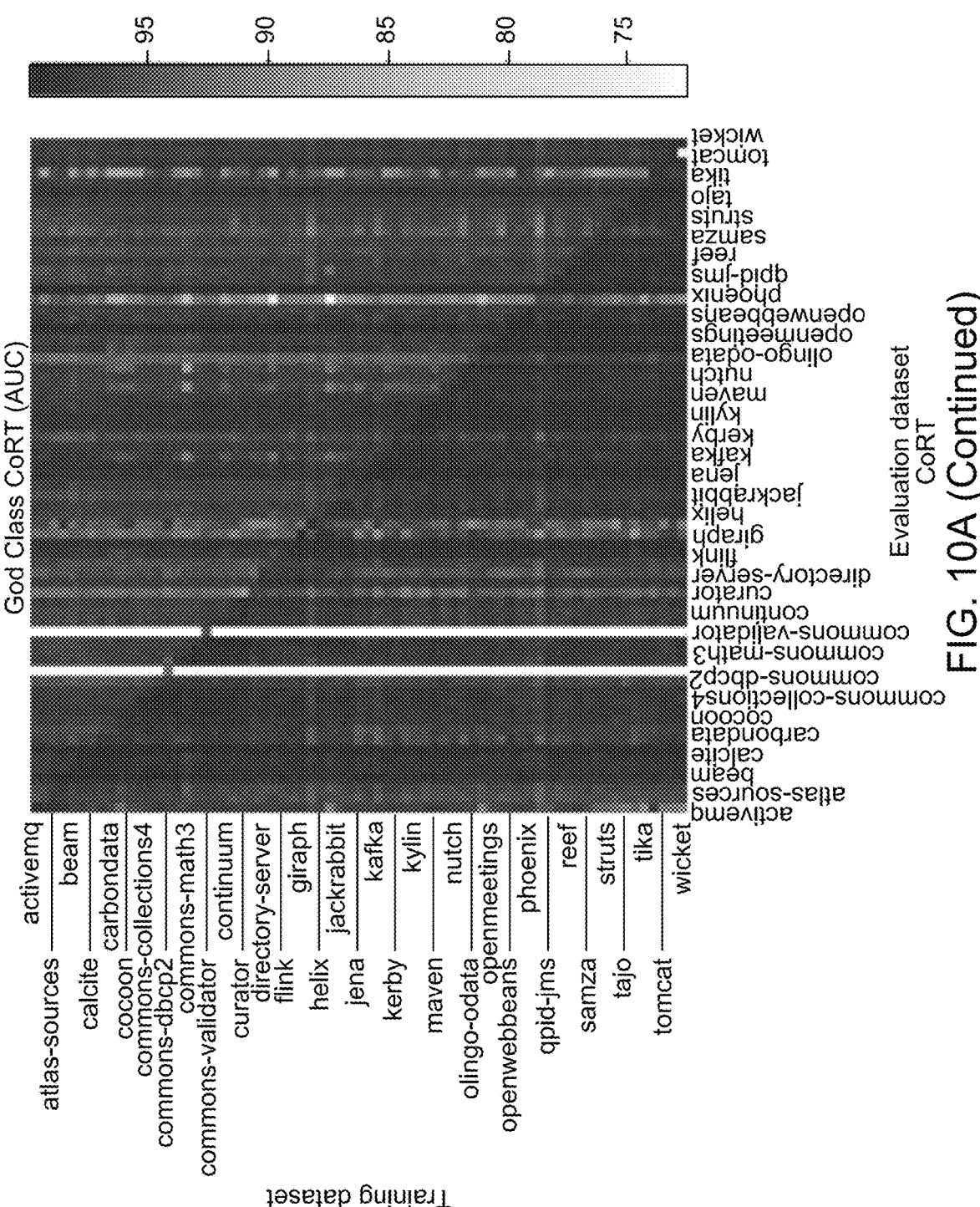
Figure 10A:
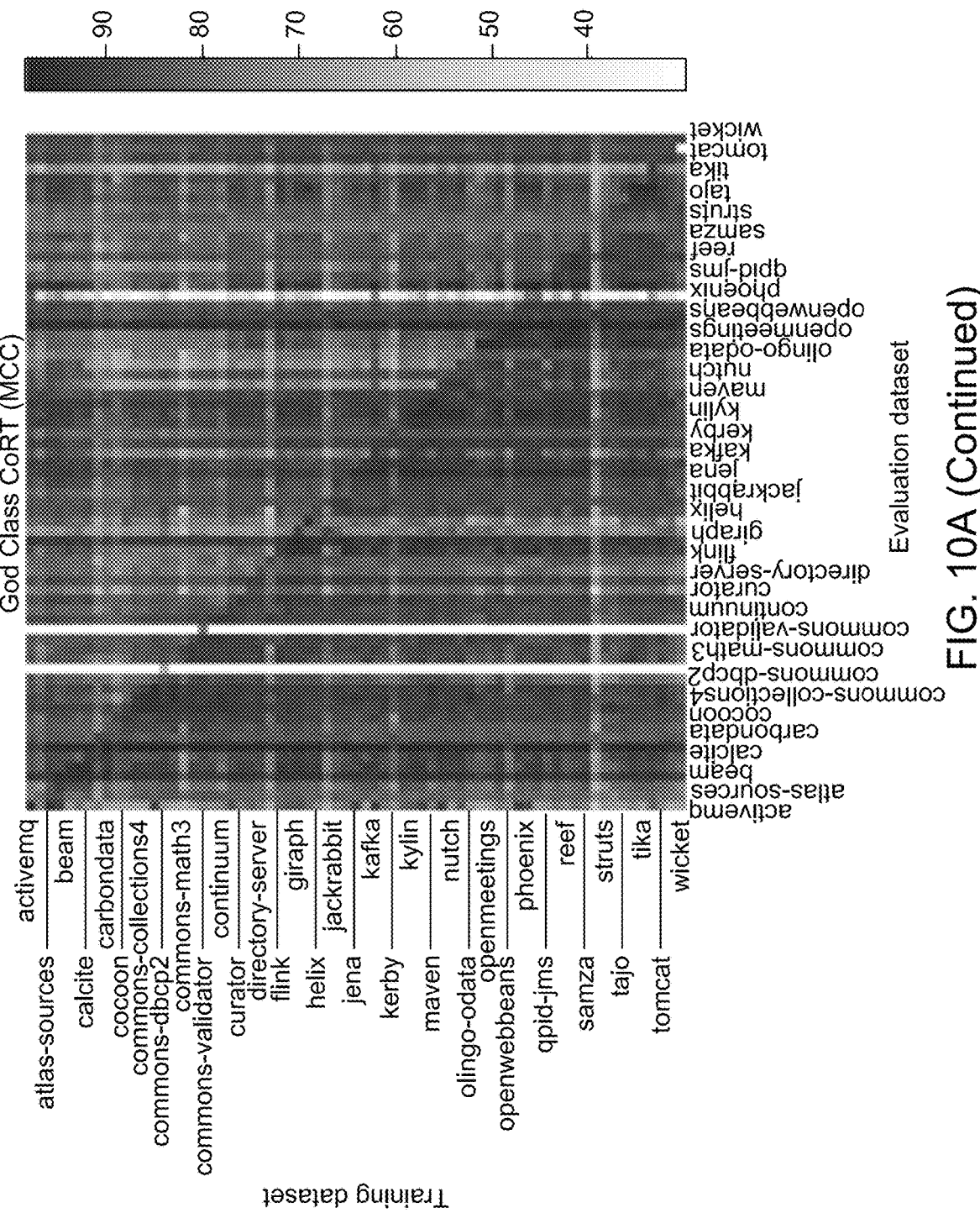
Figure 10B:
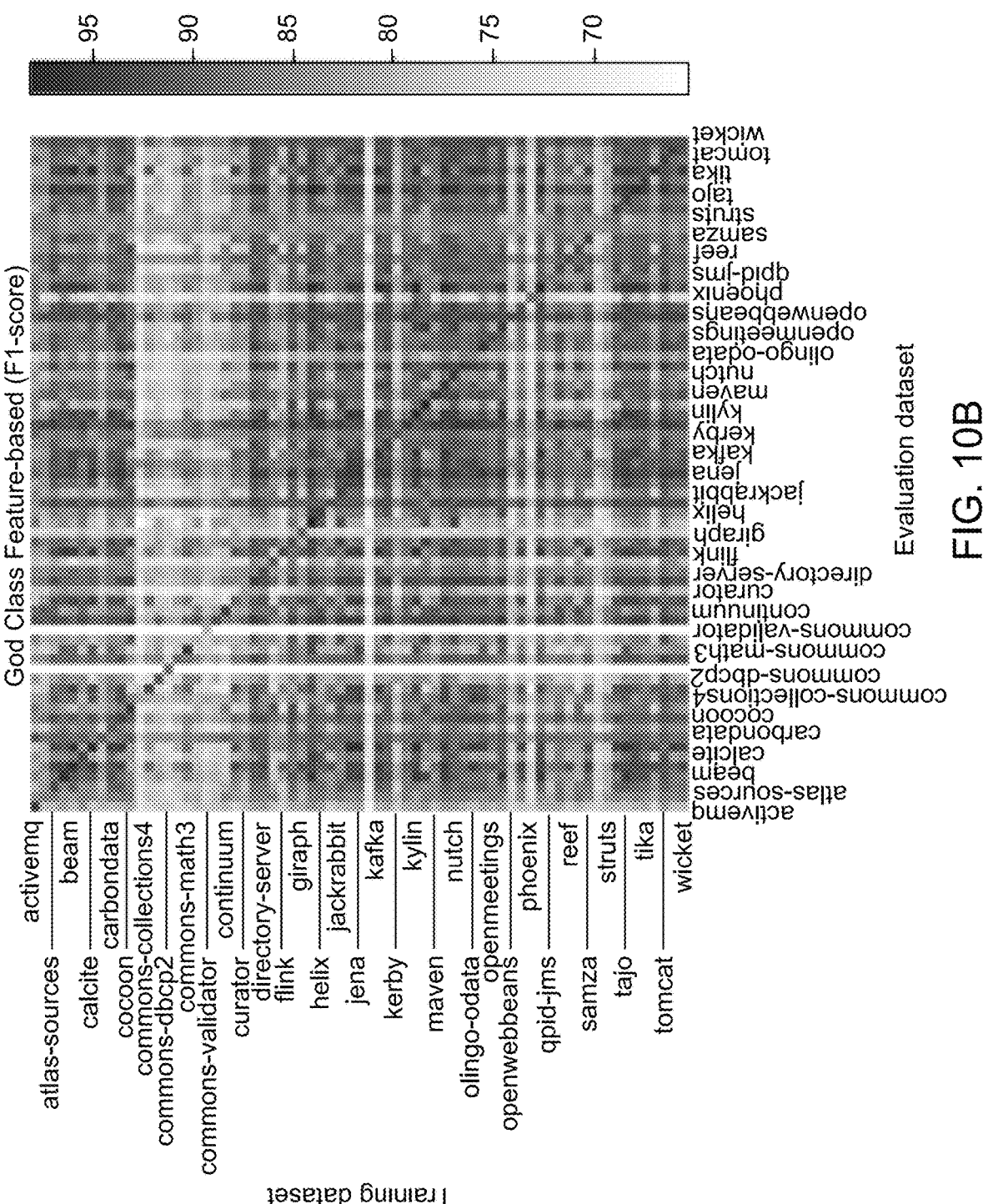
Figure 10B:
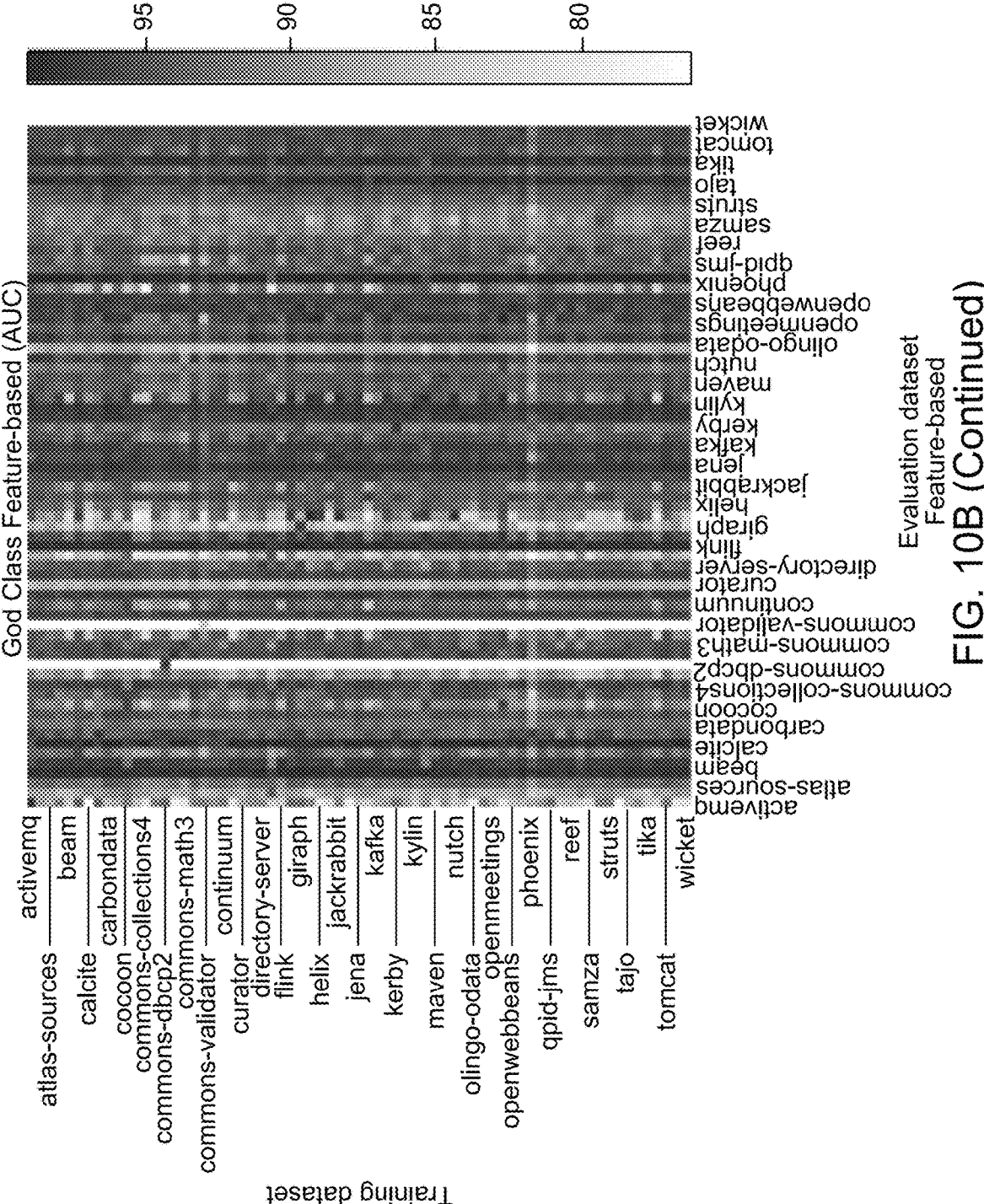
Figure 10B:
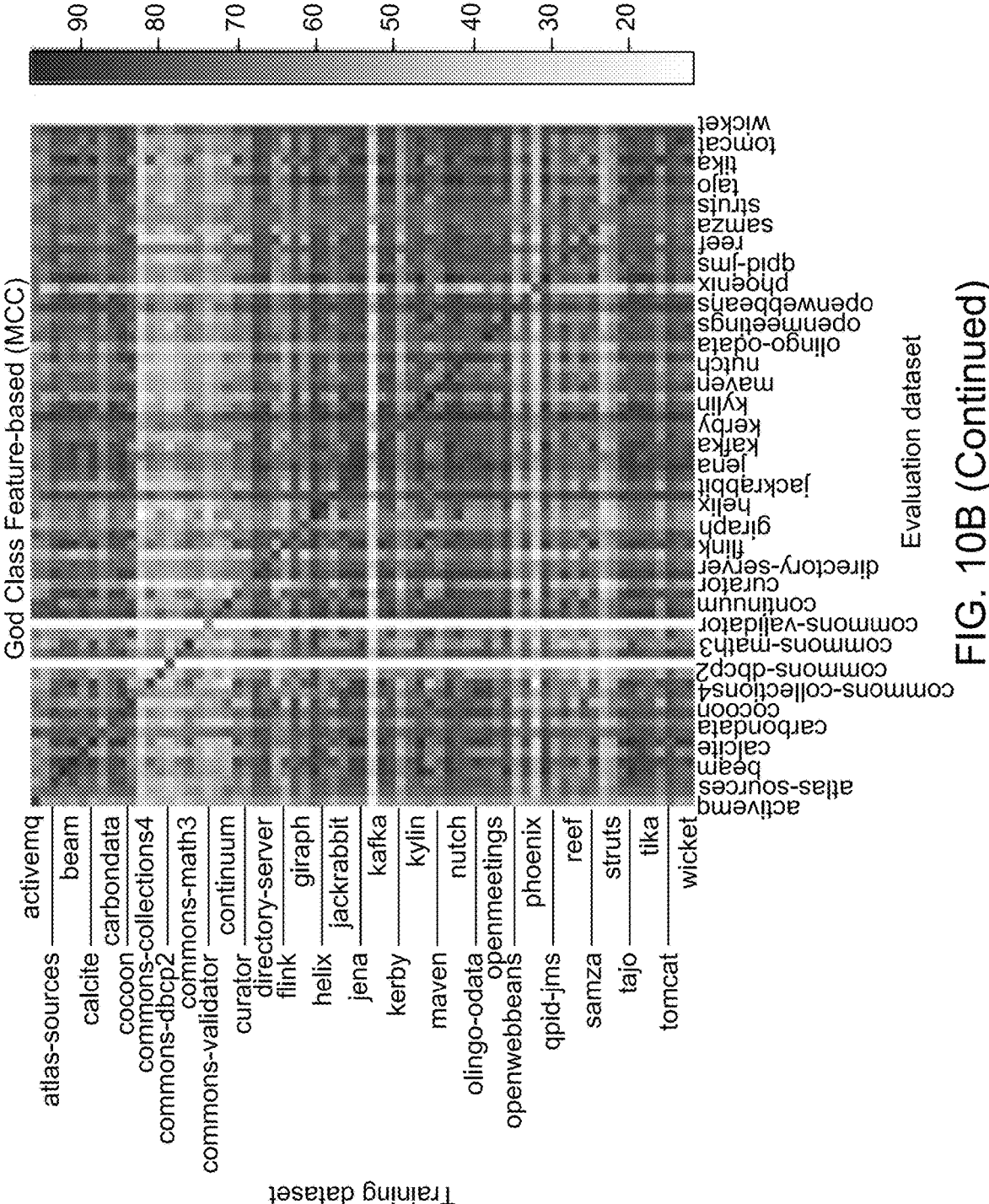
Figure 10C:
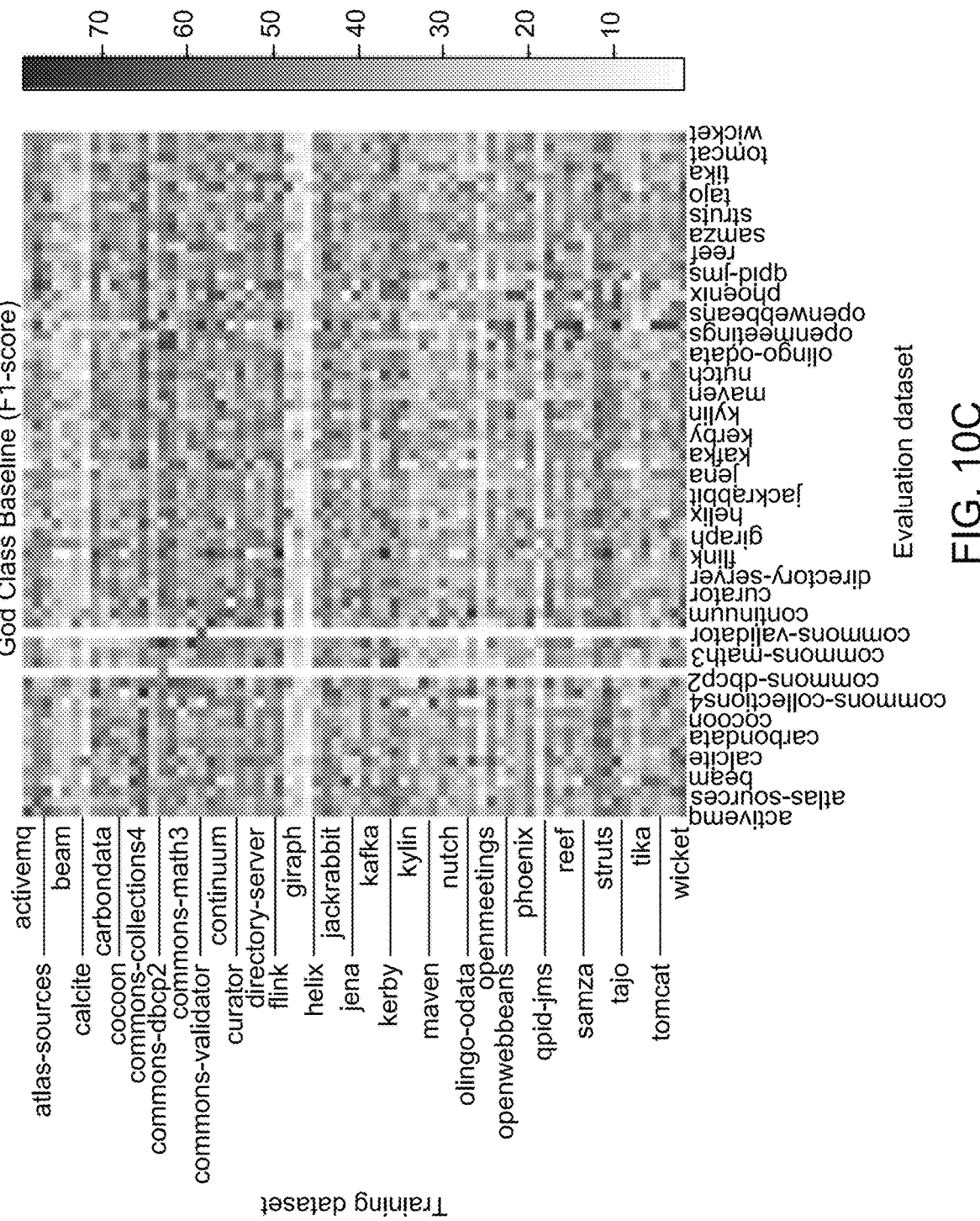
Figure 10C:
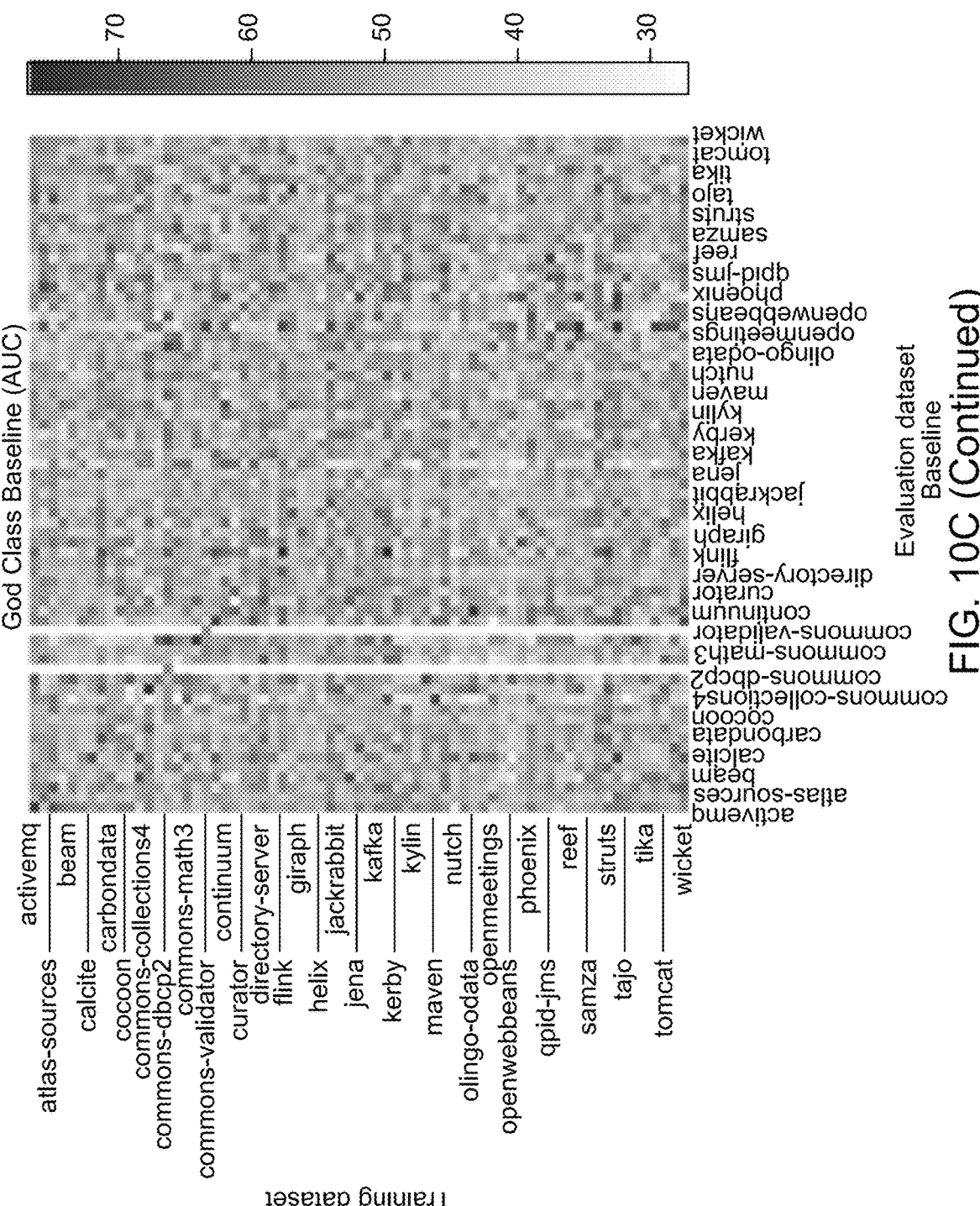
Figure 10C:
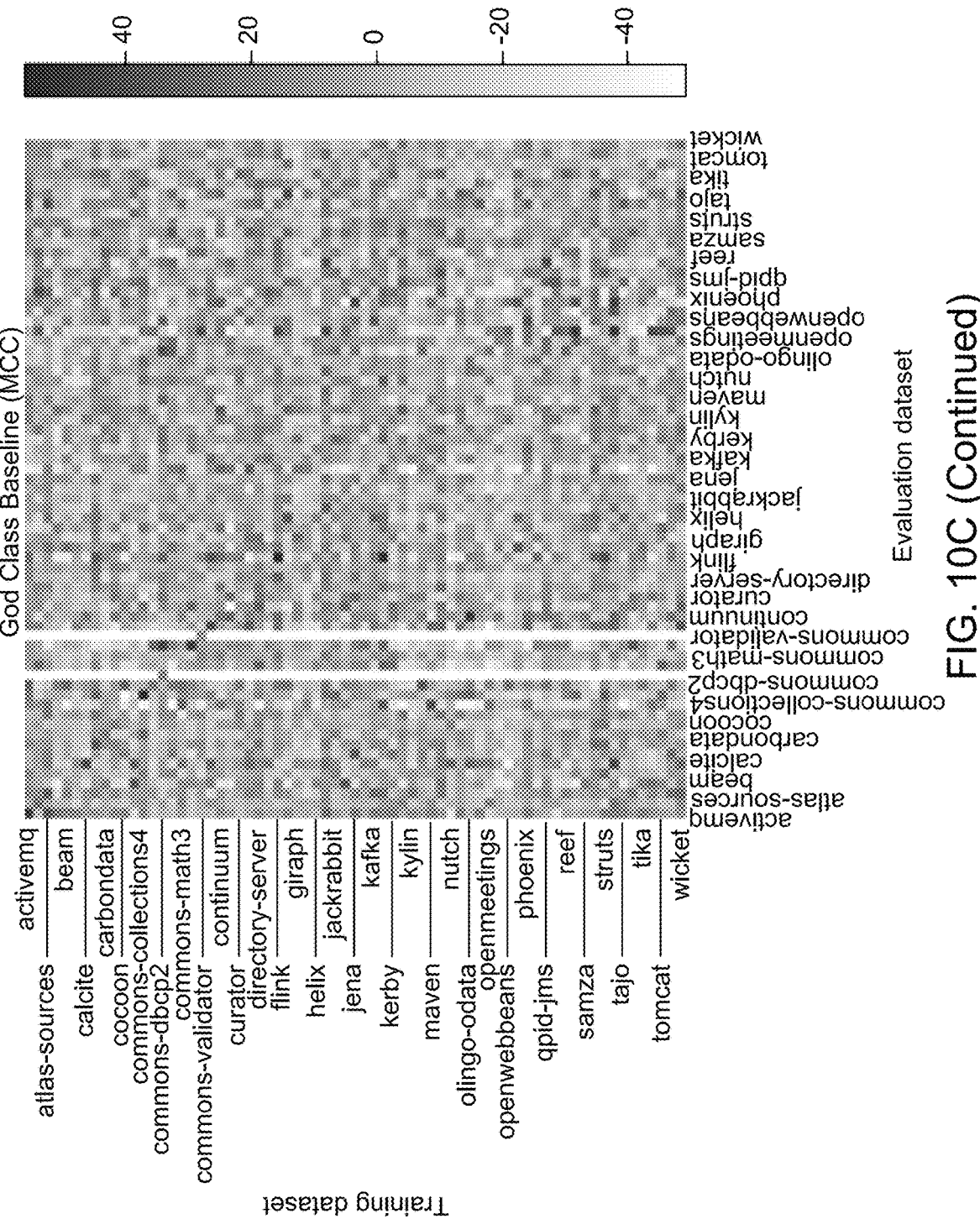
Figure 11A:
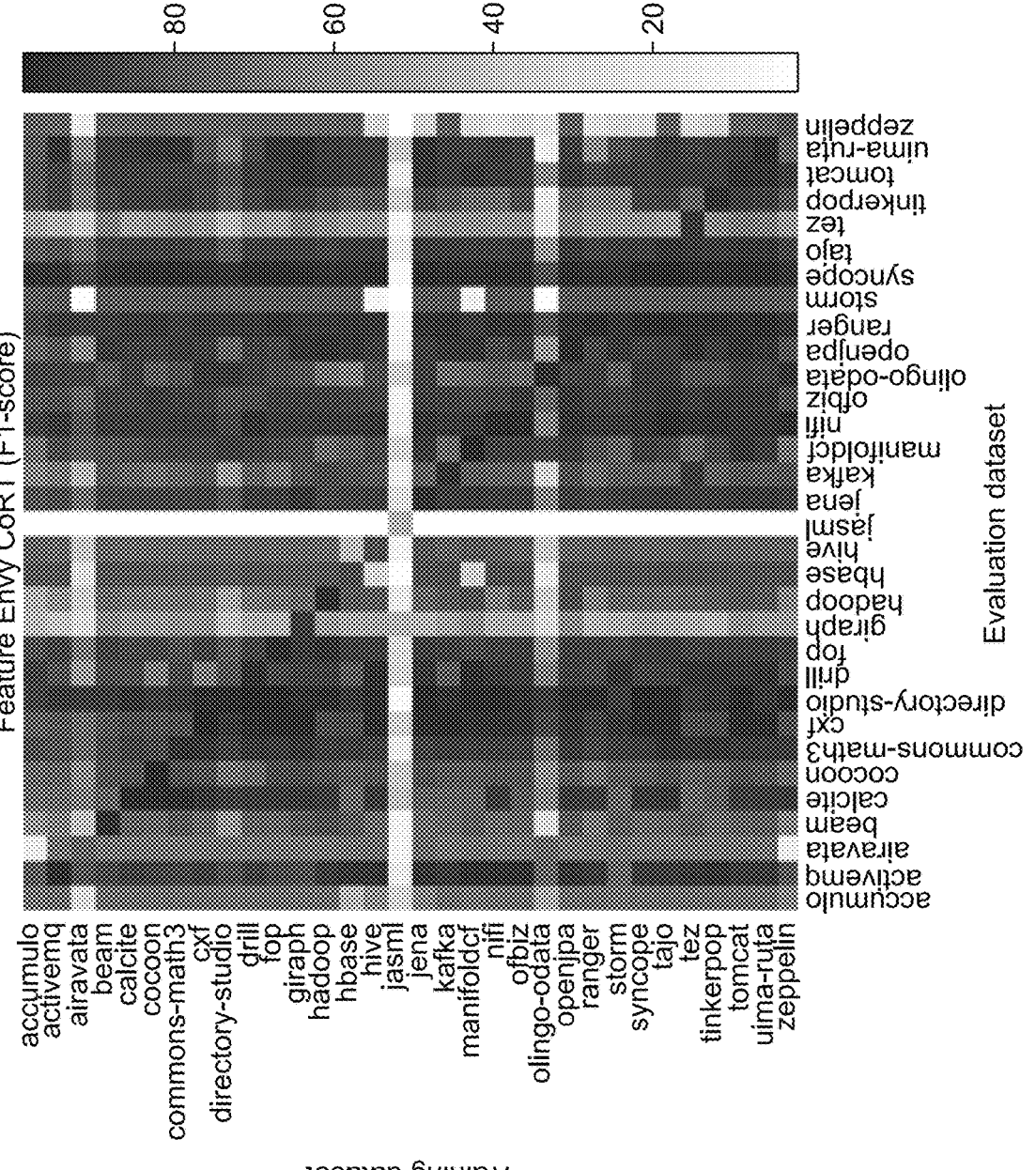
FIGS. 11A, 11B, 11C illustrate a cross-project heatmap for feature envy, in accordance with an exemplary aspect of the disclosure.
Figure 11A:
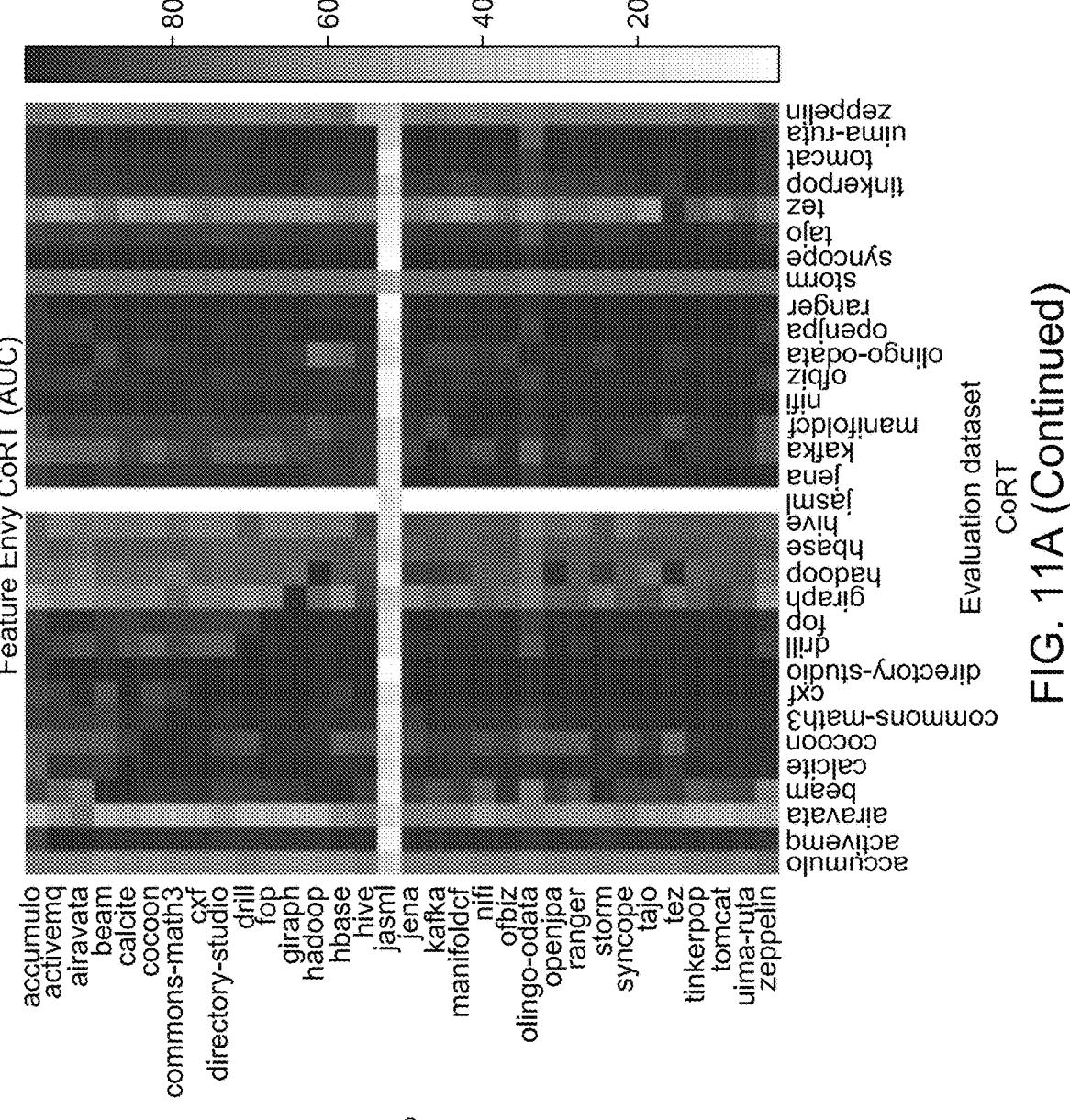
Figure 11A:
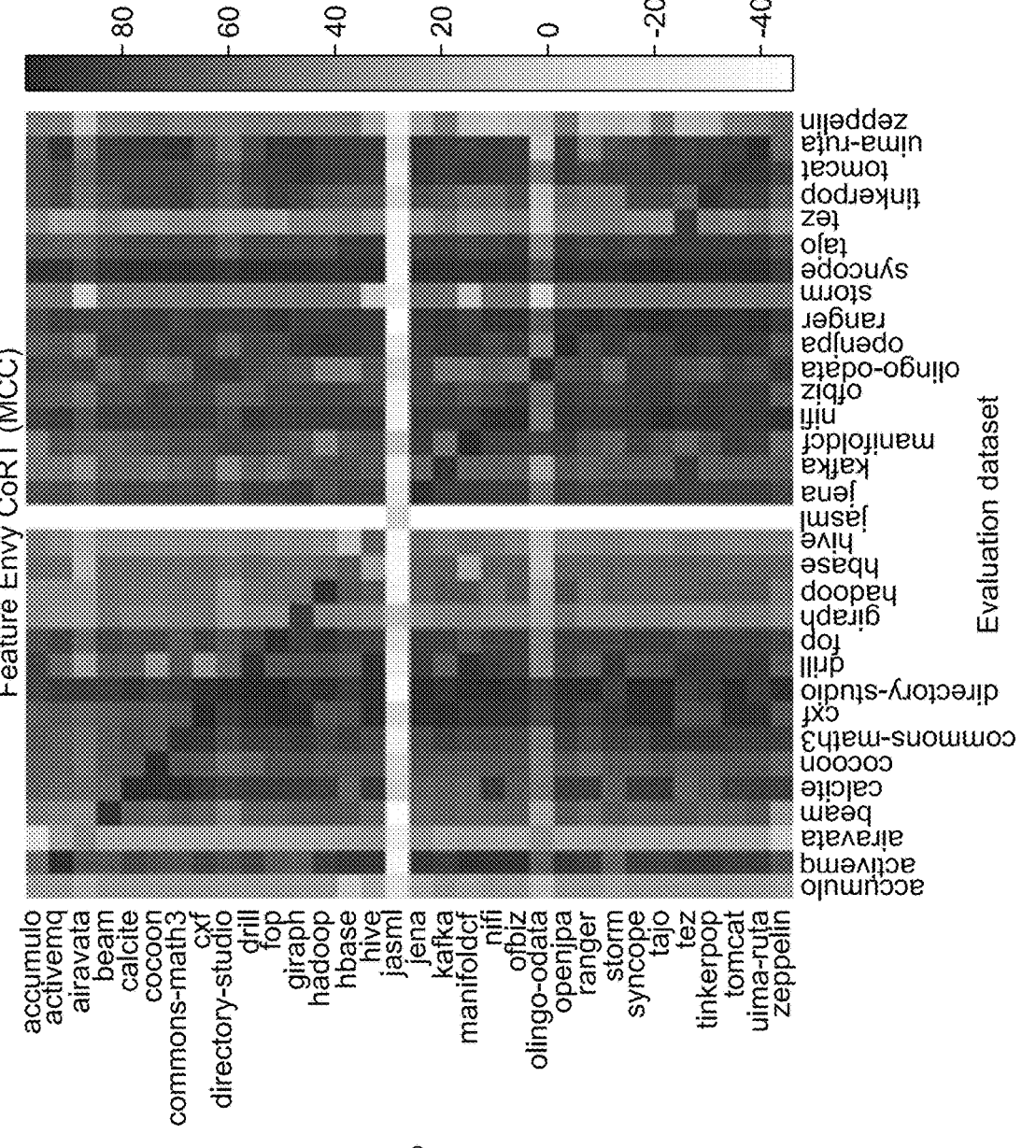
Figure 11B:
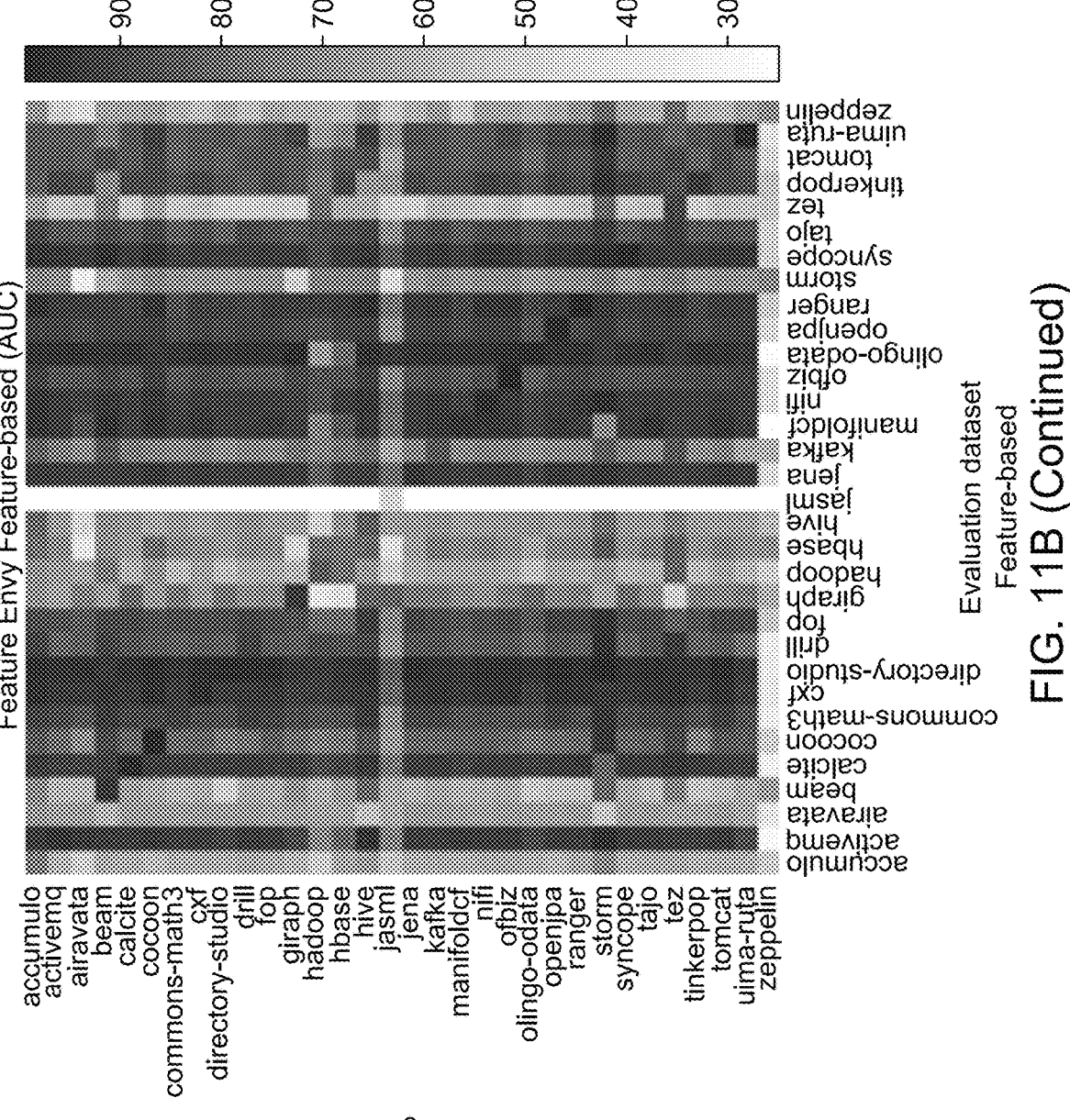
Figure 11B:
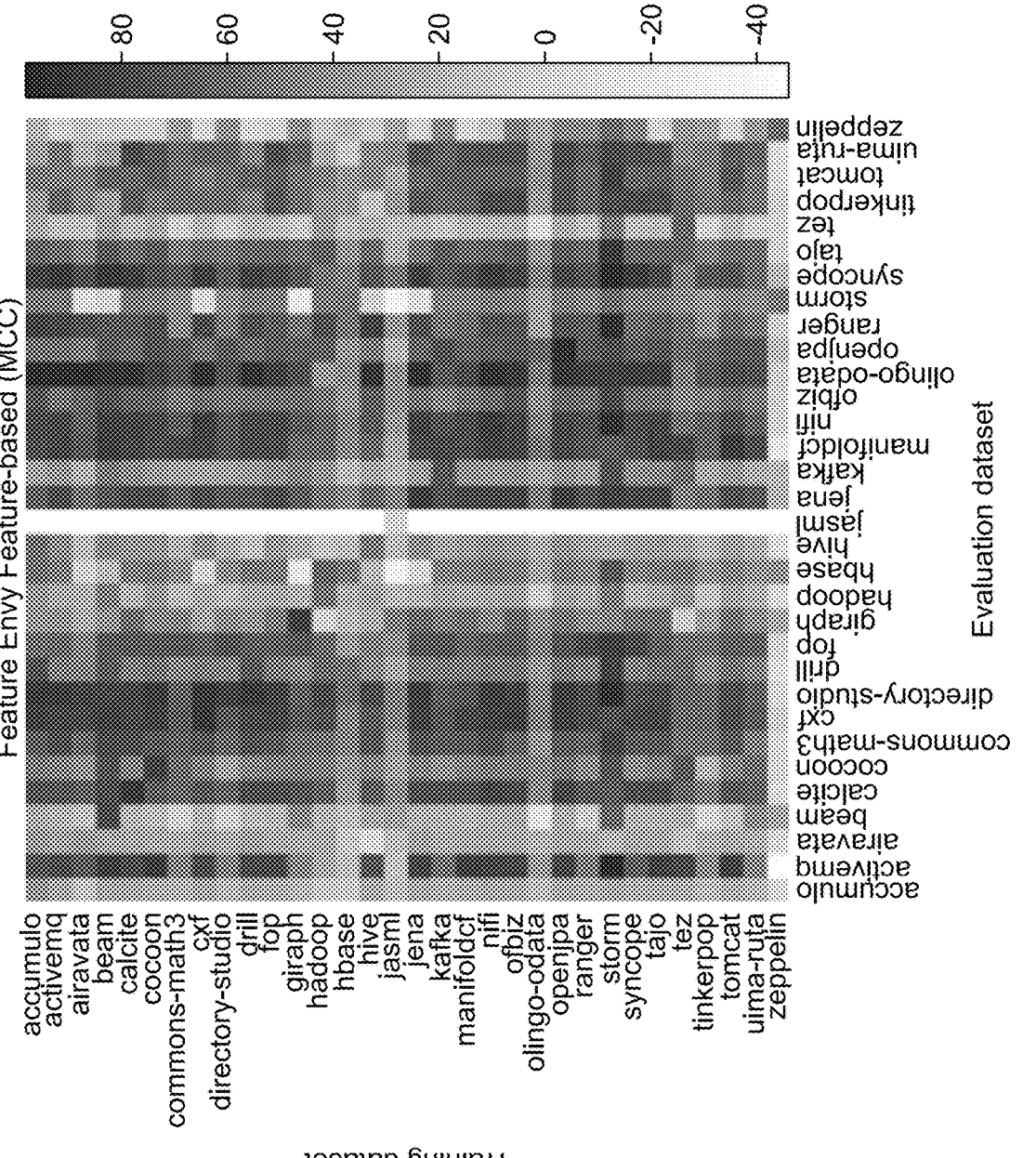
Figure 11C:
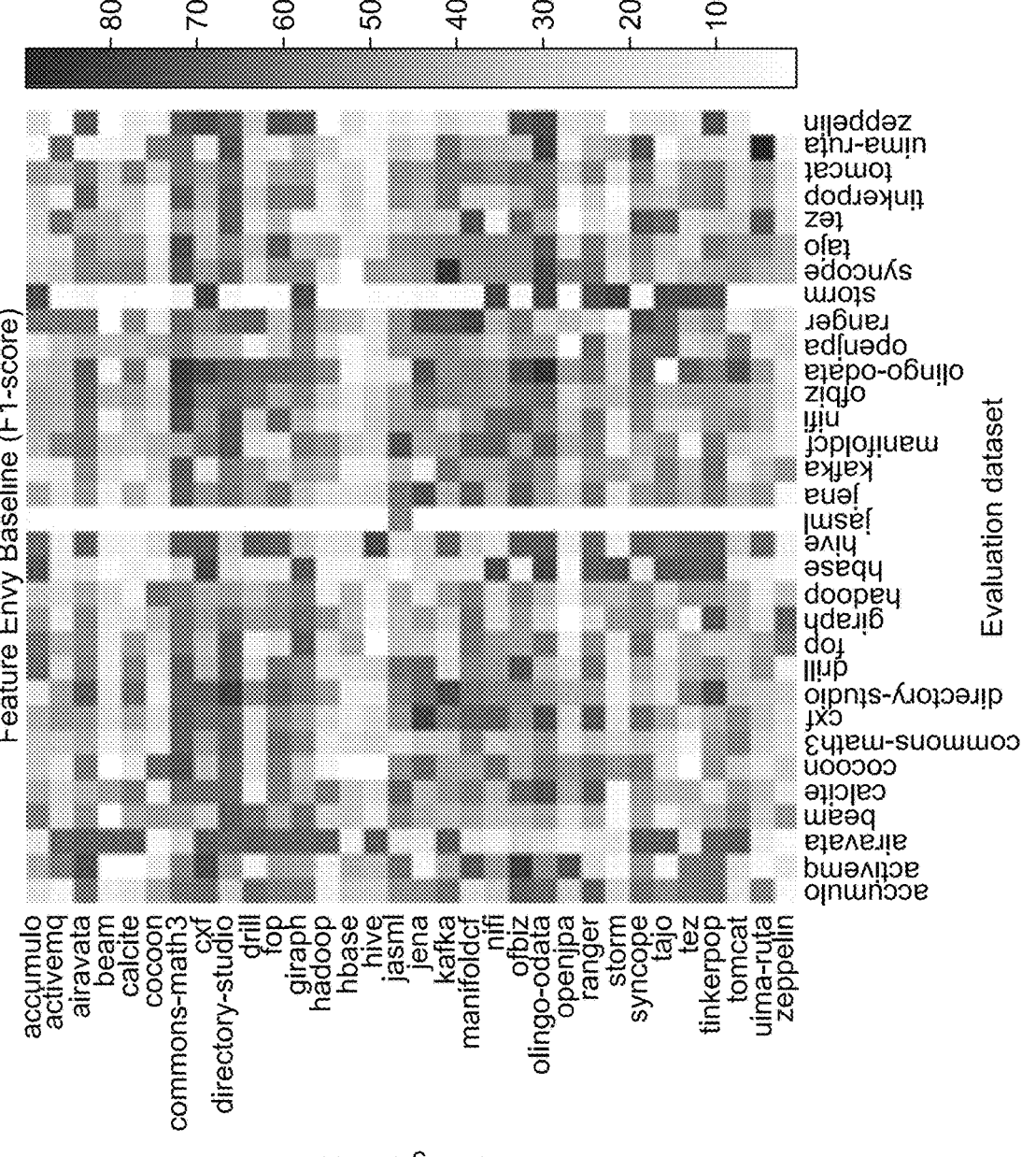
Figure 11C:
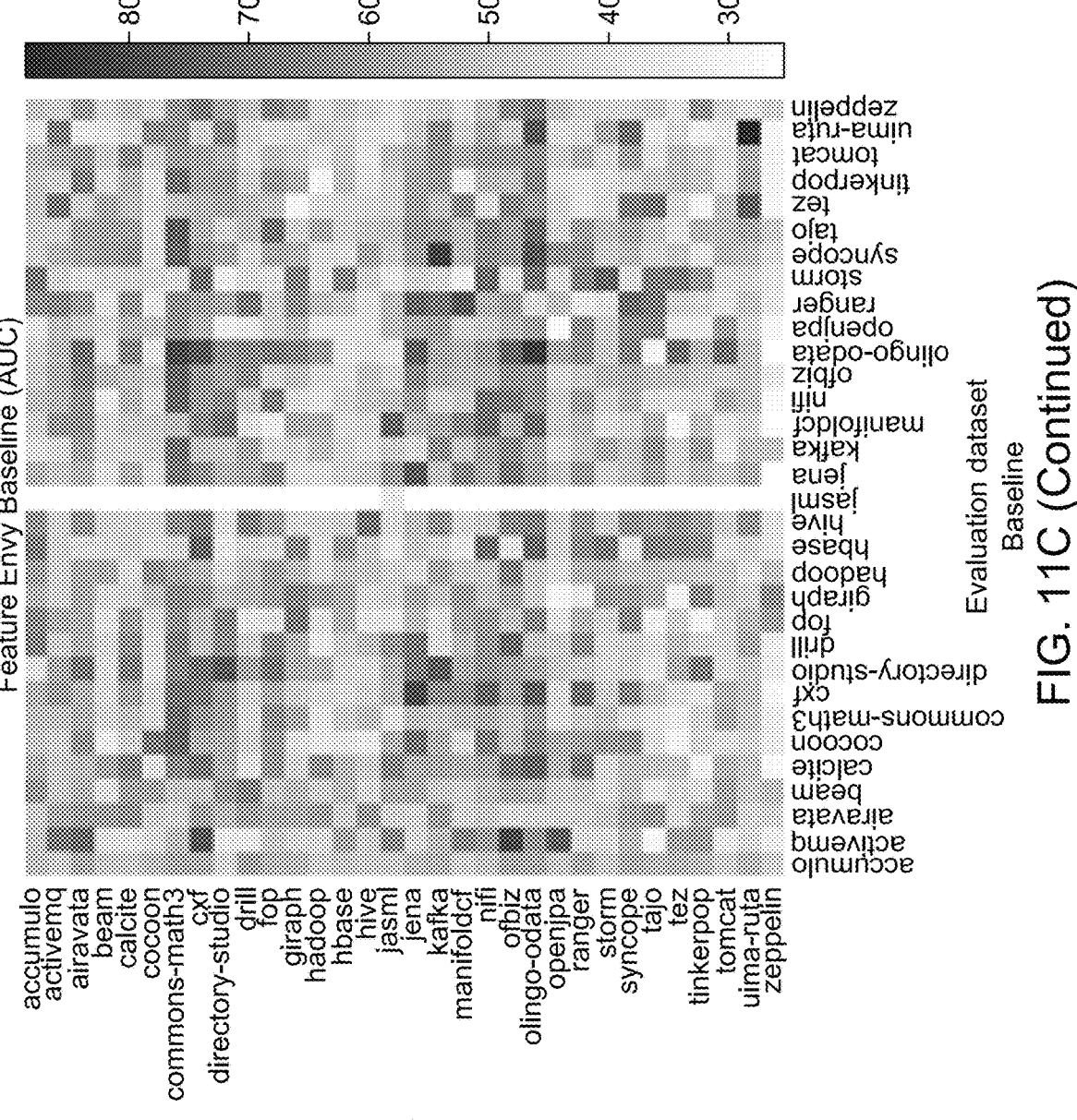
Figure 11C:
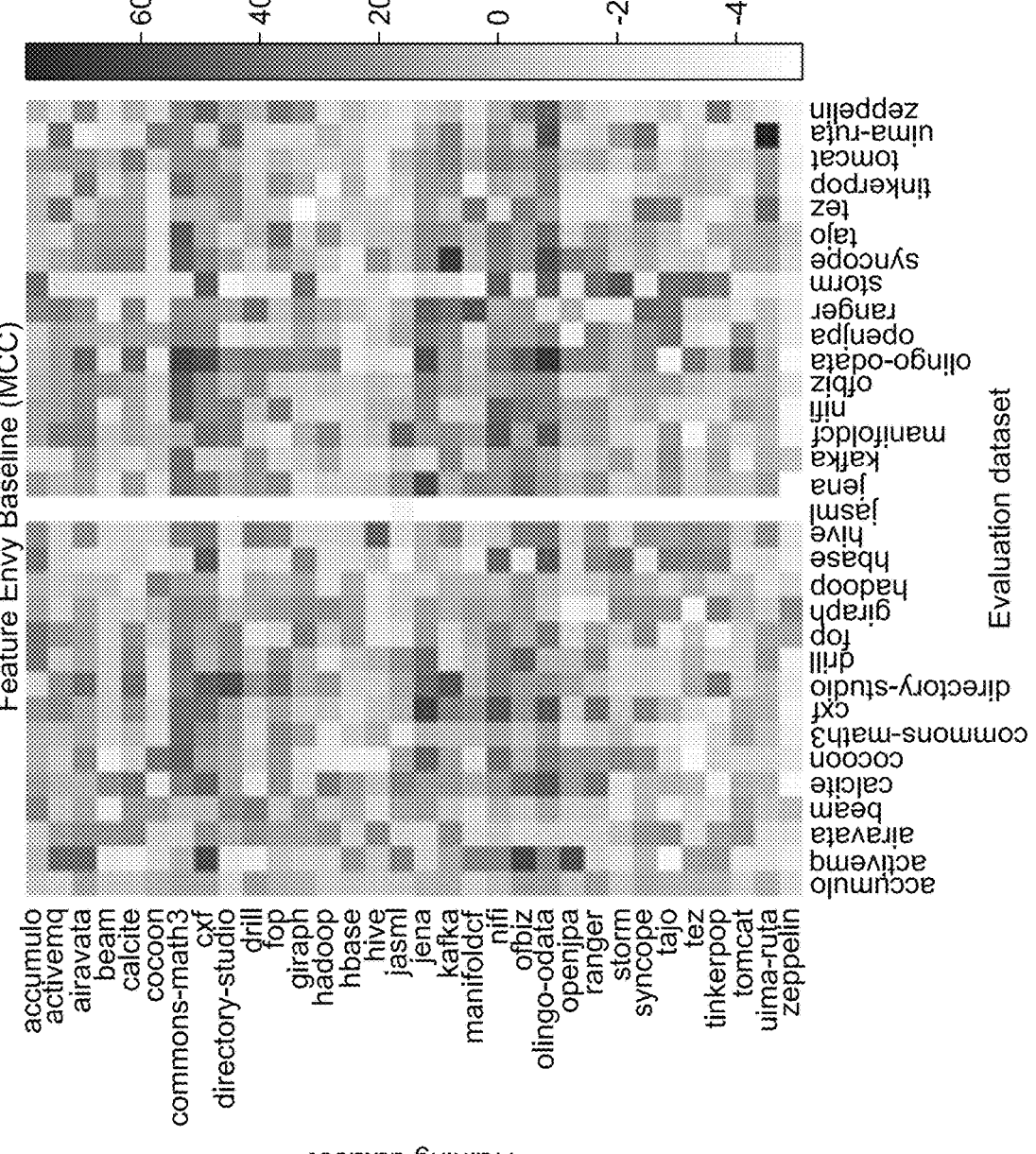
Figure 12A:
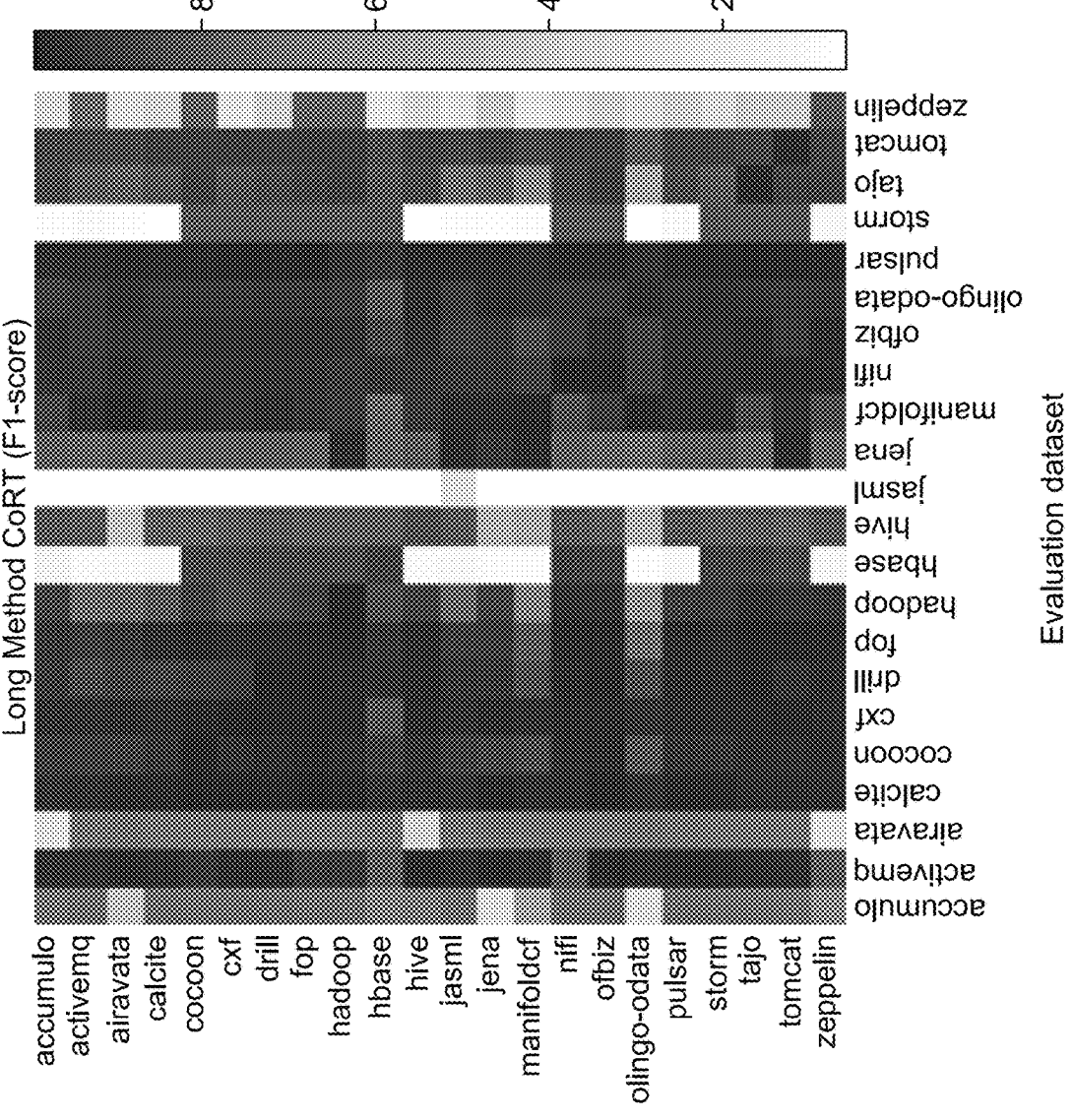
FIGS. 12A, 12B, 12C illustrate a cross-project heatmap for long method, in accordance with an exemplary aspect of the disclosure.
Figure 12A:
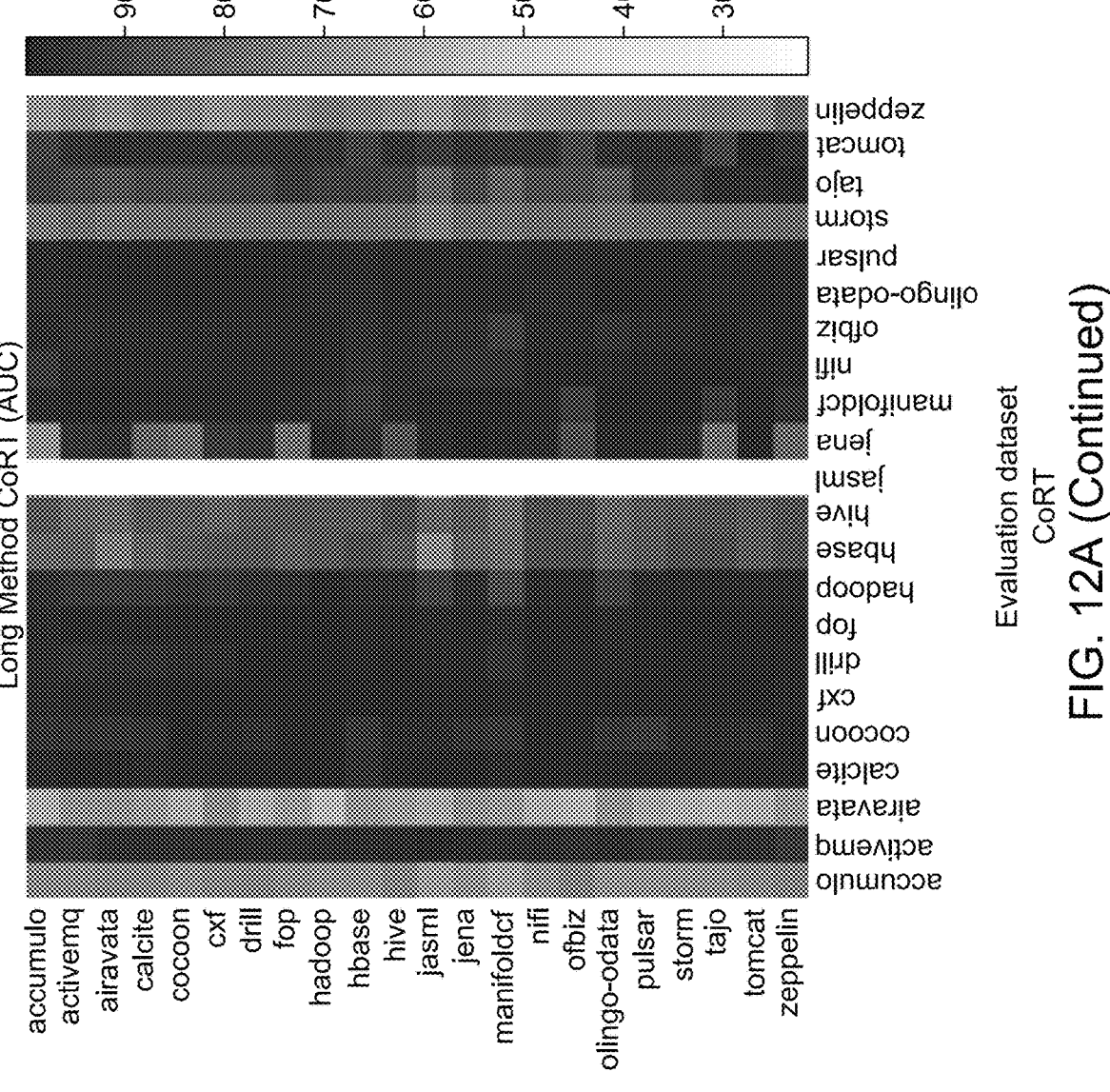
Figure 12A:
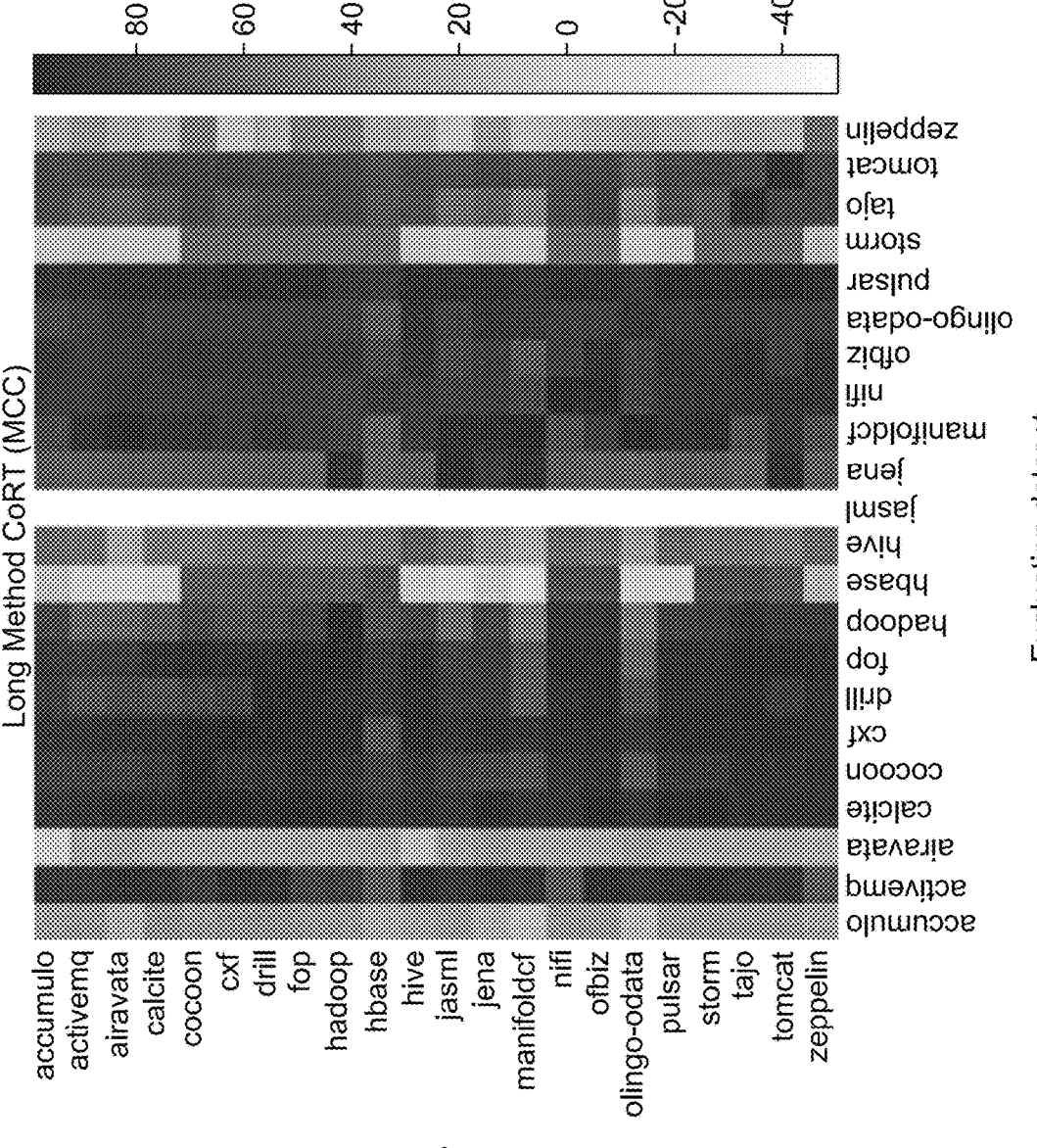
Figure 12B:
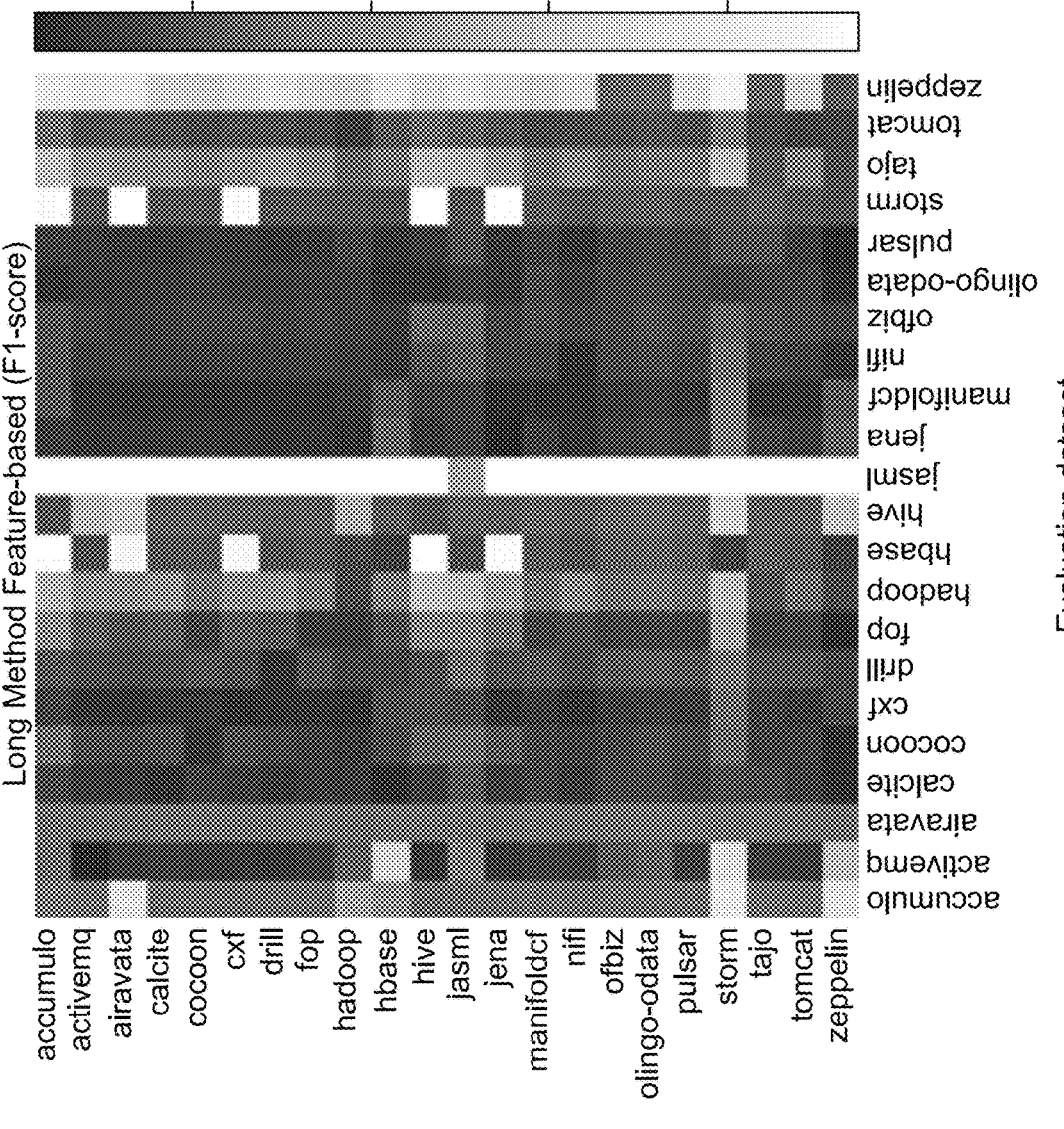
Figure 12B:
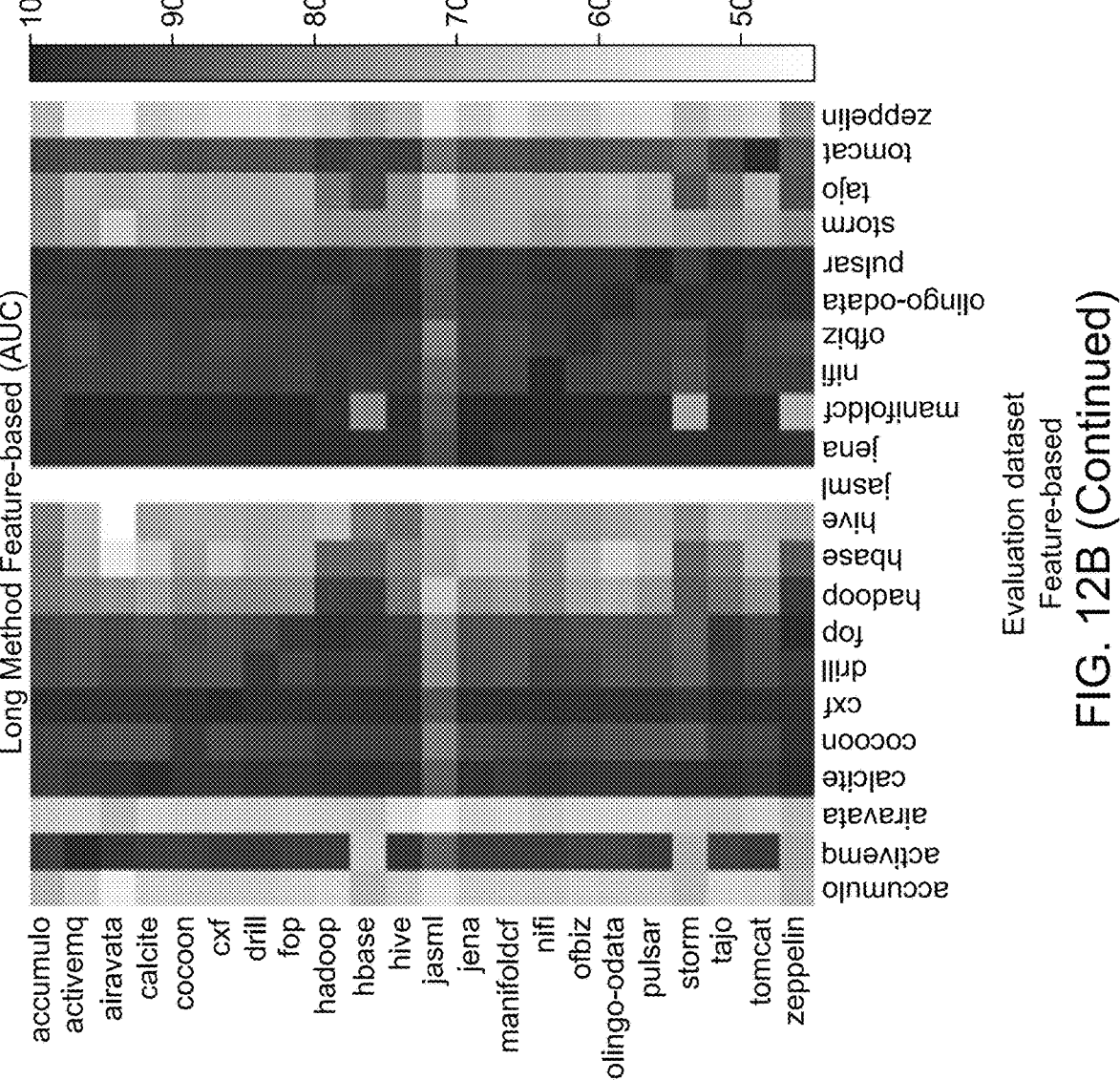
Figure 12B:
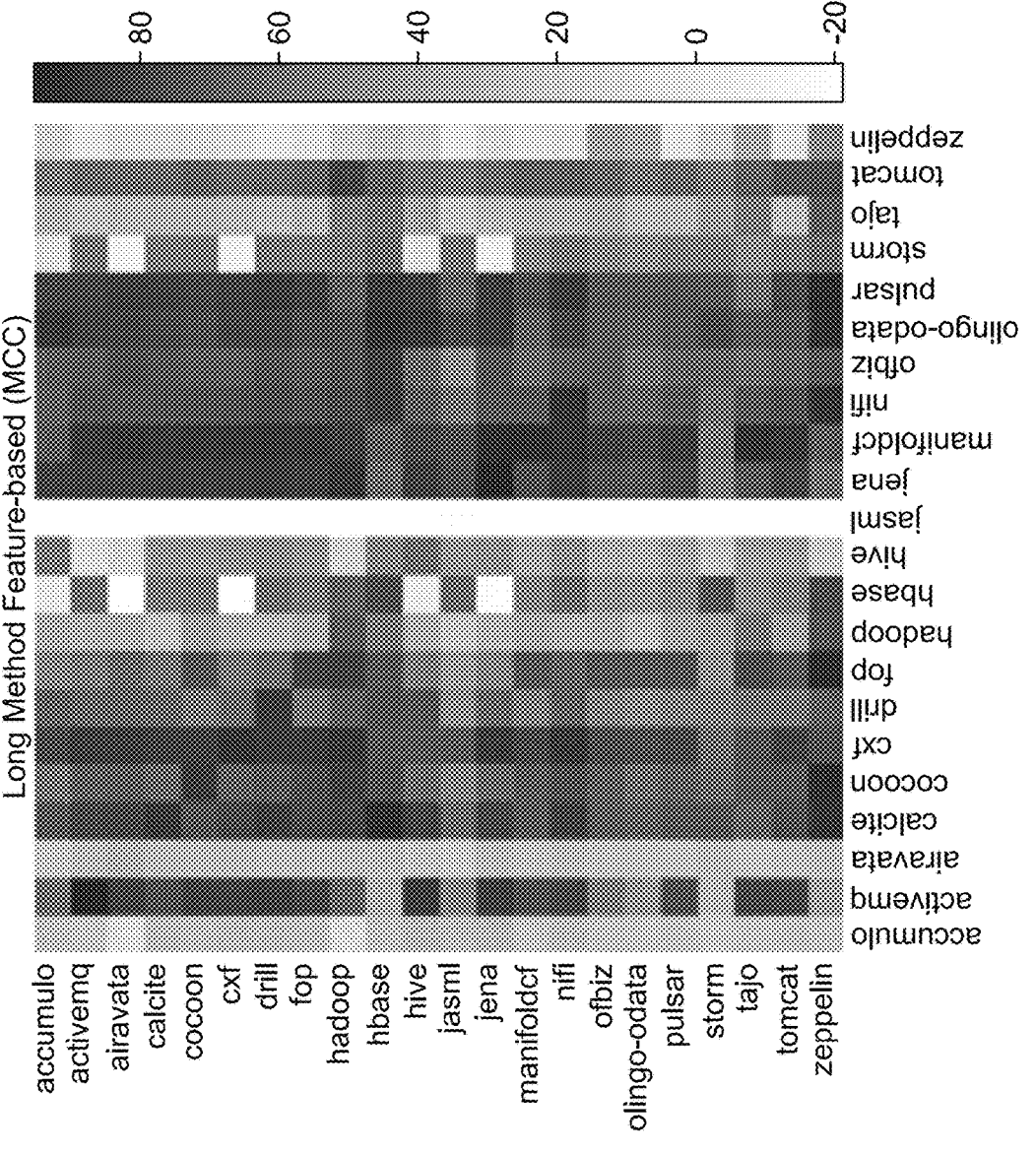
Figure 12C:
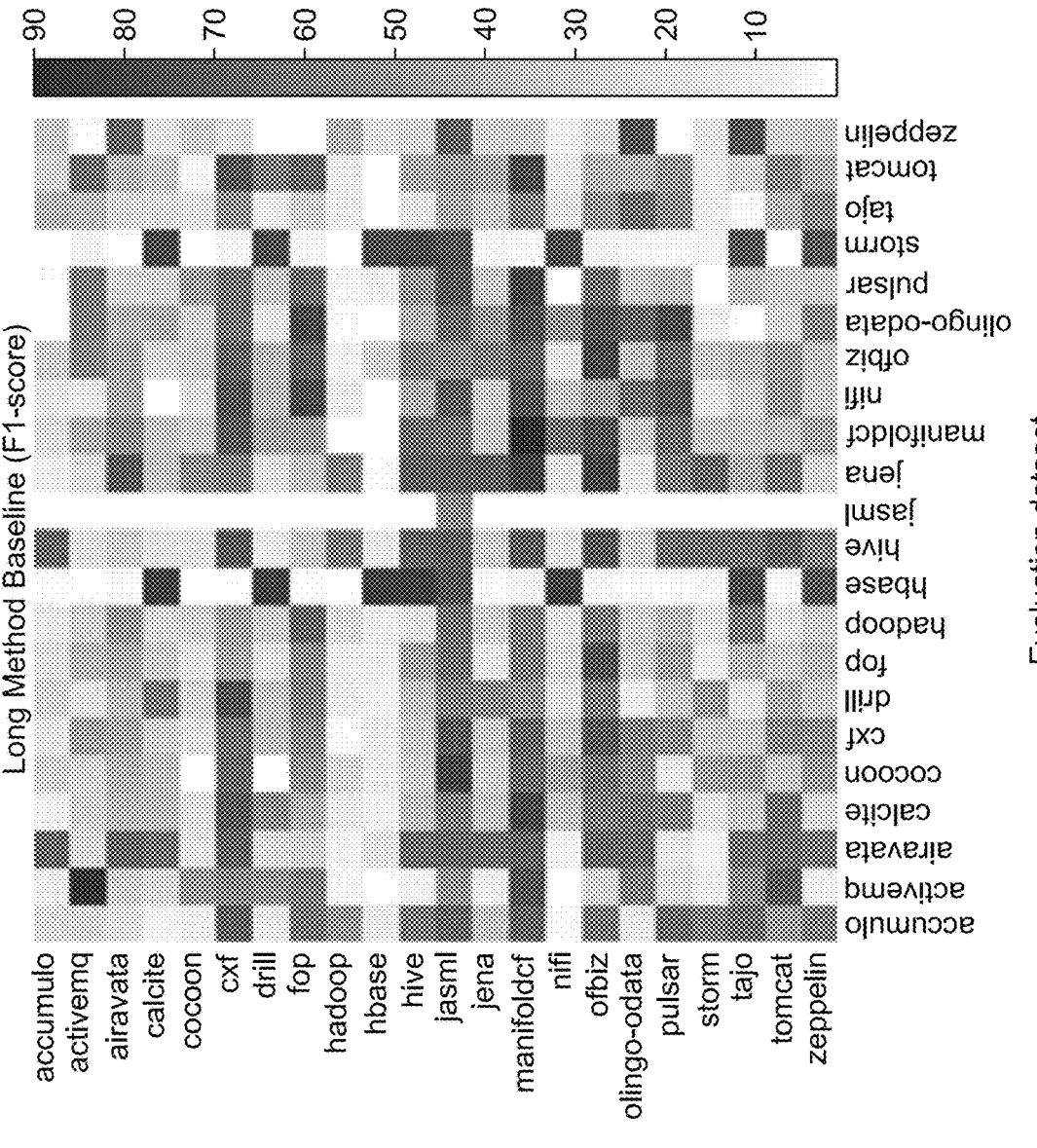
Figure 12C:
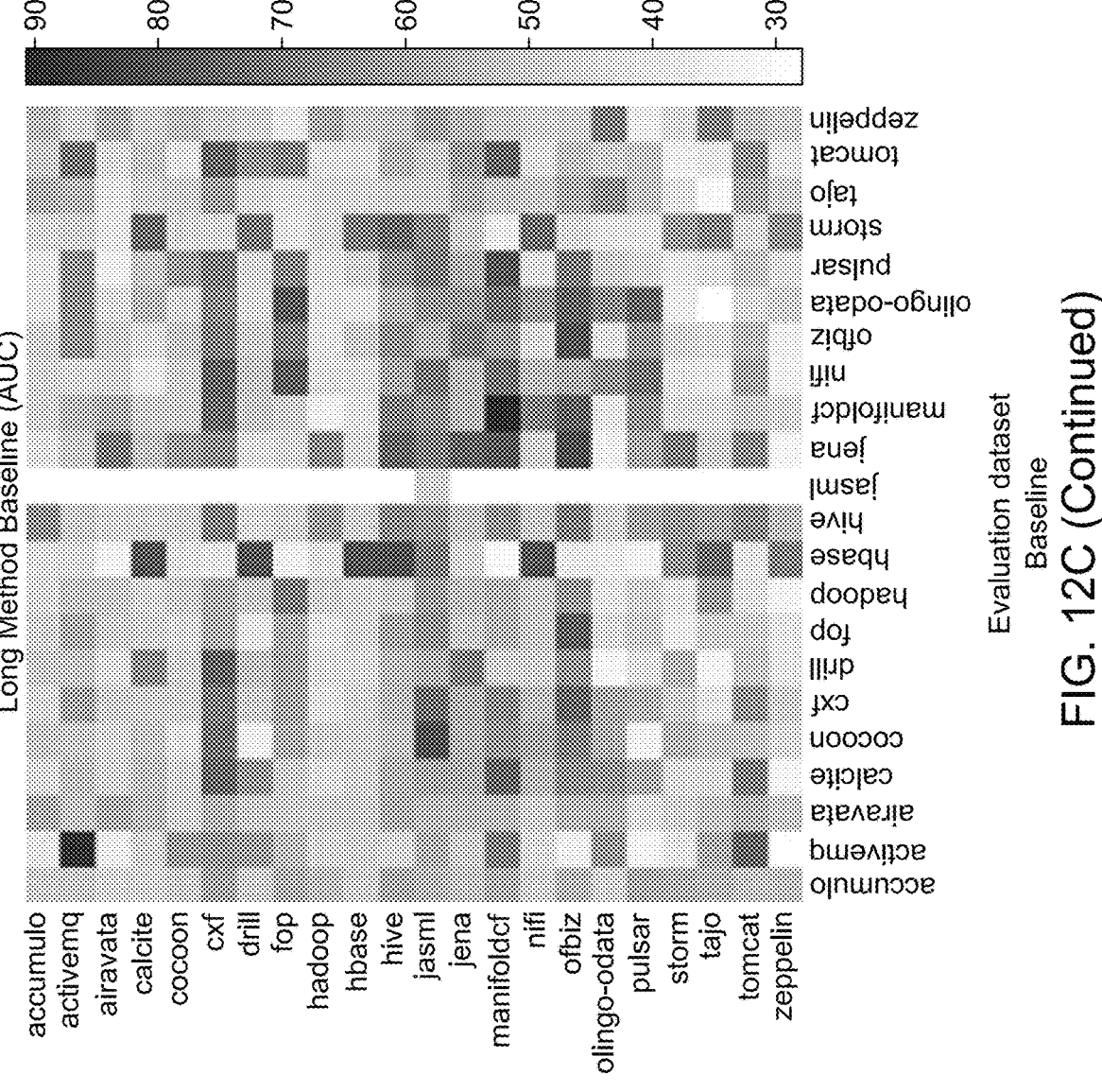
Figure 12C:
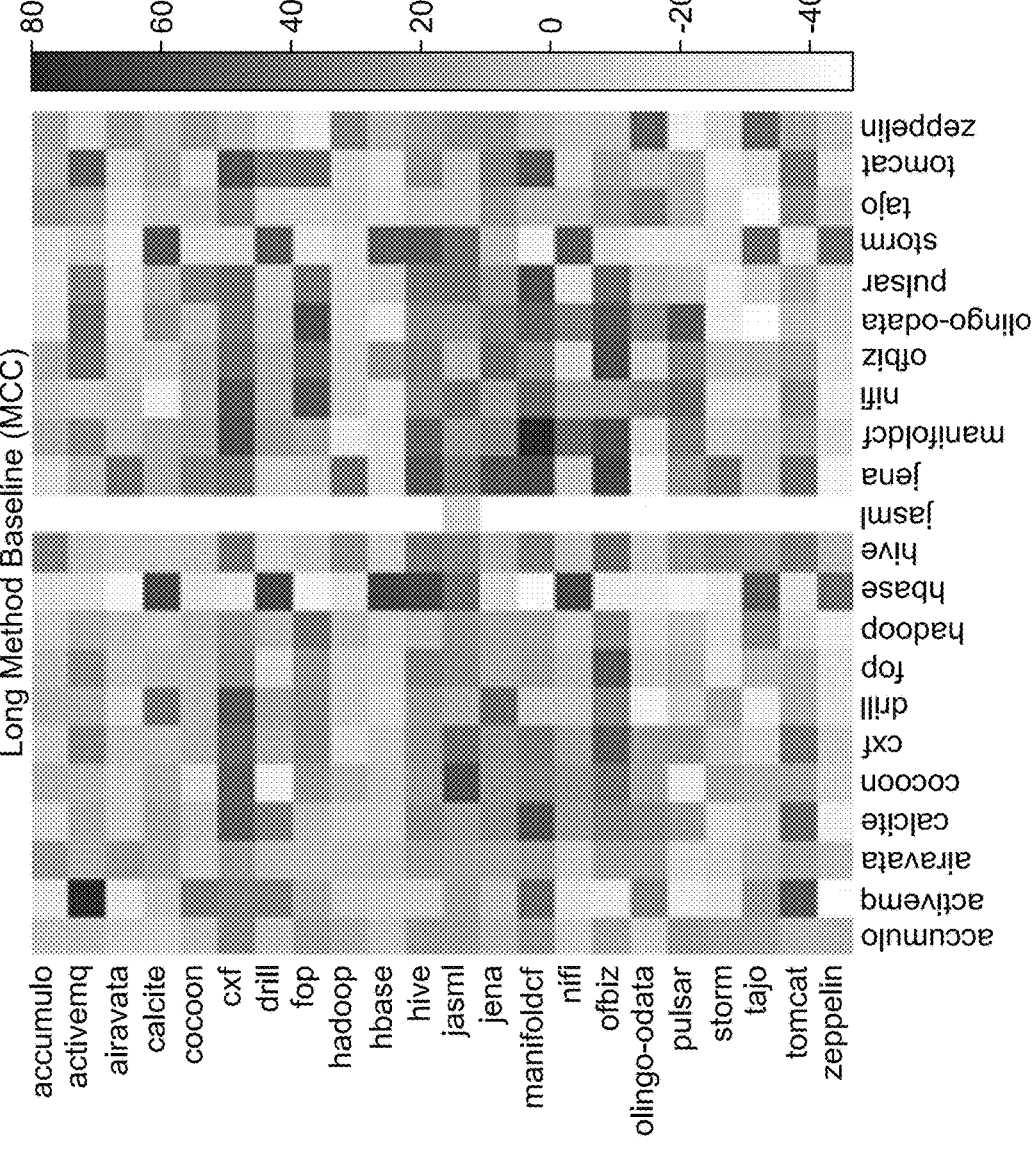
Figure 13A:
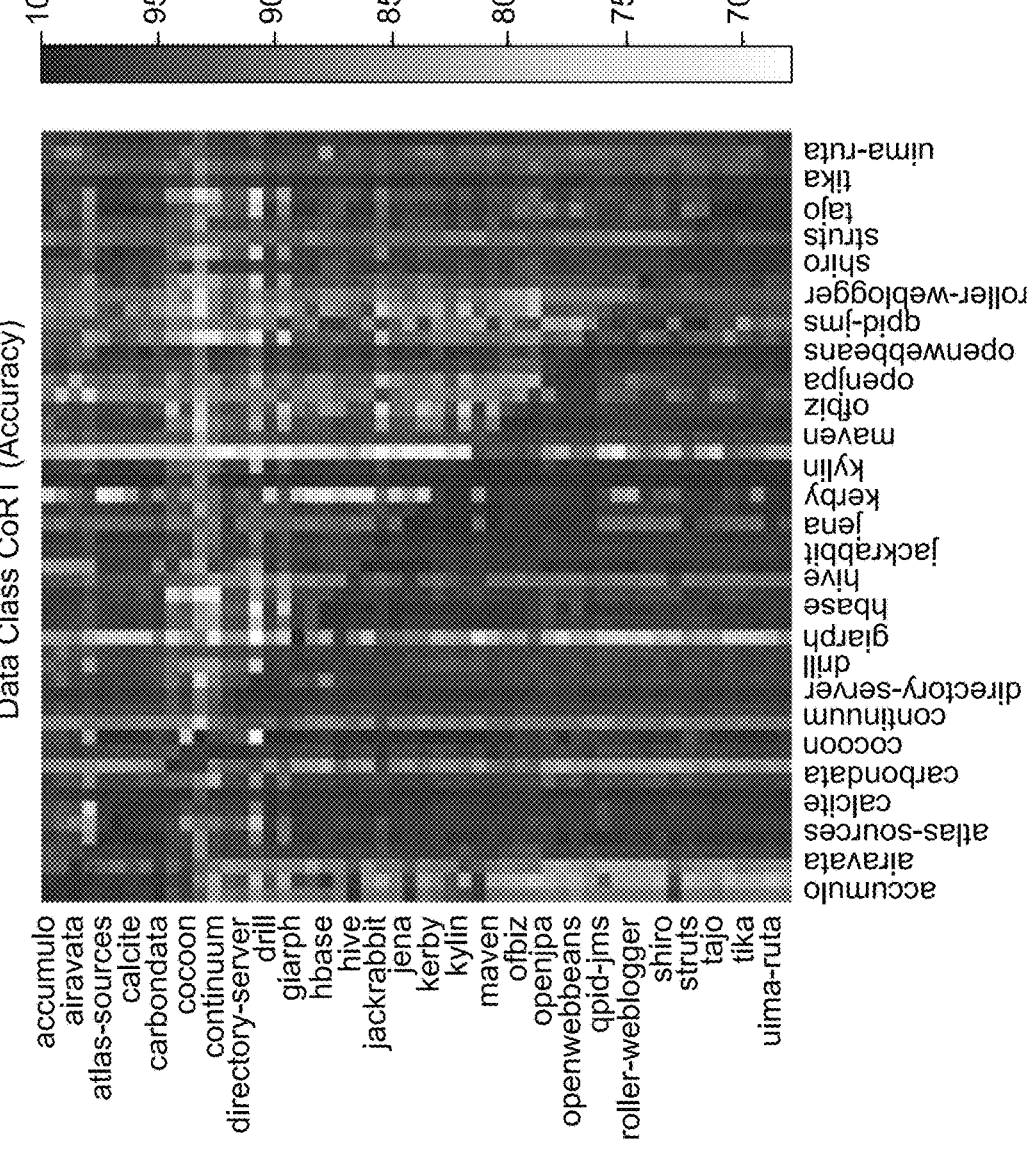
FIGS. 13A, 13B, 13C are an illustration of a cross-project performance heatmap for data class, according to certain embodiments.
Figure 13A:
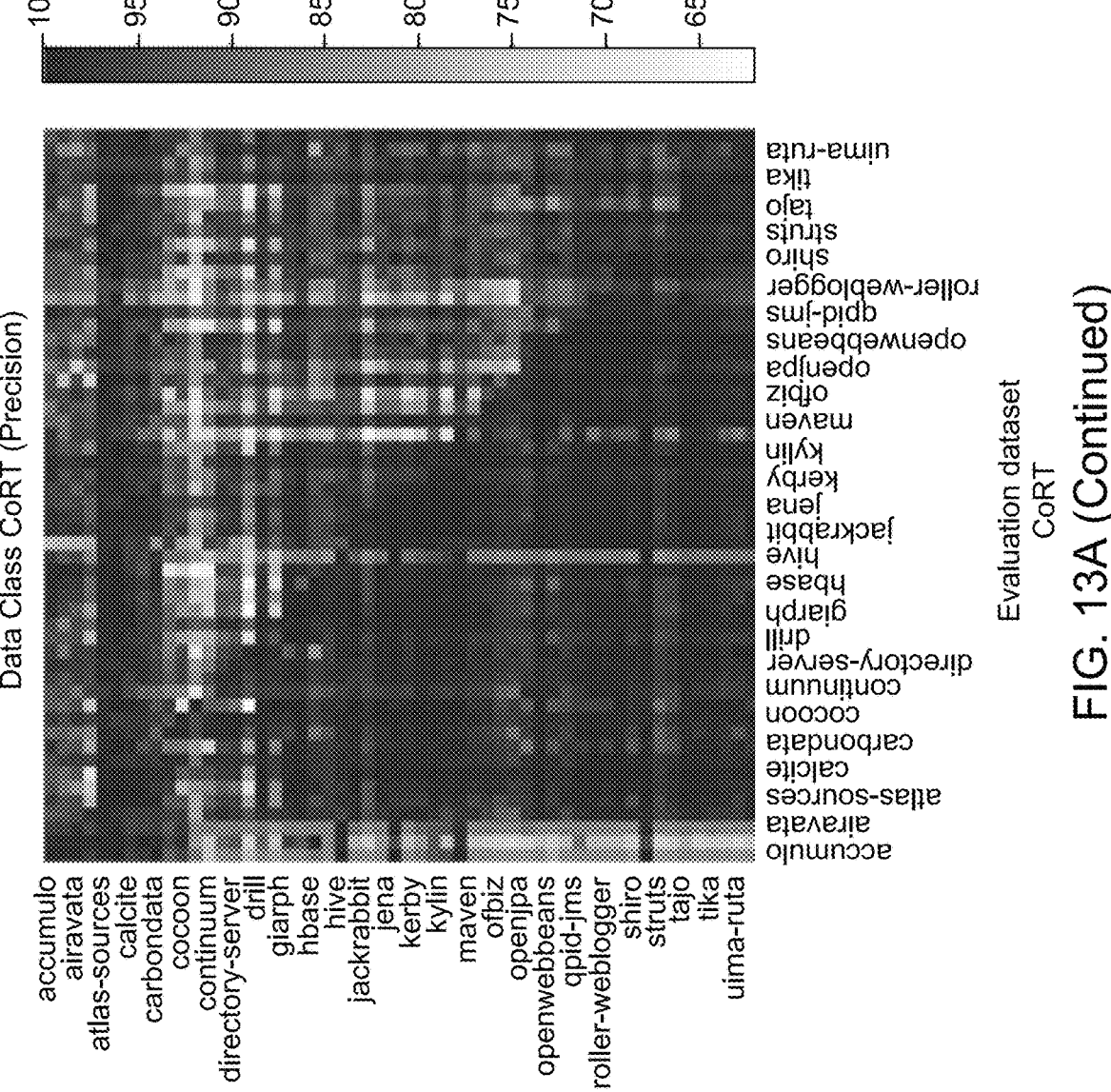
Figure 13A:
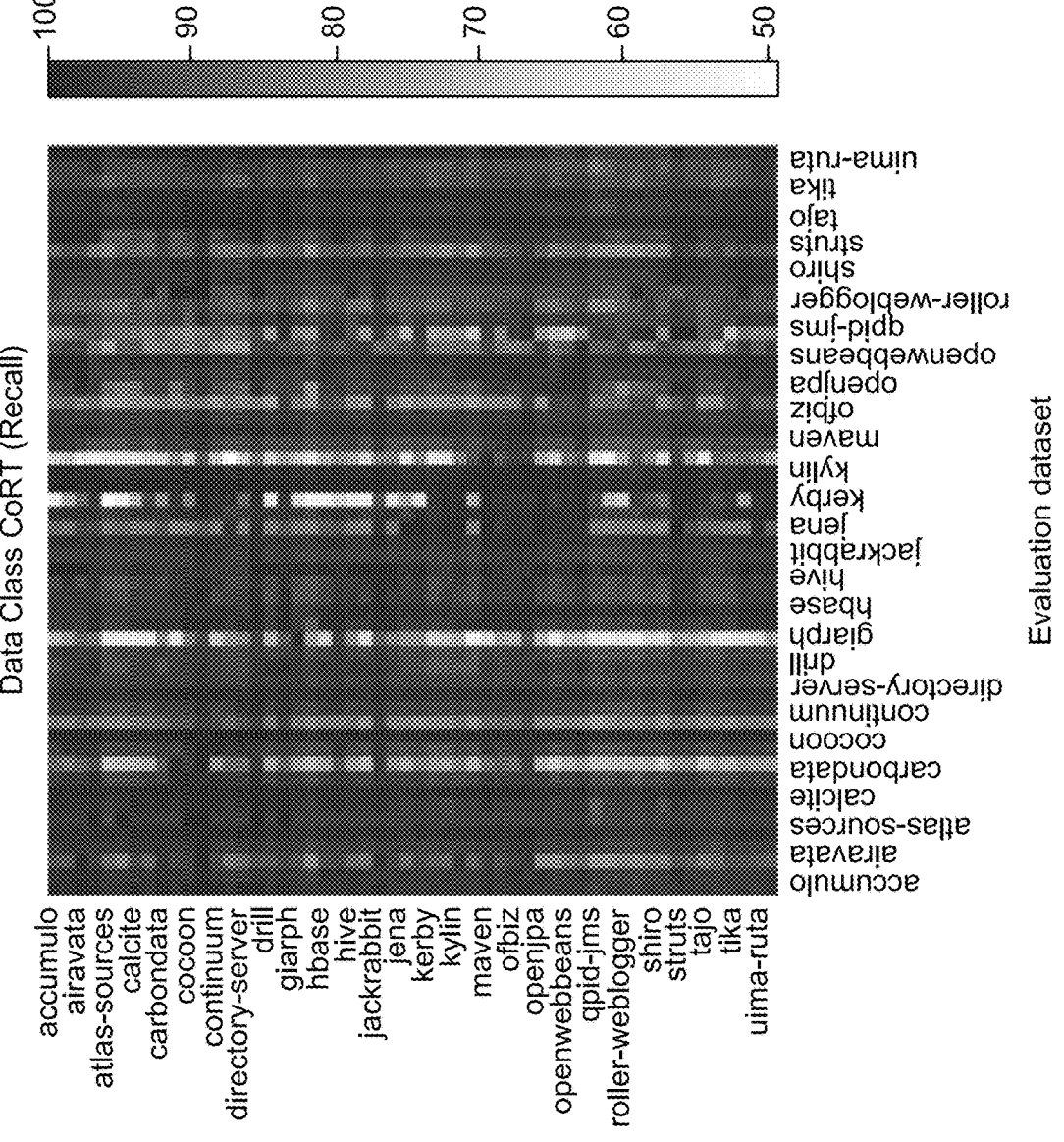
Figure 13B:
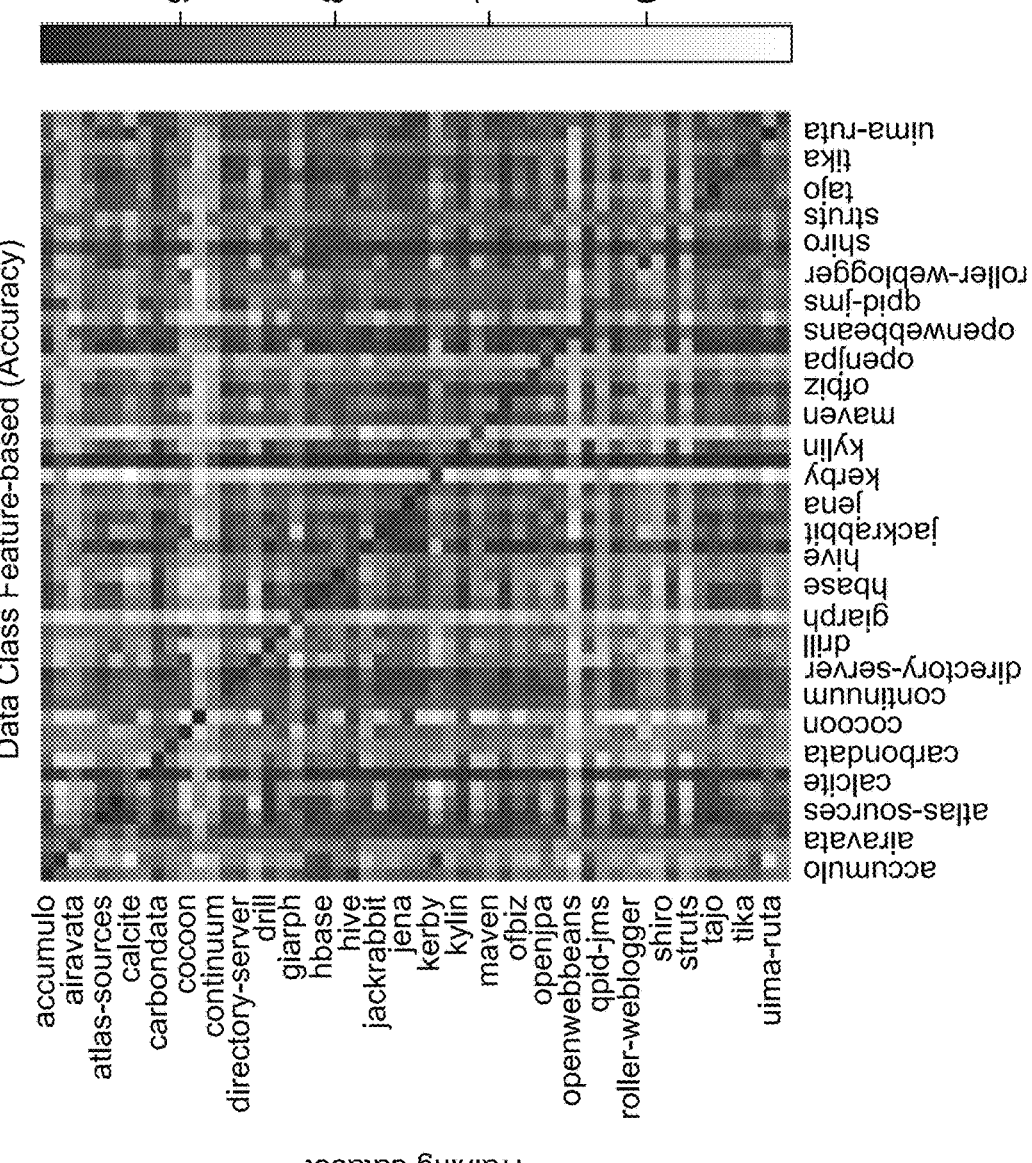
Figure 13B:
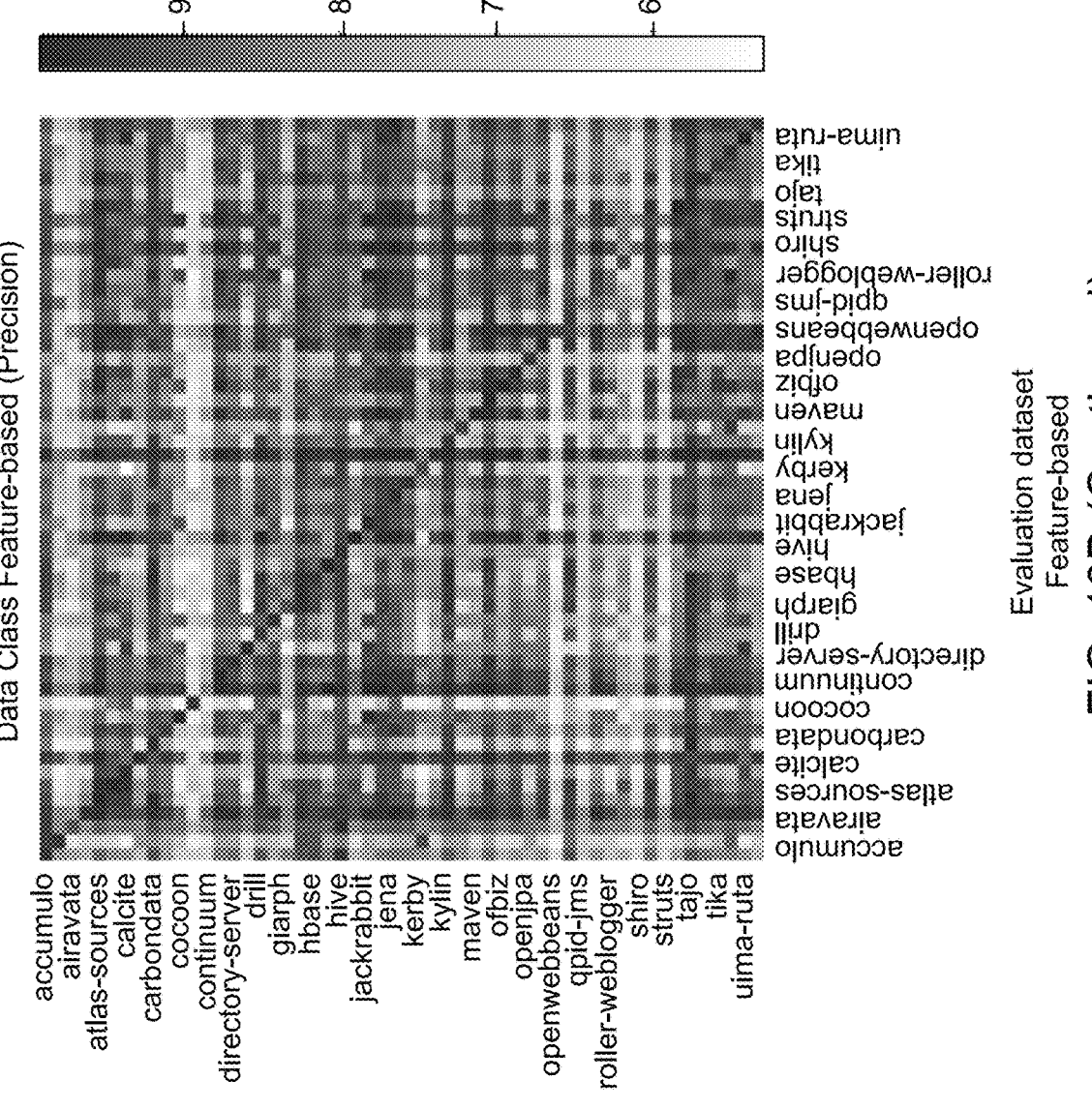
Figure 13B:
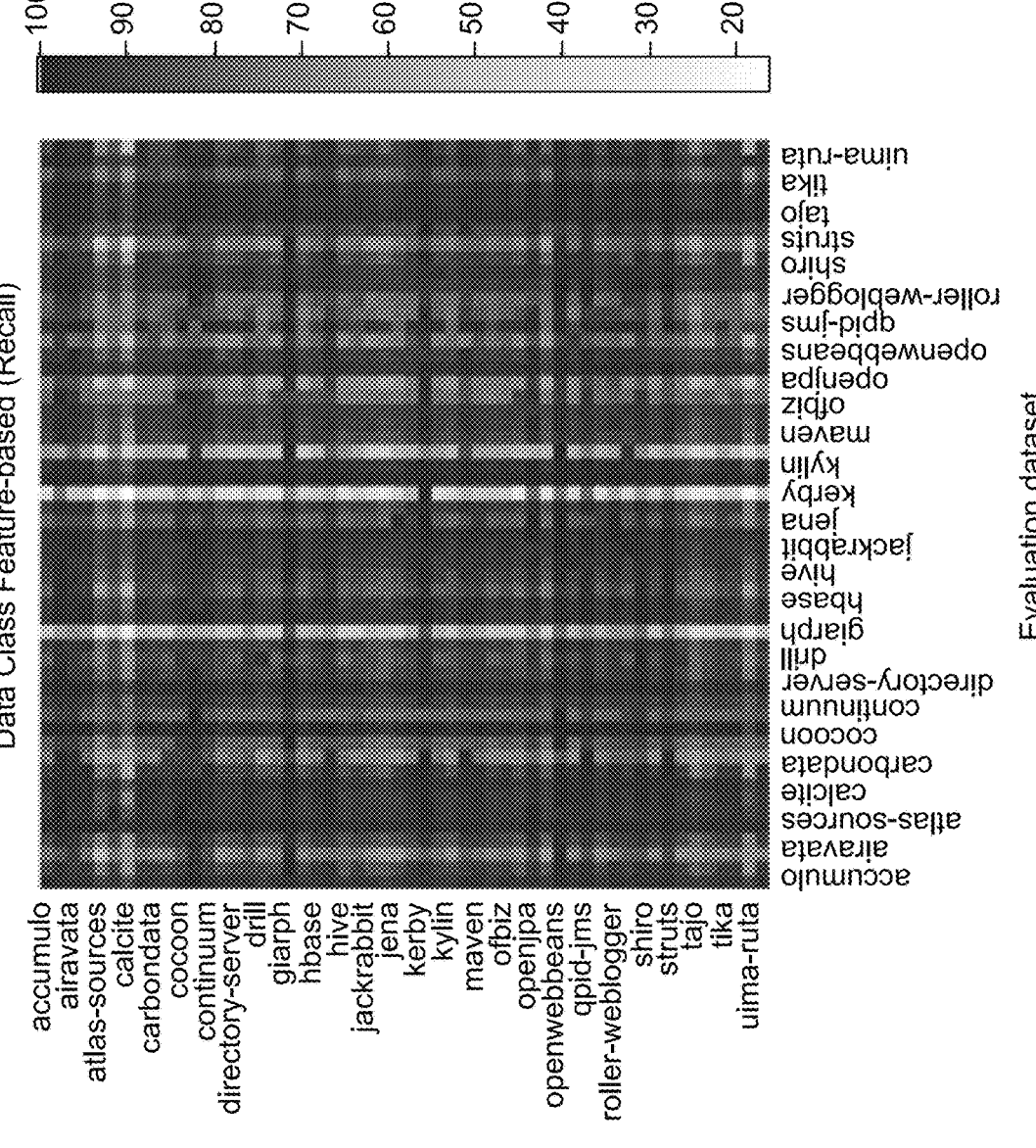
Figure 13C:
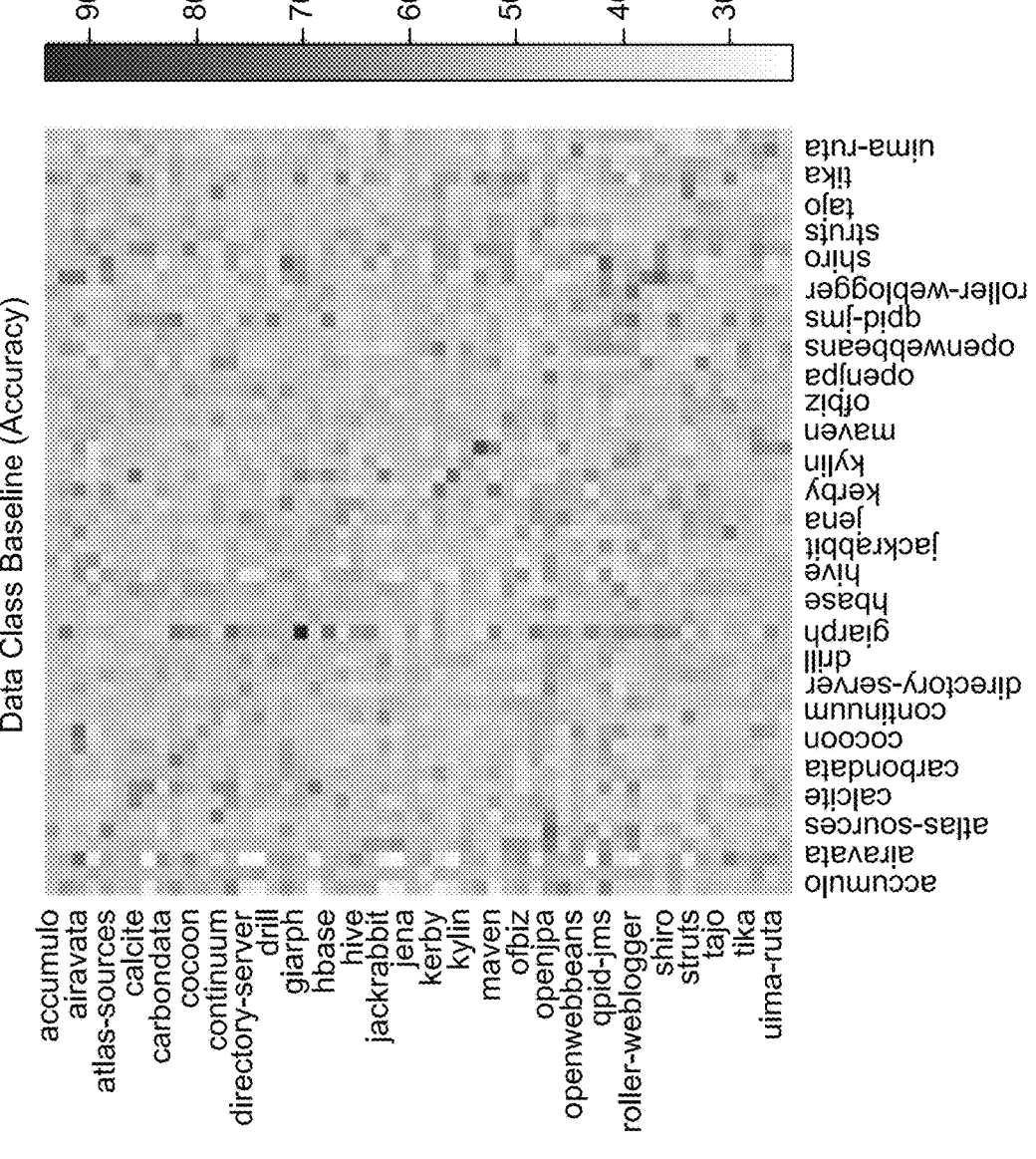
Figure 13C:
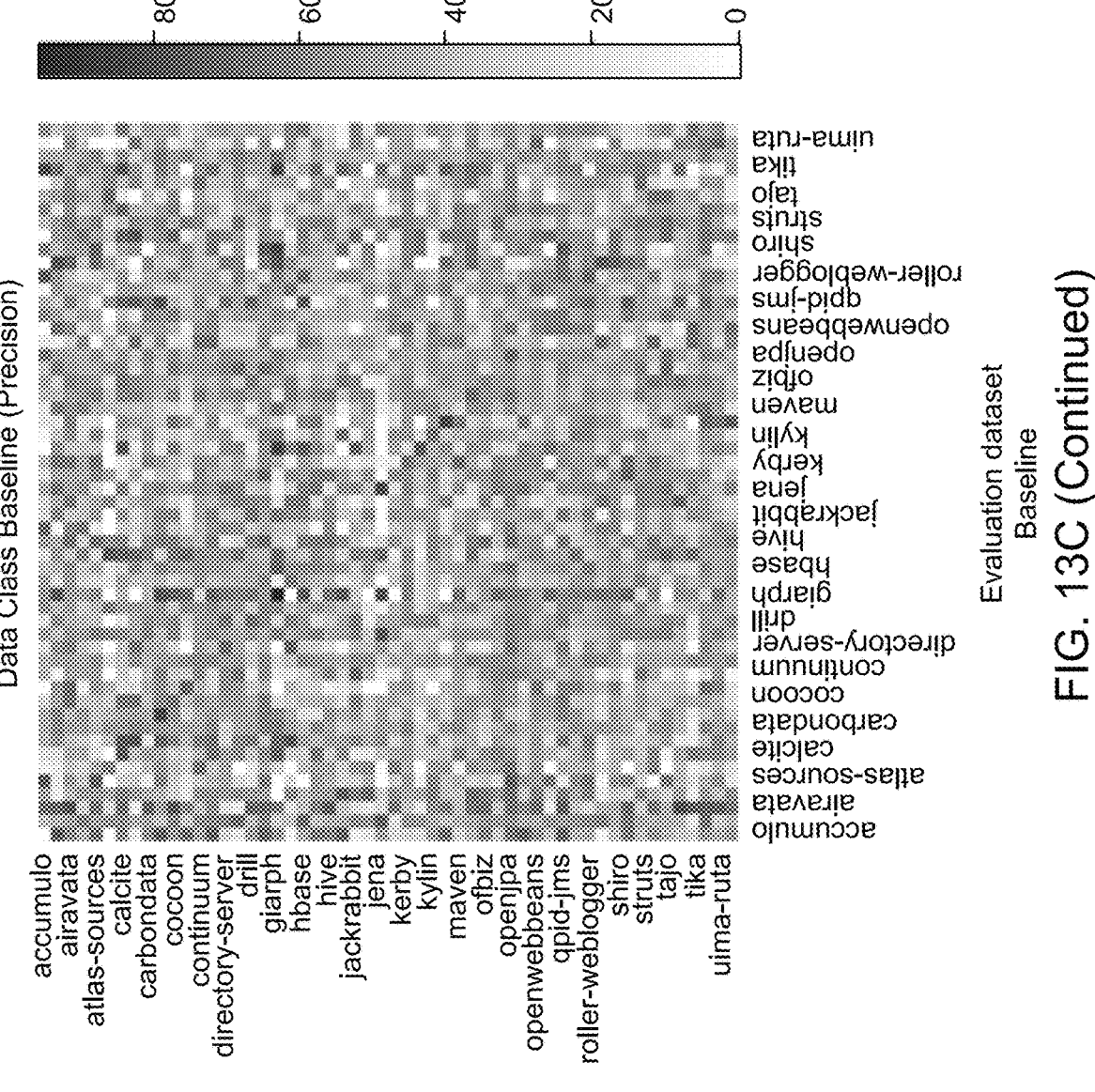
Figure 13C:
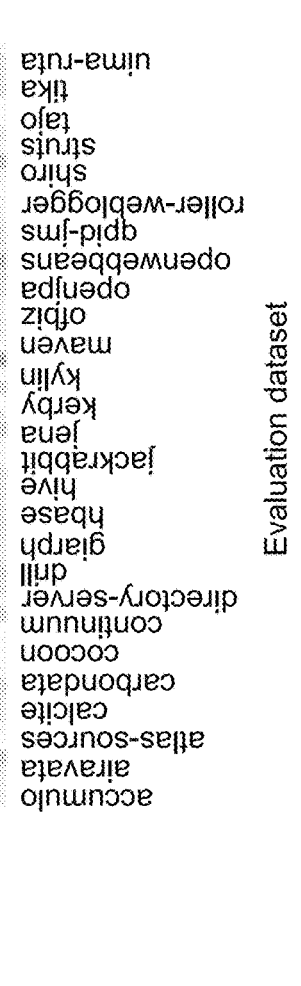
Figure 13C:
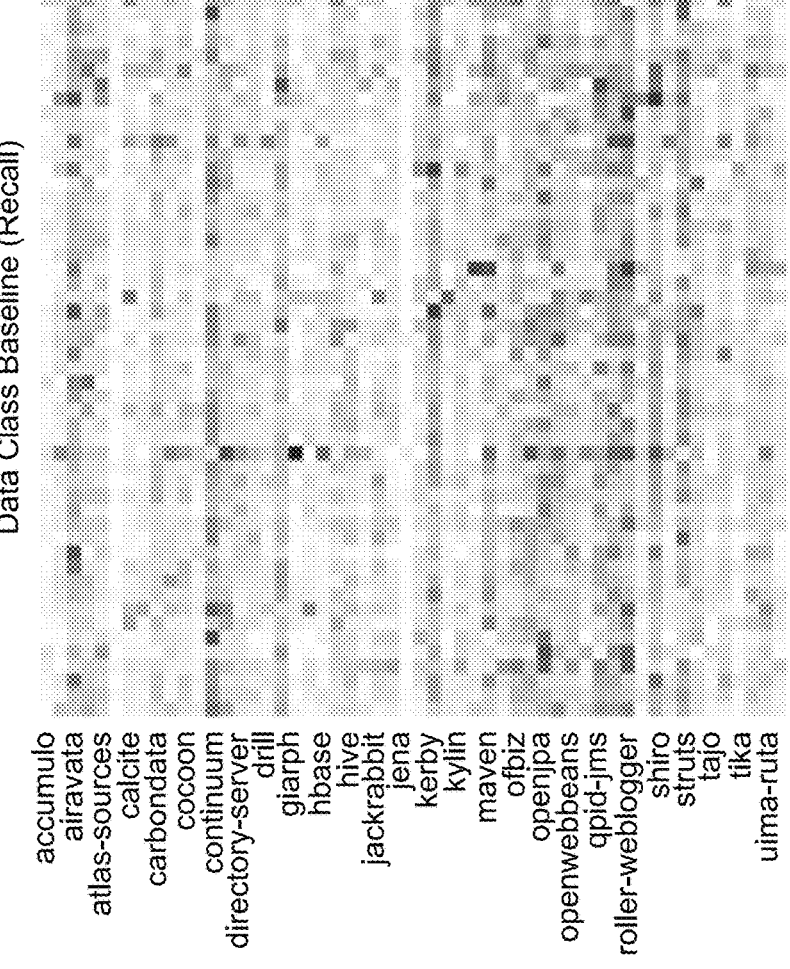
Figure 14A:
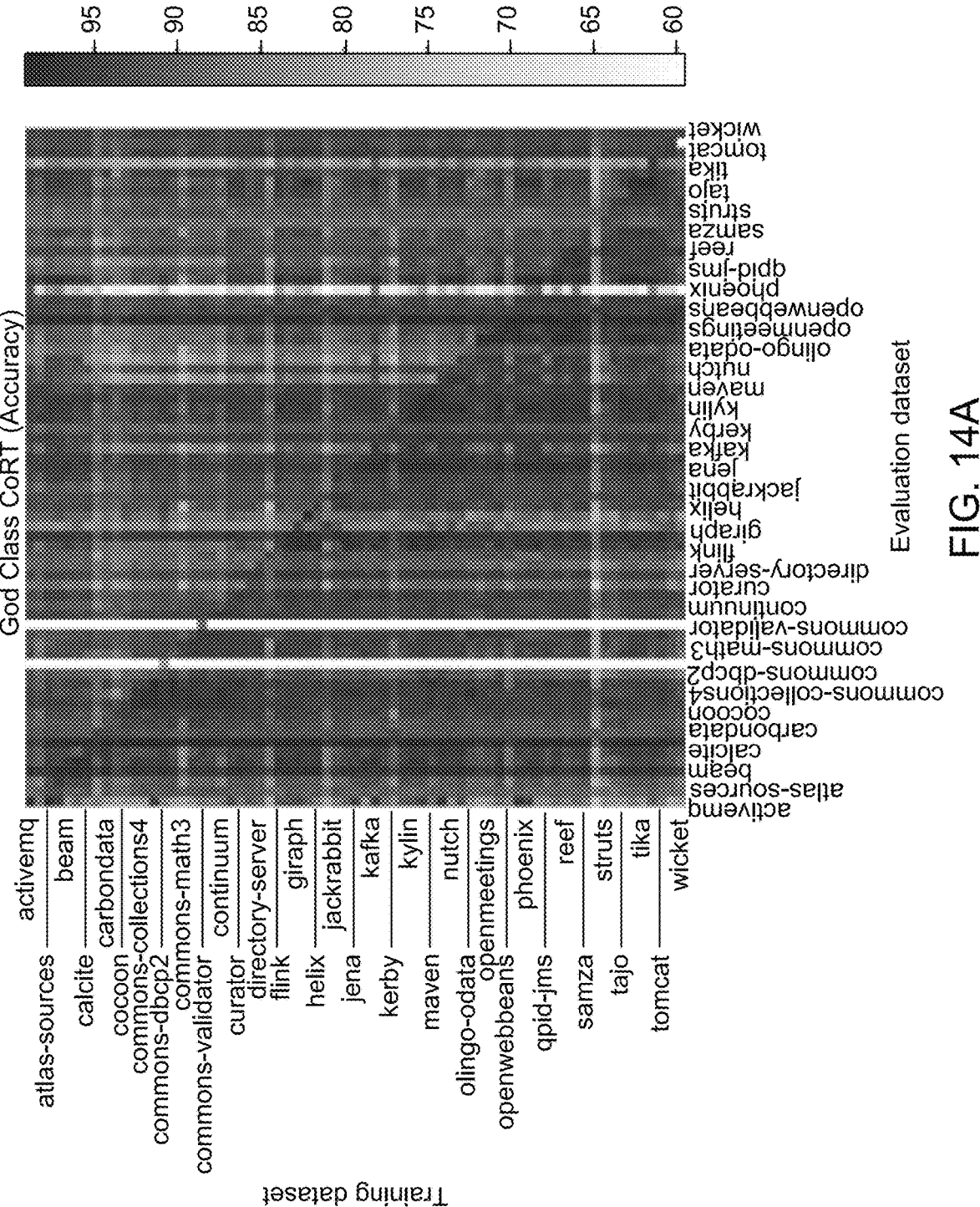
FIGS. 14A, 14B, 14C are an illustration of cross-project performance heatmap of God Class, according to certain embodiments.
Figure 14A:
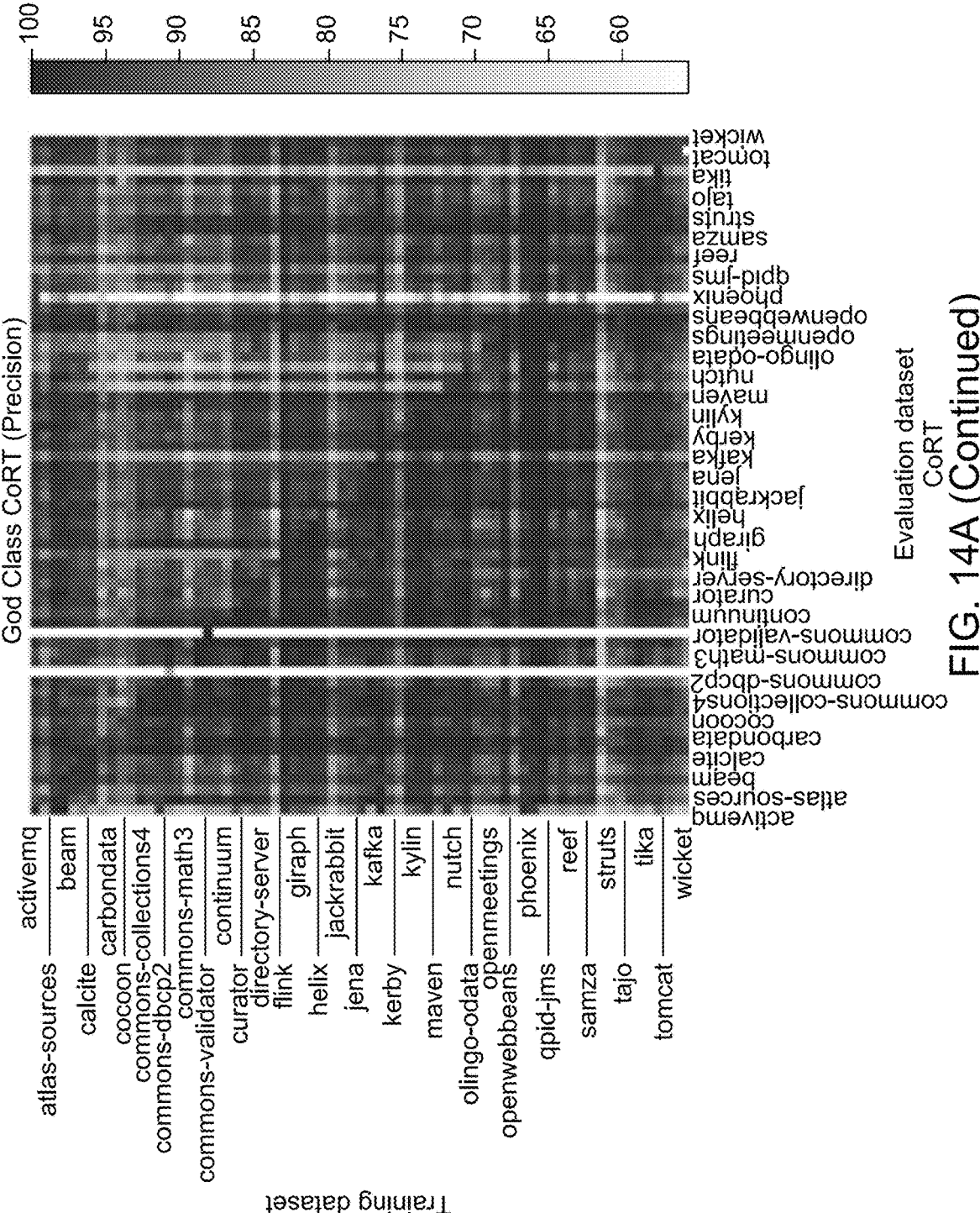
Figure 14A:
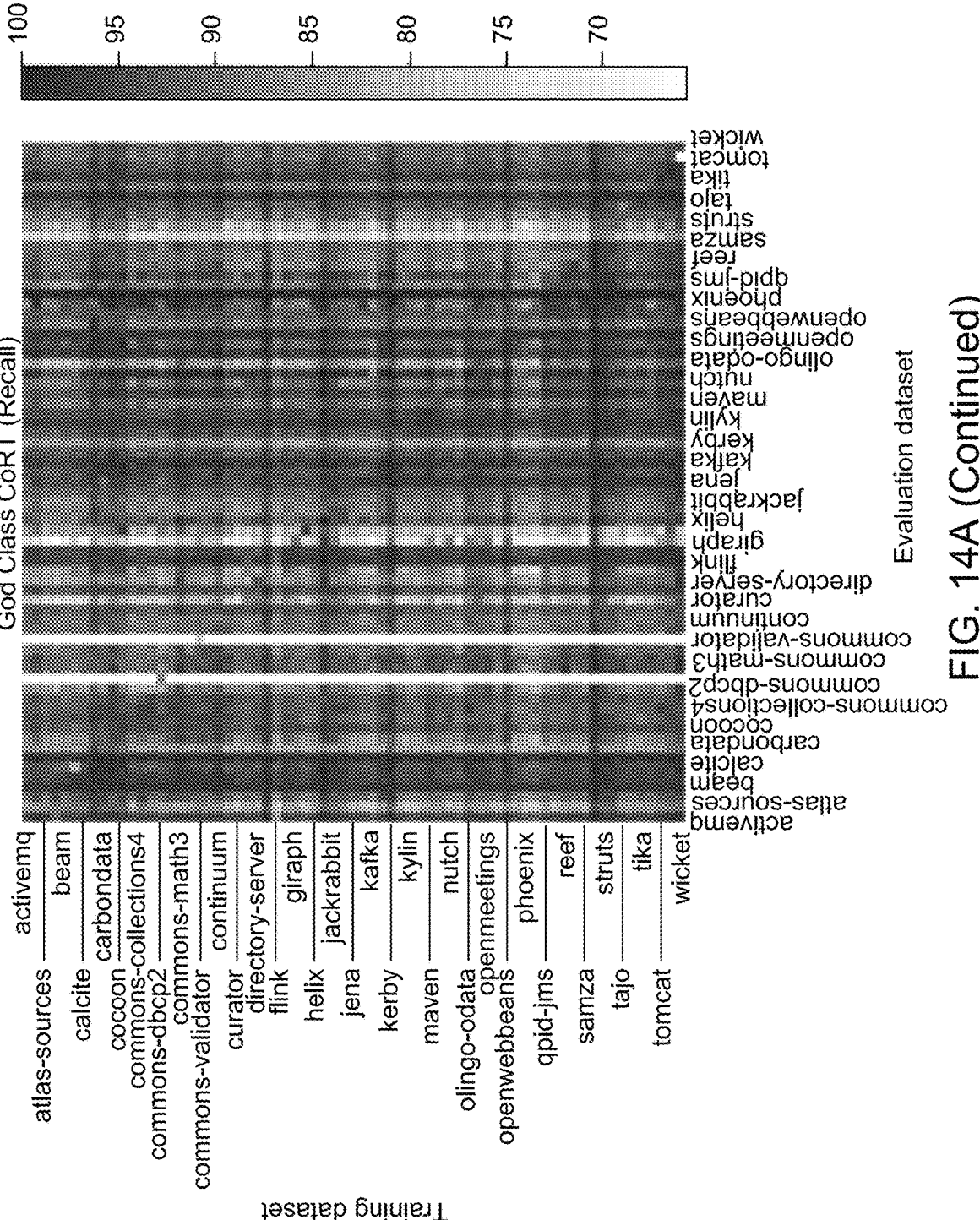
Figure 14B:
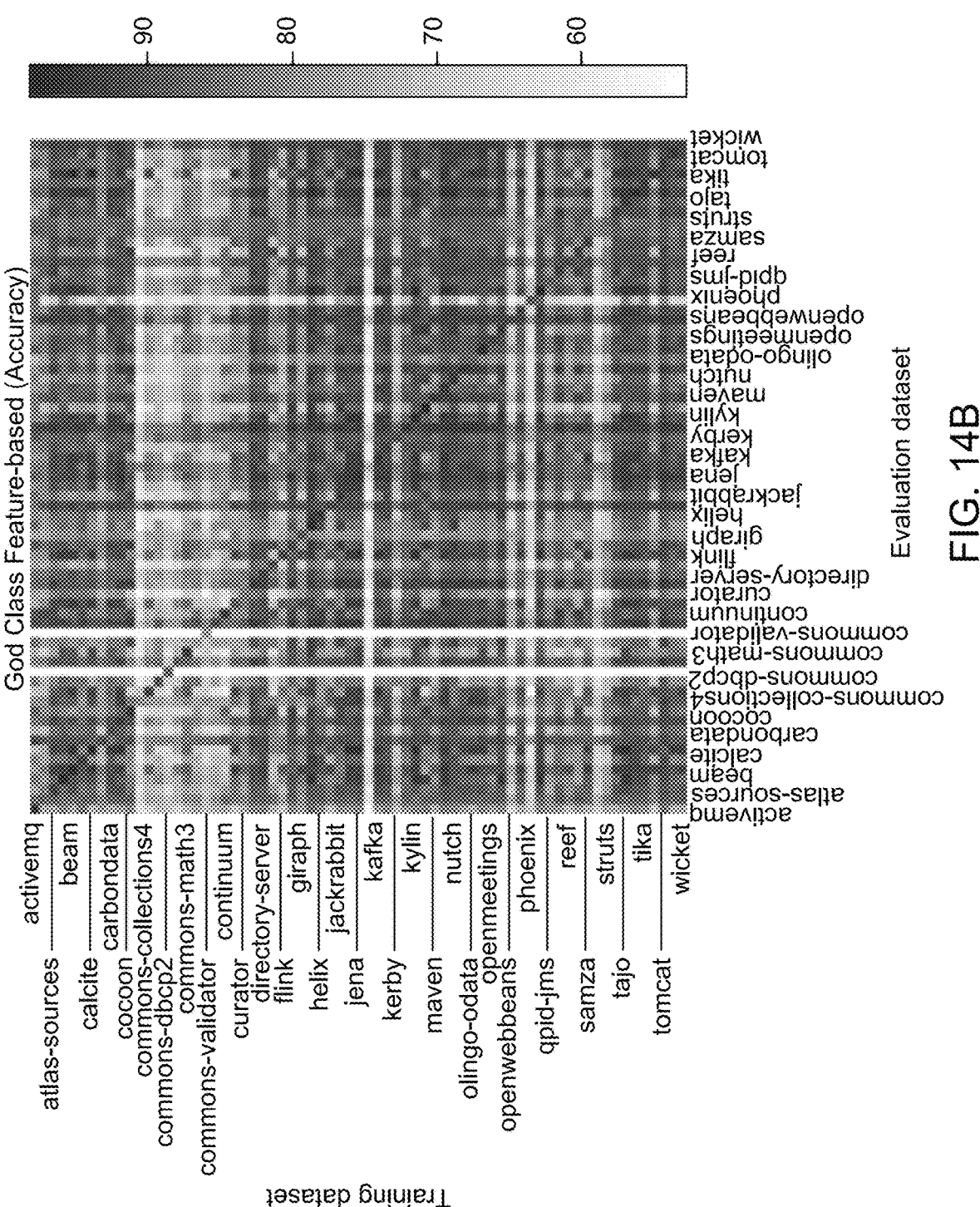
Figure 14B:
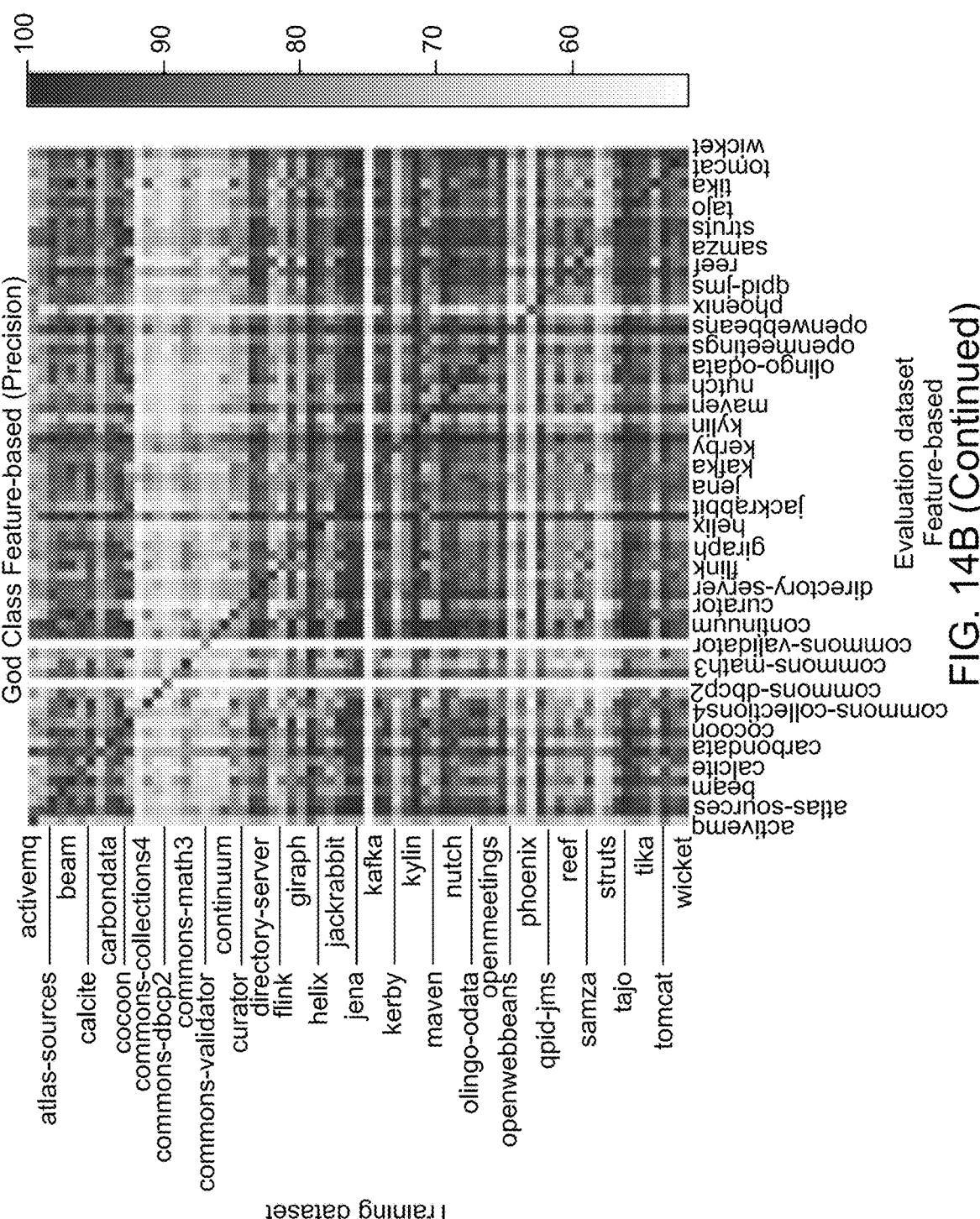
Figure 14B:
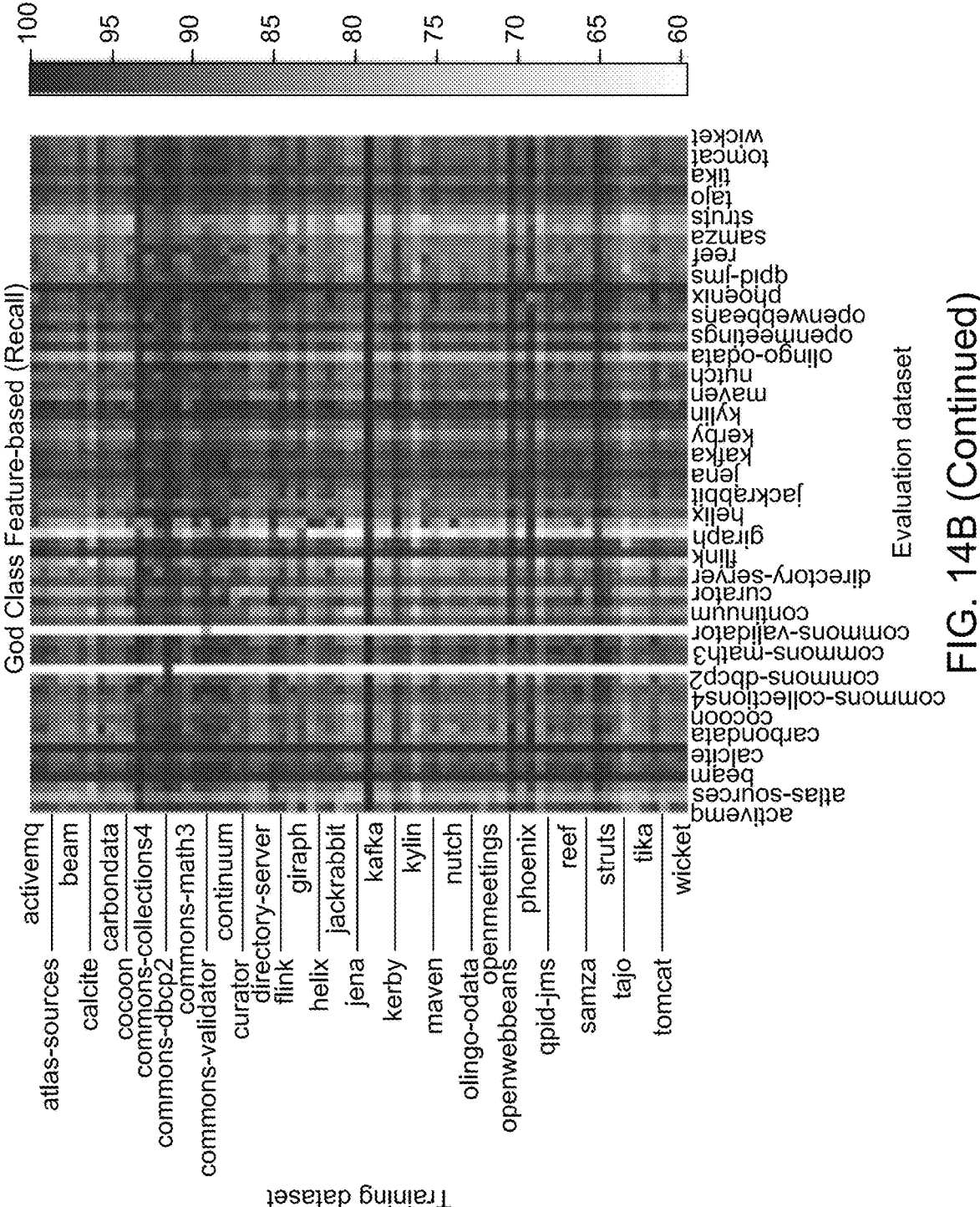
Figure 14C:
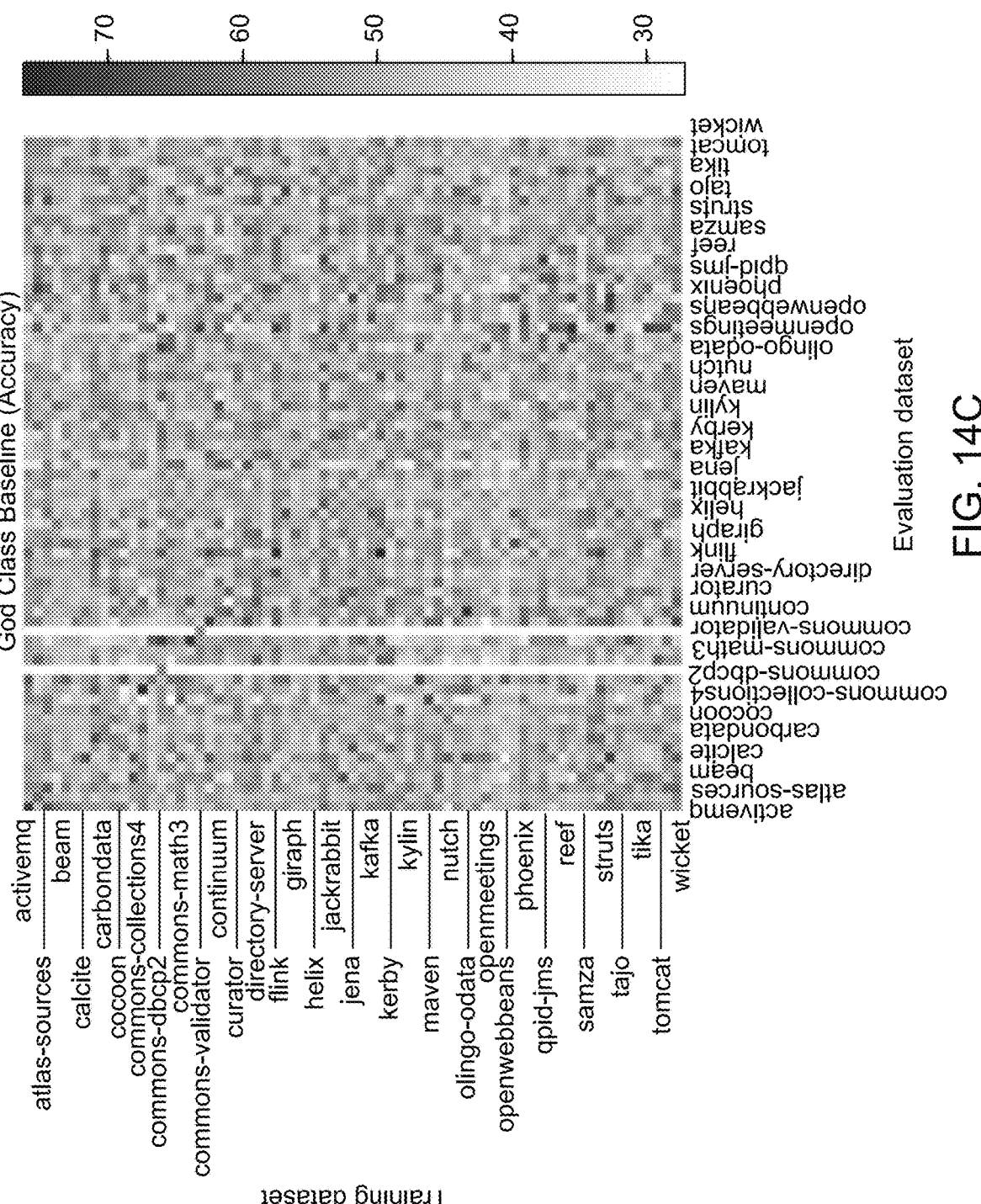
Figure 14C:
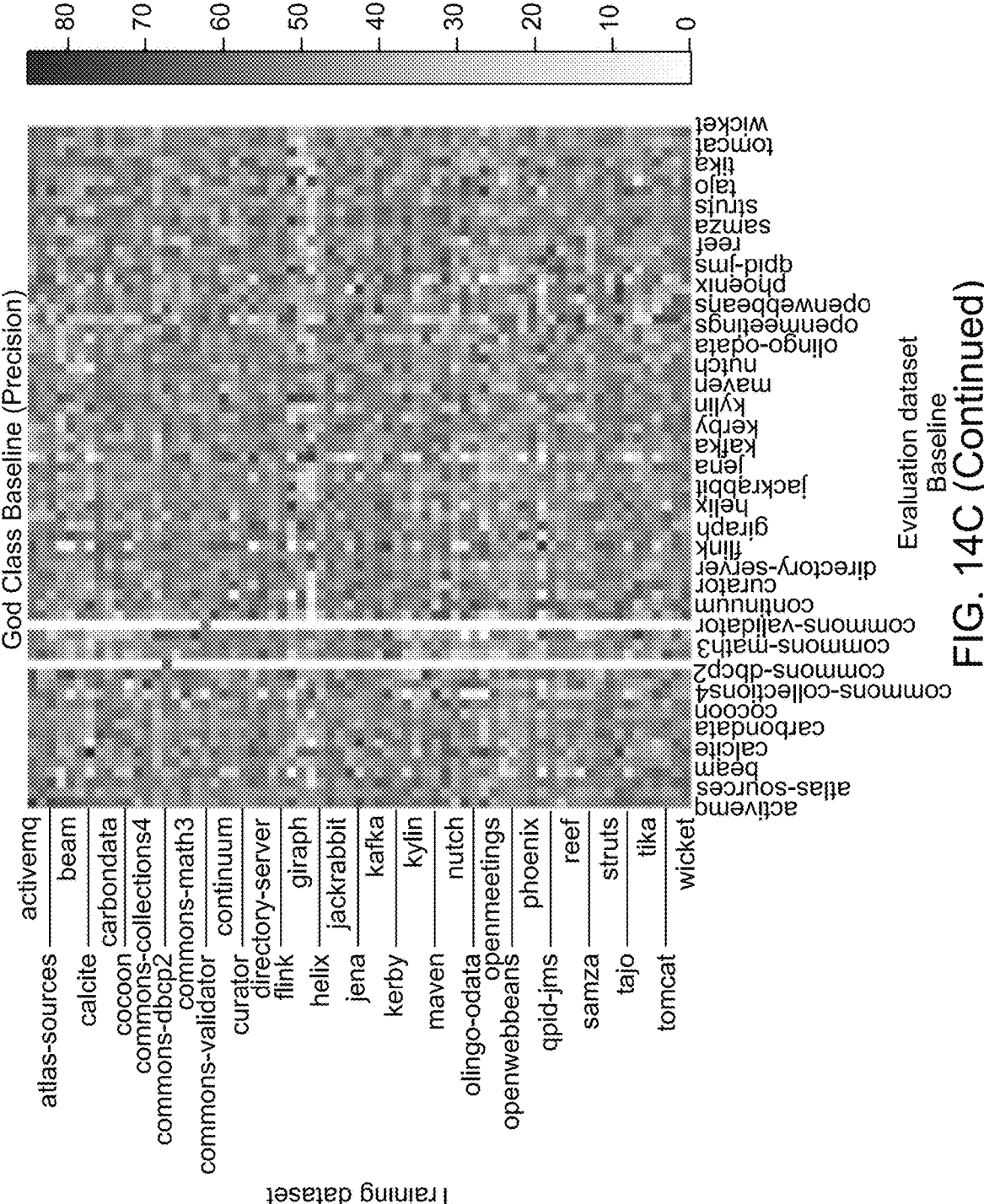
Figure 14C:
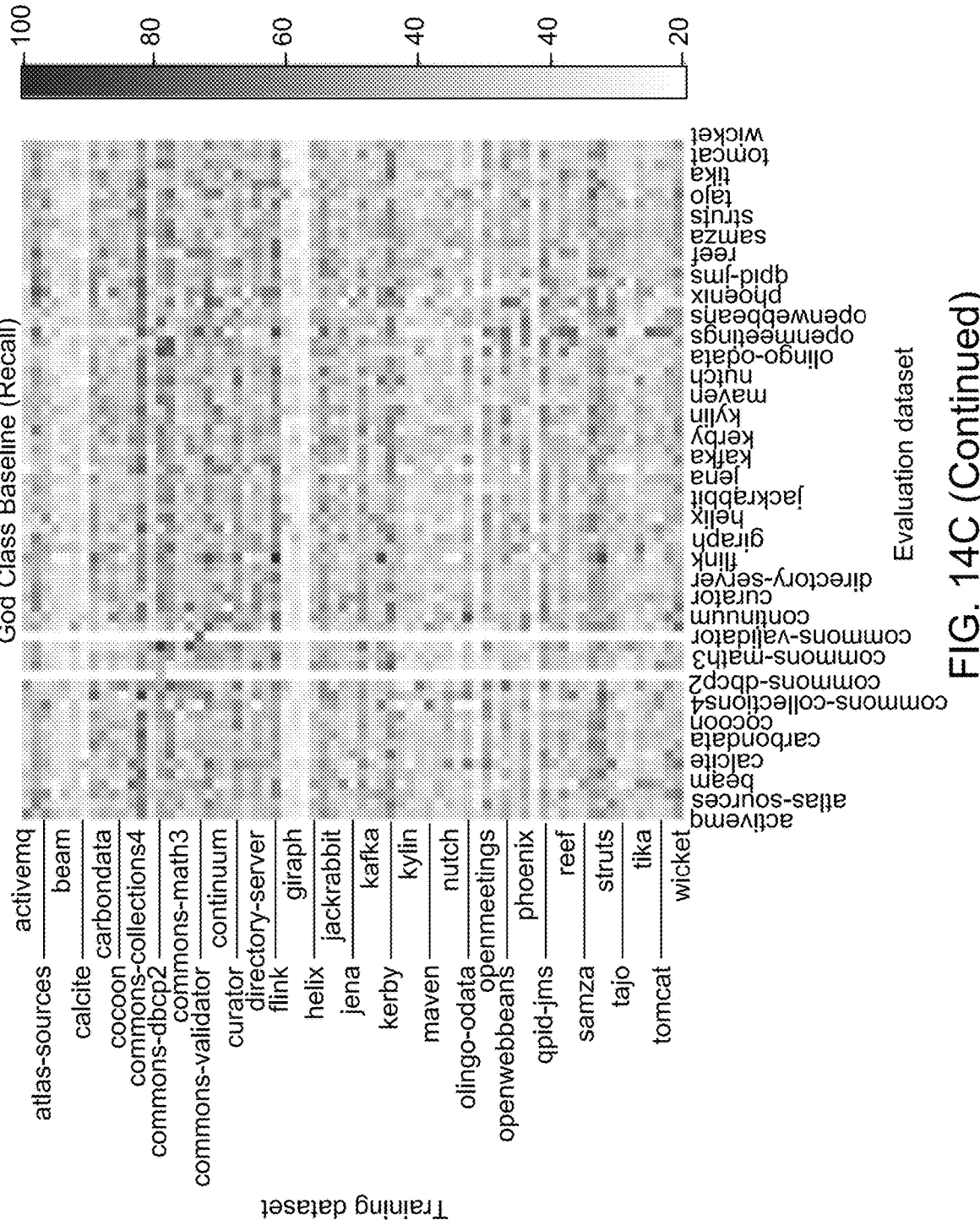
Figure 15A:
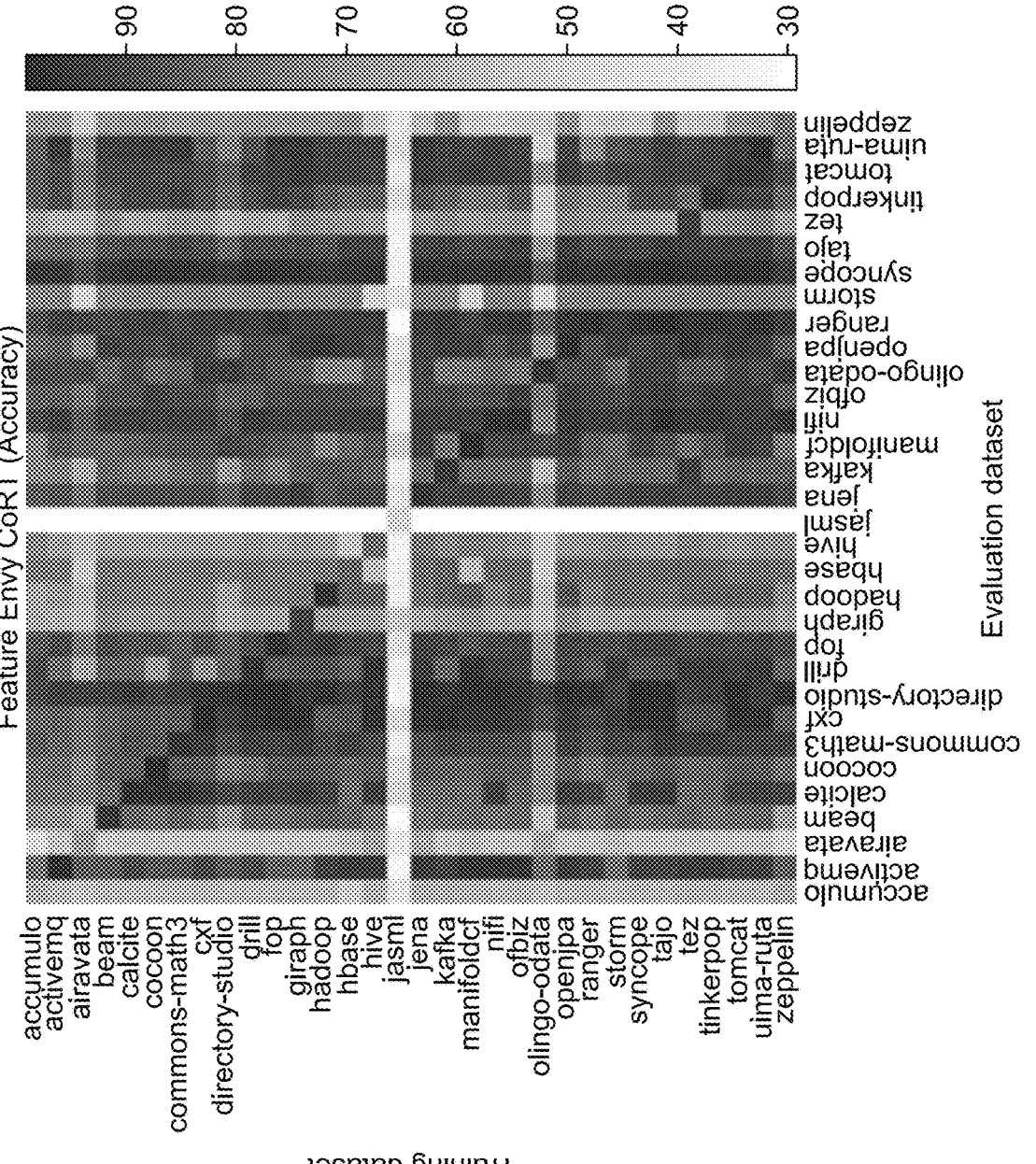
FIGS. 15A, 15B, 15C are an illustration of cross-project performance heatmap for Feature Envy, according to certain embodiments.
Figure 15A:
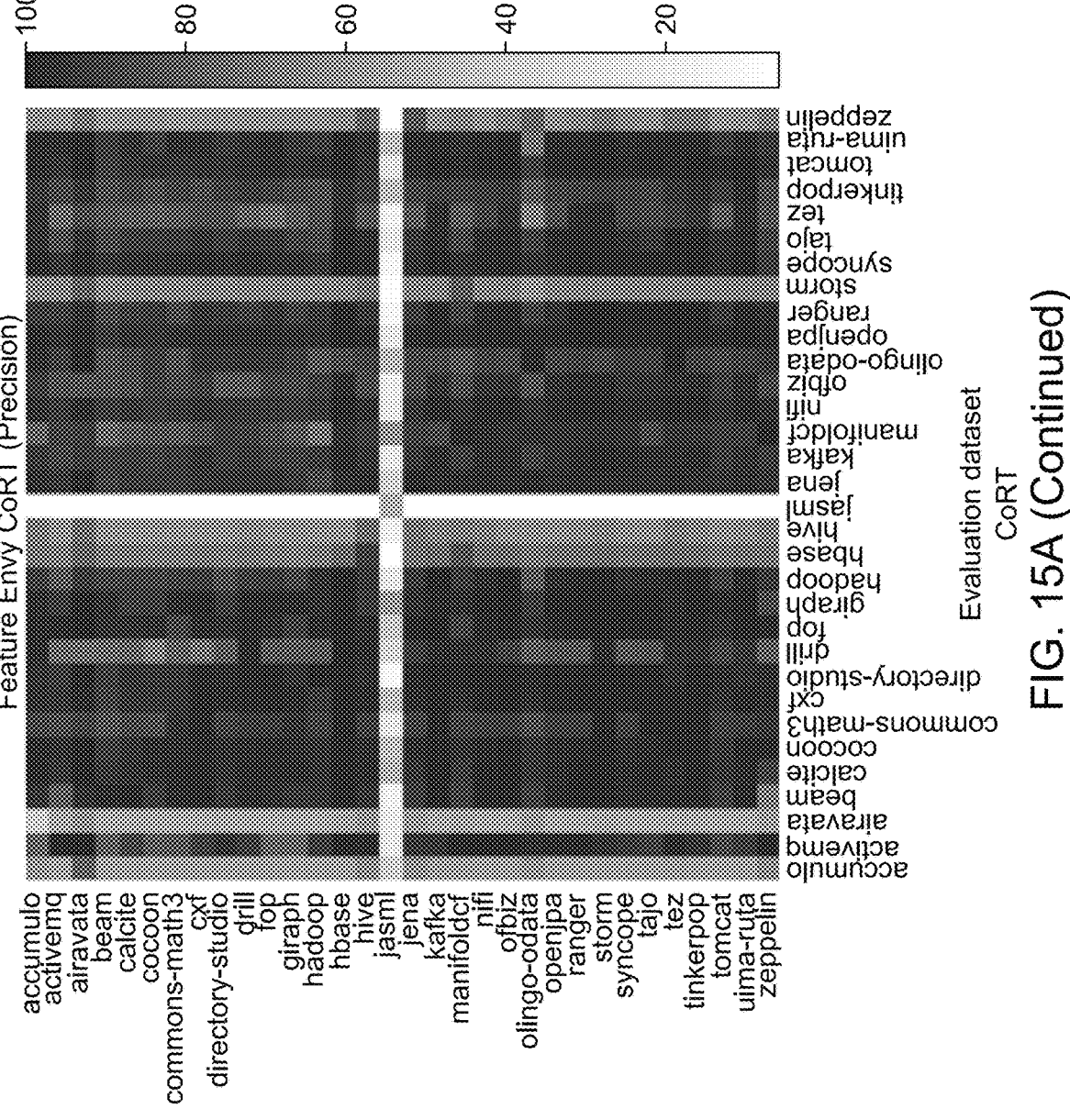
Figure 15A:
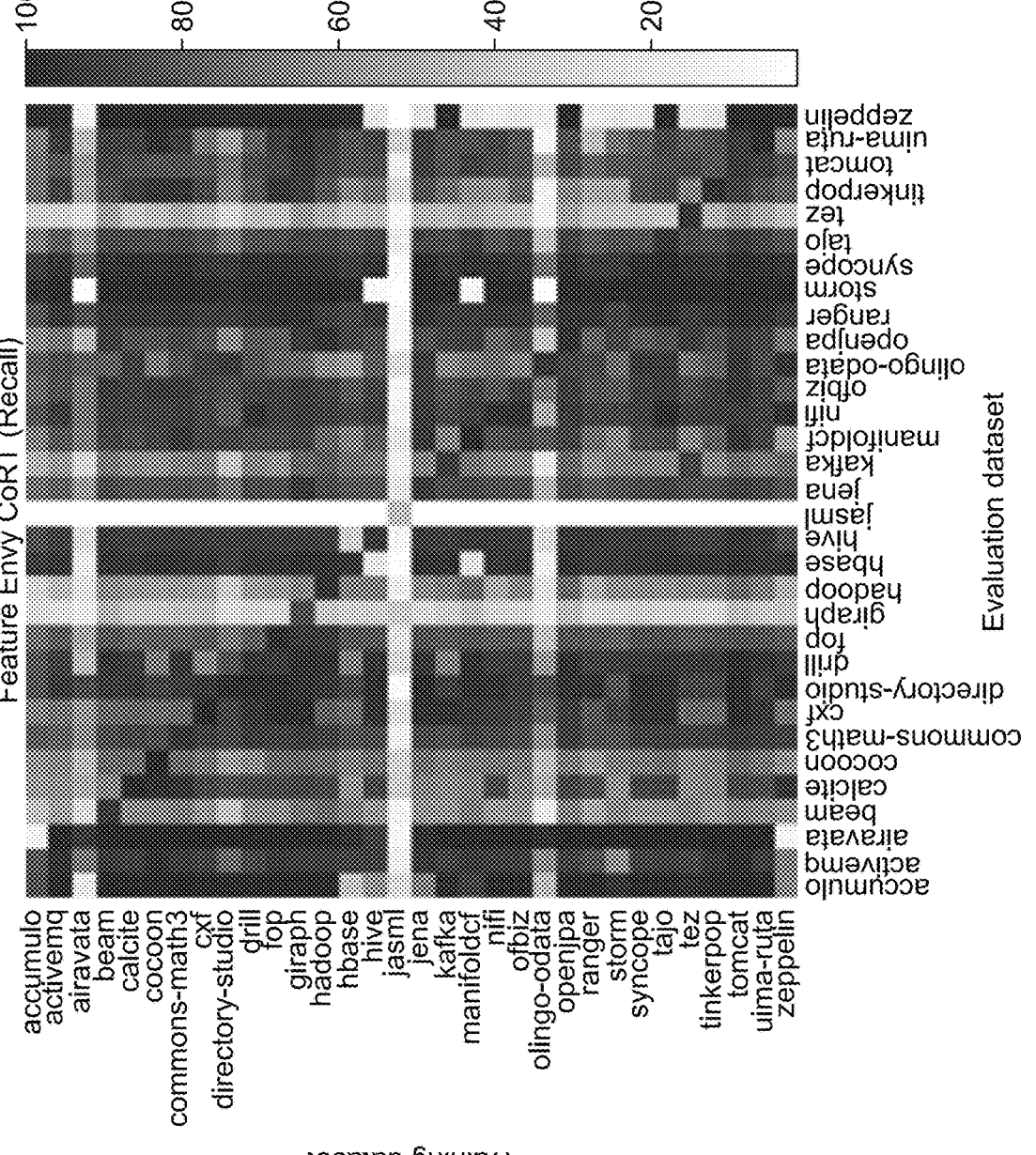
Figure 15B:
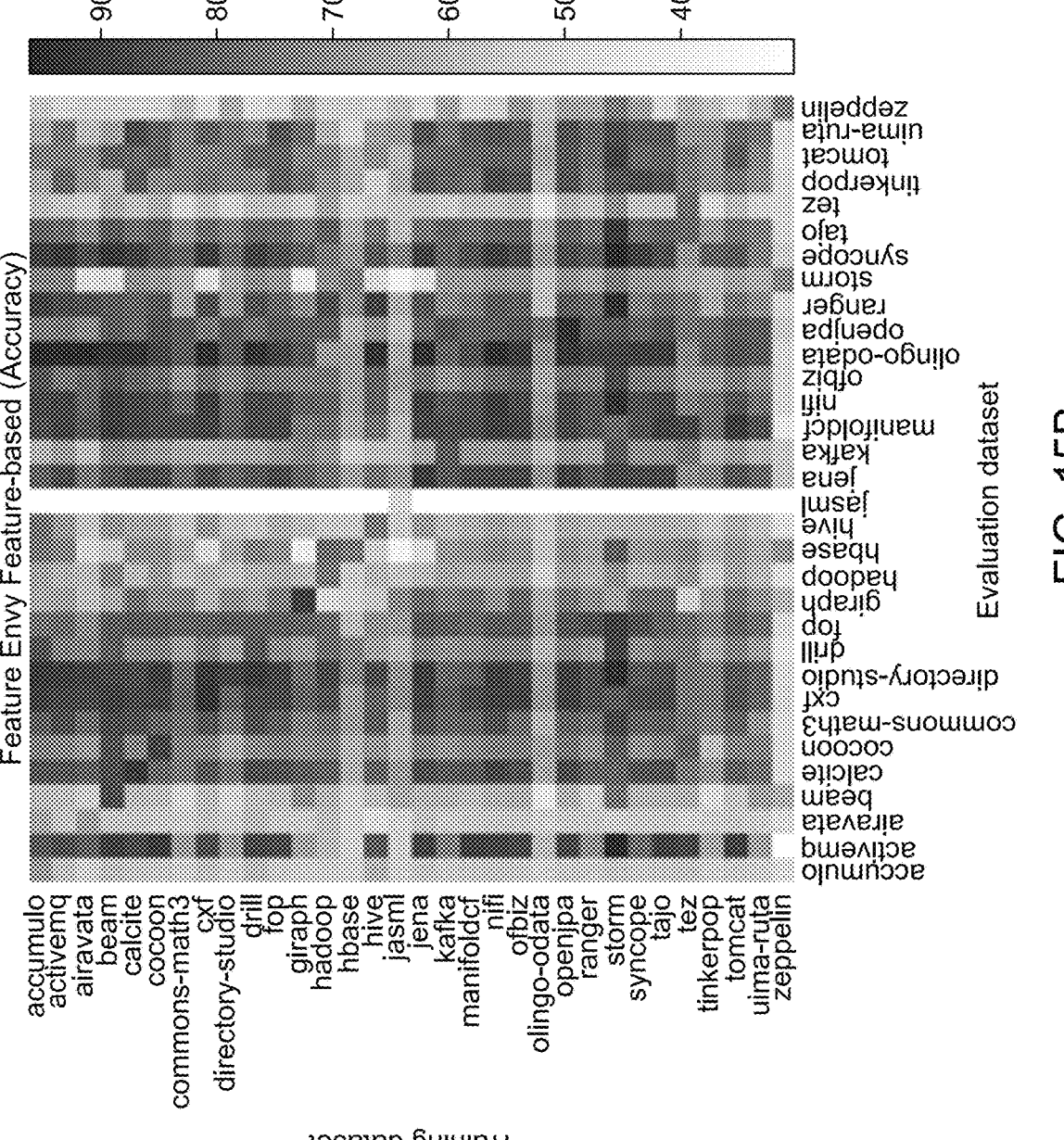
Figure 15B:
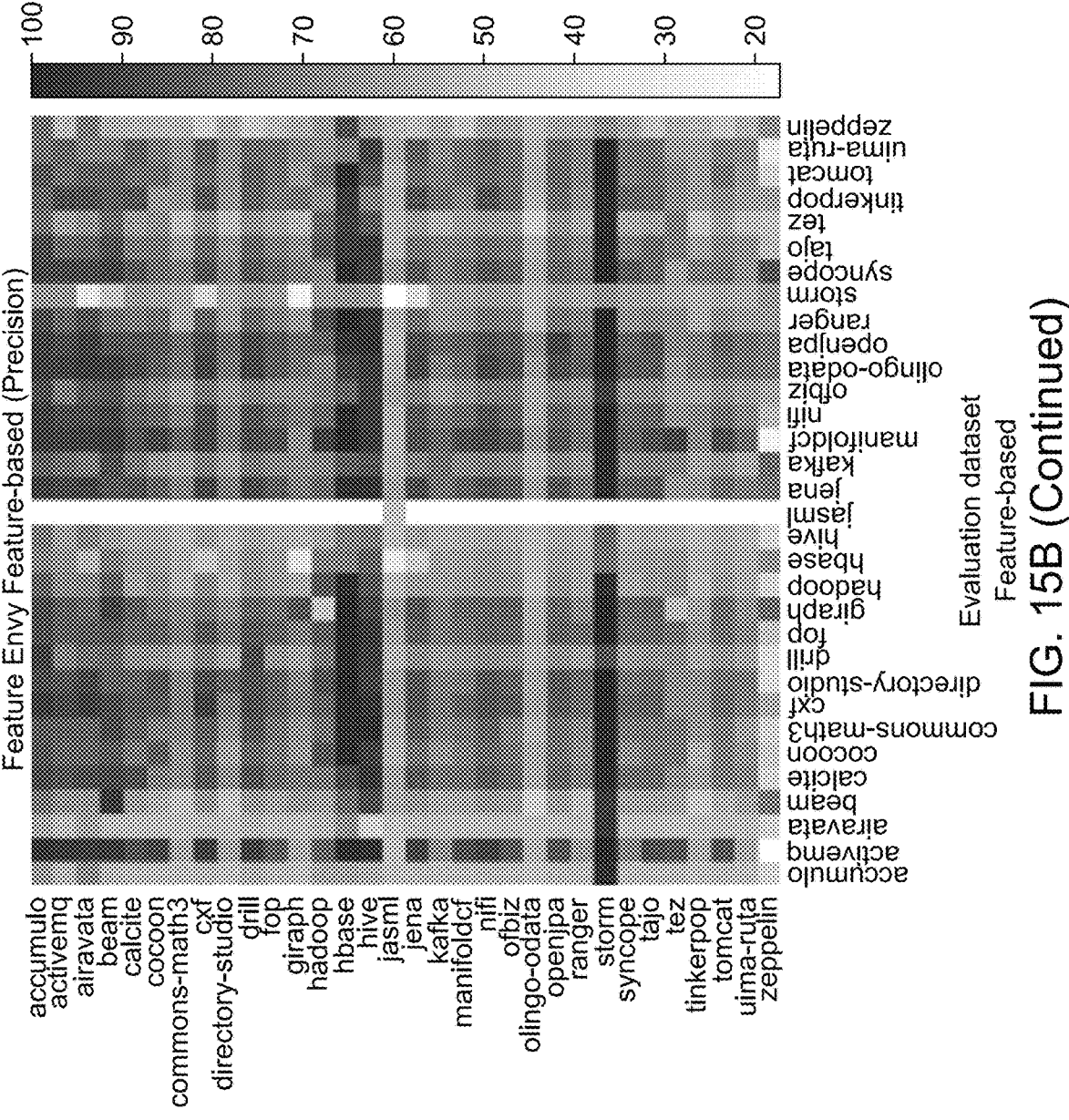
Figure 15B:
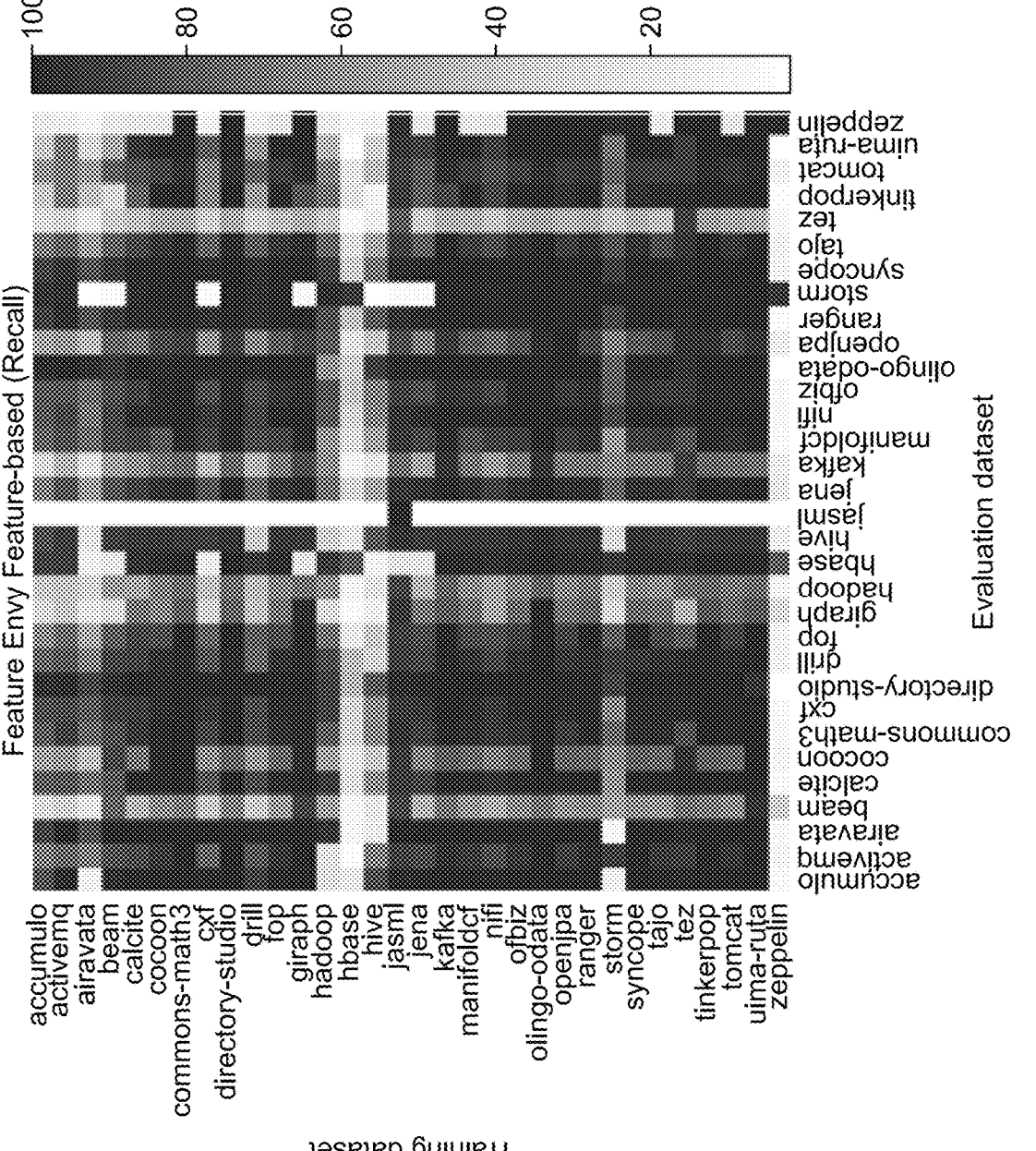
Figure 15C:
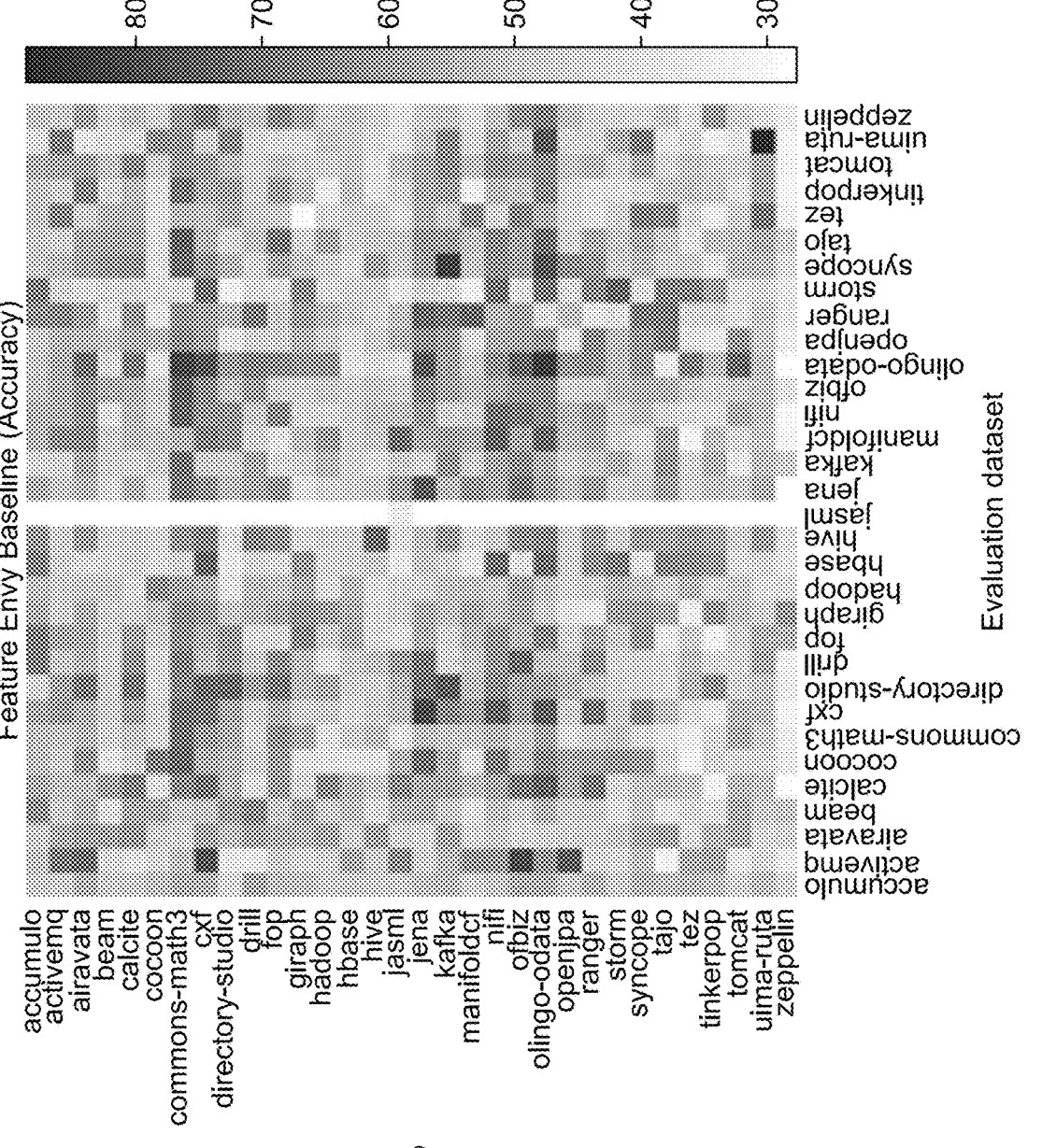
Figure 15C:
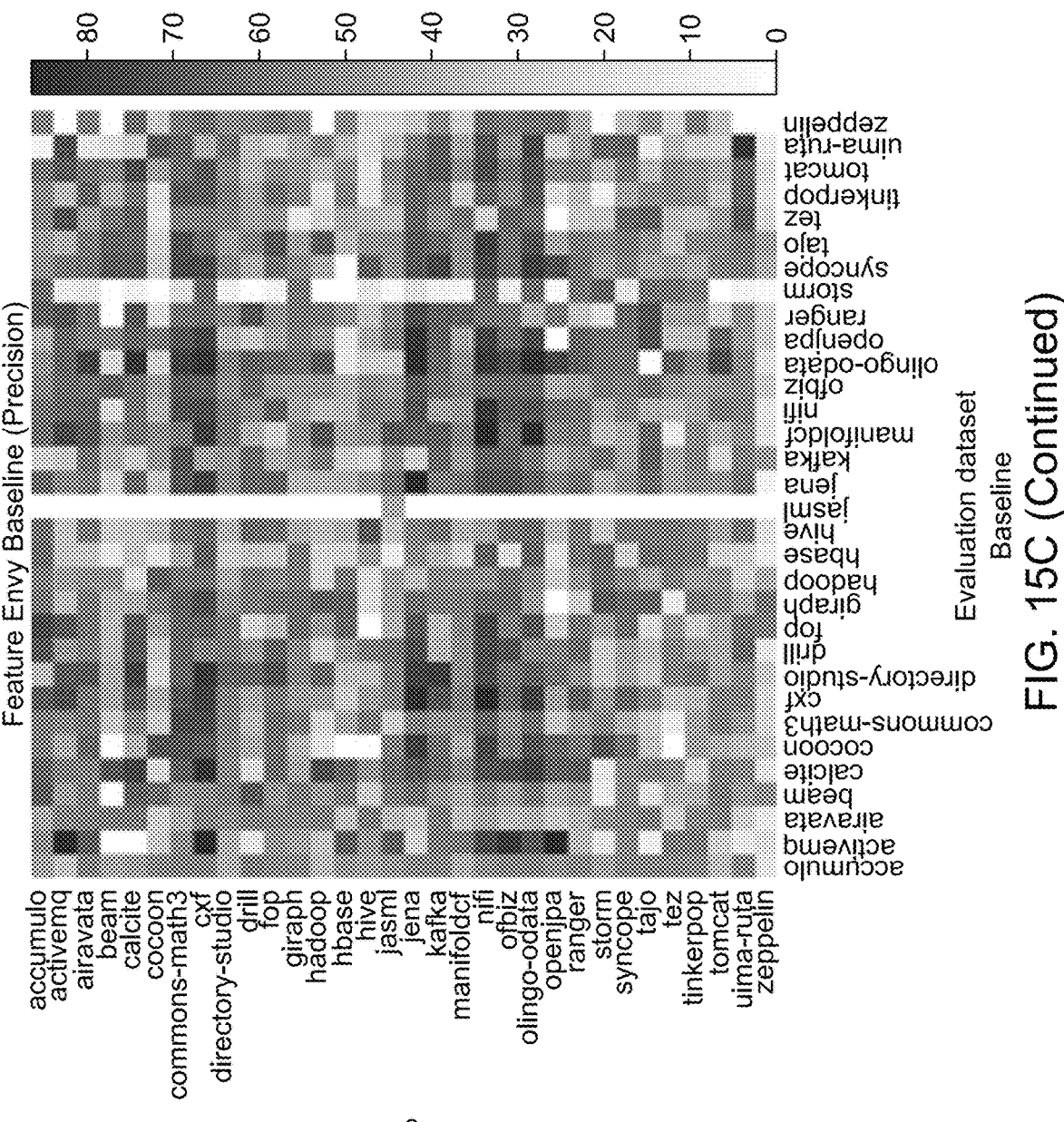
Figure 15C:
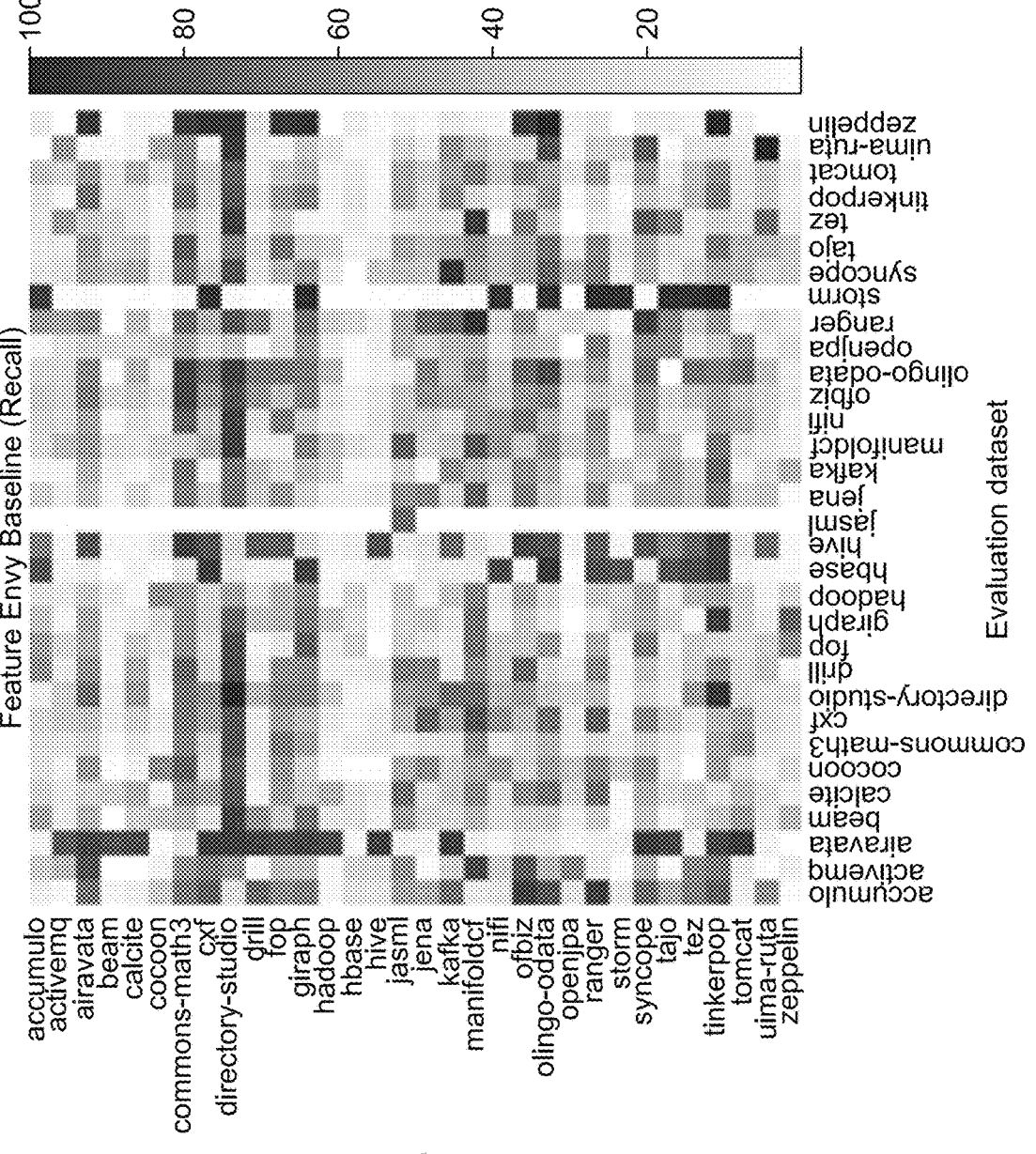
Figure 16A:
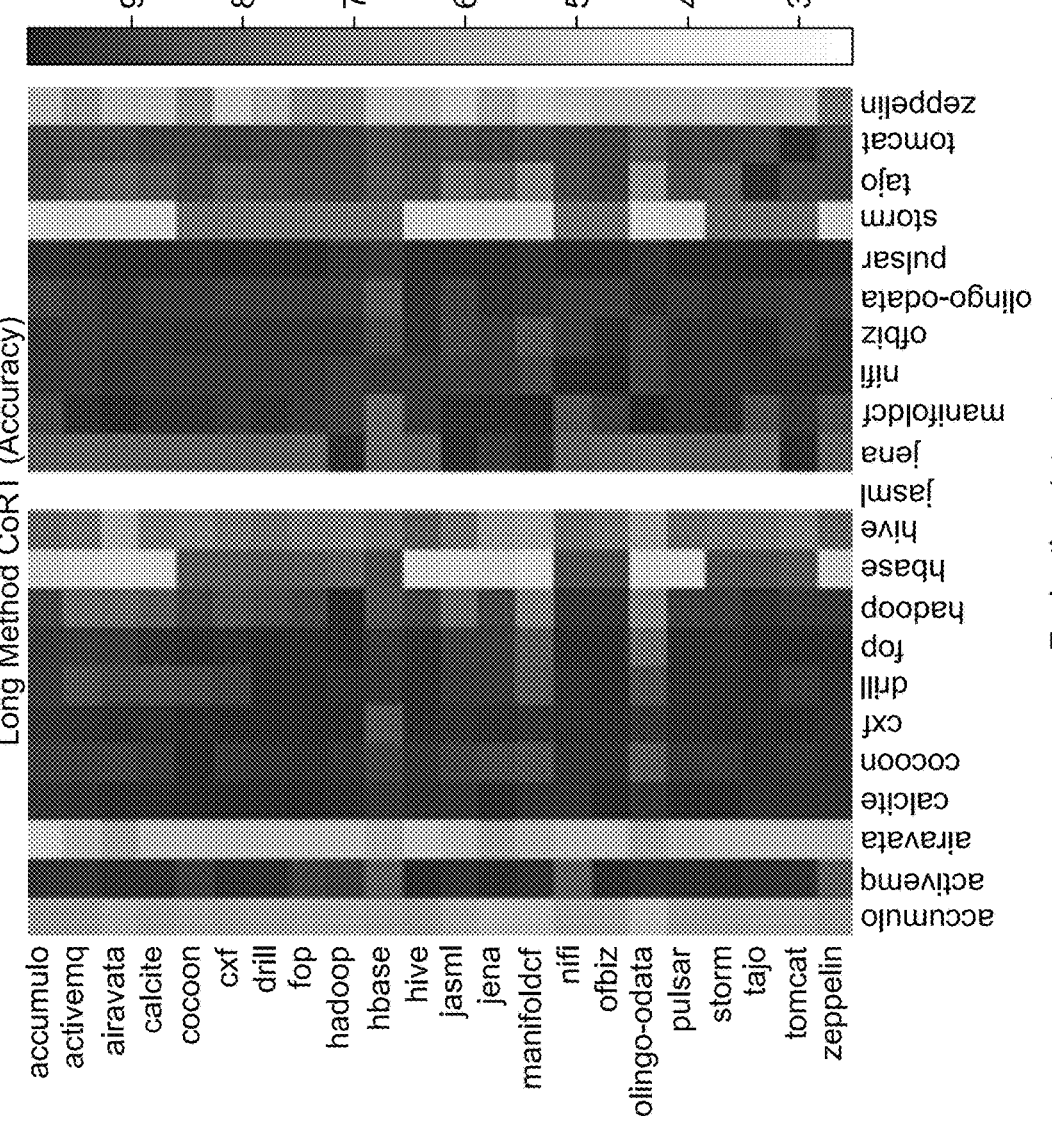
FIGS. 16A, 16B, 16C are an illustration of cross-project performance heatmap for Long Method, according to certain embodiments.
Figure 16A:
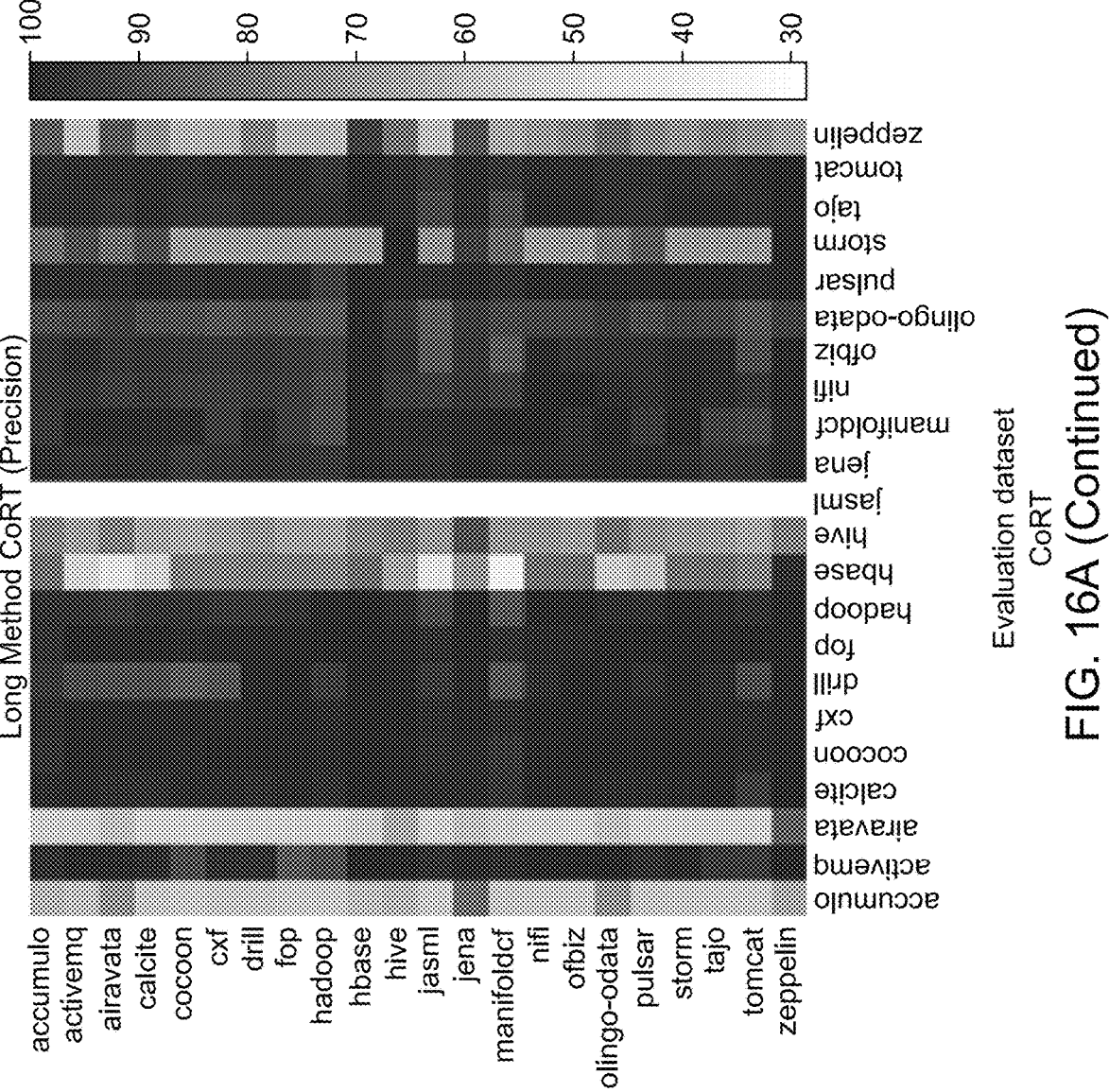
Figure 16A:
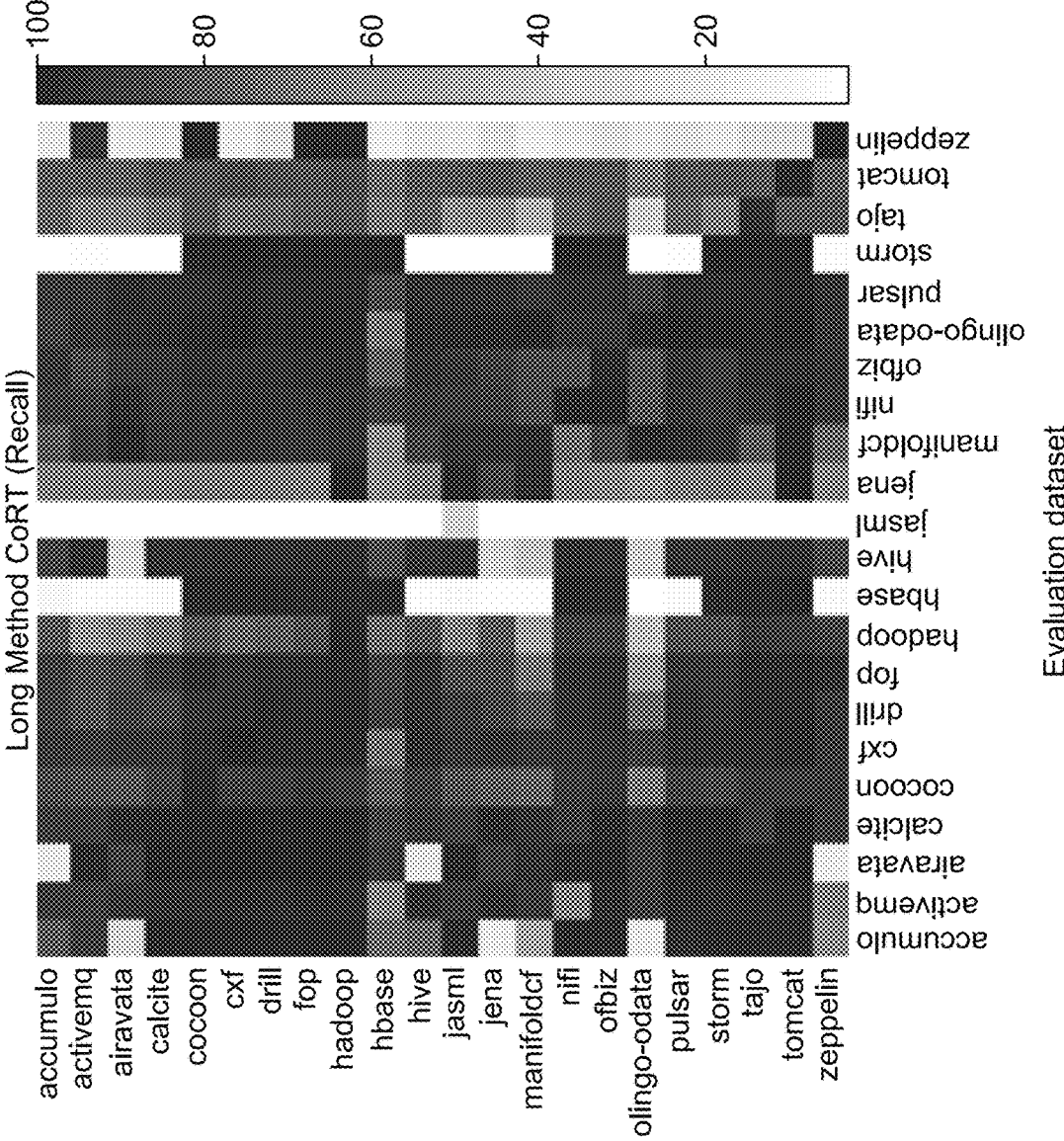
Figure 16B:
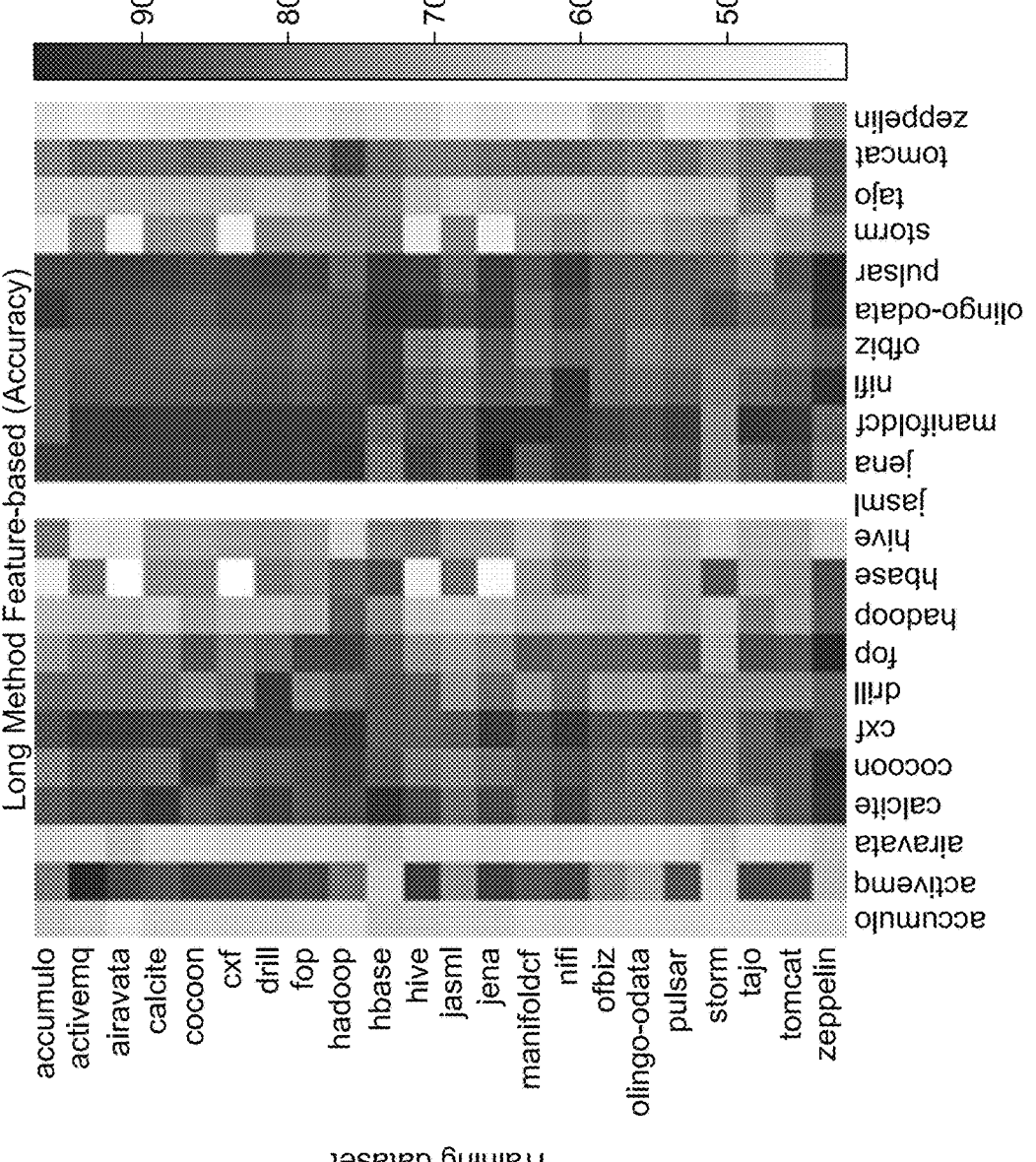
Figure 16B:
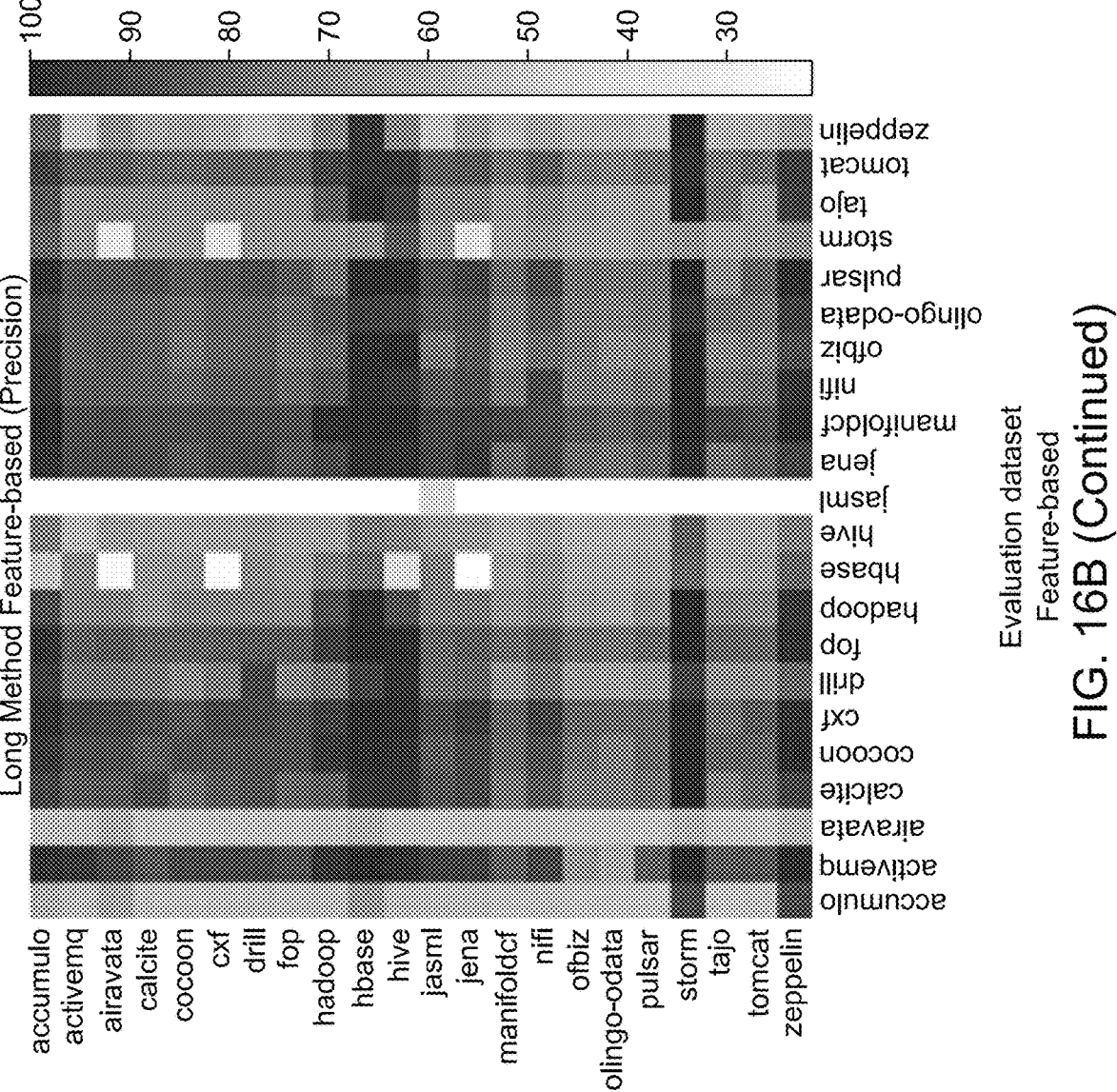
Figure 16B:
Figure 16C:
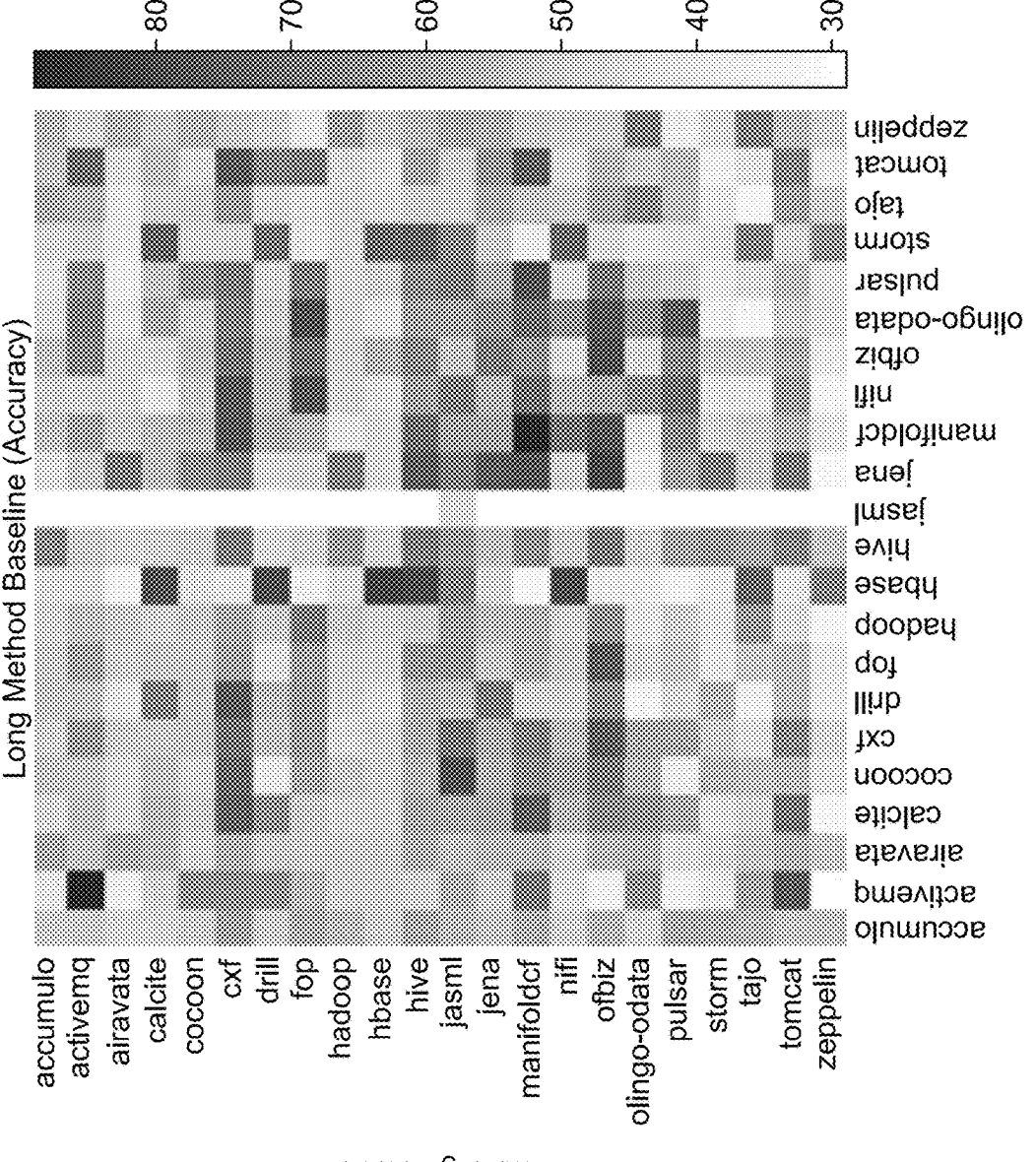
Figure 16C:
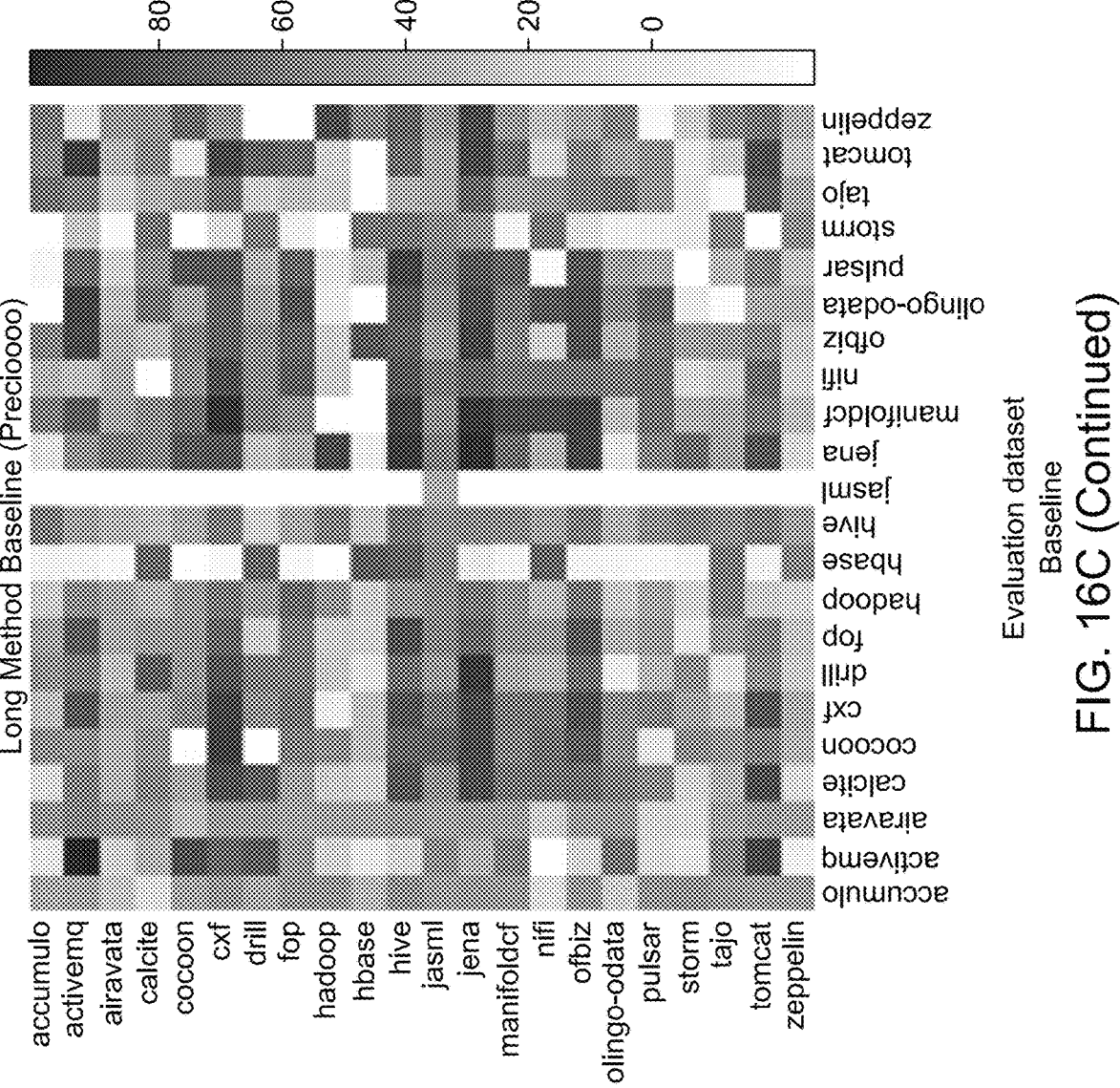
Figure 16C:
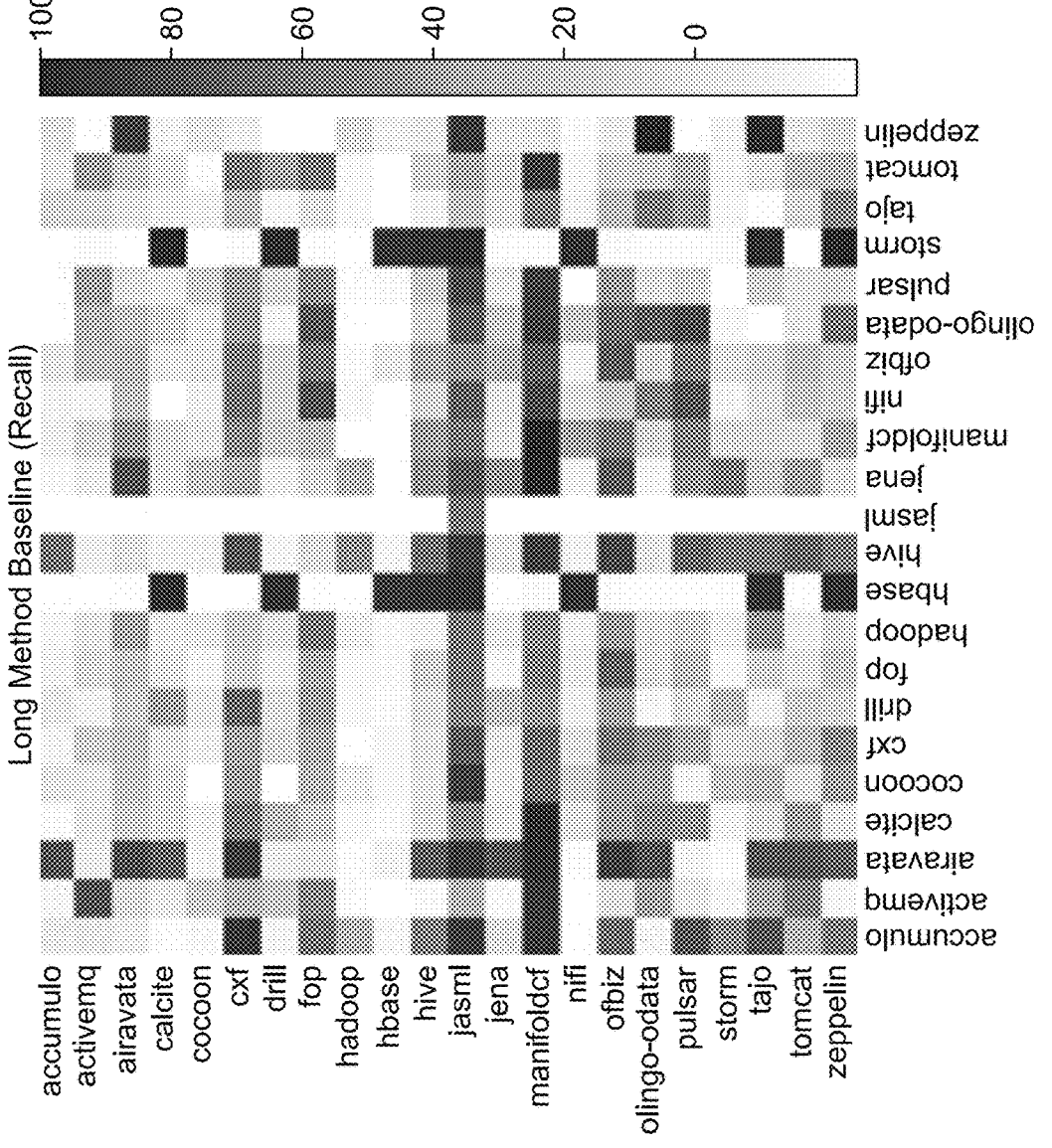

The results are presented in FIG. 8, where CORT ACC, P, R, F1, AUC, and MCC boxplots were plotted against the baseline and feature-based models for each code smell. The feature-based model performed competitively with CoRT (fine-tuned) in detecting class-level smells where both models had smaller boxes (i.e., lower dispersion) with shorter whiskers. However, CoRT outperformed the features-based model in detecting method-level smells by having smaller boxes with shorter whiskers. Moreover, it was observed that the baseline model struggled to obtain high detection performance in all four code smells.

The current section describes a cross-project evaluation. A main goal of this experiment was to evaluate to which extent a fine-tuned model (on one dataset) can be used to detect smells in other (unseen) datasets. A cross-project evaluation was performed for CoRT, feature-based, and baseline models. In this section, only the F1, AUC, and MCC metrics were considered; the results of other metrics are provided in FIG. 13A-FIG. 13C, FIG. 14A-FIG. 14C, FIG. 15A-FIG. 15C, and FIG. 16A-FIG. 16C). In the heatmap, 1) datasets on the vertical axis represent the dataset used to fine-tune CoRT, 2) while datasets on the horizontal axis represent datasets used for detection, 3) and shades represent the detection performance where darker shades refers to high performance and lighter shades indicates low performance.

FIG. 9A-FIG. 9C, FIG. 10A-FIG. 10C, FIG. 11A-FIG. 11C, and FIG. 12A-FIG. 12C illustrate the detection performance of cross-project evaluation for Data Class, God Class, Feature Envy and Long Method, respectively. In most cases, it can be observed that the diagonal axis is darker than the rest because it is the result of evaluating the same datasets used for fine-tuning. For class-level smells, CoRT has better detection performance when used on unseen datasets. Some datasets, like Kerby, were difficult to detect in the feature-based model; however, Kerby had a better performance by CoRT. For method-level smells, it was observed that both feature-based and CoRT have similar detection performance, where both models struggled to detect almost the same datasets.

In summary, CoRT is a DL-based self-supervised model that is trained with a proxy task using Transformer. The CoRT was trained using 16 million lines of code collected from 103 open-source projects and used to detect code smells in the source code. The below section presents implications and limitations of the CoRT.

Proxy Task: The selection of the proxy task plays a vital role in having good representations of structural and semantics features. For instance, if the source code is chosen without punctuation, the original structure of the statements are likely to be lost, and this proxy task may not be useful. The findings of this experiment suggest that the defined proxy task is well-formulated, as it produced good results in the pre-training phase as well as in the fine-tuning phase. Although CoRT performed well on the proxy task, it requires hyperparameters optimization to find the optimal settings, which is an expensive process. Thus, it is a necessity to have a model with good representation without extensive hyperparameters search. Strategies to enhance CoRT involves formulating a new proxy task, for example, including masking the punctuations instead of the reserved word or a combination of the two methods. Although the premise of self-supervised learning is not to use labeled data, pseudo labels may have to be created from the proxy task. Also, significant volumes of data may be required to generate accurate pseudo labels without compromising accuracy.

Detection Performance: the results from experiments suggest that the CoRT method has better detection performance in detecting class-level code smells compared to method-level code smells. There are several possible explanations for this result. First, the pre-trained model was trained using all extracted classes, assuming that the methods are included within the classes. Second, previous studies that used the ML-based approach have a similar conclusion where ML models struggled to detect method-level smells compared to class-level smells (Alazba & Aljamaan, 2021). A possible area of future research would be to investigate why method-level code smells are difficult to detect. A reasonable approach to tackle this issue is to train the pre-trained model using the methods instead of classes, then use the model for detecting method-level code smells.

Computational Efficiency: The method of disclosure has two main stages: pre-training and fine-tuning. There are significant computational advantages to computing an expensive representation of the data in advance (i.e., pre-training step) and then applying the model on multiple tasks using cheaper models on top of the representations (i.e., fine-tuning). On the other hand, the pre-training phase is computationally expensive as it requires a huge amount of data and consists of two steps 1) defining pseudo labels and 2) training the model on pseudo labels compared to supervised learning. Therefore, trade-offs between the two approaches must be considered in future studies.

Comparative Evaluation: The findings from the evaluation show that CoRT is effective for both fine-tuning and feature-based approaches; however, fine-tuning would enhance performance of the CoRT model because it requires minutes of training leading to better results. In the study, the comparison of the CoRT approach was constrained to the baseline and feature-based approach.

The CoRT has several benefits for researchers and developers because the semantics and structural features are automatically extracted without the need for transformations and/or defining rules and thresholds for the detection of each code smell. As a result, the adaptation of the method by developers can be expected, which implies developing plugins and/or software bots for detecting code smells and consequently using it in reality. Moreover, the CoRT approach is not tight to a specific programming language or task, which might open doors for researchers to investigate the capability of this approach in detecting code smells in other programming languages or applying the model for other downstream tasks such as code generation and defect predictions.

Threats To Validity: Some assumptions were made during the experiments that can challenge the accuracy of the results. In this section, the potential threats and how they were mitigated is described.

Conclusion Validity: this threat is related to the association between the treatment and the outcome. The evaluation methodology used to evaluate the CoRT is considered a threat as using other evaluation methods might affect the outcomes of this study; however, 80/20 and 70/30 validation methods were adopted, which are the two most used methods in evaluating DL-based models. As for the evaluation metrics, adopting one metric exposes a risk of bias leading to misleading outcomes. Therefore, multiple metrics were used that are commonly used in the literature, such as precision, recall, accuracy, f-score, MCC, and AUC. Also, some metrics, such as precision and recall, are threshold-dependent, and finding the proper threshold is challenging; therefore, both threshold-dependent as well as threshold-independent evaluation metrics were adopted, such as AUC and loss.

Construct Validity: As for potential issues related to the relation between the theory and the observation, potential problems has been identified in the adopted methodology. The implementation of the experimented prediction models exposes a threat. The implementation provided by Tensorflow was implemented, which is considered a reliable framework for implementing DL models. In this study, tokenized source code was used as independent variables. The tool used for data extraction might be a threat since the reliability of this tool is assumed. However, ANTLR4 was selected, which has been used in previously known studies (See: Hua, W., Sui, Y., Wan, Y., Liu, G., & Xu, G. (2021). FCCA: Hybrid Code Representation for Functional Clone Detection Using Attention Networks. IEEE Transactions on Reliability, 70(1), 304-318. doi.org/10.1109/TR.2020.300191; White, M., Tufano, M., Vendome, C., & Poshyvanyk, D. (2016). Deep learning code fragments for code clone detection. 2016 31st IEEE/ACM International Conference on Automated Software Engineering (ASE), 87-98; and Nafi, K. W., Kar, T. S., Roy, B., Roy, C. K., & Schneider, K. A. (2019). CLCDSA: Cross Language Code Clone Detection using Syntactical Features and API Documentation. 2019, 34th IEEE/ACM International Conference on Automated Software Engineering (ASE), 1026-1037. doi.org/10.1109/ASE.2019.00099, all incorporated herein by reference in their entireties). Another threat to the validity stems from the labeled datasets used to construct the fine-tuning dataset. To mitigate this threat, labeled datasets were selected that have been verified by inventors. Moreover, the process of mapping the extracted code to the labels was automated to minimize the risk of mislabeling, as the manual mapping will be error-prone.

Internal Validity: the internal threat is associated with the correctness of the experiments' outcome. The code smell definitions are subjective; a code smell with almost identical definitions might have two names. To mitigate this problem, the definition were made and used to label the datasets. In case no definition was stated, the definitions suggested by Fowler (See: Fowler, M., Beck, K., Brant, J., Opdyke, W., Roberts, D., & Gamma, E. (1999). Refactoring: Improving the Design of Existing Code (1 edition). Addison-Wesley Professional, incorporated herein by reference in its entirety).

External Validity: this threat is concerned with the generalization of study conclusions. With respect to the generalizability, CoRT was evaluated on four code smells. Although four of the most common code smells: two are at the class-level and two at the method-level, the results may not be generalized to other types. In terms of programming languages, CoRT is language agnostic and can be adapted for any programming language. However, the CoRT was evaluated using Java projects and it may not be suggested that the CoRT may not work well for programming languages other than Java. Also, the results may not be generalized to all software systems. To mitigate this, an effort was made to use a sizable and representative dataset, where 103 Java projects were utilized. Moreover, some cross-project experiments were performed to assess the generalizability of the CoRT.

In summary, a proxy task for self-supervised learning that trains a Transformer model to be able to recognize the code representations is disclosed. Despite the simplicity of the proxy task, the study shows that the proxy task successfully forces the trained model (CoRT) to learn structural and semantic features that are useful for multiple downstream tasks, such as the detection of Data Class, God Class, Feature Envy, and Long Method code smells. The model was carefully built by comparing multiple DL model architectures and applying hyperparameter optimization. The method of the disclosure was evaluated by applying CoRT on two class-level, and two method-level code smells. Also, the time complexity of the CoRT was evaluated. Moreover, the method of disclosure was evaluated by comparing it with supervised and feature-based approaches, and the method of disclosure showed all code smells high detection performance. Also, the generalizability of the method of disclosure was compared to supervised and feature-based methods by applying cross-project evaluation. High detection scores were observed in terms of accuracy, precision, recall, F1-score, AUC, and MCC, surpassing other approaches by a significant margin.

The method of disclosure includes applying CoRT to detect bad smells at the model level. Moreover, it is advantageous to integrate the implementation of CoRT into a software bot to facilitate the use of the disclosed approach by developers to find refactoring opportunities in real-word scenarios. Finally, applying the disclosure to detect code smells in other programming languages is being performed to support that the disclosed approach is programming languages independent.

Figure 17:
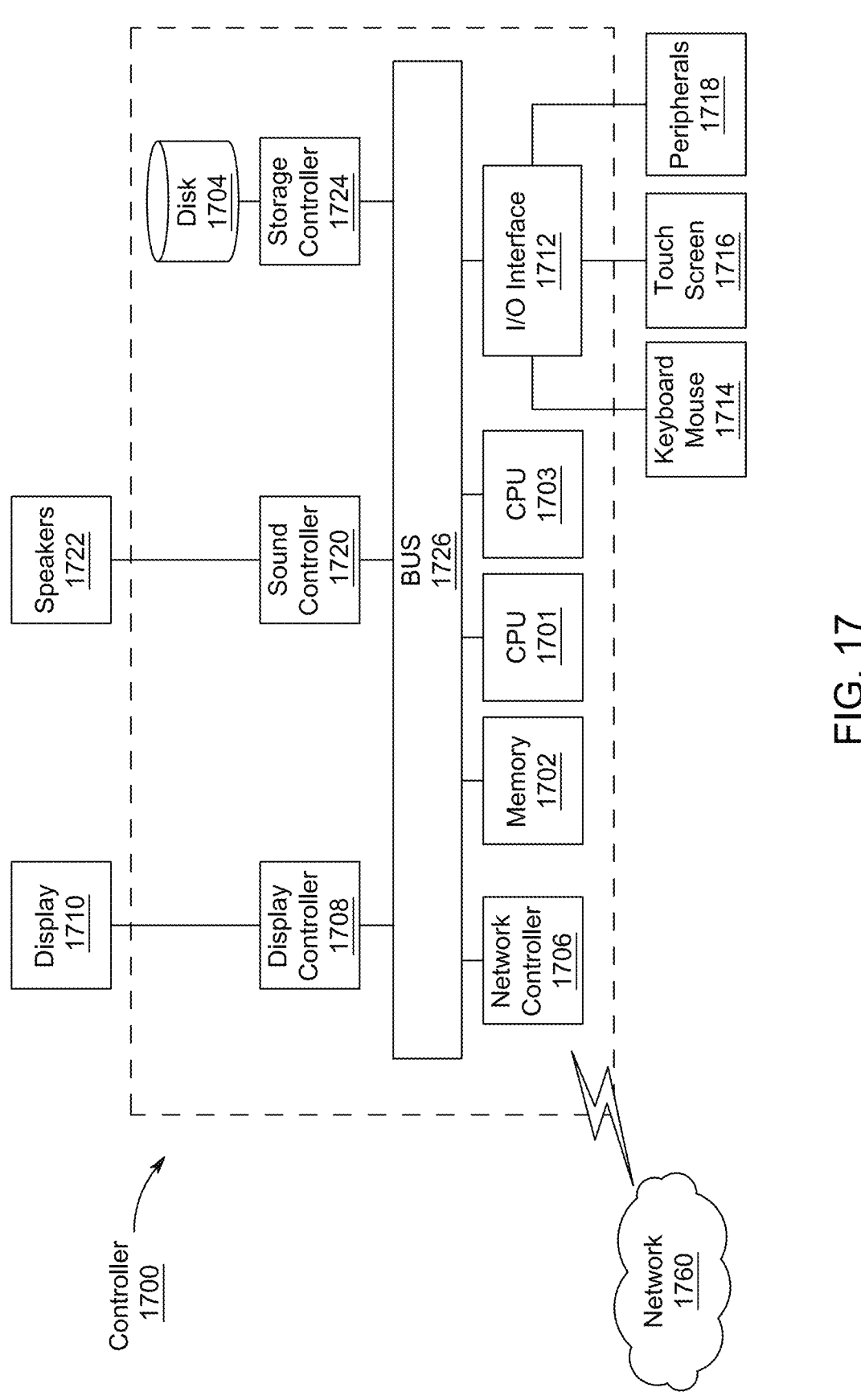
FIG. 17 is an illustration of a non-limiting example of details of computing hardware used in the computing system, according to certain embodiments.

Next, further details of the hardware description of the computing environment of FIG. 1 according to exemplary embodiments is described with reference to FIG. 17. In FIG. 17, a controller 1700 is described is representative of the system 600 of FIG. 6 in which the controller is a computing device which includes a CPU 1701 which performs the processes described above/below. The process data and instructions may be stored in memory 1702. These processes and instructions may also be stored on a storage medium disk 1704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 1701, 1703 and an operating system such as Microsoft Windows 17, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1701 or CPU 1703 may be a Xenon or Core processor from Intel of America or an Opteron processor from AMD of America, or may be other processor types that would be recognized by one of ordinary skill in the art. Alternatively, the CPU 1701, 1703 may be implemented on an FPGA, ASIC, PLD or using discrete logic circuits, as one of ordinary skill in the art would recognize. Further, CPU 1701, 1703 may be implemented as multiple processors cooperatively working in parallel to perform the instructions of the inventive processes described above.

The computing device in FIG. 17 also includes a network controller 1706, such as an Intel Ethernet PRO network interface card from Intel Corporation of America, for interfacing with network 1760. As can be appreciated, the network 1760 can be a public network, such as the Internet, or a private network such as an LAN or WAN network, or any combination thereof and can also include PSTN or ISDN sub-networks. The network 1760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1708, such as a NVIDIA GeForce GTX or Quadro graphics adaptor from NVIDIA Corporation of America for interfacing with display 1710, such as a Hewlett Packard HPL2445w LCD monitor. A general purpose I/O interface 1712 interfaces with a keyboard and/or mouse 1714 as well as a touch screen panel 1716 on or separate from display 1710. General purpose I/O interface also connects to a variety of peripherals 1718 including printers and scanners, such as an OfficeJet or DeskJet from Hewlett Packard.

A sound controller 1720 is also provided in the computing device such as Sound Blaster X-Fi Titanium from Creative, to interface with speakers/microphone 1722 thereby providing sounds and/or music.

The general purpose storage controller 1724 connects the storage medium disk 1704 with communication bus 1726, which may be an ISA, EISA, VESA, PCI, or similar, for interconnecting all of the components of the computing device. A description of the general features and functionality of the display 1710, keyboard and/or mouse 1714, as well as the display controller 1708, storage controller 1724, network controller 1706, sound controller 1720, and general purpose I/O interface 1712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 18:
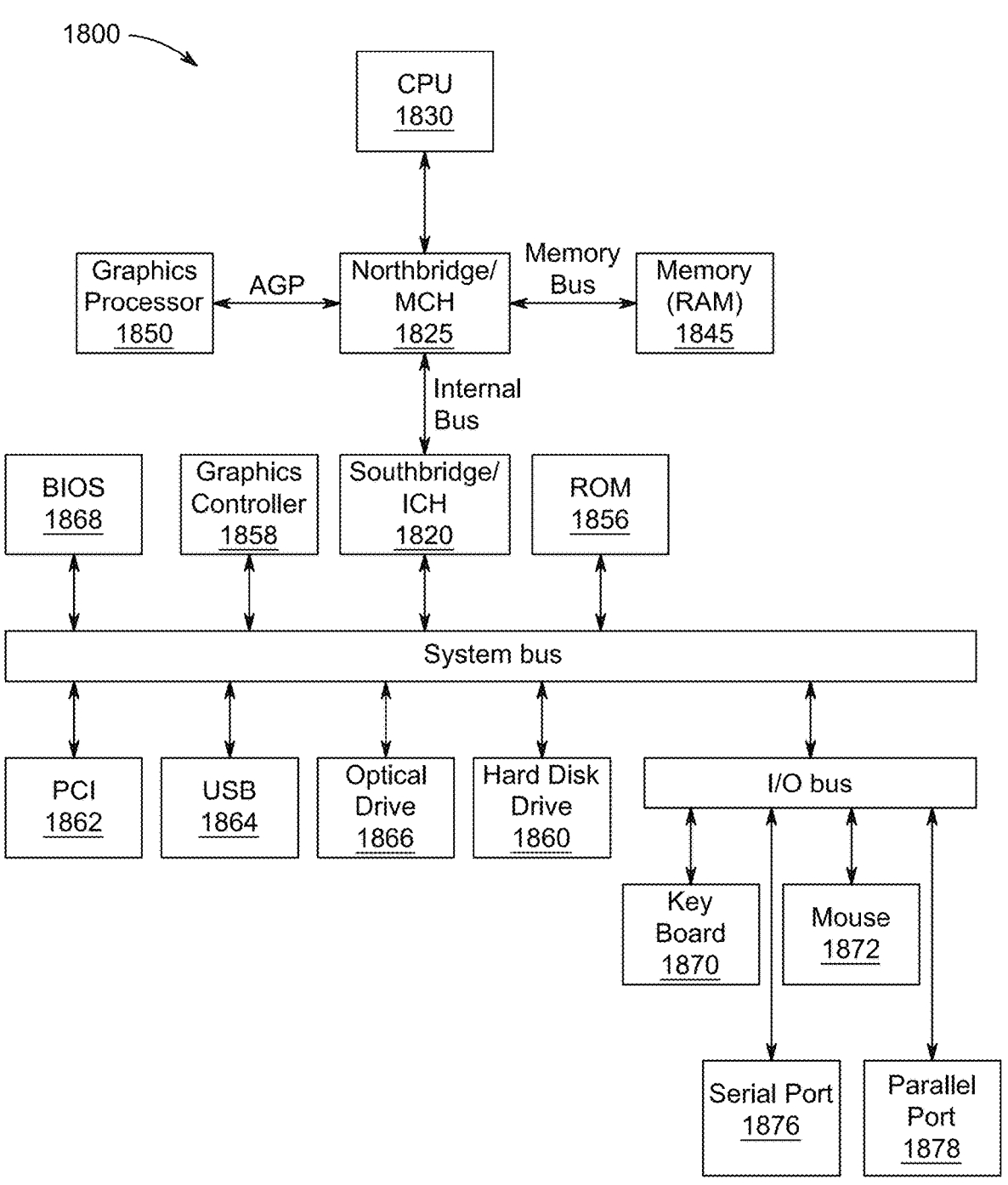
FIG. 18 is an exemplary schematic diagram of a data processing system used within the computing system, according to certain embodiments.

FIG. 18 shows a schematic diagram of a data processing system, according to certain embodiments, for performing the functions of the exemplary embodiments. The data processing system is an example of a computer in which code or instructions implementing the processes of the illustrative embodiments may be located.

In FIG. 18, data processing system 1800 employs a hub architecture including a north bridge and memory controller hub (NB/MCH) 1825 and a south bridge and input/output (I/O) controller hub (SB/ICH) 1820. The central processing unit (CPU) 1830 is connected to NB/MCH 1825. The NB/MCH 1825 also connects to the memory 1845 via a memory bus, and connects to the graphics processor 1850 via an accelerated graphics port (AGP). The NB/MCH 1825 also connects to the SB/ICH 1820 via an internal bus (e.g., a unified media interface or a direct media interface). The CPU Processing unit 1830 may contain one or more processors and even may be implemented using one or more heterogeneous processor systems.

Figure 19:
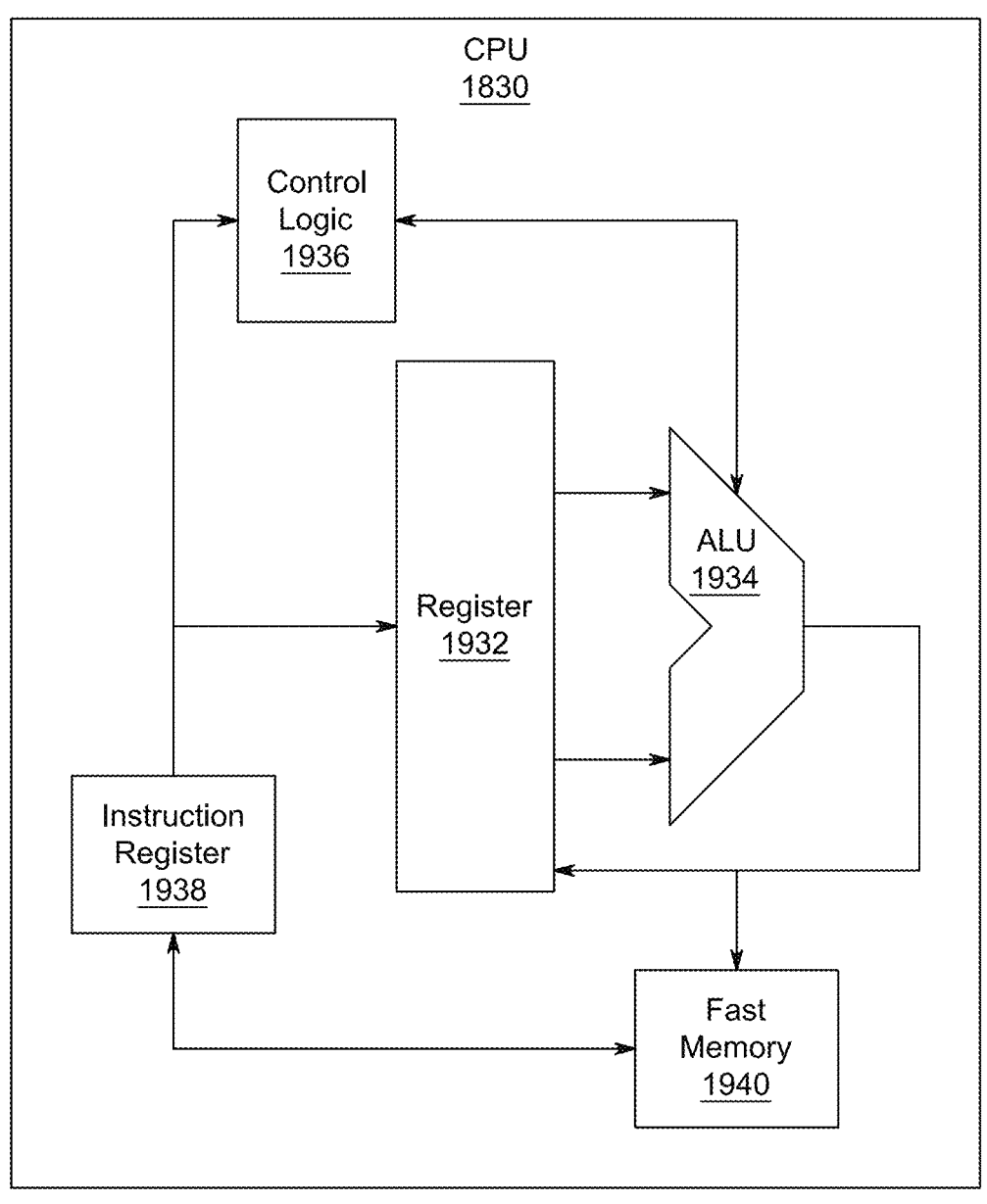
FIG. 19 is an exemplary schematic diagram of a processor used with the computing system, according to certain embodiments.

For example, FIG. 19 shows one implementation of CPU 1830. In one implementation, the instruction register 1938 retrieves instructions from the fast memory 1940. At least part of these instructions are fetched from the instruction register 1938 by the control logic 1936 and interpreted according to the instruction set architecture of the CPU 1830. Part of the instructions can also be directed to the register 1932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 1934 that loads values from the register 1932 and performs logical and mathematical operations on the loaded values according to the instructions. The results from these operations can be feedback into the register and/or stored in the fast memory 1940. According to certain implementations, the instruction set architecture of the CPU 1830 can use a reduced instruction set architecture, a complex instruction set architecture, a vector processor architecture, a very large instruction word architecture. Furthermore, the CPU 1830 can be based on the Von Neuman model or the Harvard model. The CPU 1830 can be a digital signal processor, an FPGA, an ASIC, a PLA, a PLD, or a CPLD. Further, the CPU 1830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 18, the data processing system 1800 can include that the SB/ICH 1820 is coupled through a system bus to an I/O Bus, a read only memory (ROM) 1856, universal serial bus (USB) port 1864, a flash binary input/output system (BIOS) 1868, and a graphics controller 1858. PCI/PCIe devices can also be coupled to SB/ICH 1888 through a PCI bus 1862.

The PCI devices may include, for example, Ethernet adapters, add-in cards, and PC cards for notebook computers. The Hard disk drive 1860 and CD-ROM 1866 can use, for example, an integrated drive electronics (IDE) or serial advanced technology attachment (SATA) interface. In one implementation the I/O bus can include a super I/O (SIO) device.

Further, the hard disk drive (HDD) 1860 and optical drive 1866 can also be coupled to the SB/ICH 1820 through a system bus. In one implementation, a keyboard 1870, a mouse 1872, a parallel port 1878, and a serial port 1876 can be connected to the system bus through the I/O bus. Other peripherals and devices that can be connected to the SB/ICH 1820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method of analyzing computer source code to detect code smells, comprising:

inputting, via processing circuitry, the source code;

creating, via the processing circuitry, pseudo labels by a proxy task based on a vector of tokens for the source code;

training, via the processing circuitry, a transformer model on the pseudo labels, as a pre-trained model that outputs a prediction of a value of tokens in the vector of tokens;

applying, via the processing circuitry, the pre-trained model to a plurality of fine-tuning models for respective downstream tasks, wherein each fine-tuning model is created by training the pre-trained model; and outputting, via the processing circuitry, from each fine-tuning model, an indication of whether a code smell has been detected in the source code.

2. The method of claim 1, further comprising:

inputting, via the processing circuitry, the source code;

parsing, via the processing circuitry, the source code to extract classes and extract textual features of the classes;

applying, via the processing circuitry, a set of preprocessing techniques, including tokenization, filtering, truncation, and vectorization, to convert the textual features into a proper format; and inputting, via the processing circuitry, the formatted textual features for training the transformer model.

3. The method of claim 2, wherein the step of creating pseudo labels includes:

given results from the preprocessing techniques of the formatted textual features that consists of m instances where a single instance i is associated with x value which is a feature vector of length n tokens, where each instance i represents a whole class or part of a class, a list R of reserved words of a target programming language, and a unique token $MASK_{ID}$:

getting, via the processing circuitry, index positions of reserved words in a feature vector of n tokens;

masking, via the processing circuitry, reserved words randomly;

masking, via the processing circuitry, random tokens; and constructing, via the processing circuitry, a new data set with the pseudolabels.

4. The method of claim 3, wherein the training includes:

inputting, via the processing circuitry, the randomly masked reserved words; and training, via the processing circuitry, the Transformer model on the source code in which the masked reserved words have been applied.

5. The method of claim 1, wherein the respective downstream tasks include:

class-level code smells: God Class and Data Class, and method-level code smells: Feature Envy and Long Method.

6. The method of claim 1, wherein the inputting includes inputting, via the processing circuitry, a sequence of code for a class, wherein the sequence of code is a sequence of tokens including out of vocabulary tokens and mask tokens.

7. The method of claim 6, wherein a representation of each token in the sequence of code is a summation of a token embedding and a positional embedding.

8. The method of claim 7, wherein in the token embedding, each token is mapped to a dense vector of a fixed embedding dimension.

9. The method of claim 7, wherein the positional embedding is a representation of a position of each token within the sequence of code.

10. A system for source code smell detection, comprising: processing circuitry configured to
input a source code,
create pseudo labels by a proxy task based on a vector of tokens for the source code,
train a transformer model on the pseudo labels, as a pre-trained model that outputs a prediction of a value of tokens in the vector of tokens,
apply the pre-trained model to a plurality of fine-tuning models for respective downstream tasks, wherein each fine-tuning model is created by training the pre-trained model, and
output from each fine-tuning model, an indication of whether a code smell has been detected in the source code.
11. The system of claim 10, the processing circuitry further configured to:
input the source code,
parse the source code to extract classes and extract textual features of the classes,
apply a set of preprocessing techniques, including tokenization, filtering, truncation, and vectorization, to convert the textual features into a proper format, and
input the formatted textual features for training the transformer model.
12. The system of claim 11, wherein the create pseudo labels by the processing circuitry includes:
given results from the preprocessing techniques, of the formatted textual features that consists of m instances where a single instance i is associated with x value which is a feature vector of length n tokens, where each instance i represents a whole class or part of a class, a list R of reserved words of a target programming language, and a unique token $MASK_{ID}$: the processing circuitry further configured to:
get index positions of reserved words in a feature vector of n tokens,
mask reserved words randomly,
mask random tokens, and
construct a new data set with the pseudo labels.
13. The system of claim 12, wherein the train by the processing circuitry is further configured to:
input the randomly masked reserved words, and
train the Transformer model on the source code in which the masked reserved words have been applied.

14. The system of claim 10, wherein the respective downstream tasks, by the processing circuitry, include:
class-level code smells: God Class and Data Class, and method-level code smells: Feature Envy and Long Method.
15. The system of claim 10, wherein the input by the processing circuitry includes:
input a sequence of code for a class, wherein the sequence is a sequence of tokens including out of vocabulary tokens and mask tokens.
16. The system of claim 15, wherein a representation of each token in the sequence of tokens is a summation of a token embedding and a positional embedding.
17. The system of claim 16, wherein in the token embedding, each token is mapped to a dense vector of a fixed embedding dimension.
18. The system of claim 17, wherein the positional embedding is a representation of a position of each token within the sequence of tokens.
19. The system of claim 10, wherein the respective downstream tasks that the pre-trained model is applied are each configured on separate processing circuitry, wherein each fine-tuning model for a respective downstream task is created by training the pre-trained model.
20. A non-transitory computer-readable storage medium including computer executable instructions, wherein the instructions, when executed by processing circuitry, cause the processing circuitry to perform a method of analyzing computer source code to detect code smells, the method comprising:
inputting, via the processing circuitry, the source code;
creating, via the processing circuitry, pseudo labels by a proxy task based on a vector of tokens for the source code;
training, via the processing circuitry, a transformer model on the pseudo labels, as a pre-trained model that outputs a prediction of a value of tokens in the vector of tokens;
applying, via the processing circuitry, the pre-trained model to a plurality of fine-tuning models for respective downstream tasks, wherein each fine-tuning model is created by training the pre-trained model; and
outputting, via the processing circuitry, from each fine-tuning model, an indication of whether a code smell has been detected in the source code.

* * * * *